United States Patent [19]
Bothof et al.

[11] 4,105,995
[45] Aug. 8, 1978

[54] DIGITALLY CONTROLLED TRANSMISSION IMPAIRMENT MEASURING APPARATUS

[75] Inventors: Delwin L. Bothof, Cupertino; Richard G. Fowles, San Jose; Johann J. Heinzl, Cupertino; David R. Novotny, San Jose; Robert L. Weisickle, San Jose; John H. Wetzel, Santa Clara; Paul G. Winninghoff, Sunnyvale, all of Calif.

[73] Assignee: Hewlett-Packard Company, Palo Alto, Calif.

[21] Appl. No.: 697,071

[22] Filed: Jun. 16, 1976

[51] Int. Cl.² .................. G08C 25/00; G06F 11/00
[52] U.S. Cl. .................. 340/146.1 E; 179/175.3 R; 235/302
[58] Field of Search ............ 235/153 AC, 153 AK, 235/302; 340/146.1 E, 172.5; 445/1; 179/175.2 R, 175.3 R; 324/73 R; 364/200, 900

[56] References Cited

U.S. PATENT DOCUMENTS

| | | | |
|---|---|---|---|
| 3,525,077 | 8/1970 | Jablonski | 445/1 |
| 3,564,509 | 2/1971 | Perkins et al. | 445/1 |
| 3,678,379 | 7/1972 | Arvay et al. | 179/175.3 R |
| 3,814,869 | 6/1974 | De Luca | 179/175.3 R |
| 3,890,495 | 6/1975 | Bauer et al. | 235/153 AK |
| 3,910,322 | 10/1975 | Hardesty, Jr. et al. | 445/1 |
| 3,958,111 | 5/1976 | Hackett | 235/153 AK |
| 3,969,594 | 7/1976 | DeLuca et al. | 179/175.3 R |
| 3,980,839 | 9/1976 | Hutcheson | 179/175.2 R |
| 4,001,559 | 1/1977 | Osborne et al. | 179/175.3 R |

Primary Examiner—Charles E. Atkinson
Attorney, Agent, or Firm—Theodore Scott Park

[57] ABSTRACT

A portable microprocessor controlled transmission impairment measuring unit capable of operating as a master unit or a slave unit and responsive to digital or manual control measures all basic parameters necessary to characterize a voice channel for its ability to transmit data traffic, as defined by Bell System Technical Reference PUB41009, dated May 1975. Measurements can be made manually end-to-end with a unit at each end of a circuit to be tested; manually looped-back with a unit at one end of the circuit; or remotely from one end with a MASTER operated unit controlling a SLAVE operated unit with all measurements displayed on the MASTER unit. The unit can also be used as a voice frequency repeater and can be operated with other test sets and computers having compatible measurements and capabilities.

All measurements are displayed on digital readouts. Two separate readouts allow simultaneous display of up to two different parameters. The displays can be selected to show either transmitted or received information. Measurement unit annunciators beside each readout automatically show an operator the measurement displayed. Ranging, decimal placement, and polarity are all completely automatic. Remote control capabilities of the unit allow measurement of specified line parameters on a common carrier telephone channel with complete control and display provided at a selected end of a line under test.

26 Claims, 56 Drawing Figures

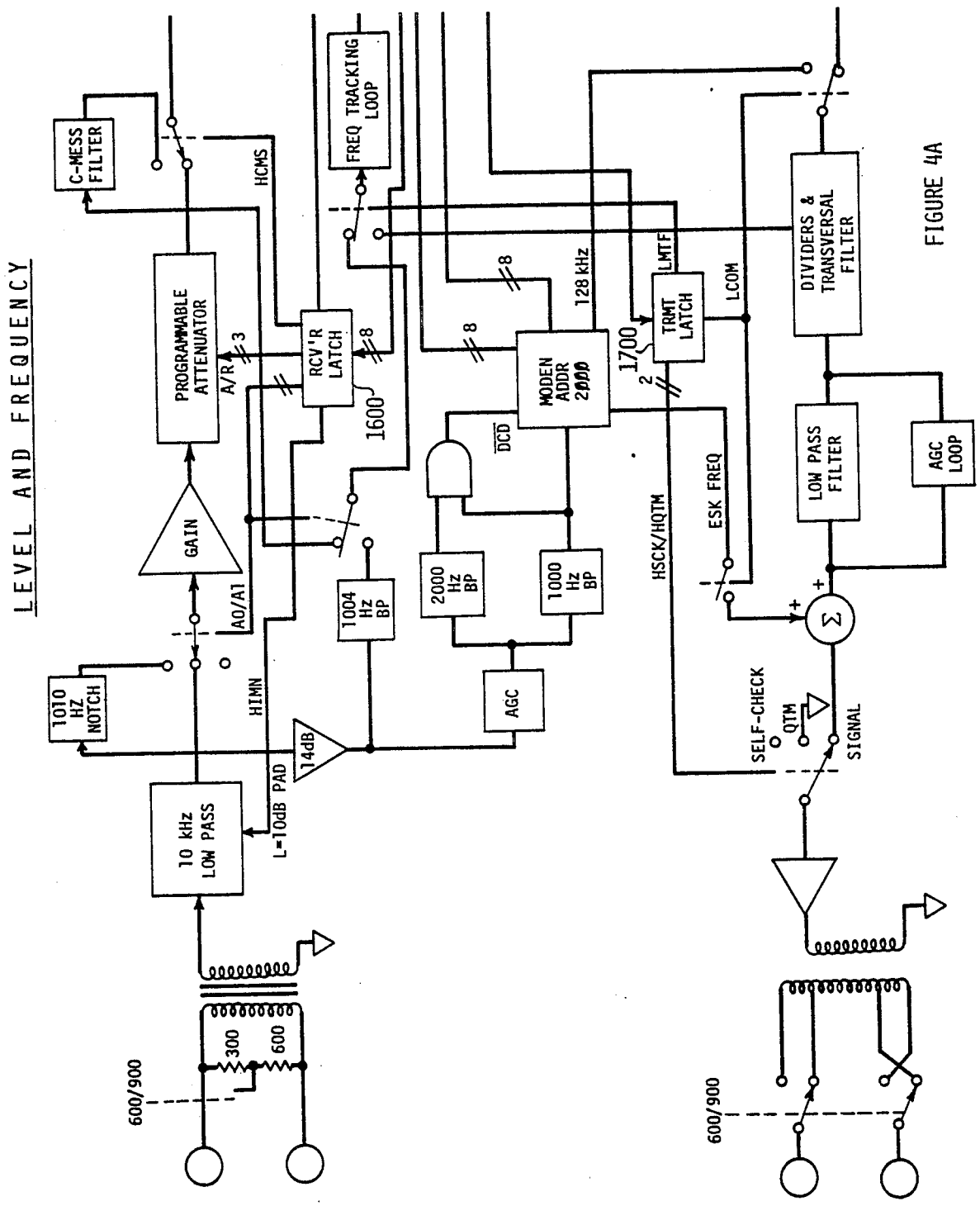

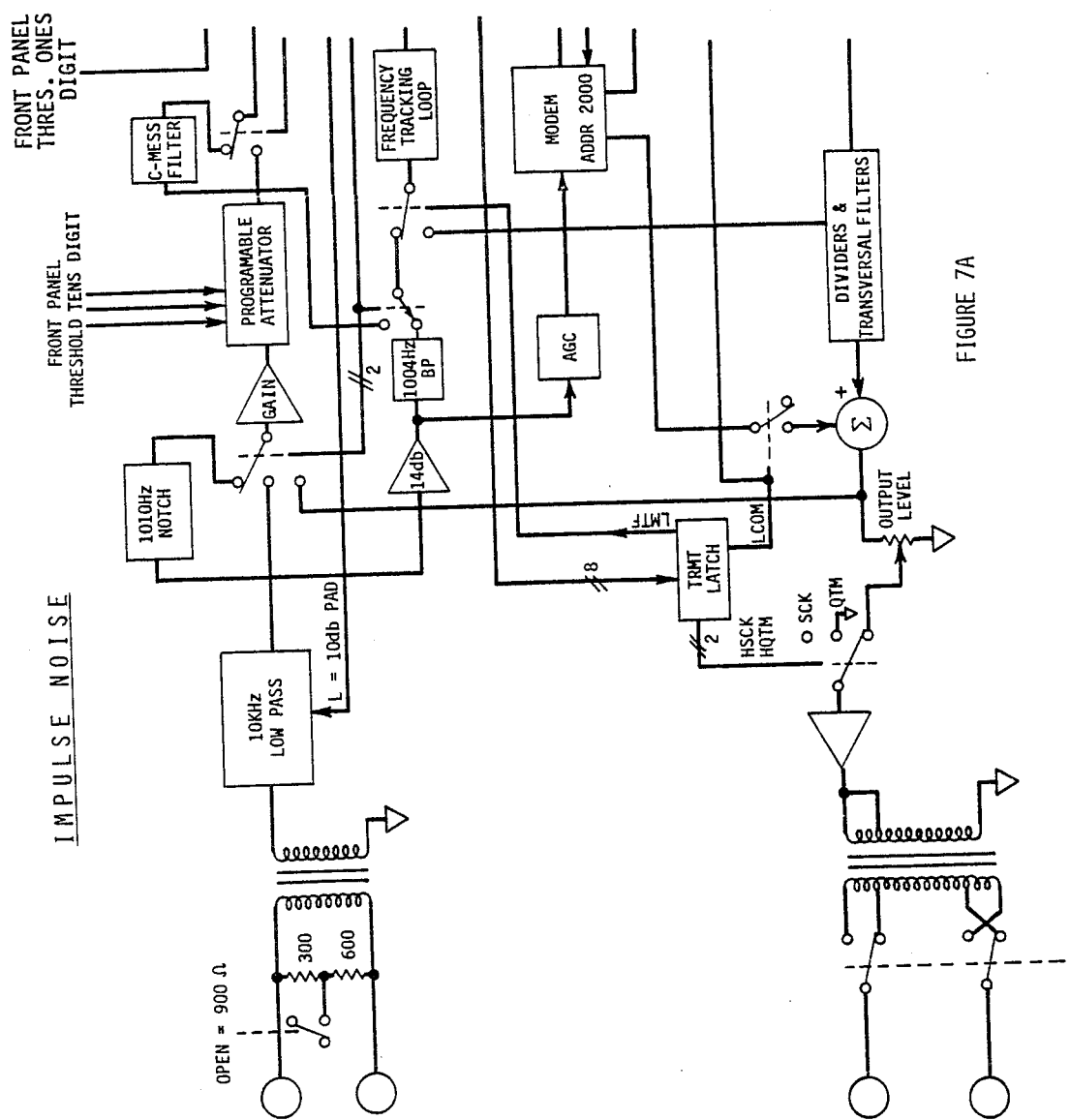

DIGITALLY CONTROLLED TRANSMISSION IMPAIRMENT MEASURING APPARATUS

BACKGROUND AND SUMMARY

In the prior art it has been necessary to have a skilled craftsperson and a transmission test set at each end of a circuit under test. The skilled craftspeople manually operated each instrument and recorded data. Coordination of the test effort frequently required an additional unused circuit and the test effort frequently proved tedious, time-consuming and produced inconsistent results.

The invention provides a portable transmission impairment measuring instrument capable of operating as a MASTER or SLAVE unit and requiring only the circuit under test for communication. A microprocessor in the MASTER unit automatically controls operation of the MASTER unit and a SLAVE unit at each end of a line under test in accordance with preprogrammed micro-instructions stored in a read only memory.

DESCRIPTION OF THE DRAWINGS

FIG. 13 comprised of FIGS. 13A-13H, is a schematic diagram of Transmitter and Latch A13.

FIG. 14, comprised of FIGS. 14A-14H, is a schematic diagram of Microprocessor Hardward Board A15.

FIG. 15, comprised of FIGS. 15A and 15B, is a block diagram of the transmitter system.

DESCRIPTION OF THE PREFERRED EMBODIMENT

Figure 1:
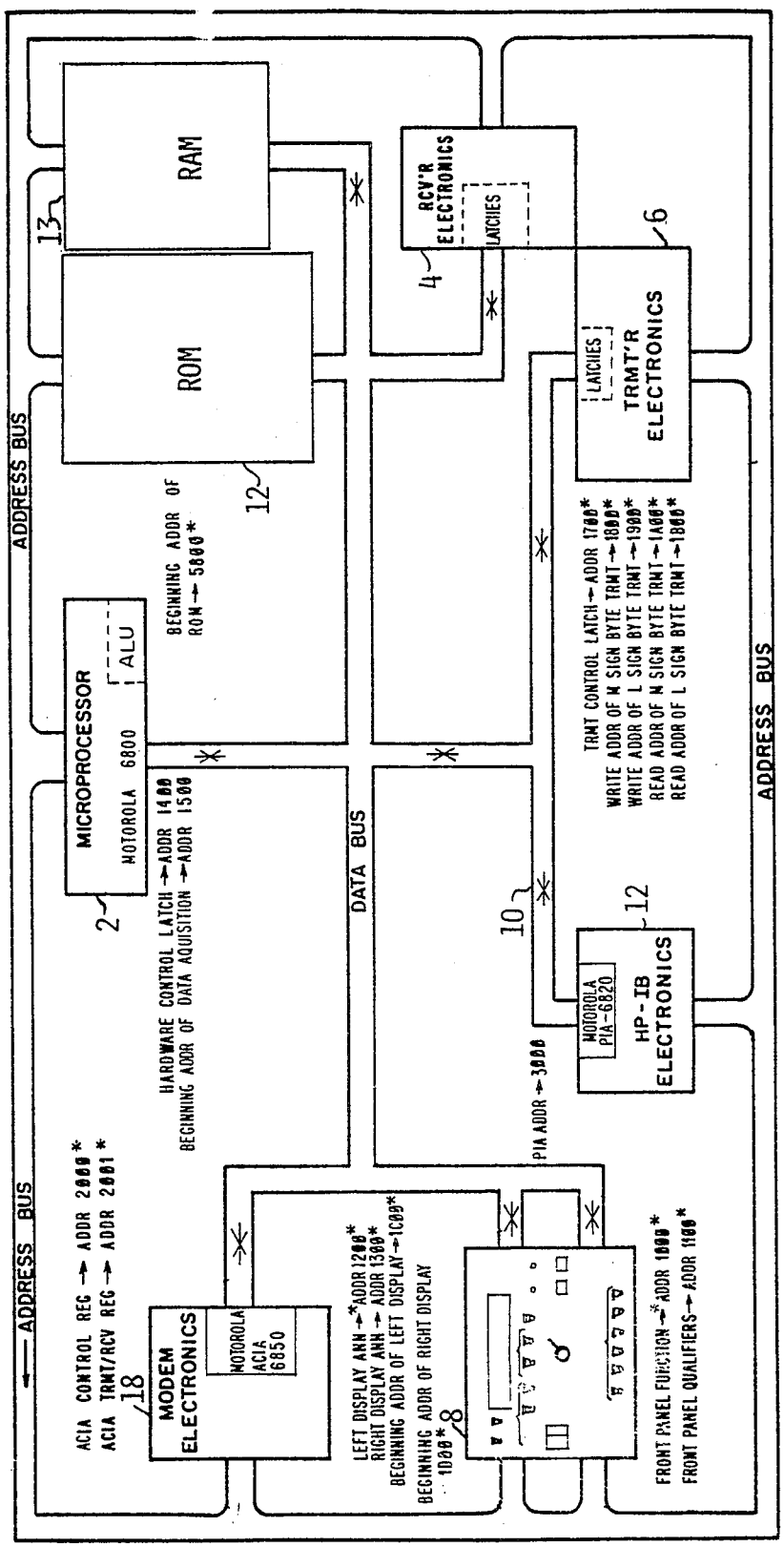
FIG. 1 is a block diagram depicting the system architecture for the preferred embodiment.

Referring to FIG. 1, processing and control in the preferred embodiment is done by a microprocessor or 2. The microprocessor 2 has control over receiver electronics 4, transmitter electronics 6 and displays 8 through the bus 10.

Upon POWER ON of the unit, the microprocessor 2 is restarted and begins executing a program stored in ROM 12. Its first action is to read front panel control status at hex addresses 1000 and 1100 corresponding to front panel switch setting. A Normal Measurement Routine, a MASTER/SLAVE Routine, or a Calculator Control Routine is then performed as described more fully hereinbelow.

NORMAL MEASUREMENT ROUTINE

Step 1: The preferred embodiment first analyzes front panel information corresponding to front panel switch settings and then goes to a look-up table to determine which bits of the system latches must be set to make the measurement.

Step 2: A receiver control latch within receiver electronics 4 is enabled, addr 1600, which programs the receiver electronics 4 into its proper configuration (e.g., selects Quasi RMS Detector or Average Detector) as described more fully hereinafter.

Step 3: A transmitter control latch within transmitter 6 is enabled, addr 1700, which programs the transmitter 6 to its proper configuration (e.g., selects fixed freq. or variable frequency as described more fully hereinafter).

Step 4: The measurement begins by selecting the proper data through a multiplexor, addr 1400, and enabling a counter.

Step 5: Data at the output of the counter is read by enabling a data acquistion latch, addr 1500.

Step 6: Data is converted, if necessary, to the proper units and then sent to the display 8, addresses 1200, 1300, IC00, and 1D00. The microprocessor 2 continually scans the front panel 8 and an HP-IB* interface 12, described more fully hereinafter, for qualifiers that may change the routine.

Figure 2:
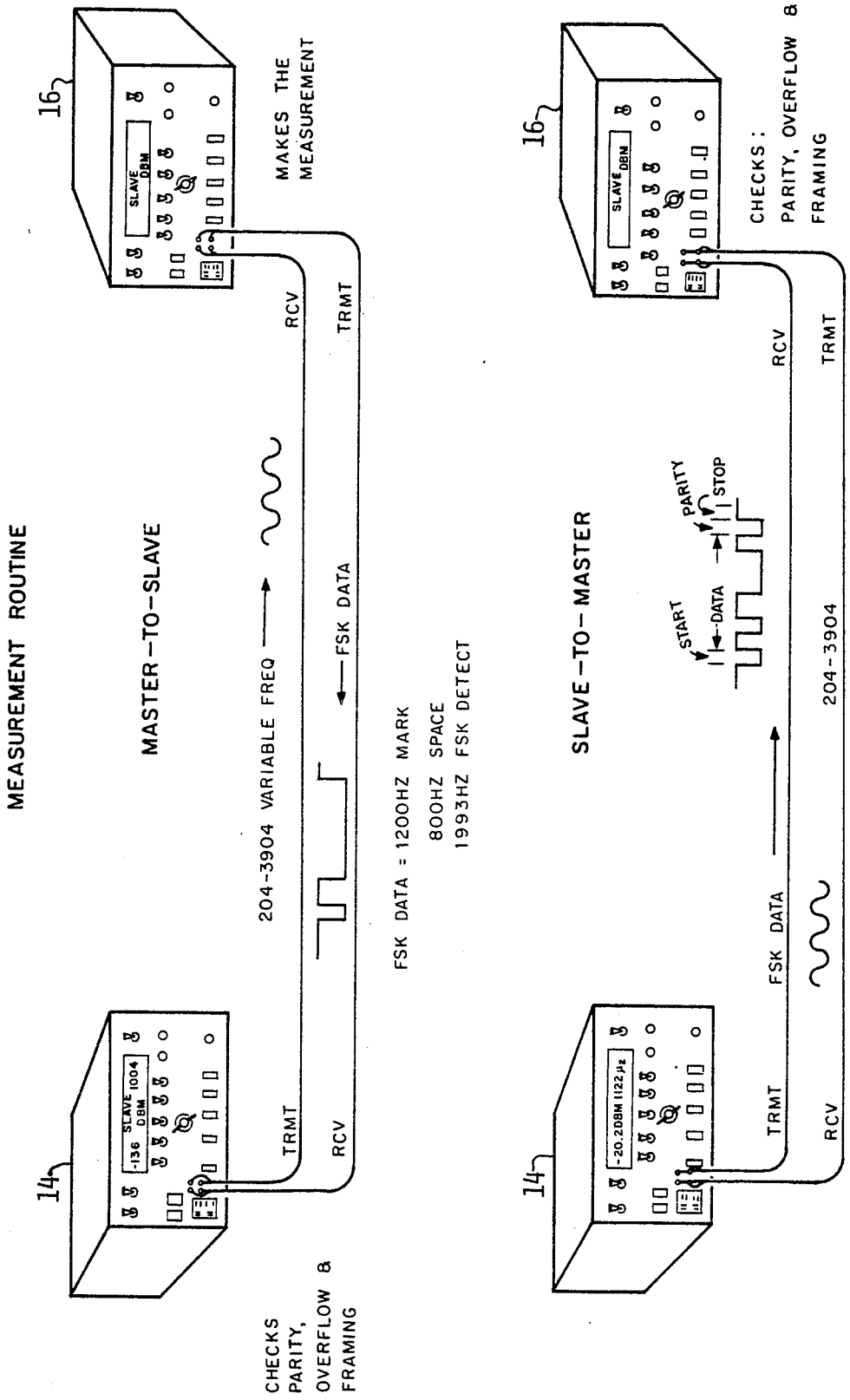
FIG. 2 shows a typical hookup employing two processor controlled MASTER/SLAVE transmission impairment measuring sets.
Figure 3:
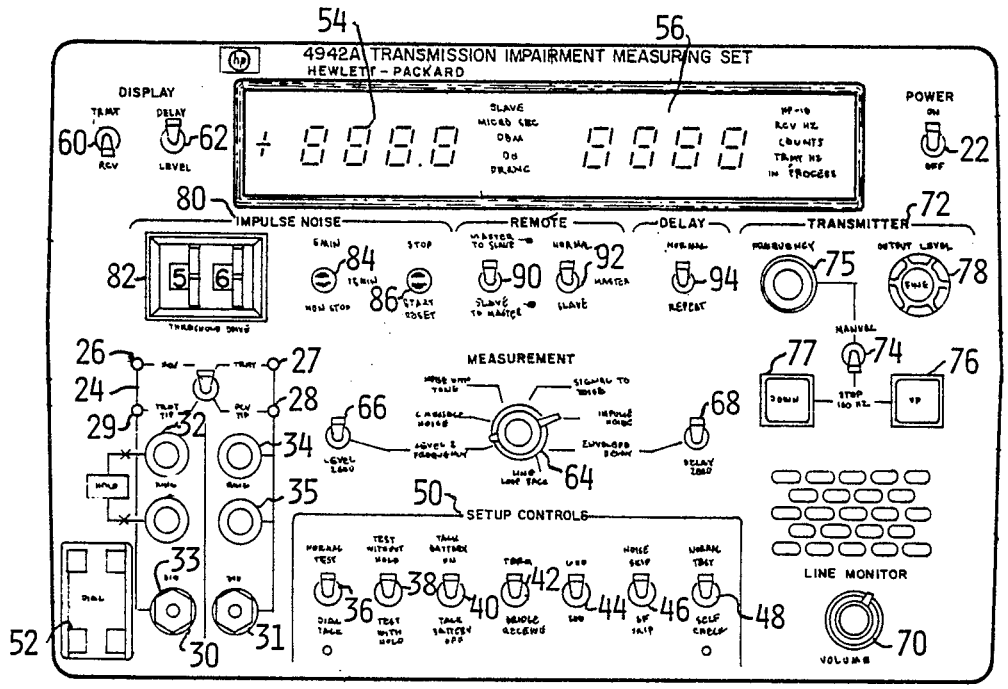
FIG. 3 shows controls, connectors and indicators for the preferred embodiment.
Figure 3:
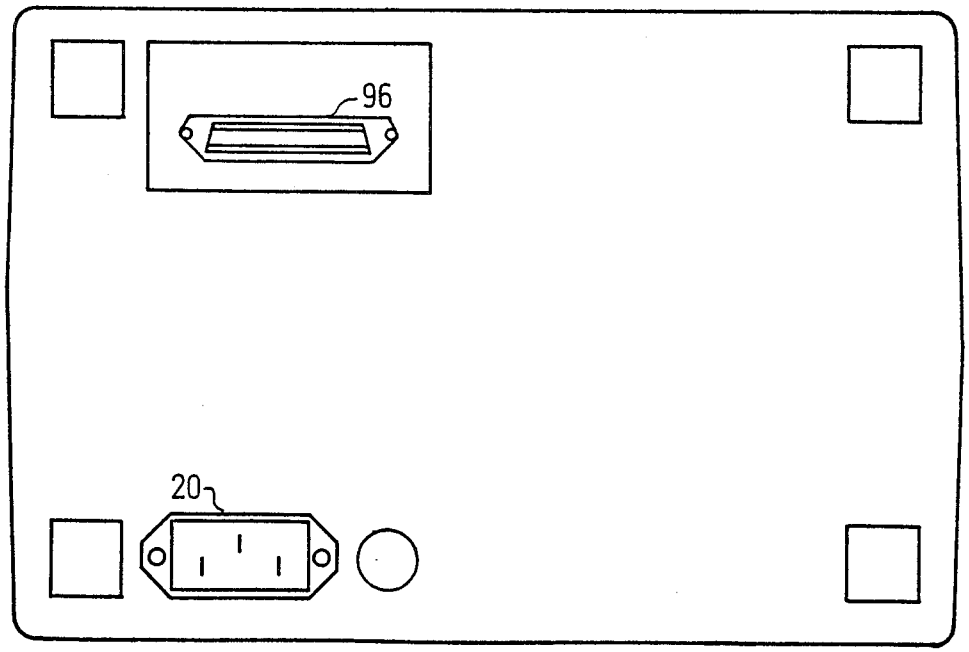

The transmitter 6 is controlled by front panel switches when in the variable frequency mode and is programmed by the microprocessor 2 when in the fixed frequency mode. Referring to FIG. 2, the direction of a measurement routine is defined on a front panel as MASTER-TO-SLAVE or SLAVE-TO-MASTER. MASTER-TO-SLAVE indicates a MASTER set 14 is transmitting and a SLAVE 16 is receiving. The SLAVE 16 makes the measurement and returns the information to the MASTER 14 via a return line by low speed FSK. In SLAVE-TO-MASTER direction, the MASTER 14 reads its front panel frequency controls and sends FSK data to the SLAVE 16 indicating which frequency the SLAVE should send. The MASTER 14 is then the receiver and makes the measurement.

MASTER/SLAVE ROUTINE: Master Set

The measurement requires a unit at each end, one set to MASTER and the other to SLAVE. The MASTER communicates the measurement and direction of test (which line is to be tested) to the SLAVE. It initializes the test through a handshake routine and then starts the measurement. All data is displayed at the MASTER. The hardware and microprocessor interface operation follows a format such as the following:

Step 1: Front panel information is analyzed, at address locations 1000 and 1100 and then a look-up table is checked for latch settings to make the measurement.

Step 2: Direction of test and measurement information is sent to the SLAVE by addressing a modem 18, address 2000 and 2001.

STEP 3: A receiver control latch, addr 1600 is enabled which programs the receiver into its proper configuration.

Step 4: The A transmit, TRMT hereafter, TRMT control latch, addr 1700, is enabled which programs the transmitter 6 to its proper configuration.

Step 5: If SLAVE-TO-MASTER direction, the MASTER starts making the measurement by selecting the proper data through the multiplexor, addr 1400, and enables the counter. Also, the MASTER reads the transmitter counters, addr 1A00, & 1B00, and sends the data to the SLAVE for programming the SLAVE send frequency. It sends data via the modem 18 at address 2000.

Step 6: If SLAVE-TO-MASTER direction, the master reads the data at the output of the counter by enabling the data acquisition latch, address 1500. If MASTER-TO-SLAVE direction, the master reads the data from the modem, addresses 2000 and 2001, which the SLAVE has sent.

Step 7: Data is converted, if necessary to proper units and sent to the displays, addr 1200, 1300, 1C00 and 1D00.

The microprocessor 2 continually scans the front panel switch settings at hex addresses 1000 and 1100 and HP-IB* interface 12 for qualifier switch changes which would change the routine.

MASTER/SLAVE ROUTINE: Slave Set

When the front panel remote switch is in the SLAVE position, the instrument only scans this switch and ignores all other function and qualifier switches. It receives all its measurement information from the MASTER set. A typical routine is as follows:

When remote switch is in SLAVE position, modem address 2000 and 2001 is checked to receive front panel information, then the look-up table in ROM 12 is checked for instrument latch settings.

STEP 2: The receiver control latch, addr 1600 within receiver 4 is enabled which programs the receiver to its proper configuration.

Step 3: The TRMT control latch, address 1700 within transmitter 6, is enabled which programs the transmitter to its proper configuration.

Step 4: If MASTER-TO-SLAVE direction, the SLAVE starts the measurement by selecting the proper data through the multiplexor, address 1400, and enabling the counter. If SLAVE-TO-MASTER direction, the SLAVE reads the transmitter data from the MASTER at the modem 18 address 2000, and programs its transmitter 6 by enabling a parallel load into TRMT counters, addresses 1800 and 1900.

Step 5: If MASTER-TO-SLAVE, the SLAVE reads the data at the output of its counter by enabling its data acquisition latch, address 1500.

Step 6: If MASTER-TO-SLAVE, the SLAVE sends the measurement data back to the MASTER via its modem 18, address 2000.

CALCULATOR CONTROL ROUTINE

Under computer or calculator digital control the routines are exactly the same as the previous sections with one exception. The microprocessor 2 now goes to the HP-IB 12, address 3000, for its front panel information instead of getting it from the front panel switch setting at addresses 1000 and 1100. When operated in the MASTER/SLAVE mode under HP-IB 12 control, a controller can completely test a private line telephone network with all data available at the controller.

Each unit has its own internal modem eletronics 18. The FSK frequencies are: 1200 Hz = Mark; 800 Hz = Space. A third frequency is used so that the modem 18 can differentiate between a single frequency near 800 and 12000 Hz and the FSK signal. This frequency is 1993 Hz and is also used as the reference carrier for Envelope Delay when measuring in the SLAVE-TO-MASTER DIRECTION. The preferred embodiment uses Motorola's ACIA from the 6800 microprocessor family. The ACIA has framing, parity, and overflow error checks. The modem 18 interfaces to the microprocessor 2 in the preferred embodiment. The communication between units is controlled by a microprocessor program described more fully hereinafter.

COMMUNICATION

Basically the communication can be broken into two categories. These are the Link-Up Routine and the Measurement Routine.

Link-Up Routine

A handshake routine insures that the instruments will not set up a test improperly and give invalid data. Condition codes in the format of H-XX (given in Table No. 1 below) are displayed if the instruments get false link-up codes because of extremely severe line conditions or an instrument failure or the like.

TABLE 1

| CONDITION CODES | |
|---|---|
| H-00 | Front Panel Controls were changed while Master is attempting to achieve control over Slave. |
| H-01 | No Data Carrier received from Slave - (e.g., Slave is not in Slave mode). |
| H-02 | No Data Information received from Slave. |
| H-03 | Continuous Data Errors - (Parity, overflow or framing). |
| H-04 | Data Errors - (e.g., Slave answers but not with proper words). |
| H-05 | Inappropriate response to Master-Slave commands |
| H-06 | Slave not responding to Master command. |
| H-07 | Incompatible Slave Measurement. |
| H-08 | Invalid command. |
| H-09 | No data received when expected - (e.g., Line drops out for >9 sec.). |
| H-10 | Slave underrange: Test Level or Noise below range capability. |
| H-11 | Master receives incorrect response. |
| H-12 | Impulse Noise accumulator overflow. |
| H-13 | Slave aborted link-up. |
| H-14 | Signal Drop-out >1 sec. during Impulse Noise measurement. |

During link-up the following routine is used:

| | |
|---|---|
| 1. Master Sends An Abort (If unacknowledged abort, the Master displays H-06 but continues sending). | Slave Responds |
| 2. Master Sends Measurement and Direction. (If after 5 attempts the Slave does not respond, the Master displays an H-02 but continues sending the code). | Slave Responds with Identical Code. |
| 3. Master Sends an Execute Command (If after 5 attempts the Slave does not respond correctly, the Master displays an H-05 and returns to Step 1). | Slave Responds with the 2's Compliment of Code from Step 2 and then Sets itself Up for the Measurement Requested |
| 4. Master Sets Itself Up to Make The Measurement. | |

The format of the data word is as follows:
B1 B2 . . . B10 B11
B1 - Start Bit: Low = Start B2, B3 = Type of Data (Control or Measurement)
  10 = Control
  01 = Measurement
B4–B9 = Control Data: Measurement and Direction
B10 = Parity Bit: Odd Parity
B11 = Stop Bit: Stop = High

MEASUREMENT ROUTINE

Once the instruments are linked they change from the linkup routine to a measurement routine. For all measurements except Envelope Delay Distortion, EDD hereafter, one direction is carrying analog signals to be tested while the other is transmitting data. Since EDD requires a complete loop for measurement, the direction of test selects either forward or return reference. Data is sent only when testing Slave-to-Master. When testing Slave-to-Master, a forward reference is used and the reference modulation is carried by the 1993 Hz signal while frequency information is being sent to the Slave. When testing Master-to-Slave, the more traditional return reference is used and the reference is modulated on an 1804 Hz carrier.

Data communications and error checking is accomplished as follows:
1. A block of 5 words is sent by the Slave. Each word is received by the Master and stored until a whole block is received. If parity, framing or overflow errors have occurred in transmission of any of the words, the whole block is ignored and the Master set waits for a new block.
2. A block consists of:
   Word 1 = Start
   Word 2 = Least significant BCD digit of Master Display
   Word 3 = Next least significant digit
   Word 4 = Next least significant digit
   Word 5 = Most significant digit
3. A word consists of 11 bits.
   B1 B2 ... B9 B10 B11
   B1 = Start: Start = Low
   B2, B3 = Control or Measurement Data
     10 = Control
     01 = Measurement
   B4, B5 = Open for Expansion
   B6 – B9 = Data Bits
   B10 = Parity
   B11 = Stop Bit For ease of understanding and clarity, a Description of Controls and Operation Procedures; Description of System Measurements; Hardware Board Theories of Operation; and System Interface Theories of Operation will be separately described in accordance with the Table of Contents below:

TABLE OF CONTENTS

DESCRIPTION OF CONTROLS AND OPERATION PROCEDURES

Description of Controls, Connectors, and Indicators
Self-Check Procedure
Condition Codes
Slave Set-Up Procedure
Master Level and Frequency Procedures
Master C-Message Noise Procedure
Master Noise-With-Tone Procedure
Master Signal-To-Noise Procedure
Master Impulse Noise Procedure
Master Envelope Delay Procedure

DESCRIPTION OF SYSTEM MEASUREMENTS

Level/Frequency
C-Message Noise
Signal To Noise
Noise With Tone
Impulse Noise
Envelope Delay Distortion

HARDWARE BOARD DESCRIPTIONS OF OPERATION

Display
Input
Modem
Filter Modulator
Transmit Control
Output
Transmitter
Envelope Delay
C-Message Filter
Autorange
Detector
Frequency Tracking
HPIB
Power Supply

SYSTEM INTERFACE DESCRIPTION OF OPERATION

Transmitter/Microprocessor Interface
ACIA - Microprocessor Interface
Mnemonic Table
System Program Routines and Subroutines
ROM Listings

DESCRIPTION OF CONTROLS, CONNECTORS, AND INDICATORS

Figure 4:
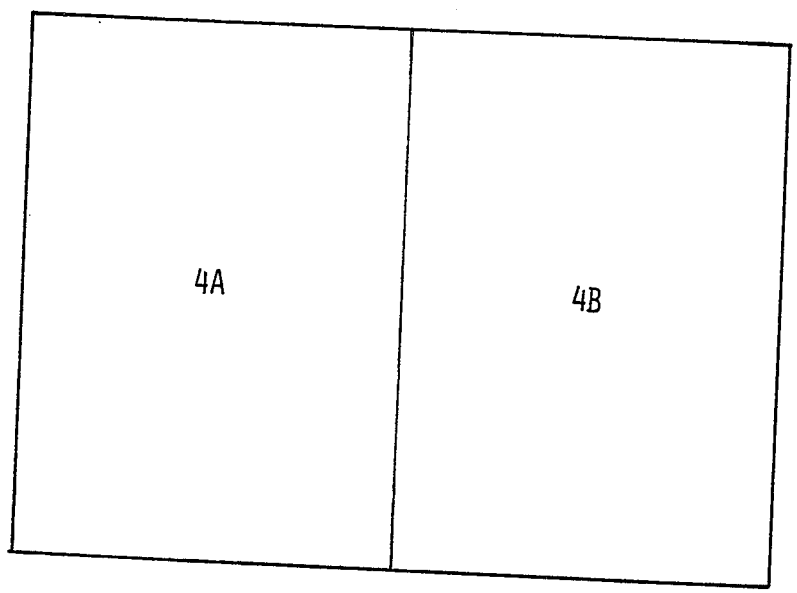
FIG. 4, comprised of FIGS. 4A and 4B, is a block diagram illustrating level and frequency measurements.
Figure 4B:
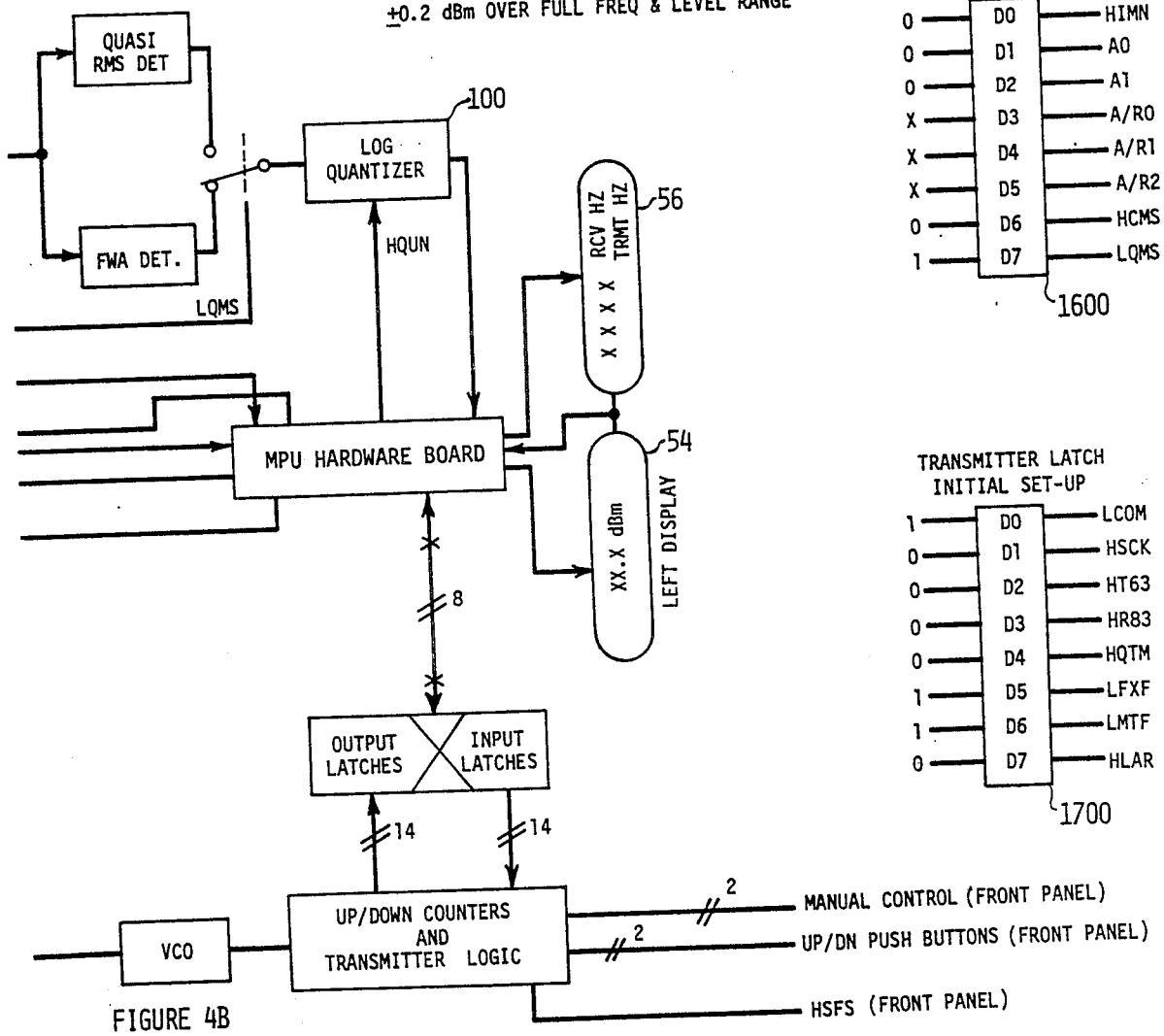

Power Cord Receptacle 20 and Fuse. Referring to FIG. 4, 117V ac (±10%) 60 Hz power is applied to the test set through a male power cord receptacle, located on rear of test set. AC line fusing is provided by a 0.75 Amp (SB) fuse located in the fuse holder next to the power cord receptacle.

POWER Switch 22. Switches test set ac operating power ON and OFF.

RCV-TRMT Jacks 24. A two position toggle switch is used to reverse connections of the left and right jack fields. When switch 24 is in up position, the left jacks are connected for RCV (receive) and the right jacks for TRMT (transmit). When switch 24 is down, connections are reversed. Dot lamps 26-29 indicate functions of respective jack fields. Connections can be made either to the 310 jacks 30 and 31. or to the TIP and RING binding posts 32-35, which are multiplied. The left jack field should always be used for 2-wire wet transmit and receive connections; the right field for 2-wire dry connections. Both left and right jack fields are used for 4-wire connections.

SETUP CONTROLS 50.

NORMAL TEST - DIAL/TALK Switch 36. In NORMAL TEST position the selected TRMT jack is connected to the test set's transmitter circuitry, but not to the DIAL connectors. in DIAL/TALK position the TRMT jack is connected to the DIAL connectors, but not to the transmitter circuitry.

TEST WITHOUT HOLD - TEST WITH HOLD Switch 38. In TEST WITHOUT HOLD position the test set holding circuit is disconnected from the RCV- TRMT jacks. In TEST WITH HOLD position the holding circuit is connected across TIP and RING of the left jack field to hold 2-wire set (DDD) circuits while testing.

TALK BATTERY ON- TALK BATTERY OFF Switch 40. In TALK BATTERY ON position the test set provides the necessary talk battery to the DIAL terminals to talk on dry circuits with a lineman's handset. In TALK BATTERY OFF position, talk battery must be supplied by the circuit under test if talking is desired.

TERM-BRIDGE RECEIVE Switch 42. In TERM position the test set provides a termination on both the RCV AND TRMT circuits. The desired terminating impedance must be selected with the 600-900 switch. In BRIDGE-RECEIVE position the receiving test set is bridged across the circuit under test, which must be terminated with other equipment. NOTE: When using BRIDGE RECEIVE it is still necessary to select the proper impedance of the line under test with the 600-900 switch in order to normalize the measurements.

600-900 Switch 44. The 600Ω or 900Ω termination must be selected to match the characteristic impedance of the line under test. When operating in TERM mode, both the TRMT and RCV circuits are terminated in the selected impedance. When operating in BRIDGE RECEIVE mode, the TRMT circuit is still terminated in the selected impedance and the RCV circuit is bridged by more than 45kΩ. The selection also normalizes level measurements for the respective impedances.

NO SF SKIP-SF SKIP SWITCH 46. In NO SF SKIP position the test set will transmit all selected frequencies. In SF SKIP position the test set will not transmit any frequencies between 2450 Hz and 2750Hz. This feature prevents the circuit under test from being disconnected by SF signaling units on the dial-up network.

NORMAL TEST-SELF CHECK Swtich 48. In NORMAL TEST position the test set performs normal testing. In SELF CHECK position proper operation of the test set can be verified by performing the procedures given in the SELF CHECK section.

DIAL Connectors 52. Provides connections for a lineman's handset (butt-in). The terminals are connected to the selected TRMT jack when the DIAL/TALK mode is selected.

Digital Displays 54, 56. Two digital displays provide quantitative information and measurement units for all measurements. Ranging is automatic, and polarity and decimal points are automatically displayed when appropriate. Up to two parameters can be displayed simultaneously. The displays also indicate underrange and overrange conditions. Display of only a (−) sign indicates underrange. Display of only a (+) sign indicates overrange.

DISPLAY Switches 58.

TRMT - RCV Switch 60. Selects either the transmitted or received information to be displayed.

LEVEL-DELAY Switch 62. Used in ENVELOPE DELAY measurements to display either level (DBM) or delay (MICRO SEC) information.

MEASUREMENT Switch 64. Programs the test set to perform the selected measurement.

LEVEL ZERO Switch 66. Used in LEVEL & FREQUENCY mode to establish a zero dB reference. All subsequent measurements will be made in dB relative to this reference. If this switch is not operated, measurements will be in absolute dBm. NOTE: LEVEL ZERO switch has been actuated and it is desired to make an absolute dBm measurement, momentarily rotating MEASUREMENT switch to another position, then back to LEVEL & FREQUENCY again.

DELAY ZERO Switch 68. Used in ENVELOPE DELAY mode to establish a zero microsecond delay reference. All subsequent enveloped delay measurements will be relative to this reference.

LINE MONITOR Speaker and VOLUME Control 70. Permits listening to the circuit under test, or the test set transmitter. The DISPLAY TRMT-RCV switch determines whether the transmitted or received signal is being monitored. The speaker output is an amplified reproduction of signals on the circuit (except in C-MESSAGE NOISE mode, which produces a C-weighted output). Speaker output can be controlled with the VOLUME control.

TRANSMITTER Controls 72.

MANUAL - STEP 100HZ Switch 74. In MANUAL position frequency is continuously variable from 200 Hz to 3950 Ha by adjusting the FREQUENCY control 75. In STEP 100 HZ position frequency is manually stepped in 100 HZ increments from 204 Hz to 3904 Hz by depressing the UP 76 and DOWN pushbuttons.

OUTPUT LEVEL Control 78. Varies transmitter output level continuously from −39 dBm to +10 dBm. Output level is displayed on left display.

IMPULSE NOISE Controls 80.

THRESHOLD DBRNC Switches 82. Set the desired threshold above which impulse noise peaks will be totalized on the display. The threshold is adjustable from 30 to 109 dBrnC.

5 MIN - 15 MIN - NONSTOP Count Time Switch 84. Selects length of time for which impulse noise is counted. Counting is stopped automatically when either the 5 MIN or 15 MIN positions are selected. Counting must be stopped manually with the STOP - START/RESET switch when the NONSTOP position is selected.

STOP - START/RESET Switch 86. Impulse noise counting is stopped and total is held on display when switch is momentarily held in STOP position. All previous counts are reset to zero on display and new counting interval is initiated when switch is momentarily held in START/RESET position.

REMOTE Switches 88.

MASTER TO SLAVE - SLAVE TO MASTER Switch 90. Selects transmission path to be tested. Selecting the MASTER TO SLAVE position will cause the circuit connected to the TRMT jack at the MASTER unit to be tested. Selecting the SLAVE TO MASTER position will cause the circuit connected to the RCV jack at the MASTER unit to be tested. The dot lamp associated with the respective position indicates that the MASTER unit has achieved control of the SLAVE unit. The lamp should light within 10 seconds after the NORMAL - MASTER - SLAVE switches are properly positioned on both the MASTER and SLAVE units.

NORMAL - MASTER - SLAVE Switch 92. In NORMAL position all controls are under manual control. The test set can be operated manually with other compatible test sets. In MASTER position the unit is in remote control of the SLAVE unit for all MEASUREMENT functions. In SLAVE position the unit is remotely controlled by the MASTER unit for all MEASUREMENT functions.

DELAY Switch 94. Used in ENVELOPE DELAY mode to determine whether the test set is to measure envelope delay (NORM), or to retransmit the enveloped delay signal from the far-end of the circuit (REPEAT). This congtrol is not used during MASTER-SLAVE operation.

HP-IB Connector 96. Connections to Hewlett-Packard Interface Bus for controlling the preferred embodiment with a calculator or computer.

SELF-CHECK

NOTE

The SELF CHECK routine automatically makes an operational check of the test set, including its ability to operate in MASTER and SLAVE modes. The test set will automatically step through the SELF CHECK routine and should produce indications at each step as indicated below. At the end of the SELF CHECK routine, the display will indicate PASS if all checks are within specifications. If any steps fail to pass, the display will indicate failure codes at the end of the routine for those steps that fail to pass. A list of SELF CHECK failure codes, and their meanings are given at the end of this procedure.

The SELF CHECK procedure should be performed periodically to verify performance of the test set. SELF CHECK is recommended before transporting the test set to a remote testing site; or whenever there is any doubt about transmission measurement results.

1. PRELIMINARY SETUP a. Disconnect test set from on-line testing.
b. Switch POWER ON.
c. Loop TRMT jack to RCV jack. Operate RCV/TRMT jack field switch and observe that corresponding dot lamps light.
d. Set all SETUP CONTROLS Switches to "up" positions.
e. Set REMOTE Switch to NORMAL or MASTER.
f. Set NORMAL TEST - SELF CHECK Switch to SELF CHECK.

2. STEP 1: DISPLAY AND ANNUNCIATOR CHECKS a. Observe that left display indicates ±1888.8 and that right display indicates 8888. Observe that all numerical segments are present and evenly illuminated.
b. Observe that all display annunciators are on and evenly illuminated.
c. Observe that MASTER TO SLAVE and SLAVE TO MASTER dot lights are on.

NOTE

It is not necessary to observe the following test routine unless it is desired to analyze a specific problem with the test set. SELF CHECK status will be displayed at the end of the routine.

3. STEPS 2-4: LEVEL & FREQUENCY CHECKS a. Left display should indicate +0.0 DBM (±0.3 dBm). Right display should indicate 204 RCV HZ (±2 Hz).
b. Left display should indicate +0.0 DBM (±0.3 dBm). Right display should indicate 1004 RCV HZ (±2 Hz).
c. Left display should indicate +0.0 DBM (±0.3 dBm). Right display should indicate 3904 RCV HZ (±2 Hz).

4. STEPS 5-7: C-MESSAGE FILTER CHECKS a. Left display should indicate −16.0 DBM(±1.0 dBm). Right display should indicate 304 RCV HZ (±2 Hz).
b. Left display should indicate +0.0 DBM (±0.3 dBm). Right display should indicate 1004 RCV HZ (±2 Hz).
c. Left display should indicate −2.5 DBM (±1.0 dBm). Right display should indicate 3004 RCV HZ (±2 Hz).

5. STEP 8 a. Left display should indicate less than −50 DBM (algebraically). Right display should indicate 100r RCV HZ (±2 Hz).

6. STEP 9: IMPULSE NOISE CHECK a. Right display should indicate 70 COUNTS (±4 Counts).

7. STEP 10: ENVELOPE DELAY CHECK a. Left display should reset to 0 MICROSECONDS, then indicate 3000 MICROSECONDS (±10μS). Right display should indicate 1804 RCV HZ (±2 Hz).

8. STEP 11: SELF CHECK STATUS DISPLAY a. If all SELF CHECK tests are within specifications the display will indicate PASS until the NORMAL TEST - SELF CHECK Switch is returned to the NORMAL TEST position. The test set has passed all of the above visible tests, in addition to ENVELOPE DELAY response time and a complete check of the modem used for MASTER - SLAVE operation.
b. If the test set fails to pass any of the above tests, failure codes will be displayed indicating the tests that have failed. These codes will be displayed sequentially until the NORMAL TEST - SELF CHECK Switch is returned to the NORAML TEST position. Following are interpretations of the SELF CHECK Failure codes that can be displayed:

| CODE | MESSAGE |
|---|---|
| H20 | Level out of tolerance at 204 Hz (STEP 2) |
| H21 | Level out of tolerance at 1004 Hz (STEP 3) |
| H22 | Level out of tolerance at 3904 Hz (STEP 4) |
| H30 | C-Message filter out of tolerance at 304 Hz (STEP 5) |
| H31 | C-Message filter out of tolerance at 1004 Hz (STEP 6) |
| H32 | C-Message filter out of tolerance at 3004 Hz (STEP 7) |
| H33 | Noise-With-Tone notch out of tolerance (STEP 8) |
| H34 | Impulse Noise counts out of tolerance (STEP 9) |
| H40 | Frequency out of tolerance at 204 Hz, 1004 Hz, or 3904 Hz (STEPS 2-4) |
| H70 | Envelope Delay response time out of tolerance (STEP 10) |
| H71 | Envelope Delay accuracy out of tolerance (STEP 10) |
| H80, H81, H82, H83 | Test set modem does not pass SELF CHECK (NOTE: Failure of the modem affects only MASTER-SLAVE operation. Normal operation is not affected). |

9. SELF CHECK - MODEM ONLY.

If a quick SELF CHECK of only the modem is desired, the following procedure can be used:
a. Perform PRELIMINARY SETUP procedures (a) through (3).
b. Hold DELAY ZERO Switch in "down" position while setting NORMAL TEST - SELF CHECK Switch to SELF CHECK. Release DELAY ZERO Switch.

c. If modem passes SELF CHECK, display will immediately indicate PASS. Refer to failure codes, above, if failure code is displayed.

CONDITION CODES

Under certain conditions, the unit will abort or fail to achieve its normal display and indicate a "condition code" in the display. Following is a list of condition codes that can occur, their messages, probable causes, and recommended remedial actions to clear the condition. (Also refer to SELF CHECK procedure for listing of SELF CHECK failure codes).

| CONDITION CODE | MESSAGE | PROBABLE CAUSES | RECOMMENDED ACTIONS |
|---|---|---|---|
| H-00 | Front panel controls changed while MASTER attempting to achieve control over SLAVE | 1. Operator error. | 1. Do not touch controls until dot light illuminates. |
| H-01 | No data carrier received from SLAVE. | 1. SLAVE OUTPUT LEVEL set too low.<br>2. Excessive circuit loss<br>3. Unit problem | 1. Check SLAVE OUTPUT LEVEL.<br>2. Check that MasTER receives at least −40 dBm.<br>3. Perform SELF CHECK on MASTER and SLAVE units. Return test set for repair if necessary. |
| H-02 | No data information received from SLAVE | 1. Excessive noise on circuit<br>2. Unit problem | 1. Check circuit noise.<br>2. Perform SELF CHECK on SLAVE unit. Return test set for repair if necessary. |
| H-03 | Data errors. | 1. Excessive noise on circuit<br>2. Unit problem | 1. Check circuit noise.<br>2. Perform SELF CHECK on MASTER unit. Return test set for repair if necessary. |
| H-04 | Data errors. | 1. Unit problem | 1. Perform SELF CHECK on MASTER and SLAVE units. Return test set for repair if necessary. |
| H-05 | Inappropriate response to MASTER-SLAVE commands. | 1. Unit problem | 1. Perform SELF CHECK on MASTER and SLAVE units. Return test set for repair if necessary. |
| H-06 | SLAVE not responding to MASTER command | 1. MASTER OUTPUT LEVEL set too low.<br>2. Excessive circuit loss.<br>3. Excessive noise on circuit<br>4. Unit problem | 1. Check MASTER OUTPUT LEVEL<br>2. Check that SLAVE receives at least −40 dBm.<br>3. Check circuit noise.<br>4. Perform SELF CHECK on MASTER and SLAVE units. Return test set for repair if necessary. |
| H-07 | Incompatible SLAVE measurement. | 1. SLAVE can make requested measurement only in LINE LOOP BACK. | 1. SLAVE must be compatible with MASTER (or it aborts to LINE LOOP BACK mode for measurements not available in SLAVE unit.) |
| H-08 | Invalid command. | 1. MASTER MEASUREMENT Switch set LINE LOOP BACK.<br>2. Unit problem. | 1. Set MASTER MEASUREMENT Switch to valid position.<br>2. Perform SELF CHECK on MASTER unit. Return test set for repair if necessary. |
| H-09 | No data received when expected. | 1. Circuit dropout.<br>2. SLAVE OUTPUT CONTROL moved during data transmission.<br>3. Unit problem. | 1. Check circuit; re-run test.<br>2. Do not touch SLAVE OUTPUT CONTROL while measurement in progress.<br>3. Perform SELF CHECK |

-continued

| CONDITION CODE | MESSAGE | PROBABLE CAUSES | RECOMMENDED ACTIONS |
|---|---|---|---|
| | | | on MASTER and SLAVE units. Return test set for repair if necessary. |
| H-10 | SLAVE Underrange; test Level or Noise below range capability. | 1. Normal condition | 1. None |
| H-11 | MASTER receives incorrect response | 1. RCV-TRMT Switch changed during data transmission.<br>2. Unit problem. | 1. Do not touch RCV-TRMT Switch while measurement in progress.<br>2. Perform SELF CHECK on MASTER and SLAVE units. Return test set for repair if necessary. |
| H-12 | IMPULSE NOISE accumulator overflow | 1. IMPULSE NOISE exceeded 9999 COUNTS. | 1. Use shorter counting interval. |
| H-13 | SLAVE aborted control of MASTER | 1. SLAVE REMOTE Switch changed to NORMAL or MASTER during data transmission. | 1. Do not touch SLAVE REMOTE Switch while measurement in progress. |
| H-14 | Signal dropout >1 Sec. during IMPULSE NOISE measurement. | 1. Circuit dropped out carrier. | 1. Initiate new test. |

SLAVE SETUP

1. Set REMOTE Switch to NORMAL.
2. Set MEASUREMENT Switch to LEVEL & FREQUENCY.
3. Set DISPLAY Switch to TRMT.
4. Set TRANSMITTER Switch to STEP 100 HZ.
5. Adjust transmit frequency to 1004 Hz using TRANSMITER UP-DOWN Pushbuttons. Observe TRMT HZ in right display.

DATA LEVEL

All transmission measurements should be made at Data Level. The Data Level for data circuits is a power 13dB below the Transmission Level Point (TLP). For example, if the TLP is −16 dB, the Data Level would be −29 dBm. Therefore, an output level of −29 dBm would be applied in this case.

8. If IMPULSE NOISE is to be measured, set IMPULSE NOISE Thumbwheel Switches to desired DBRNC THRESHOLD.
9. Set REMOTE Switch to SLAVE. The SLAVE unit is now set up for control by the MASTER unit. If desired, the display annunciators can be observed to determine the progress of the MASTER unit. The following annunciators indicate the mode of the MASTER unit:
LEVEL & FREQUENCY .... DBM
C-MESSAGE NOISE .... DBRNC
NOISE-WITH-TONE .... DBRN and TRMT HZ
SIGNAL-TO-NOISE .... DB
IMPULSE NOISE .... COUNTS
ENVELOPE DELAY .... MICRO SEC

LEVEL AND FREQUENCY MASTER OPERATION

MASTER SETUP

1. Set REMOTE Switch to NORMAL.
2. Set MEASUREMENT Switch to LEVEL & FREQUENCY.
3. Set DISPLAY Switch to TRMT.
4. Set TRANSMITTER Switch to STEP 100 Hz.

If signaling units are used in the network under test, set BI SF SKIP - SF SKIP Switch to SF SKIP. This mode automatically blanks the transmitter output so that frequencies between 2450 Hz and 2750 Hz cannot be transmitted.

6. Adjust transmit frequency to 1004 Hz using TRANSMITTER UP-DOWN Pushbuttons. Observe TRMT HZ in right display.
7. Adjust OUTPUT LEVEL Control for "Data Level". Observe DBM level in left display.

DATA LEVEL

All transmission measurements should be made at Data Level. The Data Level for data circuits is a power 13dB below the Transmission Level Point (TLP). For example, if the TLP is −16dB, the Data Level would be −29 dBm. Therefore, an output level of −29 dBm would be applied in this case.

8. Set DISPLAY Switch to RCV.
9. Set REMOTE Switch to MASTER.

MASTER TO SLAVE DIRECTION

10. Set REMOTE Switch to MASTER TO SLAVE. Wait until associated dot light illuminates before proceeding. This dot light should come on within 10 seconds. It indicates that the MASTER unit has achieved control over the SLAVE unit. Observe that SLAVE annunciator is on, indicating that measurements will be made by SLAVE unit.

1000 HZ LOSS MEASUREMENT

11. Observe MASTER generated TRMT HZ (nominally 1004 Hz) in right display. Observe DBM level received by SLAVE unit on left display.

ATTENUATION DISTORTION MEASUREMENT

12. Momentarily hold down LEVEL ZERO Switch. This establishes a 0 dB reference at the reference frequency (1004 Hz).

13. Transmit desired test frequencies using TRANSMITTER UPDOWN Pushbuttons or MANUAL FREQUENCY Control. Observe MASTER generated TRMT HZ in right display and DB level received by SLAVE unit in left display at each test frequency. +DB indicates more loss and −DB indicates less loss, relative to the reference frequency.

SLAVE TO MASTER DIRECTION

14. Set REMOTE Switch to SLAVE TO MASTER. Wait until associated dot light illuminates before proceeding. This dot light should come on within 10 seconds. It indicates that the MASTER unit has achieved control over the SLAVE unit.

1000 HZ LOSS MEASUREMENT

15. Observe SLAVE generated by RCV HZ (nominally 1004 Hz) in right display. Observe DBM level received by MASTER unit in left display.

ATTENUATION DISTORTION MEASUREMENT

16. Momentarily hold down LEVEL ZERO Switch. This establishes a 0 dB reference at the reference frequency (1004 Hz).
17. Command SLAVE unit to transmit desired test frequencies by operating MASTER unit TRANSMITTER UP-DOWN Pushbuttons or MANUAL FREQUENCY Control. Observe SLAVE generated RCB HZ in right display and DB level received by MASTER unit in left display at each test frequency. +DB indicates more loss and −DB indicates less loss, relative to the reference frequency.

NOTE

Attenuation Distortion measurements can also be made in absolute dBm. The test set is automatically in the dBm mode until the LEVEL ZERO Switch is operated. To return the test set to the dBm mode, momentarily rotate MEASUREMENT Switch to another position, then back to LEVEL & FREQUENCY again.

C-MESSAGE NOISE MASTER OPERATION

MASTER SETUP

1. Set REMOTE Switch to NORMAL.
2. Set MEASUREMENT Switch to LEVEL & FREQUENCY.
3. Set DISPLAY Switch to TRMT.
4. Set TRANSMITTER Switch to STEP 100HZ.
5. Adjust transmit frequency to 1004 Hz using TRANSMITTER UP-DOWN Pushbuttons. Oserve TRMT HZ in right display.
6. Adjust OUTPUT LEVEL Control for "Data Level". Observe DBM level in left display.

DATA LEVEL

All transmission measurements should be made at Data Level. The Data Level for data circuits is a power 13 dB below the Transmission Level Point (TLP). For example, if the TLP is −16 dB, the Data Level would be −29 dBm. Therefore, an output level of −29 dBm would be applied in this case.

7. Set MEASUREMENT Switch to C-MESSAGE NOISE.
8. Set DISPLAY Switch to RCV.
9. Set REMOTE Switch to MASTER.

MASTER TO SLAVE DIRECTION

10. Set REMOTE Switch to MASTER TO SLAVE. Wait until associated dot light illuminates before proceeding. This dot light should come on within 10 seconds. It indicates that the MASTER unit has achieved control over the SLAVE unit. Observe that SLAVE annunicator is on, indicating that measurements will be made by SLAVE unit.
11. Observe DBRNC noise level received by SLAVE unit in left display.

SINGLE FREQUENCY INTERFERENCE CHECK

12. In order to perform a Single Frequency Interference Check in the Master to Slave Direction, the SLAVE unit must turn on his LINE MONITOR by adjusting VOLUME Control until desired loudness is obtained in speaker. He should listen for any predominant tone which will indicaate a potential single frequency interference problem.

SLAVE TO MASTER DIRECTION

13. Set REMOTE Switch to SLAVE TO MASTER. Wait until associated dot light illuminates before proceeding. This dot light should come on within 10 seconds. It indicates that the MASTER unit has achieved control over the SLAVE unit.
14. Observe DBRNC noise level received by MASTER unit in left display.

SINGLE FREQUENCY INTERFERENCE CHECK

15. Turn on LINE MONITOR by adjusting VOLUME control until desired loudness is obtained in speaker. Listen for any predominant tone which will indicate a potential single frequency interference problem.

NOISE-WITH-TONE MASTER OPERATION

MASTER SETUP

1. Set REMOTE Switch to NORMAL.
2. Set MEASUREMENT Switch to NOISE-WITH-TONE.
3. Set DISPLAY Switch to TRMT.
4. Observe TRMT HZ in right display. Verify that 1004 Hz is being transmitted.
5. Adjust OUTPUT LEVEL Control for "Data Level". Observe DBM level in left display.

DATA LEVEL

All transmission measurements should be made at Data Level. The Data Level for data circuits is a power 13 dB below the Transmission Level Point (TLP). For example, if the TLP is −16 dB, the Data Level would be −29 dBm. Therefore, an output level of −29 dBm would be applied in this case.

6. Set DISPLAY Switch to RCV.
7. Set REMOTE Switch to MASTER.

MASTER TO SLAVE DIRECTION

8. Set REMOTE Switch to MASTER TO SLAVE. Wait until associated dot light illuminates before proceeding. This dot light should come on within 10 seconds. It indicates that the MASTER unit has achieved control over the SLAVE unit.

9. Observe MASTER generated TRMT HZ (1004 Hz) in right display. Observe DBRNC noise level received by SLAVE unit in left display.

SINGLE FREQUENCY INTERFERENCE CHECK

10. In order to perform a Single Interference Check in the Master to Slave Direction, the SLAVE unit must turn on his Line Monitor by adjusting VOLUME Control until desired loudness is obtained in speaker. He should listen for any predominant tone which will indicate a potential single frequency interference problem.

SLAVE TO MASTER DIRECTION

11. Set REMOTE Switch to SLAVE TO MASTER. Wait until associated dot light illuminates before proceeding. This dot light should come within 10 seconds. It indicates that the MASTER unit has achieved control over the SLAVE unit.
12. Observe SLAVE generated RCV HZ (1004 Hz) in right display. Observe DBRNC noise level received by MASTER unit in left display.

SINGLE FREQUENCY INTERFERENCE CHECK

13. Turn on LINE MONITOR by adjusting VOLUME control until desired loudness is obtained in speaker. Listen for any predomnant tone which will indicate a potential single frequency interference problem.

SIGNAL-TO-NOISE MASTER OPERATION

MASTER SETUP

1. Set REMOTE Switch to NORMAL.
3. Set MEASUREMENT Switch to SIGNAL-TO-NOISE.
3. Set DISPLAY Switch to TRMT.
4. Observe TRMT HZ in right display. Verify that 1004 Hz is being transmitted.
5. Adjust OUTPUT LEVEL Control for "Data Level". Observe DBM in left display.

DATA LEVEL

All transmission measurements should be made at Data Level. The Data Level for data circuits is a power 13 dB below the Transmission Level Point (TLP). For example, if the TLP is −16 dB, the Data Level would be −29 dBm. Therefore, an output level of −29 dBm would be applied in this case.

6. Set DISPLAY Switch to RCV.
7. Set REMOTE Switch to MASTER.

MASTER TO SLAVE DIRECTION

8. Set REMOTE Switch to MASTER TO SLAVE. Wait until associated dot light illuminates before proceeding. This dot light sould come on within 10 seconds. It indicates that the MASTER unit has achieved control over the SLAVE unit. Observe that SLAVE annunciator is on, indicating that measurements will be made by SLAVE unit.
9. Observe MASTER generated TRMT HZ (1004 HZ) in right display. Observe DB signal-to-noise ratio (S + N/N) received by SLAVE unit in left display.

SLAVE TO MASTER DIRECTION

10. Set REMOTE Switch to SLAVE TO MASTER. Wait until associated dot light illuminates before proceeding. This dot light should come on within 10 seconds. It indicates that the MASTER unit has achieved control over the SLAVE unit.
11. Observe SLAVE generated RCV HZ (1004 Hz) in right display. Observe DB signal-to-noise ratio (S + N/N) received by MASTER unit in left display.

IMPULSE NOISE MASTER OPERATION

MASTER SETUP

1. Set REMOTE Switch to NORMAL.
2. Set MEASUREMENT Switch to IMPULSE NOISE.
3. Set DISPLAY Switch to TRMT.
4. Observe TRMT HZ in right display. Verify that 1004 Hz is being transmitted.
5. Adjust OUTPUT LEVEL Control for "Data Level". Observe DBM in left display.

DATA LEVEL

All transmission measurements should be made at Data Level. The Data Level for data circuits is a power 13 dB below the Transmission Level Point (TLP). For example, if the TLP is −16 dB, the Data Level would be −29 dBm. Therefore, an output level of −29 dBm would be applied in this case.

6. Set DISPLAY Switch to RCV.
7. Set REMOTE Switch to MASTER.

MASTER TO SLAVE DIRECTION

8. Set REMOTE Switch to MASTER TO SLAVE. Wait until associated dot light illuminates before proceeding. This dot light should come on within 10 seconds. It indicates that the MASTER unit has achieved control over the SLAVE unit. Observe that SLAVE annunciator is on, indicating that measurements will be made by SLAVE unit.
9. Set IMPULSE NOISE Switch to desired count interval (5 MIN, 15 MIN, or NON-STOP).
10. Verify that SLAVE unit IMPULSE NOISE Thumbwheel Switches have been set up to desired DBRNC THRESHOLD. (This should have been performed during his SLAVE SETUP procedure).
11. Momentarily hold down and release IMPULSE NOISE STOP-START/RESET Switch to START/RESET position. Observe that IN PROCESS Annunciator comes on.
12. Left display indicates count time (in minutes) remaining in 5 MIN and 15 MIN modes. Elapsed time is indicated for NON-STOP mode.
13. Observe that IN PROCESS Annunciator goes out at completion of 5 MIN or 15 MIN interval. Observe impulse noise COUNTS received by SLAVE unit on right display.
14. If NON-STOP mode is used, momentarily hold up and release IMPULSE NOISE STOP-START/RESET Switch to STOP position at end of desired counting interval. Observe impulse noise COUNTS received by SLAVE unit in right display.

SINGLE FREQUENCY INTERFERENCE CHECK

15. In order to perform a Single Frequency Interference Check in the Master to Slave Direction, the SLAVE unit must turn on his LINE MONITOR by adjusting VOLUME Control until desired loudness is obtained in speaker. He should listen for any predominant tone which will indicate a potential single frequency interference problem.

SLAVE TO MASTER DIRECTION

16. Set REMOTE Switch to SLAVE TO MASTER. Wait until associated dot light illuminates before proceeding. This dot light should come on within 10 seconds. It indicates that the MASTER unit has achived control over the SLAVE unit.
17. Set IMPULSE NOISE Switch to desired count interval (5 MIN, 15 MIN, or NON-STOP).
18. Set IMPULSE NOISE Thumbwheel Switches to desired DBRNC THRESHOLD.
19. Momentarily hold down and release IMPULSE NOISE STOP-START/RESET Switch START/RESET position. Observe that IN PROCESS Annuciator comes on.
20. Left display indicates count time (in minutes) remaining in 5 MIN and 15 MIN modes. Elapsed time is indicated for NON-STOP mode.
21. Observe that IN PROCESS Annunciator goes out at completion of 5 MIN or 15 MIN interval. Observe impulse noise COUNTS received by MASTER unit in right display.
22. If NON-STOP mode is used, momentarily hold up and release IMPULSE NOISE STOP-START/RESET Switch STOP position at end of desired counting interval. Observe impulse noise COUNTS received by MASTER unit in right display.

SINGLE FREQUENCY INTERFERENCE CHECK

23. Turn on LINE MONITOR by adjusting VOLUME Control until desired loudness is obtained in speaker. Listen for any predominant tone which will indicate a potential single frequency interference problem.

NOTE

Count can be reset to zero and restarted at any time by momentarily holding switch to START/RESET position. Count can also be stopped at any time by momentarily holding switch to STOP position, however, count must be restarted at zero counts.

NOTE

The right display has a maximum capacity of 9999 COUNTS. If this capacity is exceeded, the display will indicate "H-12" to indicate "accumulator overflow condition".

NOTE

If a circuit drop-out exceeding one second occurs at any time during the counting interval, a condition code "H-14" will be displayed. If this occurs, it will be necessary to re-establish control over the SLAVE unit by momentarily throwing the REMOTE Switch to NORMAL, then back to MASTER again.

ENVELOPE DELAY MASTER OPERATION

MASTER SETUP

1. Set REMOTE Switch to NORMAL.
2. Set MEASUREMENT Switch to ENVELOPE DELAY.
3. Set DISPLAY switches to TRMT and LEVEL.
4. Set TRANSMITTER Switch to STEP 100 HZ.
5. If SF signaling units are used in the network under test, set NO SF SKIP - SF SKIP Switch to SF SKIP. This mode automatically blanks the transmitter output so that frequencies between 2450 Hz and 2750 Hz cannot be transmitted.
6. Adjust transmit frequency to reference frequency (e.g., 1804 Hz, or frequency of minimum delay) using TRANSMTTER UP-DOWN Pushbuttons. Observe TRMT HZ in right display.
7. Adjust OUTPUT LEVEL Control for "Data Level". Observe DBM in left display.

DATA LEVEL

All transmission measurements should be made at Data Level. The Data Level for data circuits is a power 13 dB below the Transmission Level Point (TLP). For example, if the TLP is −16 dB, the Data Level would be −29 dBm. Therefore, an output level of −29 dBm would be applied in this case.

8. Set DISPLAY Switch to RCV.
9. Set REMOTE Switch to MASTER.

MASTER TO SLAVE DIRECTION (RETURN REFERENCE)

10. Set REMOTE Switch to MASTER TO SLAVE. Wait until associated dot light illuminates before proceeding. This dot light should come on within 10 seconds. It indicates that the MASTER unit has achieved control over the SLAVE unit. Observe that SLAVE annunciator is on, indicating that measurements will be made by SLAVE unit.
11. Observe ± MICRO SEC in left display. This reading may be very erratic for a few seconds until the loop stabilizes. When the display stabilizes so that only the units and tens digits are changing, momentarily hold down and release DELAY ZERO Switch.

NOTE

This establishes a reference zero at the reference frequency. Typically, this reading will vary ± MICRO SEC. However, on very noisy circuits, the variation may be greater. A valid reference zero is established if these variations are evenly distributed above and below zero microseconds.

12. Observe MASTER generated TRMT HZ in right display. Select desired test frequencies using TRANSMITTER UP-DOWN Pushbuttons or MANUAL FREQUENCY Control.
13. At each test frequency observe ± MICRO SEC envelope delay received by SLAVE unit in left display. If readings vary, observe for an arithmetic mean (average).

SLAVE TO MASTER DIRECTION (FORWARD REFERENCE)

14. Perform MASTER SETUP steps 1-9.
15. Set REMOTE Switch to SLAVE TO MASTER. Wait until associated dot light illuminates before proceeding. This dot light should come on within 10 seconds. It indicates that the MASTER unit has achieved control over the SLAVE unit.
16. Observe ± MICRO SEC in left display. This reading may be very erratic for a few seconds until the loop stabilizes. When the display stabilizes so that only the units and tens digits are changing, momentarily hold down and release DELAY ZERO Switch.

NOTE

This establishes a reference zero at the reference frequency. Typically, this reading will vary ± MICRO SEC. However, on very noisy circuits, the variation may be greater. A valid reference zero is established if these variations are evenly distributed above and below zero microseconds.

17. Observe SLAVE generated RCV HZ in right display. Command SLAVE unit to transmit desired test frequencies by operating MASTER unit TRANSMITTER UP-DOWN Pushbuttons or MANUAL FREQUENCY Control.
18. At each test frequency, observe ± MICRO SEC envelope delay received by MASTER unit in left display. If readings vary, observe for an arithmetic mean (average).

LEVEL/FREQUENCY MEASUREMENT

NORMAL MODE

Figure 5:
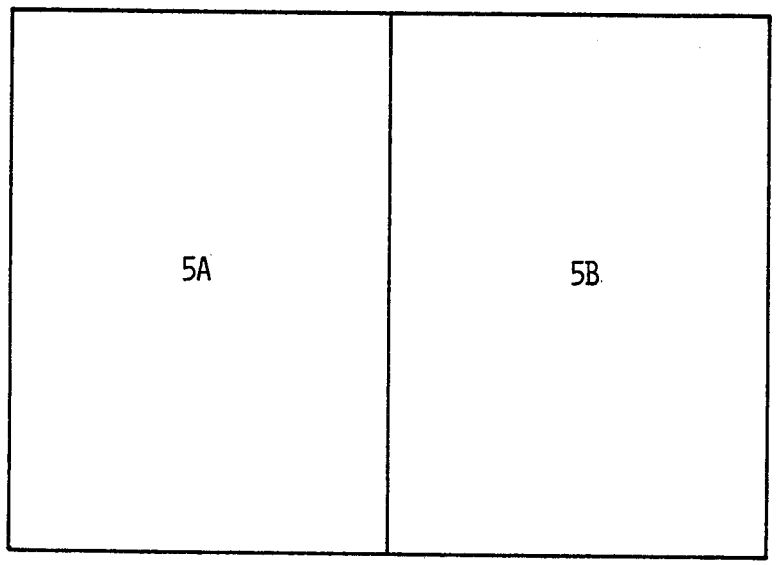
FIG. 5, comprised of FIGS. 5A and 5B, is a block diagram illustrating C-message noise measurements.
Figure 5A:
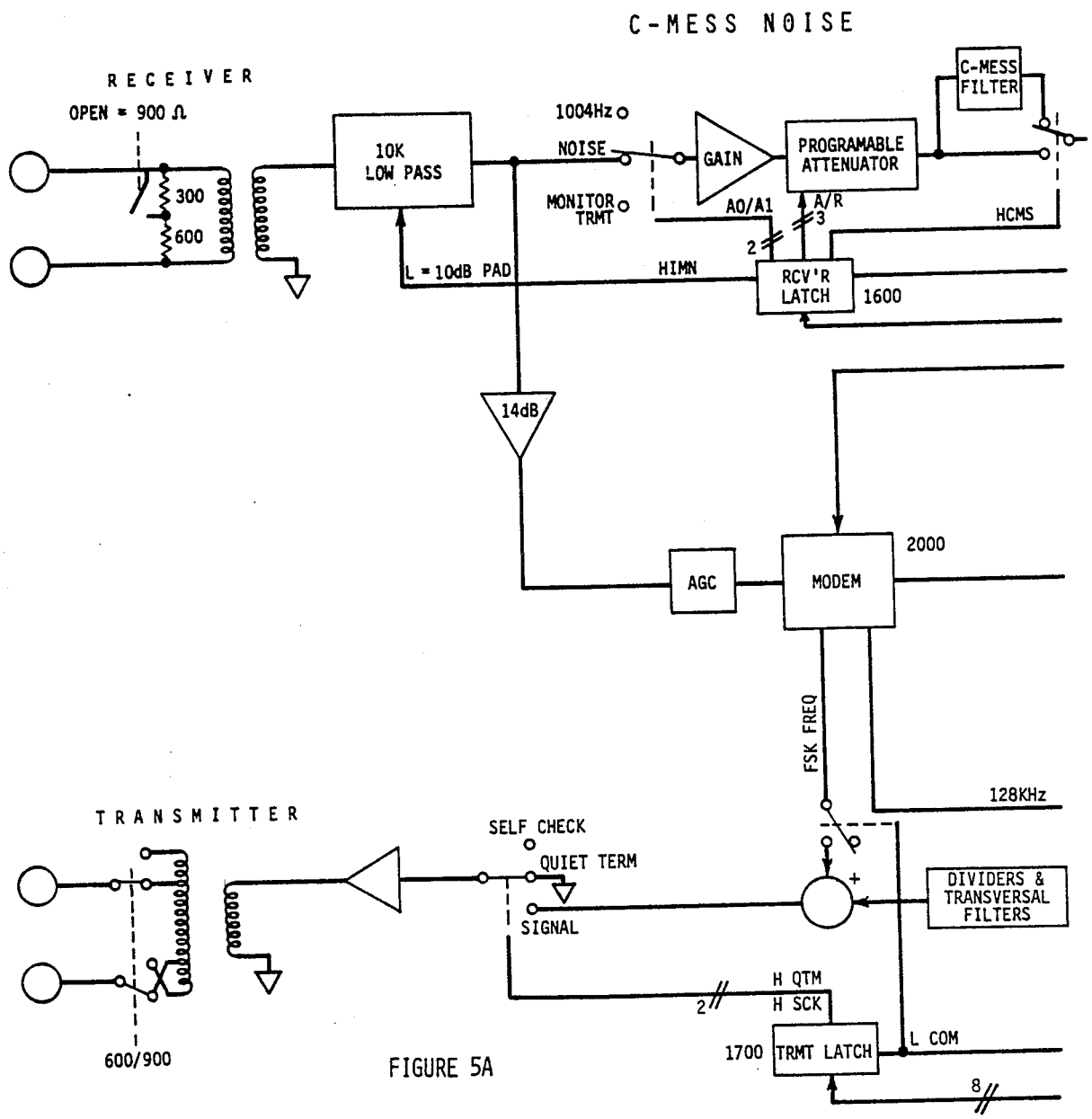
Figure 5B:
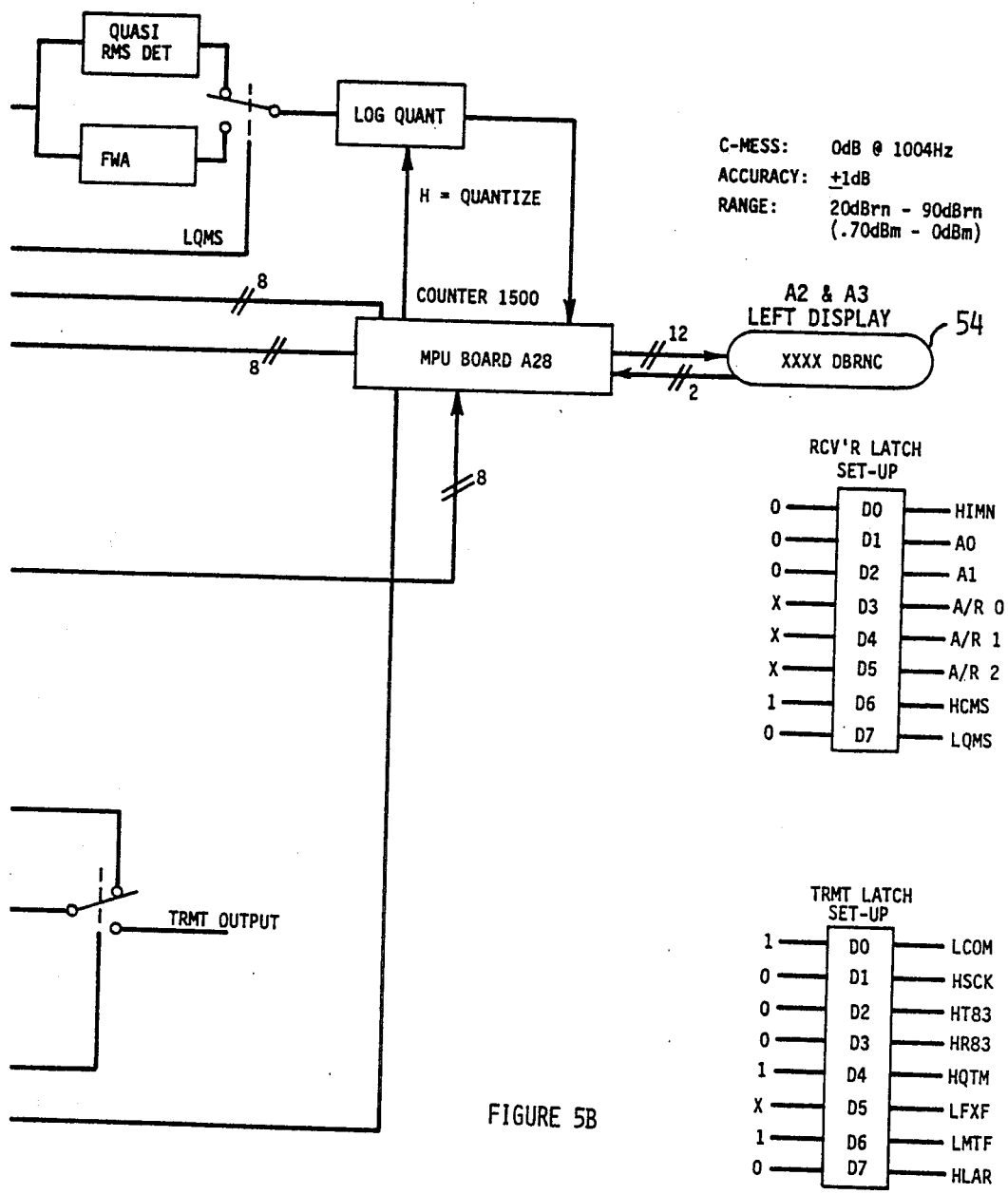

Referring to FIG. 5, prior to entry into a routine for this measurement a transmitter control latch 1700 (memory address 1700) and a receiver control latch 1600 (memory address 1600) have been programmed by an executive program. The parameters of level and frequency are measured on a time division basis, i.e., a six decade data acquisition counter (memory address 1500-1507), not shown in FIG. 5, is shared between measuring frequency and measuring level on a time slice basis. This routine starts by calling an autorange subroutine, the operation of which is described in detail hereafter in SYSTEM PROGRAM ROUTINES AND SUBROUTINES and generally hereafter under the title AUTORANGING. On returning from the autorange routine the actual level is computed by adding the results from a log quantizer 100 to the gain value pointed to by the present range state. At this point the front panel is interrogated for a level zero request. This is accomplished by reading "PANEL" (memory address 1100). If the level zero switch is depressed the present computed value of signal level is stored as a reference value and is subsequently subtracted from all new measurements. The routine preceeds to measure frequency by calling the frequency subroutine which operates as described hereinafter.

Upon return the level data is written into the left display buffer (memory addresses 1C00-1C03) and displayed on the display 54 and frequency is written into the right display buffer (memory addresses 1D00-1D03) and displayed on the display 56. If there is no change the program loops to its beginning; otherwise it aborts back to executive.

MASTER/SLAVE MODE:

MASTER-to-SLAVE TEST DIRECTION

On entry the Master/Slave link has been established by the executive routines. In the instrument considered to be the master the routine is altered in that data is being received on the master sets receive channel. The information is being transmitted by the Slave via FSK. The actual data is the level parameter and is being measured by the Slave and transmitted to the Master on the unused line. The Master set receives the FSK signals via its internal modem. Each time a word is received an interrupt is transmitted to the microprocessor 2 which acts on the received word. The master set uses this received information for the display instead of that which it measures as was done in the normal set mode.

SLAVE-TO-MASTER TEST DIRECTION

In this mode the Master set measures the level and frequency of the channel from Slave to Master as described under normal mode. The difference is that the Master has control of the Slave's transmitter frequency. This is accomplished by the Master set reading its internal frequency programming counter (memory addresses 1A00 and 1B00). The number stored there is encoded and transmitted via FSK over the Master-to-Slave channel to the Slave. The Slave set receives the FSK signals and services the received characters through an interrupt service request. When a complete data field has been received by the Slave, it programs its transmitter by writing to its frequency control counter (memory addresses 1800 and 1900). If the transmitter is already at the requested frequency, the request is ignored. In this mode the Slave's transmitter can be considered to be an extension of the Master set.

FREQUENCY

Frequency is measured through the use of a software generated gate. The frequency of the input signal is multiplied by a factor 32 in the analog processing section. The measurement proceeds as follows: the frequency data input port is selected to the six decade data acquisition counter (memory addresses 1500-1507). This is performed by writing a logic "01" to bits "D6" and "D5" of the hardward control latch. (Memory address 1400). Then a 10μsec master reset pulse is applied to the six decade data acquisition counter (memory address 1500-1507) by writing a logic "1" followed by a logic "0" to bit D3 of the hardware control latch (memory address 1400). Next a 31.250 millisecond frequency gate pulse is generated by a software wait loop. The duration of this pulse is 1/32 second which has the effect of removing the multiplication by 32 described previously. This also allows a measurement of frequency accurate to ± 1 Hz in 1/32 of a second. After closing of the frequency gate another wait loop of 1 millisecond is executed. This allows for the worst case frequency gate synchronization time. Having completed this the microprocessor 2 reads the contents of the six decade data acquisition register (memory addresses 1500-1507) into a system RAM 13 (memory addresses 0-FF) for temporary storage and then returns to the calling point.

AUTORANGING

System autoranging is performed under program control which operates as follows: the first step is to select the log quantizer data input port to the six decade data acquisition counter. (Memory address 1500-1507). This is accomplished by writing a logic "0" to bits "D6" and "D5" of the hardware control latch (memory address 1400). The six decade data acquisition counter (memory address 1500-1507) is now reset by writing a logic =1" followed by a logic "0" to bit D3 of the hardware control latch (memory address 1400). This action produces a pulse of about 10μsec on the output of bit D3 on the latch which is connected to the master reset of the six decade data acquisition counter (memory address 1500-1507). Next a sample of the input signal level is made by writing a logic "1" to bit D4 of the hardward control latch. This enables the log quantizer to decay exponentially, quantizing the level of the input relative to an internal reference which is considered to be 0dB. After 2 milliseconds a logic "0" is written to bit D4 of the hardware control latch disabling the log quantizer. The number stored in the six decade data acquisition counter (memory addresses 1500–1507) is a number indicating the magnitude of the input signal level relative to 0dB. The contents of this counter are read by the microprocessor and stored in system RAM (memory addresses 0-FF). The program now checks to determine if the results satisfy the inequality $100 \leq$ count $\leq 1300$.

The numbers 100 and 1300 are the systems autorange points; they represent 1.00dB and 13.00dB respectively. If the inequality holds this program immediately returns to the calling program, otherwise more checks are made. Having determined that the signal level does not fall in the specified range the program continues as follows: the present autorange gain state is "fetched" from memory. The state is compared with the autorange limits stored in RAM. If the present range state is at either of the limits, this program returns to the calling routine with the MPU's overflow flag set as an indication that the system is out-of-range. It also blanks the left (1C00) and right 1D00) displays 54 and 56 by storing "FF" in the display buffers and sets either the minus or positive indicator to represent an under overrange condition to the operator. If the present range state is not at a limit the system gain is either increased or decreased by 10dB in an attempt to bring the signal in range. The procedure is as follows: the present range state is either incremented or decremented and is used to replace the present value in the receiver control latch (memory address 1600). This has the effect of either increasing or decreasing the system gain by 10dB. Since the requirement for the signal level input is $1dB \leq X \leq 13dB$ and the autorange amplifier has 10dB steps there is a 2dB hysteresis which guarantees stability of the autorange loop. Once the present range has been changed the program enters a wait loop, the length of which is a function of which detector has been selected. The wait is 200 milliseconds for the average detector and 700 milliseconds for the Quasi RMS detector. The program now loops to its beginning and repeats this procedure until it returns either in-range of out-of-range.

C-MESSAGE NOISE MEASUREMENT

Figure 6:
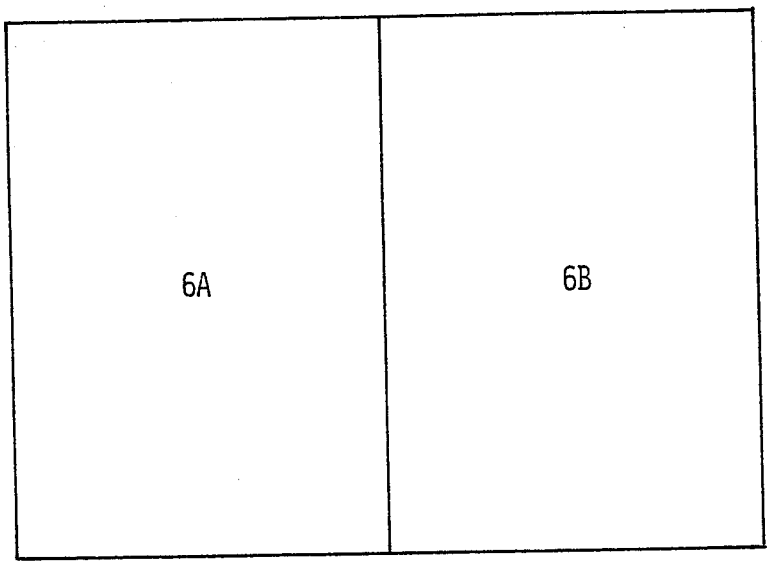
FIG. 6, comprised of FIGS. 6A and 6B, is a block diagram illustrating noise with tone and signal-to-noise measurements.
Figure 6A:
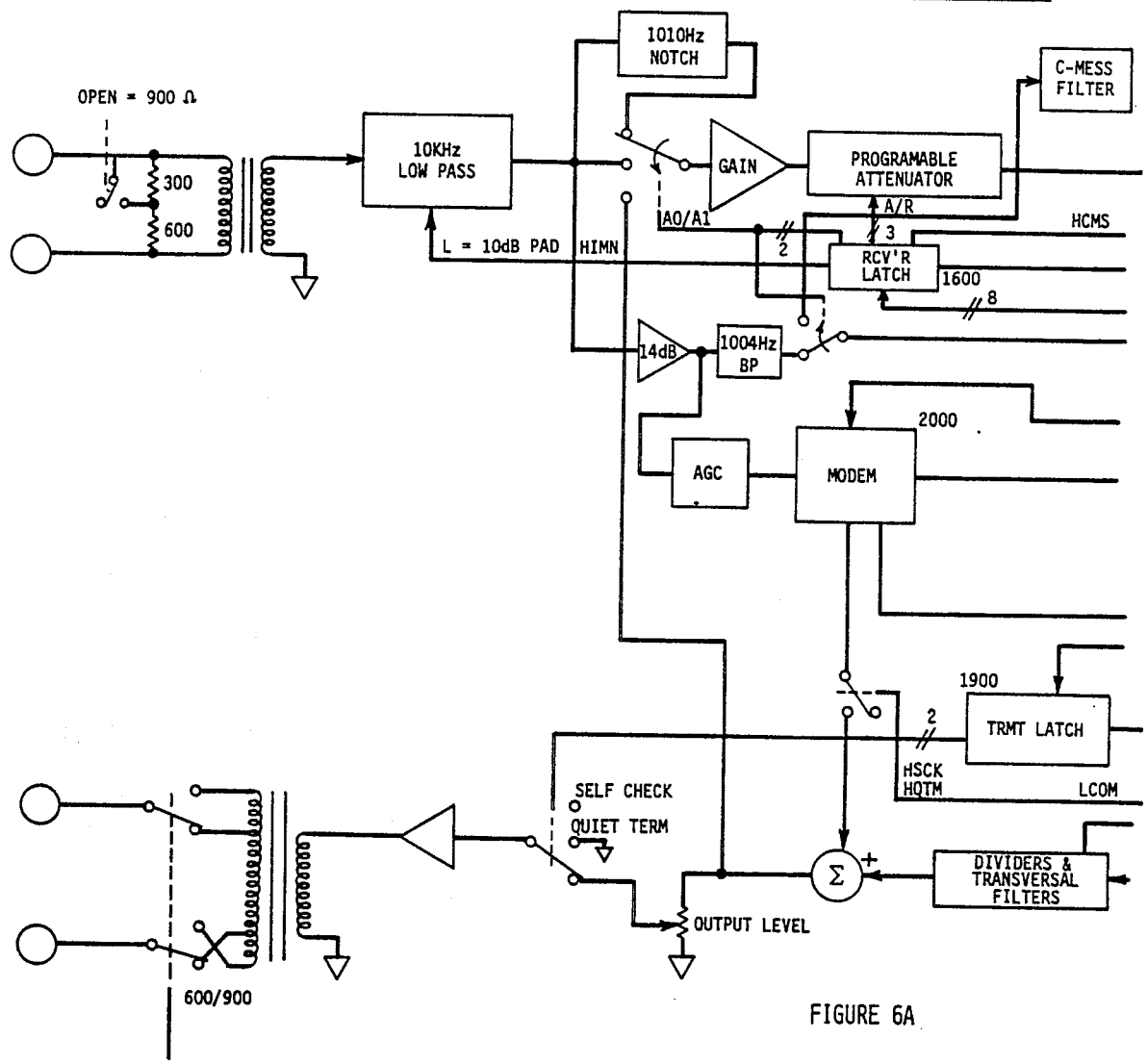
Figure 6B:
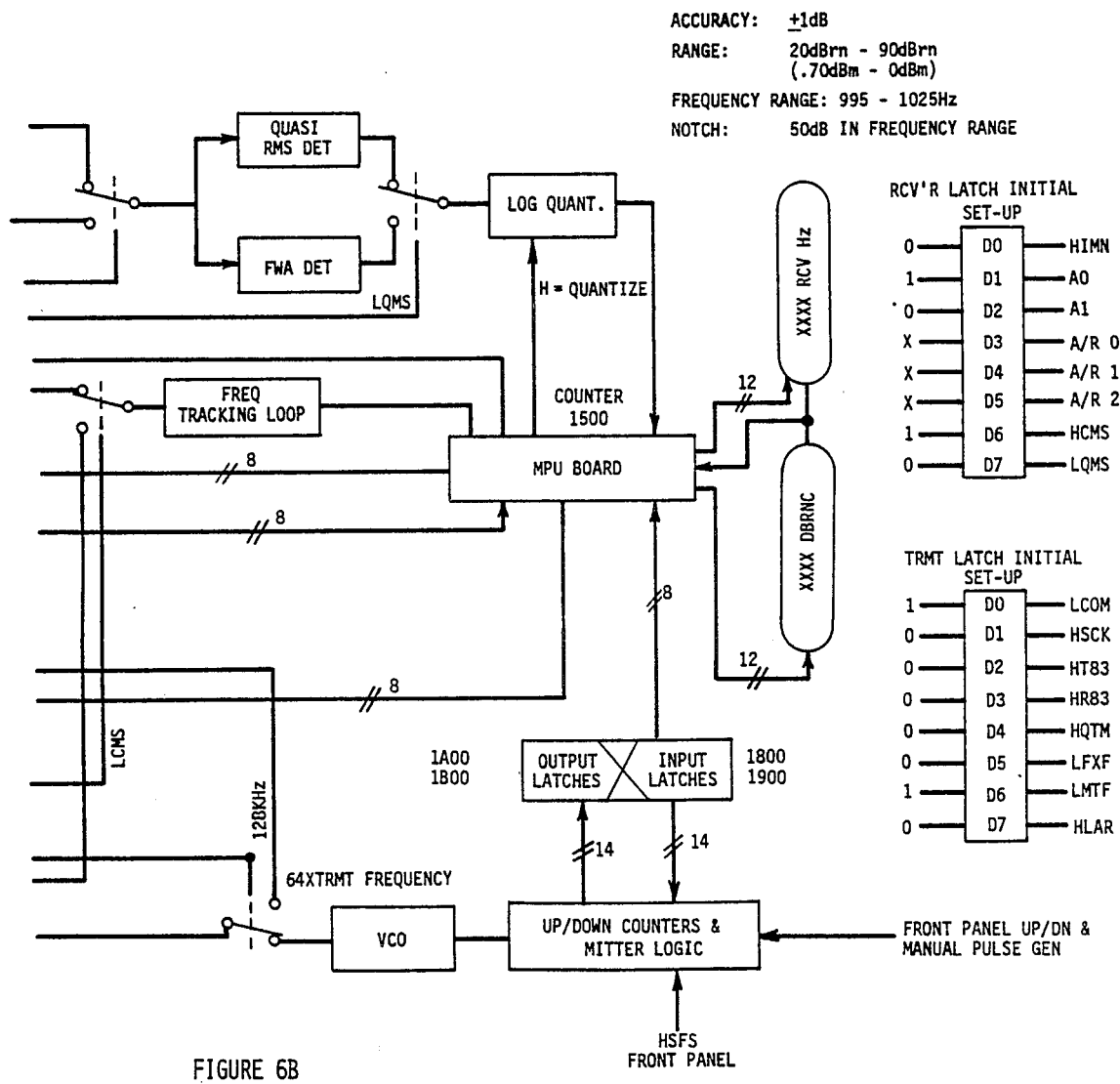

Referring to FIG. 6, in C-Weighted Message Circuit Noise, the signal source is a quiet terminated transmitter. The receiver uses a C-Weighting Filter and a Quasi-RMS detector. The exact specifications for these are set forth in Bell Publication 41009. The unit of Measurement is in DbrnC (90dBrn = 0dBm).

In normal mode operation, the microprocessor 2 determines the measurement selected by reading the front panel status latch at location 1100. In this case normal C-Message Noise has been selected. The processor 2 then programs the transmitter control latch at location 1700 for quiet termination and the receiver control latch at location 1600 to insert the C-Message Weighting Filter and select the QRMS Detector. At this point, the processor programs the programmable attenuator on A16 through location 1600 for maximum attenuation and autoranges, as described in the Level and Frequency Measurements, until the attentuation state is found. Next the processor 2 sends out a "Quantize" Pulse to the Log Quantizer on A18. The quantize output gates the six decade counter U29 on A15. This counter is read by the processor at location 1500. The processor then computes the level using the attenuation state and the quantity read from the data acquisition counter (6 decade). This is displayed on the front panel indicators.

In Master Mode Master-to-Slave Measurement, the processor determines the mode, direction, and measurement by reading the front panel status latch at location 1100. Here C-Message Noise, Master, Master-to-Slave is read. The processor, upon seeing that Master has been selected, proceeds to link up with the Slave and send the current code word to the Slave via the modem, A8. This procedure is described in the Master-Slave section. After link up has occurred, the Master processor programs its transmitter for quiet termination through the transmit control latch at location 1700. The receiver, though not used in this particular measurement, is programmed for No Filters and full wave average (FWA) detector. Measurement data is received from the Slave via FSK (as described in Master-Slave) modulation by the modem, A8. The processor reads the information from the modem via the ACIA at location 2000. The information is processed and displayed.

In Master Mode, Slave-to-Master direction, the processor determines the Mode, direction, and measurement by reading the front panel status latch at location 1100. In this case, C-Message Noise Maste, Slave-to-Master is read. Upon seeing the mode is Master, the processor initiates the link up with the Slave as described in the Master-Slave section. Included in this linking procedure is sending to the Slave the measurement code word. After link is acquired, the processor programs the transmitter through the transmitter control latch at location 1700 for fixed frequency output and sets this frequency to 1004Hz via the transmitter input latches at locations 1800 and 1900. This tone is used to retain the Master-Slave link. The receiver programming and data acquisition are identical to that in the Normal Mode, as previously described.

The processor detects the Slave mode setting by reading the front panel status latch at location 110. If the Slave mode is detected, the unit waits for the link sequence to be initiated by the Master. Part of the linking information is the current measurement code word. Upon receipt of this word, the Slave processor sets up the transmitter and receiver accordingly. The processor programs the receiver identical to the normal mode. The data acquisition method is also the same. However, the data, instead of being displayed, is sent via the modem to the Master set. This data transfer mechanism is explained in the Master-Slave section. At the Master set, the data is read and displayed. If the measurement direction is Slave to Master, the processor sets the receiver, through location 1600 to flat input and FWA detector. The processor autoranges, as described in Level-Frequency, to the 1004Hz tone being sent by the Master. If an under-range condition occurs, the Slave sends, via the modem, a status code indicating loss of tone. The processor also sets the transmitter to quiet termination through location 1700. This is identical to the transmitter configuration in the normal mode. The programming of the receiver and transmitter is defined by the code word set from the Master-to-the-Slave.

SIGNAL-TO-NOISE

Figure 7:
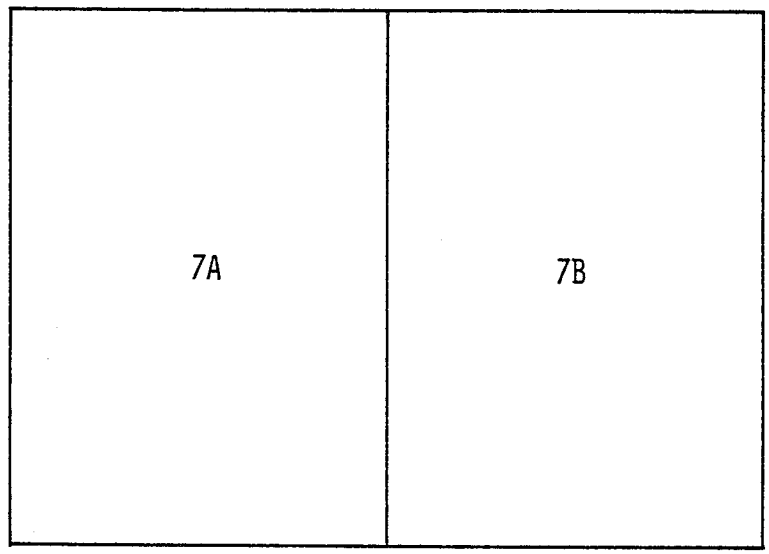
FIG. 7, comprised of FIGS. 7A and 7B, is a block diagram illustrating impulse noise measurements.
Figure 7B:
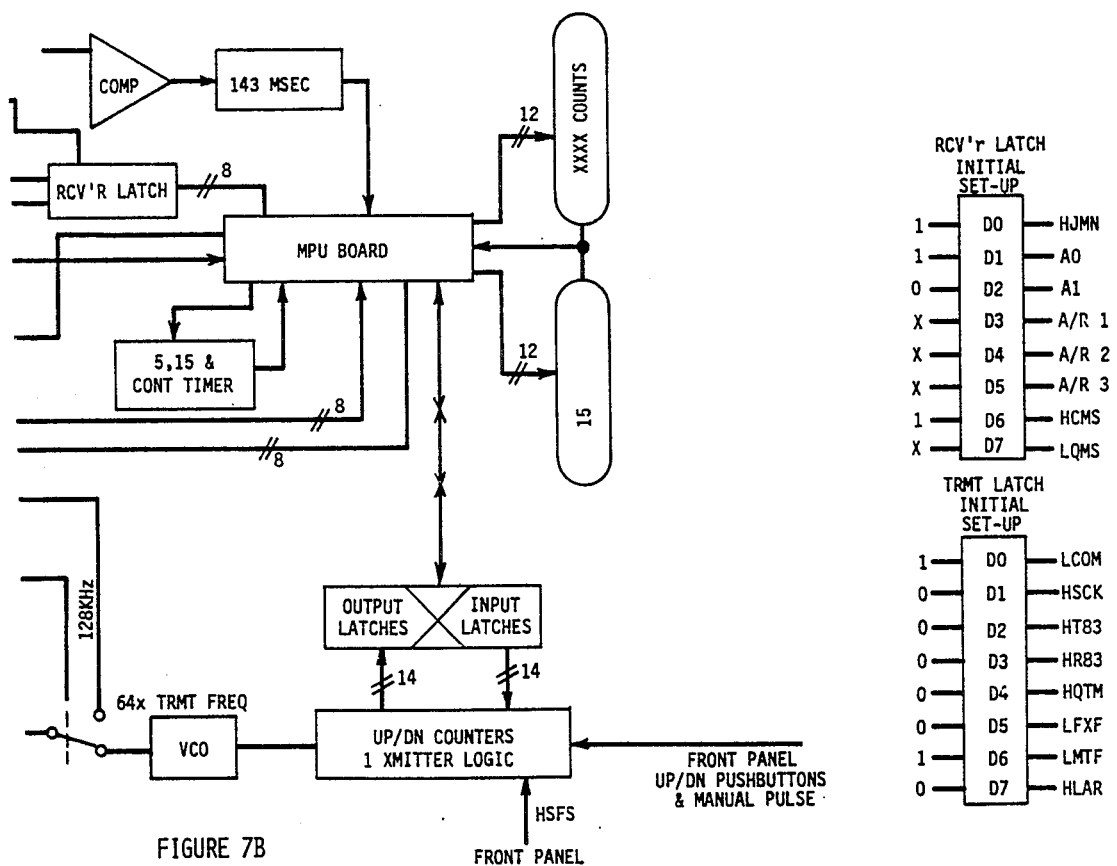

Referring to FIG. 7, the Signal-to-Noise measurement is made by combining two measurements - Level Frequency and Noise-with-Tone. This is done uniquely through the use of the microprocessor. When the normal mode is selected. The transmitter is programmed via the transmit latches at locations 1700, 1800 and 1900 for a fixed frequency at 1004Hz. The receiver at location 1600 is first programmed with the C-Message weighting filter and Quasi RMS detector. The processor then autoranges on the incoming signal and takes a measurement when the proper gain state has been reached. The autoranging and measurement processes are described in the Level and Frequency section. The measurement is stored in the RAM memory. Next the processor programs the receiver latch at location 1600 to insert the 1004Hz notch filer. Now, the transmitted signal is notched out at the receiver. The processor then autoranges on the residual signal and makes a measurement. The processor then subtracts the second reading from the first to give the ratio of signal plus noise. This number is then displayed by the front displays located at 1C00 and 1D00. The processor also measures the frequency of the most predominant tone (1004Hz) and displays this in the same manner as Level and Frequency.

In the remote mode the measurement detection, mode and direction are analogous to the previous measurements. In the Master-to-Slave mode, the Master's trnsmitter is programmed to a fixed 1004Hz. The Slave does the signal processing and makes the signal-to-noise ratio measurement. The data is sent back to the Master via the modem scheme. The Master receives the signal-to-noise ratio data via its modem and displays it through locations 1C00 and 1D00. The frequency of the Master's transmitter as read from loctions 1A00 and 1B00 are also displayed.

NOISE-WITH-TONE

Referring to FIG. 7, the Noise-With-Tone measurement is made using a 1004Hz tone as the signal source. The receiver uses a 1004Hz Notch Filter to remove the 1004Hz tone, a C-Message weighting filter to condition the signal and a Quasi RMS detector are set forth in Bell Publication 41009. The unit of measurement is DbrnC.

As a part of the normal front panel scanning routine, the processor reads the front panel status latch at location 1100. Upon reading this latch, the processor determines the mode (normal, Master, or Slave), the measurement direction (Master-to-Slave or Slave-to-Master) and the measurement. In this case, the processor reads normal, noise-with-tone. Direction is meaningless in a normal measurement. The processor then programs the transmitter to the fixed frequency mode via the transmit control latch at location 1700. The transmitter frequency is programmed into the input latches at locations 1800 and 1900. The processor also programs the receiver through the receiver latch at location 1600. This inserts the 1004 notch filter, the C-Message weighting filter and selects the QRMS detector. The processor then autoranges, as described in the Level & Frequency Routine, on the signal. Since the 1004Hz tone has been notched out, the signal that is ranged on is just the remaining noise. The processor then reads the level of the signal by sending a 2msec pulse to the log quantizer. This pulse enables the quantizer which sends a gating pulse, whose width is proportional to the log of the level to the Data Acquisition Counter U29 on A15. The processor then reads this counter at location 1500 and combines this data with the attenuation state used in autoranging to determine the noise level. This quantity is than displayed on the front panel display.

In the measurement, the processor also reads the frequency of the received tone, which under normal conditions, is removed by the notch filter. The frequency measuring process is described in the Level and Frequency Section. The received frequency is also displayed on the front panel displays.

If, during the scan of the front panel latch location 1100 the processor sees that the Master mode has been selected, the processor initiates a link-up routine with the Slave. This routine is described in the Master-Slave section. Part of the linking procedure is the Master sending to the Slave a code word which contains the measurement and direction information. The Slave's processor decodes this code word and uses it to set up the Slave's transmitter and receiver. After a successful link, the Master processor programs its receiver and transmitter.

In the Master-to-Slave measurement direction, the Master's transmitter is the signal source and is programmed to fixed frequency at 1004Hz, identical to the normal mode. The Slave's receiver is the detector and is programmed, like the receiver in the normal mode, with the 1004Hz notch filter, C-Message weighting filter and QRMS detector selected. In this case, though, the data read by the Slave's processor is not displayed but sent to the Master set via the modem A8. The method of data transmission, including programming of the Slave's transmitter and Master's receiver, is covered in the Master-Slave section. The noise level data is received through the Master's modem A8 and is processed and displayed. The frequency displayed is that of the Master's transmitter as read from the output latches at 1A100 and 1B00.

In the Slave-to-Master measurement direction, the Master establishes link with the Slave as described in the Master-to-Slave section and a programming code word is sent to the Slave from the Master through their respective modems. The Slave interprets this code word and sets up its receiver and transmitter accordingly. The Slave's transmitter is set for fixed frequency at 1004Hz through the transmitter latches at locations 1700, 1800 and 1900 and is the signal source for the measurement. The Slave's receiver is programmed without filters to receive a holding tone from the Master. Loss of this tone will break the link. After link is established, the Master programs itself to transmit a fixed tone of 1004Hz through latches located at 1700, 1800 and 1900. This acts as a holding tone for retaining the established link. The Master's receiver is programmed identical to the receiver in the normal mode. Data acquisition and frequency measurement are also identical to the normal mode while in the Slave-to-Master direction.

IMPULSE NOISE

NORMAL NODE

Figure 8:
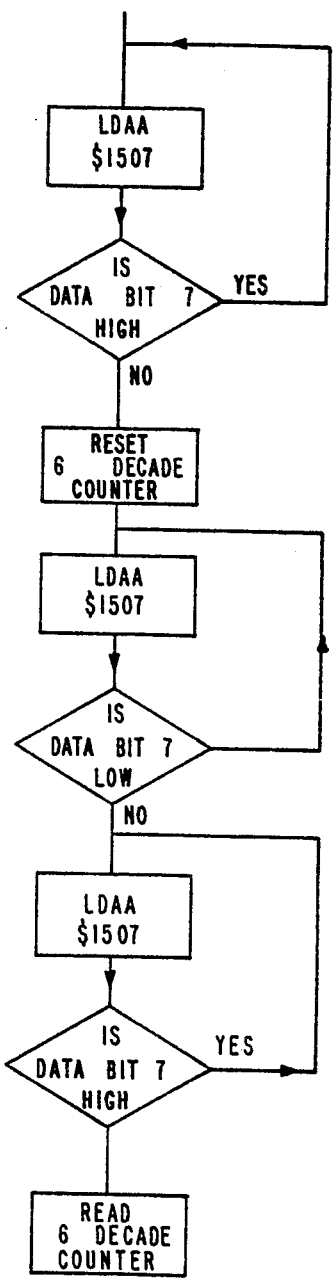
FIG. 8 is a flow chart showing a subroutine for synchronization relative to the envelope delay distortion phase difference measurement.

Referring to FIG. 8, on entry this program is in an interrogation loop reading the program qualifier byte "panel" (memory location 1100).

When a "start" command is read the impulse noise data port is selected to the six decade data acquisition counter (memory addresses 1500-1507) by writing the proper control word to the hardware control latch (memory address 1400). The data acquisition counter is then reset by writing a logic "1" followed by a logic "0" to bit D4 of the hardware control latch (memory address 1400). The system time base generator is enabled by writing a logic 1" to memory address 1F00. The program enters the "RUN" mode in which the data acquisition counter (memory address 1500–1507) is read and deposited to the right display buffer (memory address 1D00–1D03). The elapsed time or time to test termination is deposited to the left display buffer (memory address 1C00–1C03). The time is handled on an interrupt basis. The system time base generator (memory address 1F00) causes a nonmaskable interrupt once every second. The non-maskable interrupt service routine increments an internal software clock which is located in system RAM (memory address O-FF). This enables us to have an accurate system clock. The program now checks for a signal dropout by reading memory address 1E00. If there is a dropout the program will suspend waiting for the signal to return. If after one second the signal is still gone the operator is signaled by writing a word to emmory address 1200 which causes the negative sign to be illuminated. If at any time during the test the time interval is changed the test is automatically aborted. The program monitors "Panel" memory address 100 waiting for a "stop" command which will suspend the program.

MASTER/SLAVE MODE:
MASTER-TO-SLAVE TEST DIRECTION

In this mode the Slave automatically starts transmitting the contents of its data acquisition counter (memory addresses 1500–1507) to the Master set via the Slave-to-Master channel. The data transmission is as was previously described: the Master set enters the interrogation loop; when a "start" command is read from the front panel "Panel" memory address 1100, the next received data block is stored as a reference count and is subsequently subtracted from all following data received from the Slave set. The number displayed on the Master set is the present Slave count minus the reference value.

MASTER/SLAVE MODE:
SLAVE-TO-MASTER TEST DIRECTION

In this mode the Slave is used as a 1004Hz tone generator. Its receiver remains open waiting for new commands. The Master set operates as described in normal mode.

ENVELOPE DELAY MEASUREMENT

To make an envelope delay measurement one normally needs two sets. The direction of measurement determines what each set does. The "Normal" set generates the test signal and transmit it over the line to be tested to the "repeat" set. The "Repeat" set receives the envelope delay test signal and processes it the normal way (described later). The transmitter of the "Repeat" set returns the received modulation on a fixed carrier. (AM Modulation). This ensures that only the delay from Normal to Repeat is measured.

REPEAT - NORMAL

In this mode the Normal (Local) set sends the modulation on a fixed carrier to the Repeat set. The repeat set recovers the modulation and puts it on a variable carrier. The envelope delay of the line from the Repeat to Normal set is measured.

MASTER-SLAVE

The details of this mode of operation are described in more detail in the description hereinafter of the operation of the Modem board. This mode is identical to the NORMAL-REPEAT mode.

SLAVE-MASTER

The modulation (83.3Hz) is transmitted to the Slave set on a fixed carrier at about 2000Hz. The FSK signal which transmits the frequency programming information for the Slave transmitter is added to the AM modulated carrier. The combined signal sent to the Slave consists of one AM modulated signal and one frequency modulated signal. The Slave set separates the FSK signal from the AM in the Modem board by means of bandpass filters. The decoded FSK information is used to program the transmitter to the desired frequency. The AM signal is routed to the envelope delay board. As in the repeat mode the 83.3Hz modulation is recovered and modulated on the variable carrier frequency.

This scheme was developed to make a phase measurement on a comparison basis. It is necessary for the set which makes the delay measurement to have two signals identical in frequency, therefore, the 83.3 modulation is transmitted to the Slave. The Master set will have the transmitted 83.3Hz as well as the received 83.3Hz available which are identical in frequency but not in phase, because the phase of the received is a function of the parameters of the line or network to be measured.

ENVELOPE DELAY MEASUREMENT
GENERAL DESCRIPTION

Figure 9:
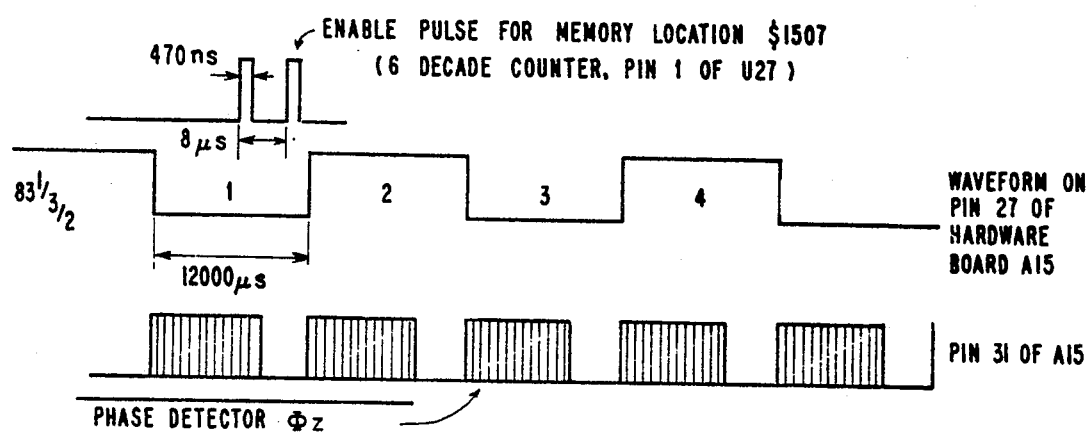
FIG. 9 shows waveforms illustrating establishment of synchronization of gating in measuring EDD phase difference.
Figure 10:
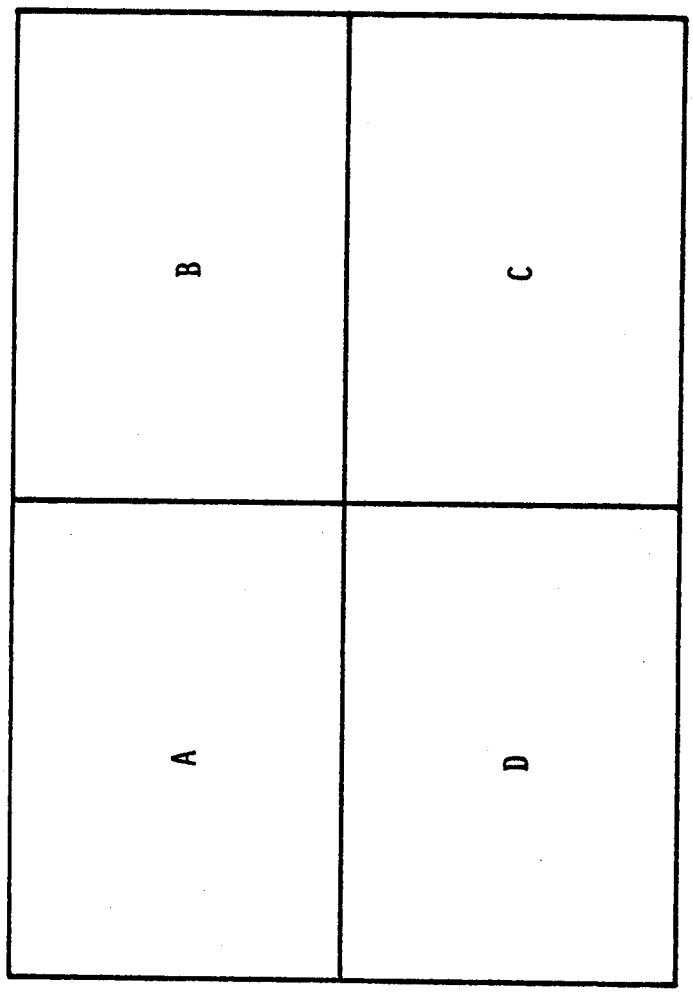
FIG. 10 is comprised of FIGS. RSA-10D, is a block diagram illustrating envelope delay measurements.
Figure 10A:
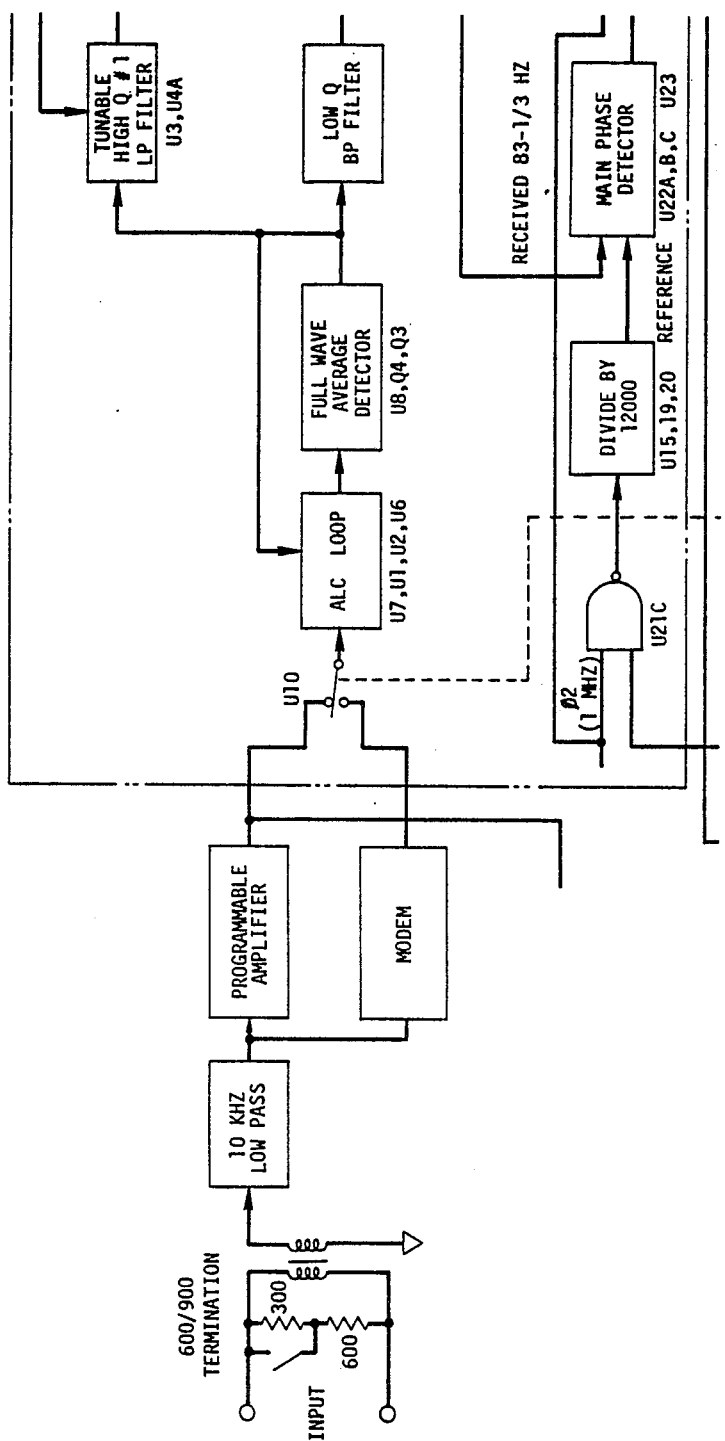
Figure 10B:
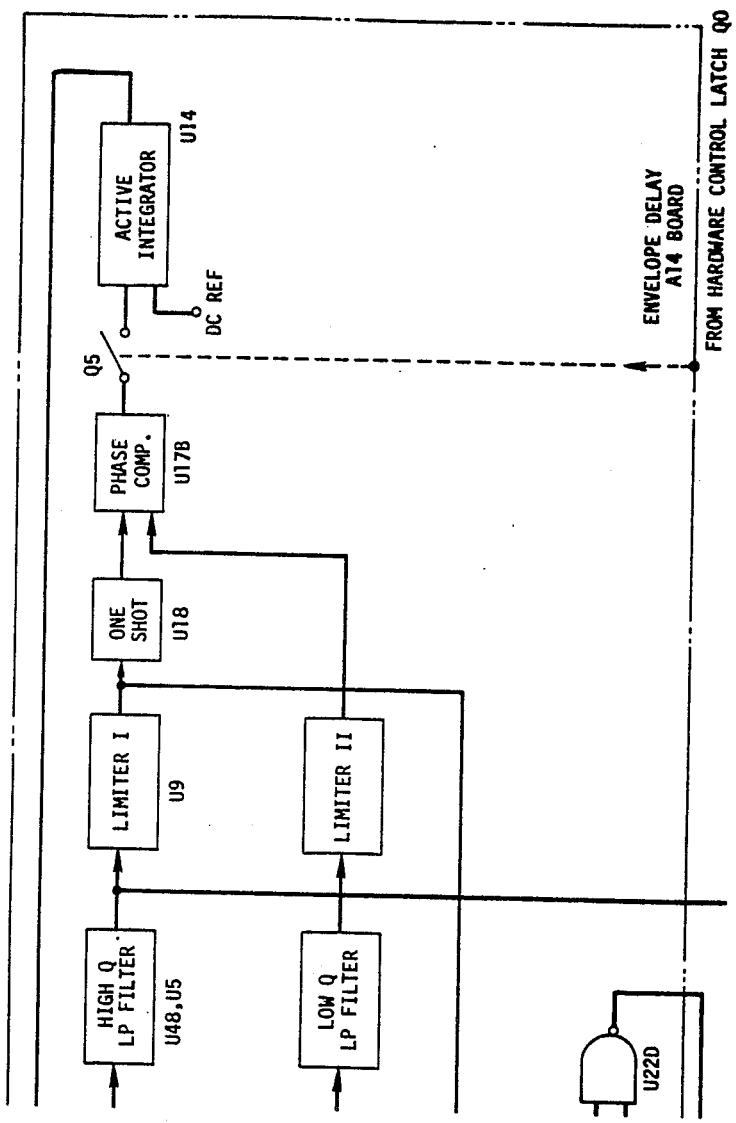
Figure 10C:
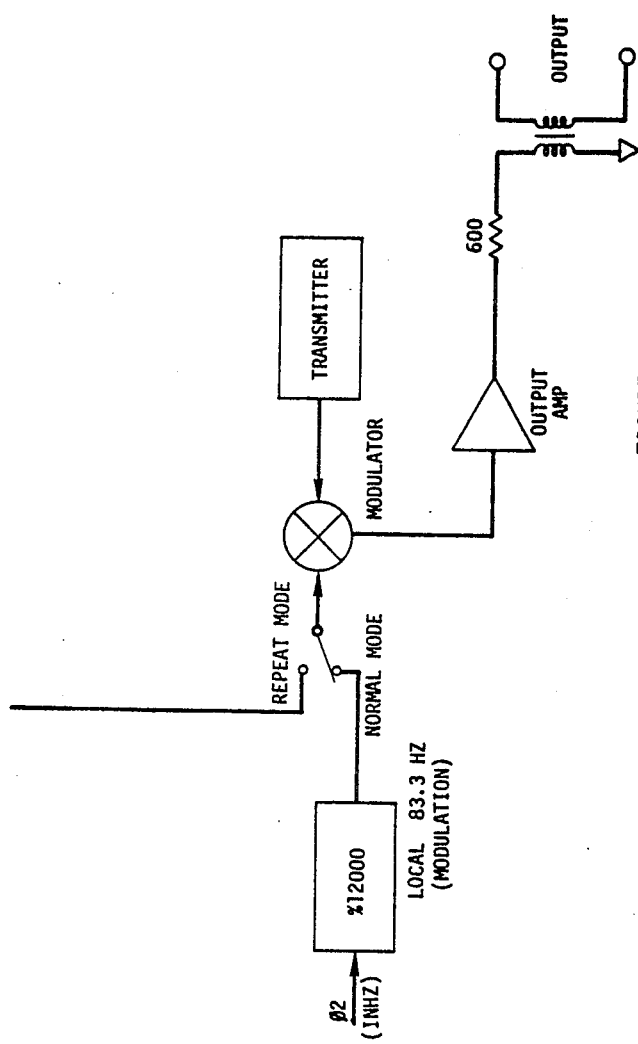
Figure 10D:
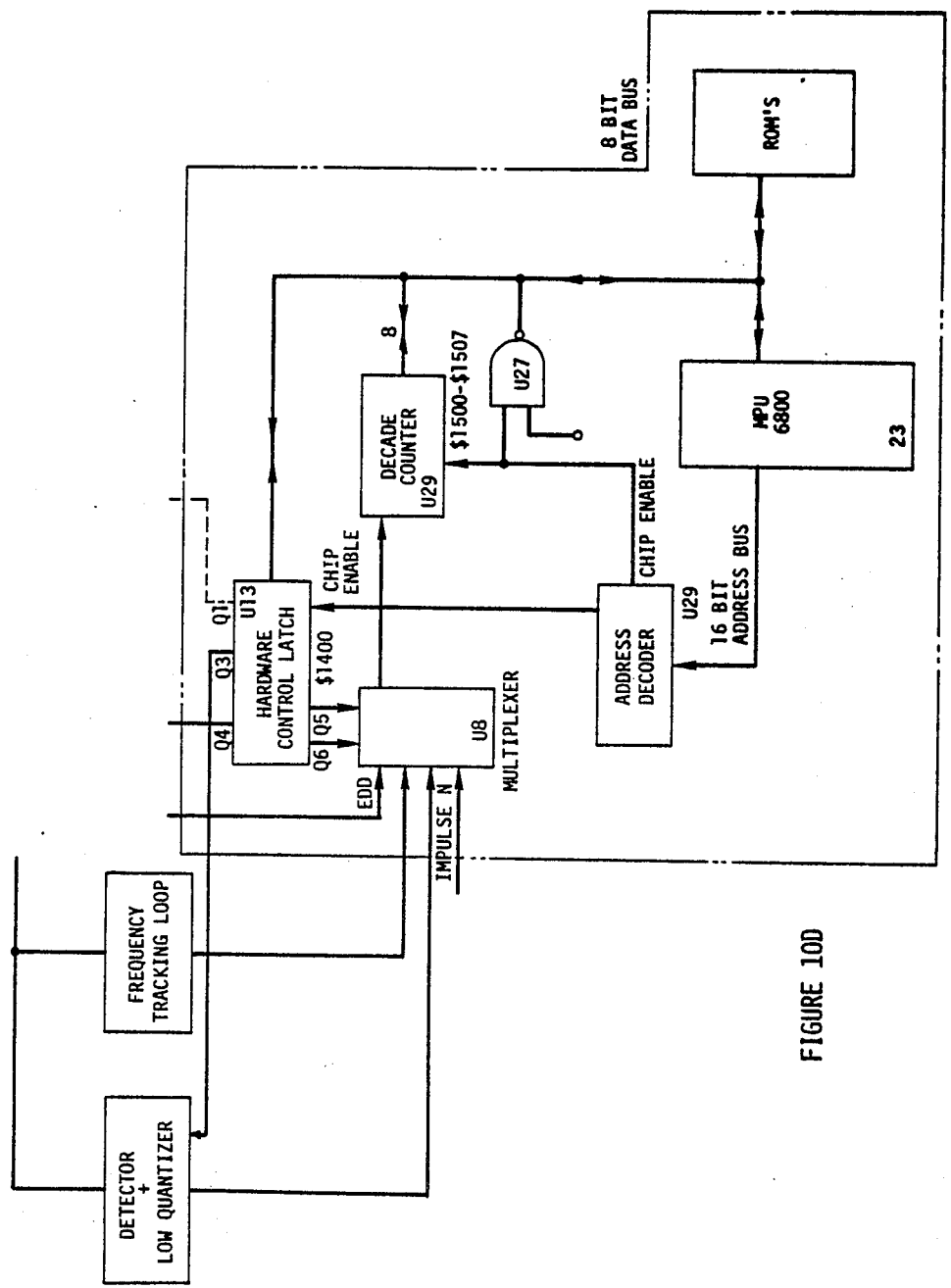
Figure 11:
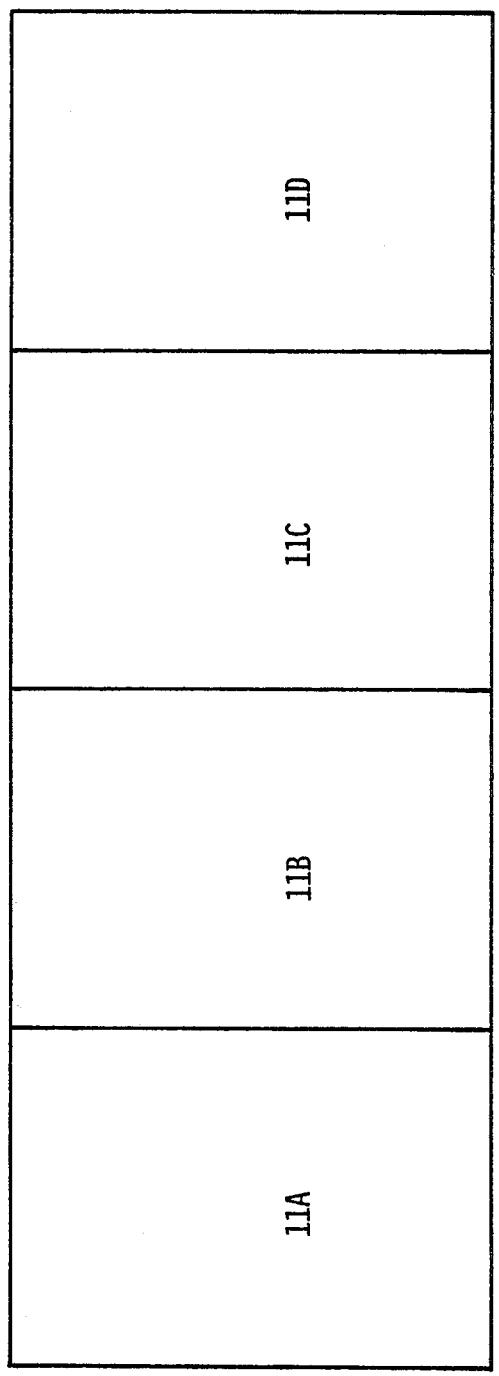
FIGS. 11A-11D and 12A-15E are schematic diagrams of Modem Board A8.
Figure 11A:
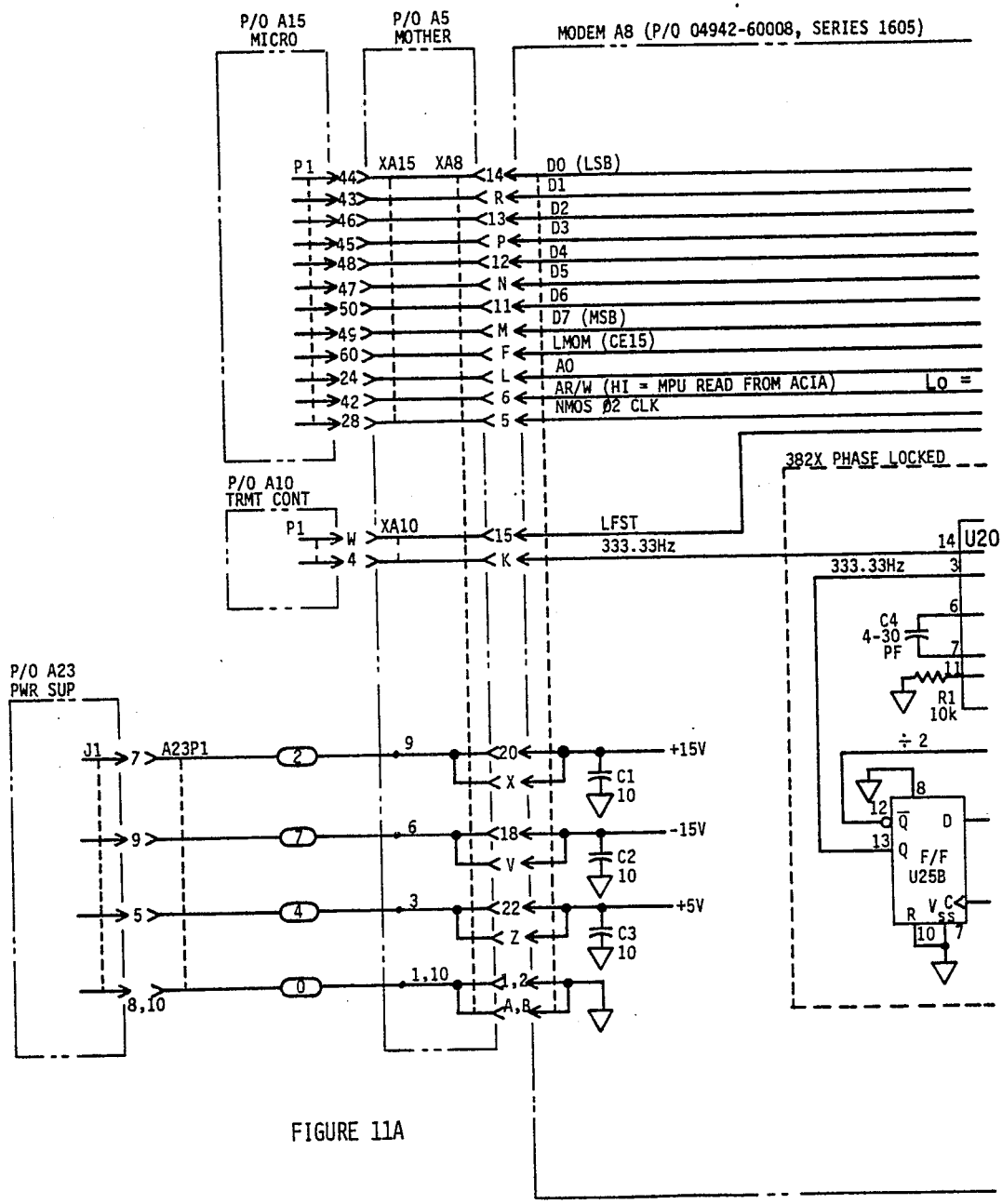
Figure 11B:
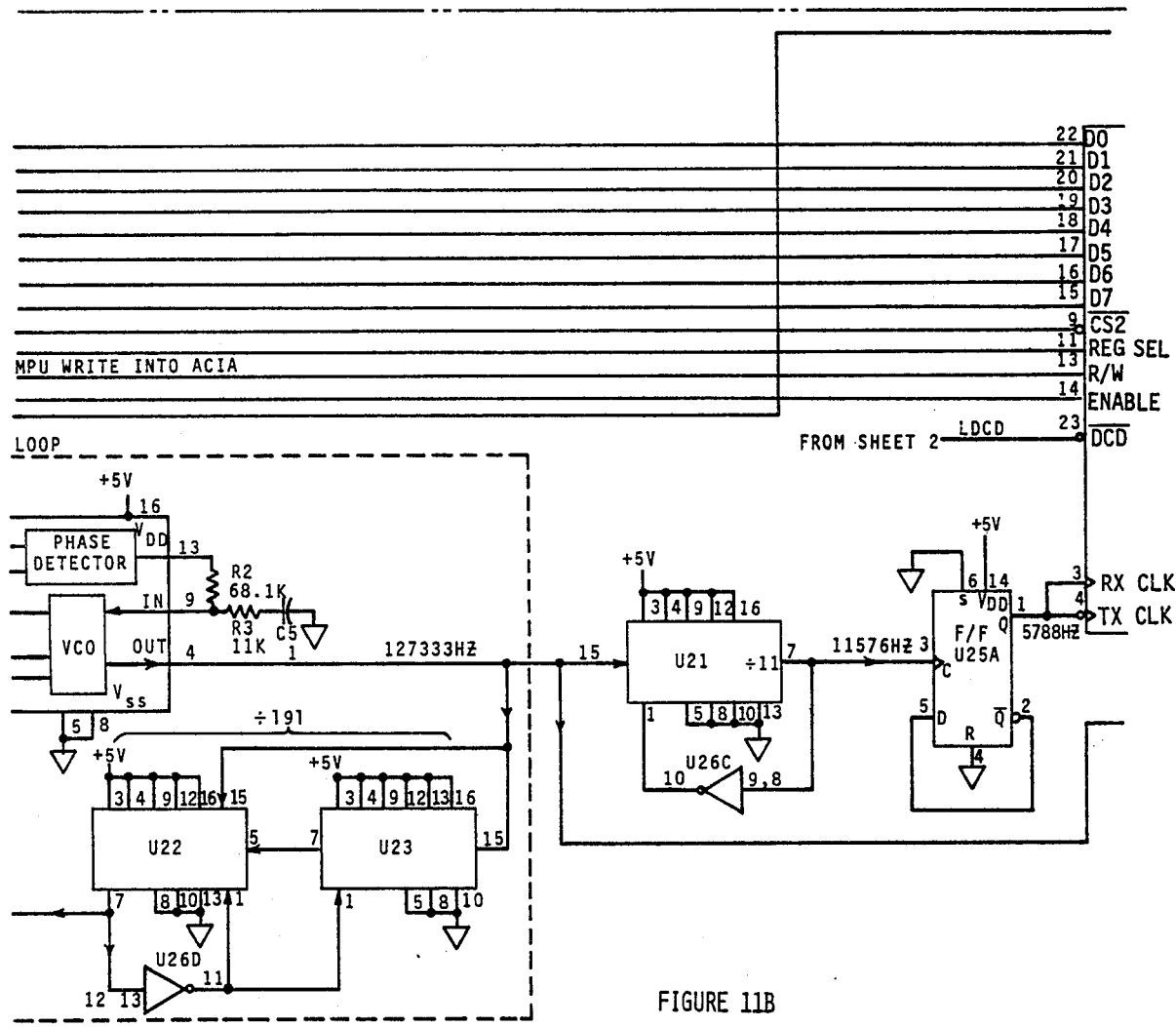
Figure 11C:
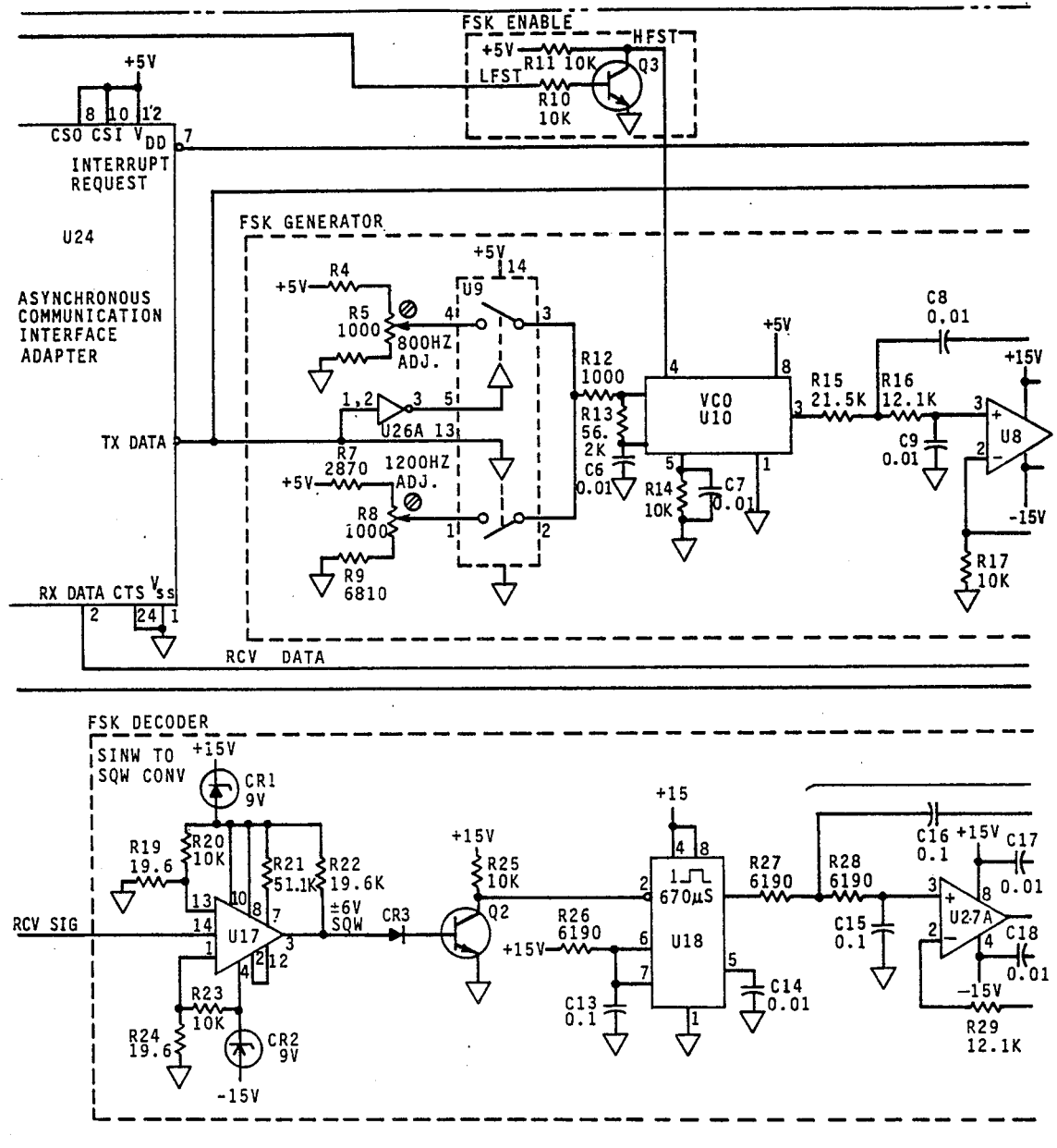
Figure 11D:
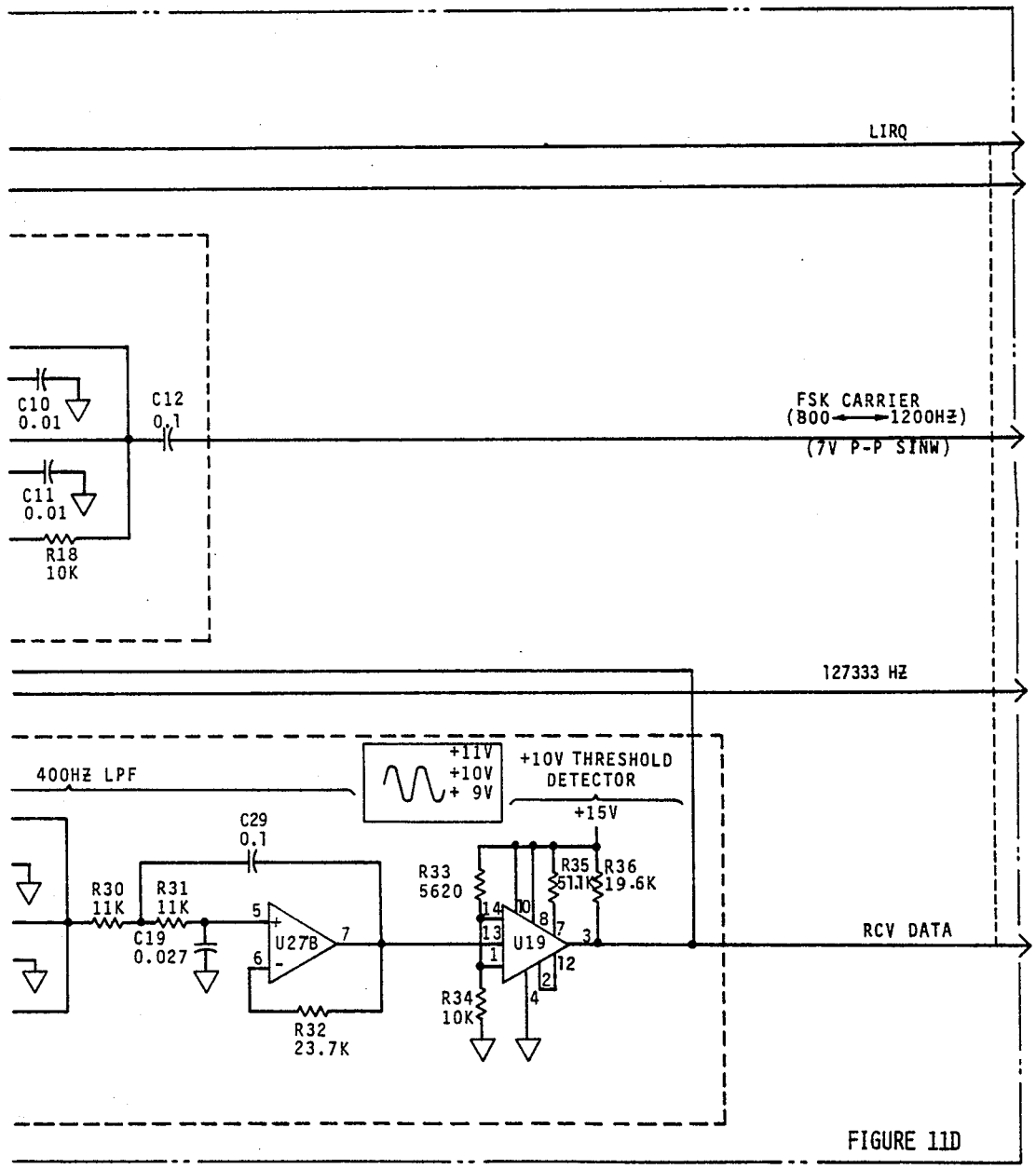
Figure 12:
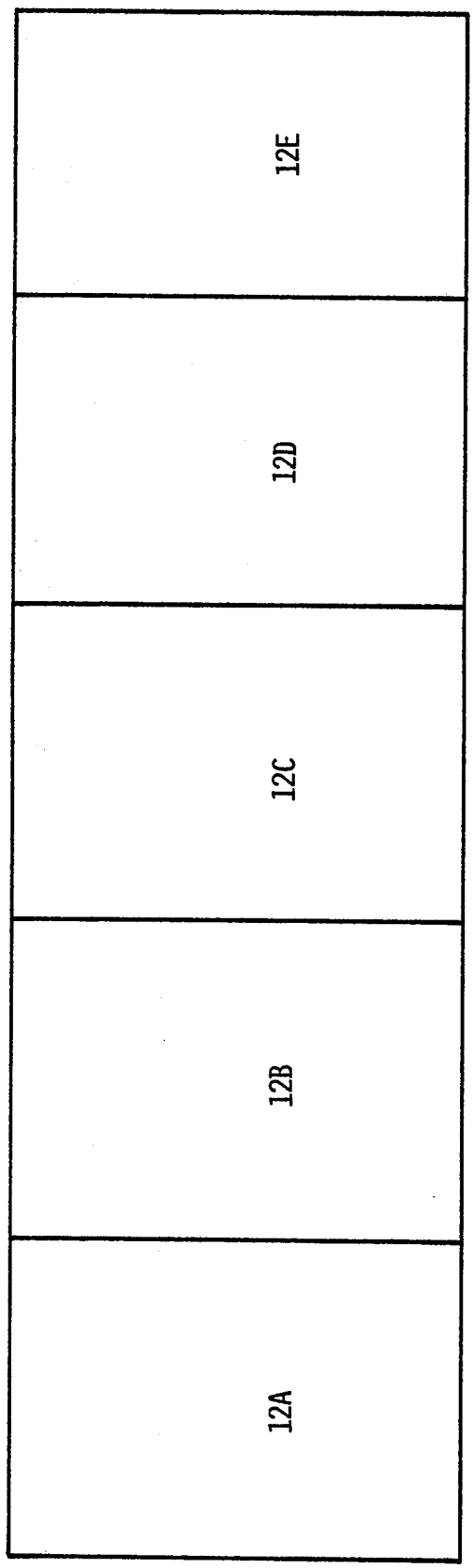
Figure 12A:
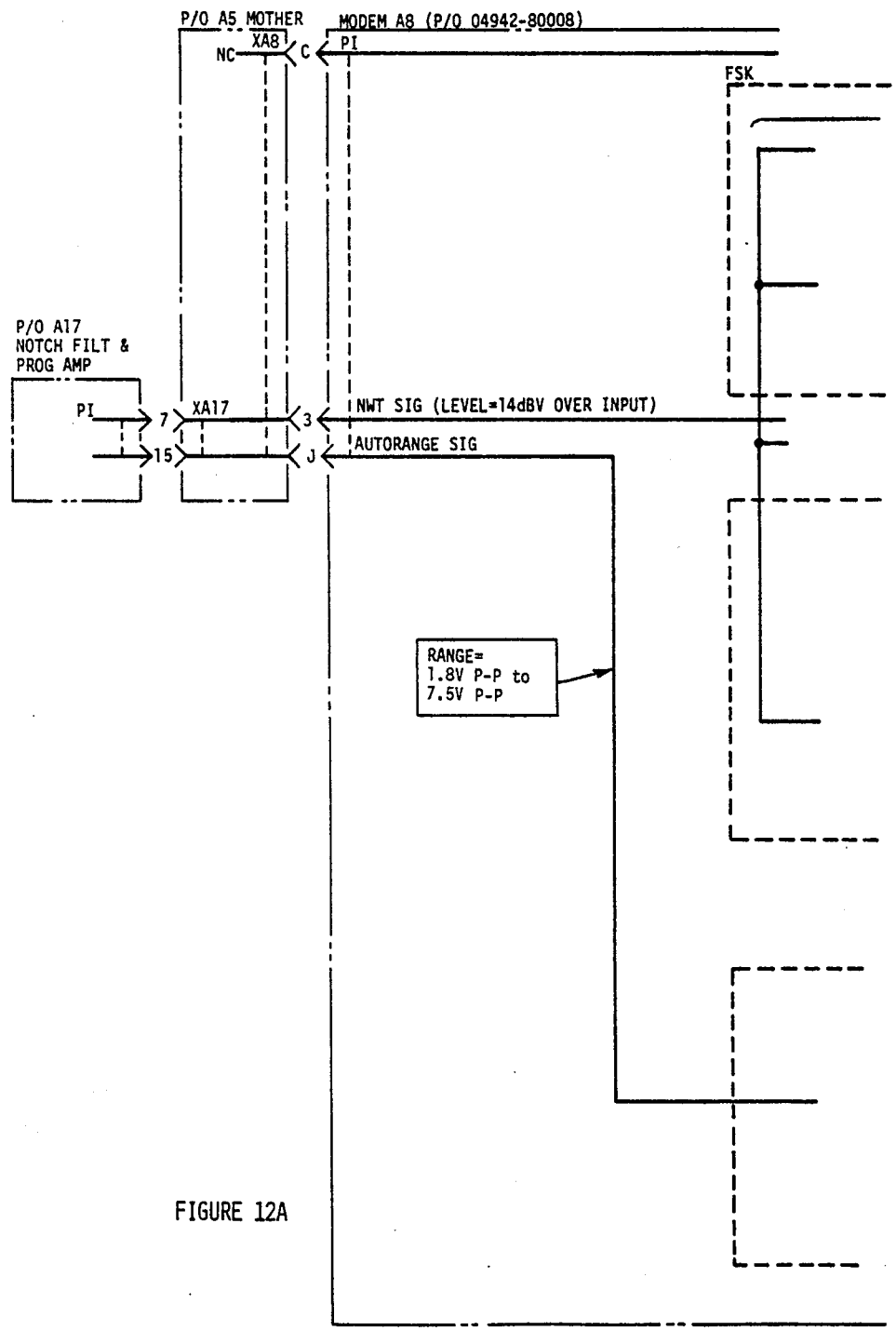
Figure 12B:
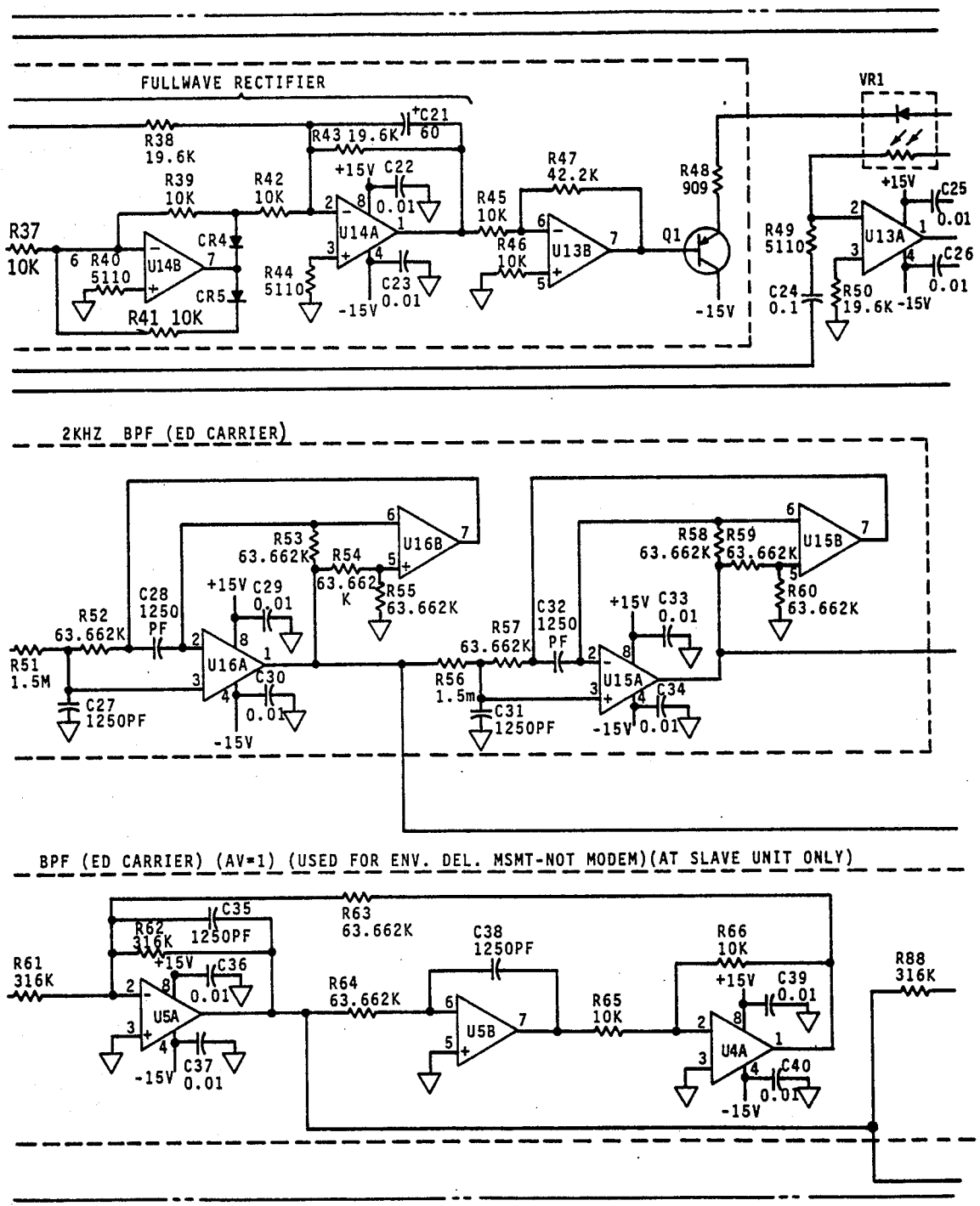
Figure 12C:
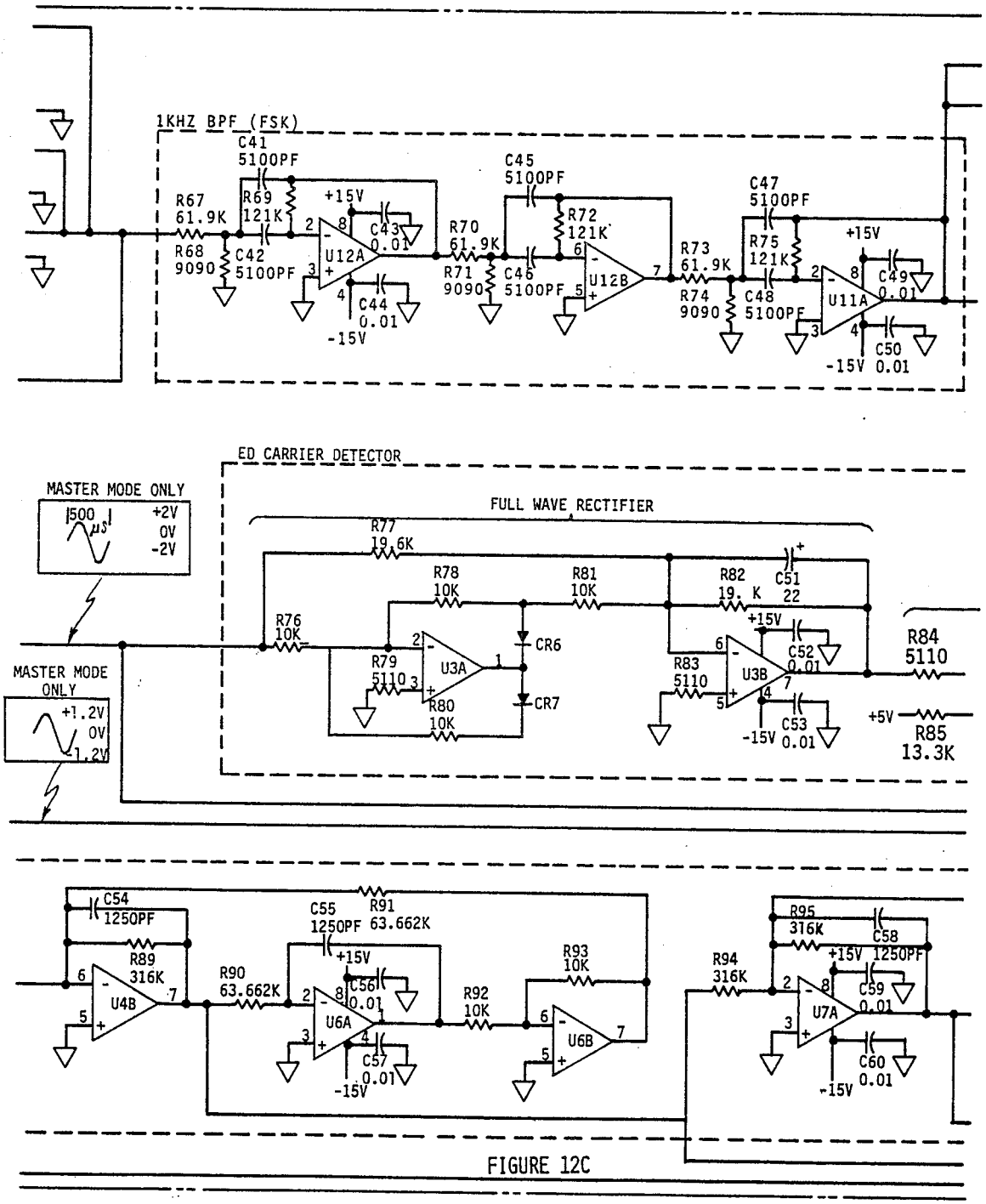
Figure 12D:
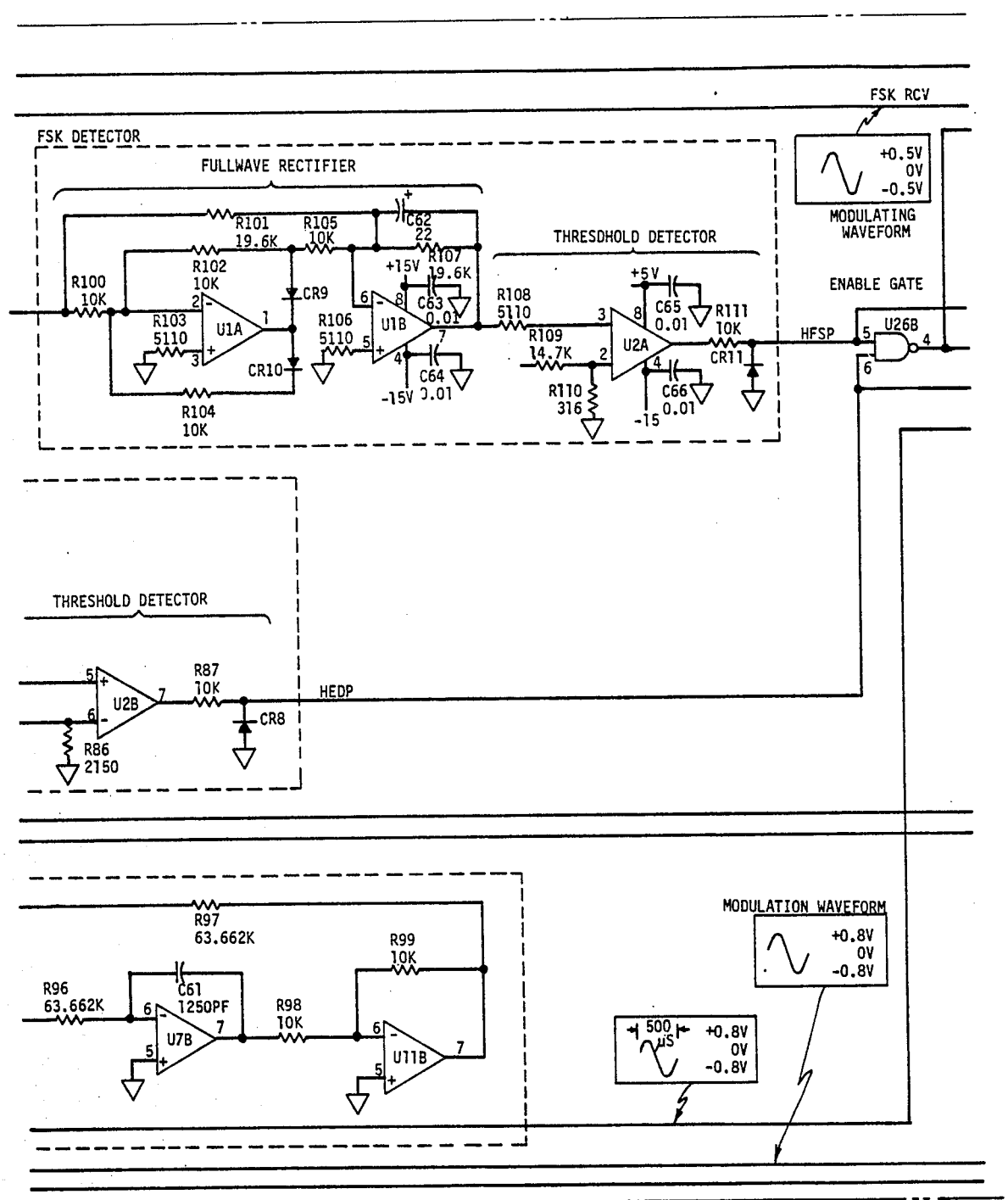
Figure 12E:
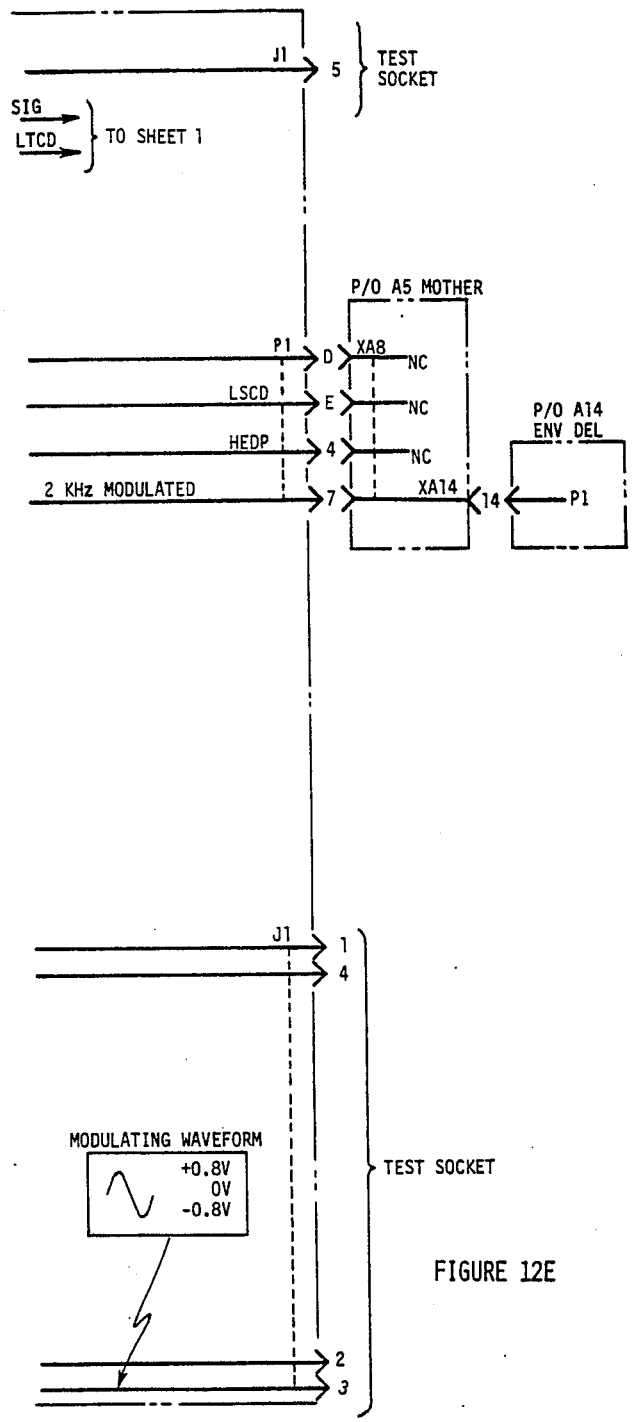
Figure 13:
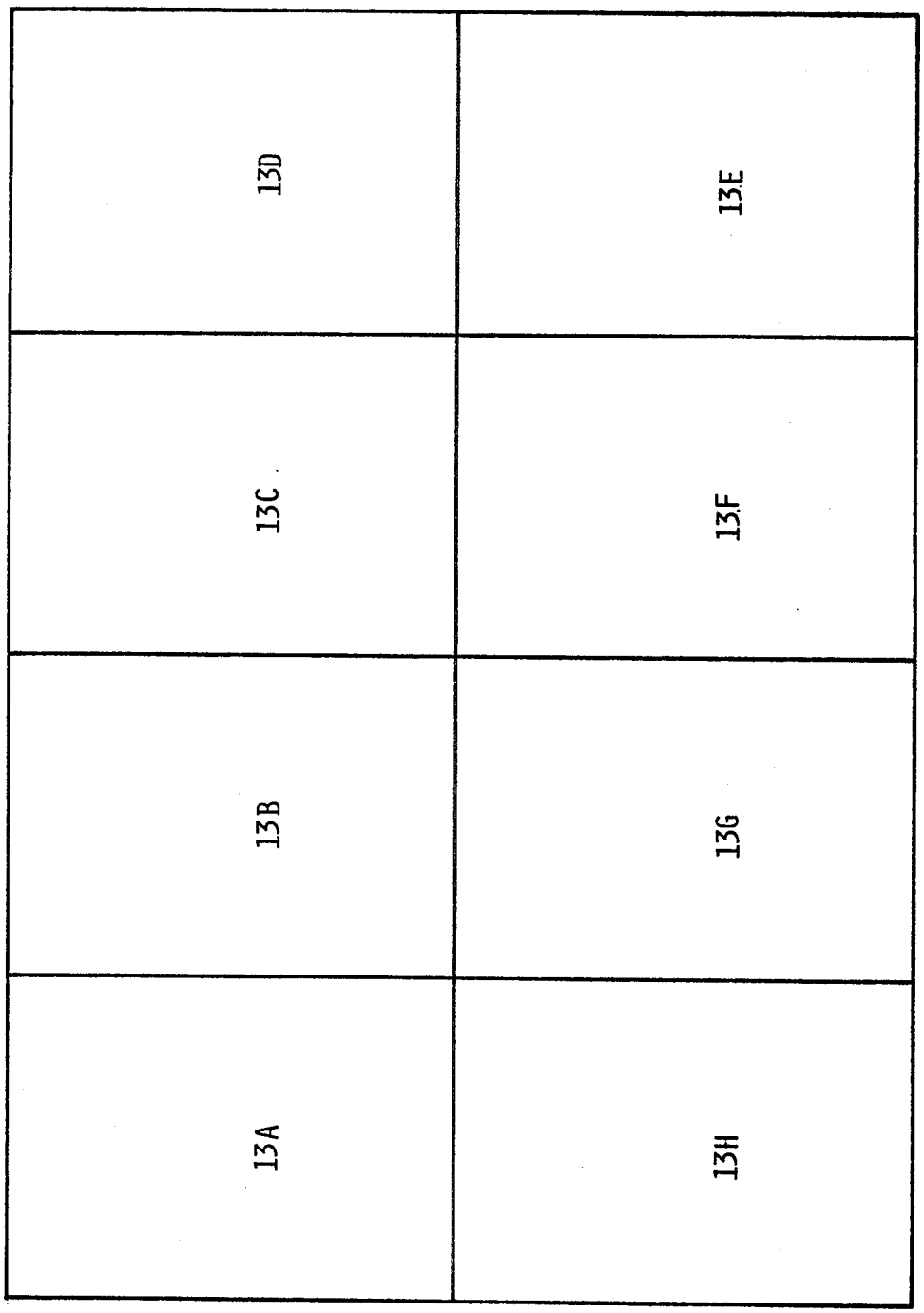
Figure 13A:
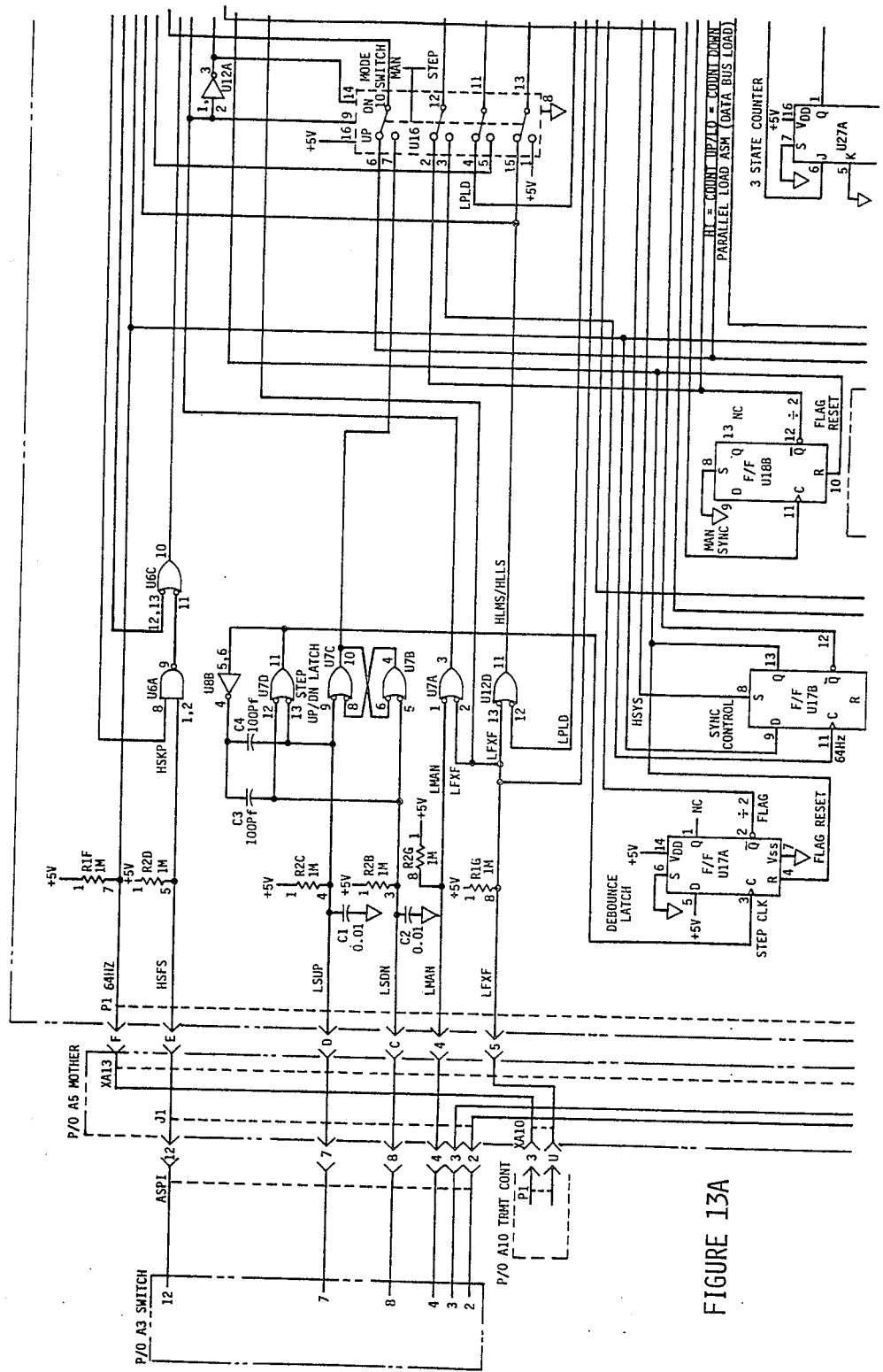
Figure 13B:
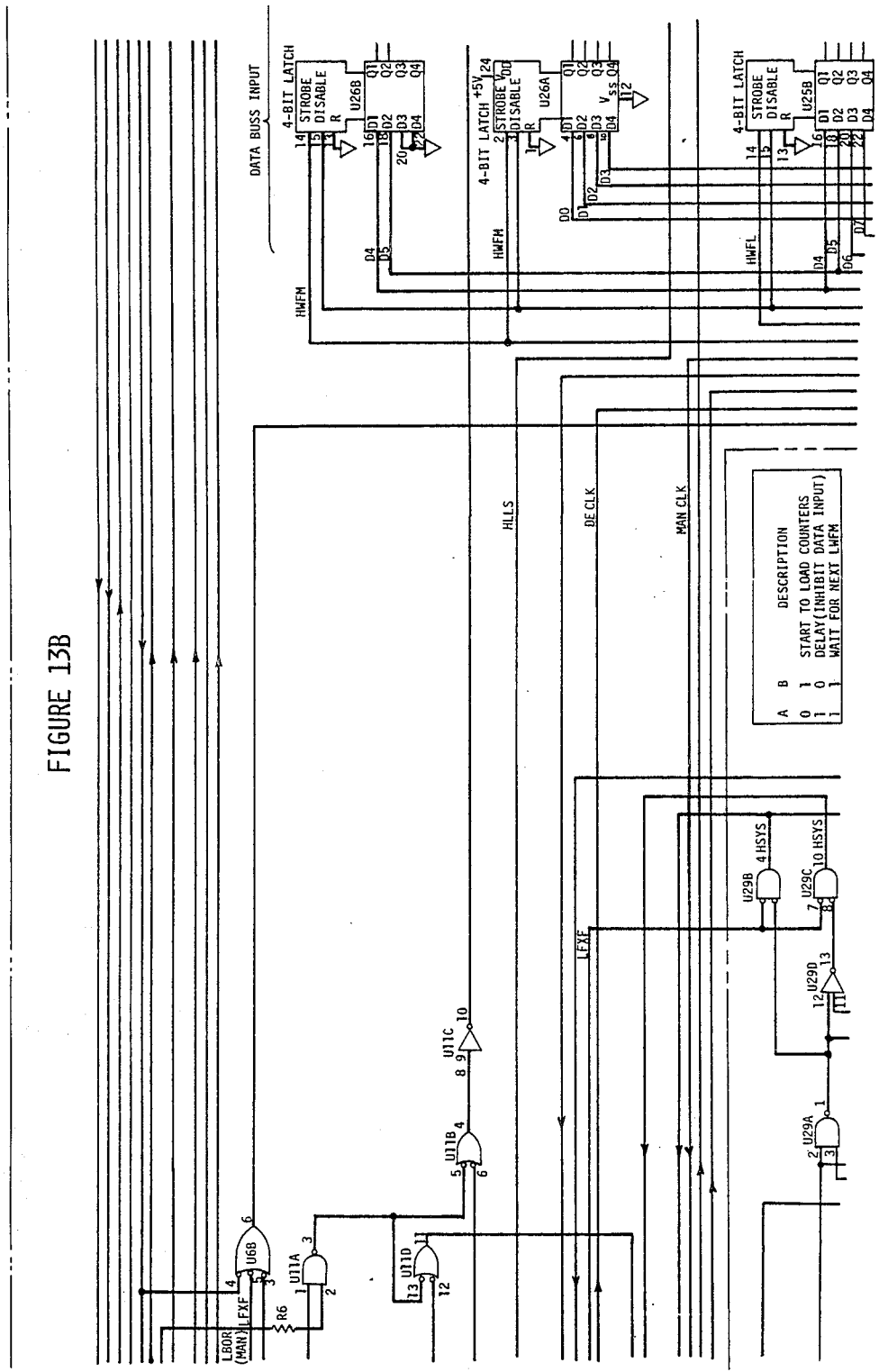
Figure 13C:
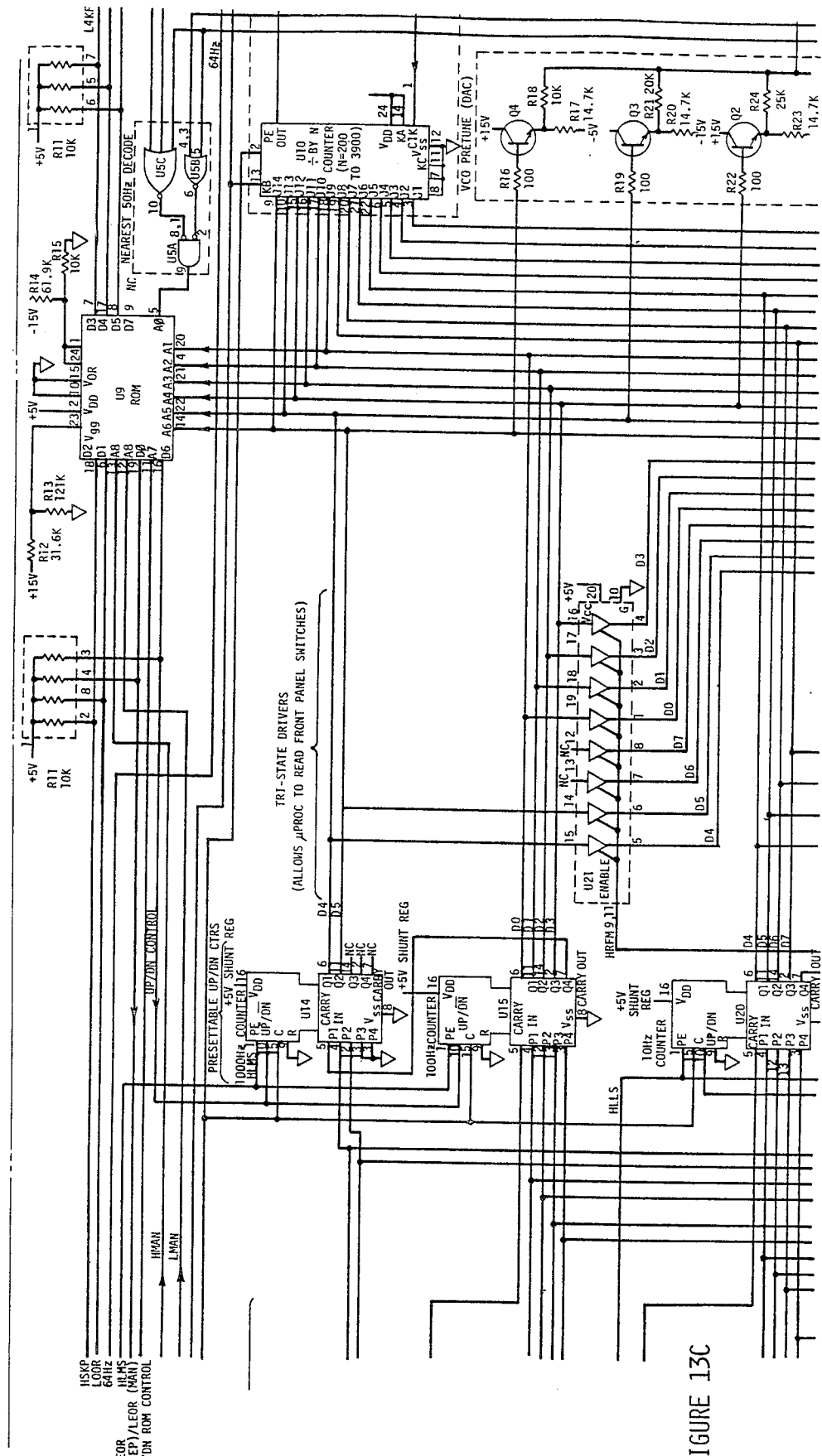
Figure 13D:
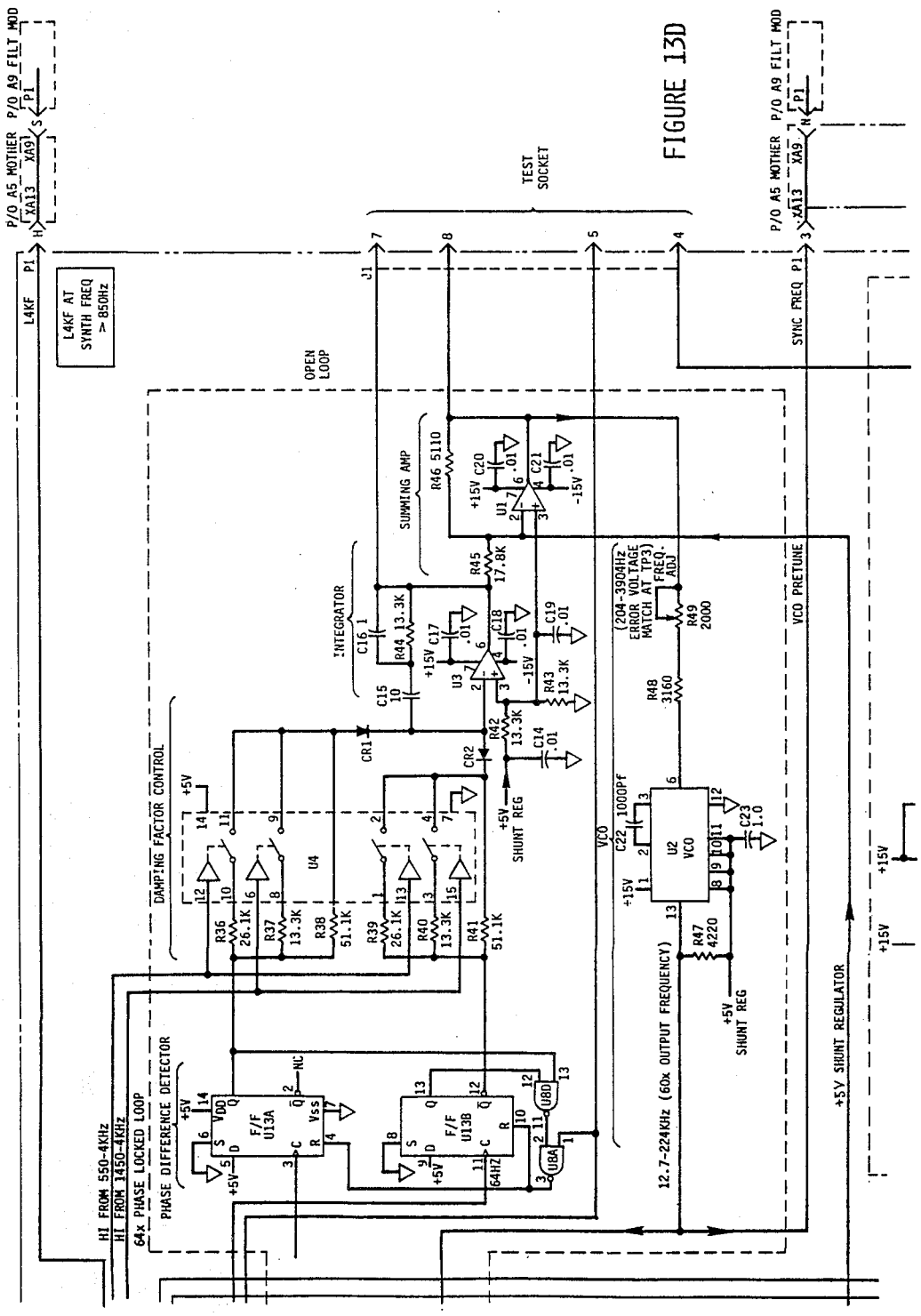
Figure 13E:
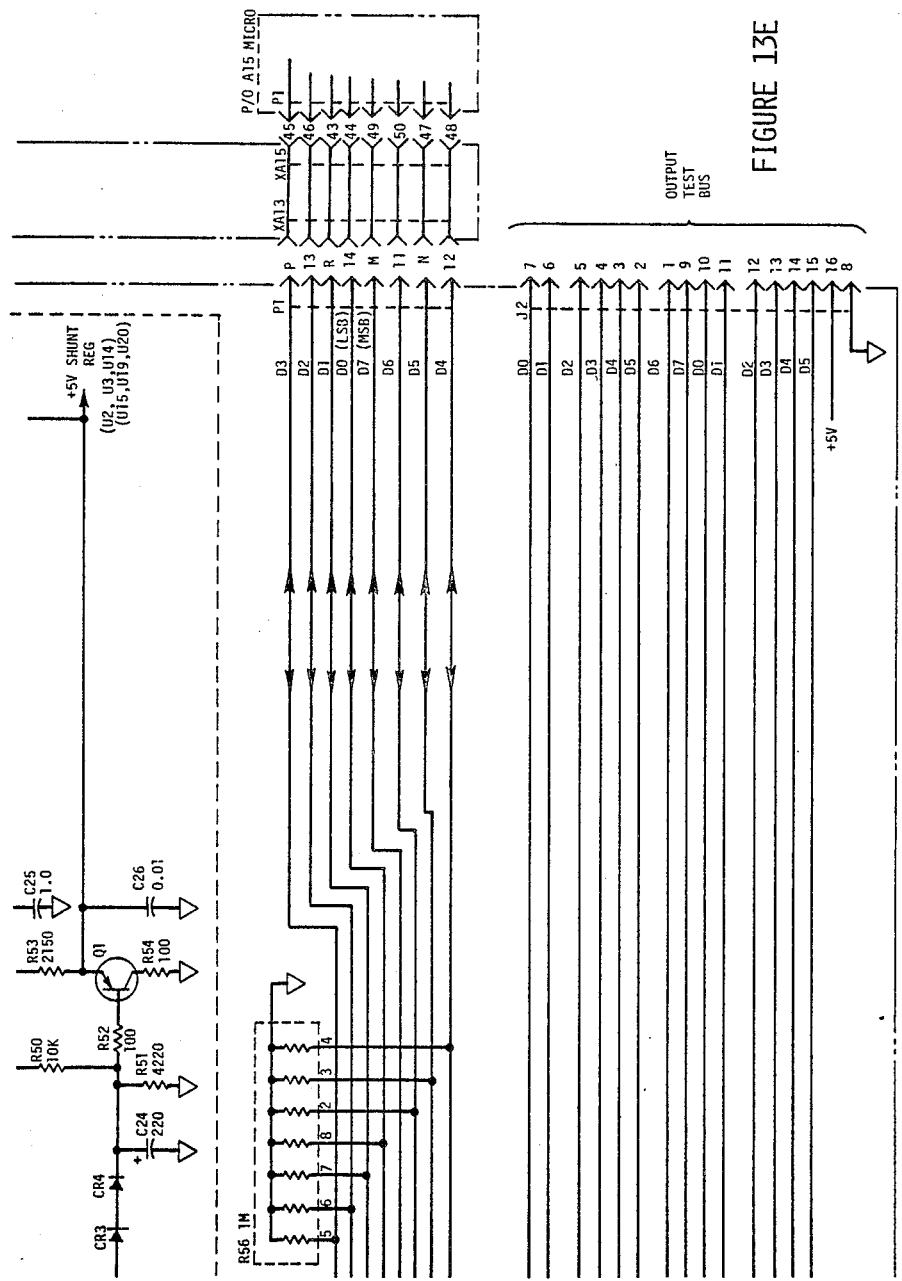
Figure 13F:
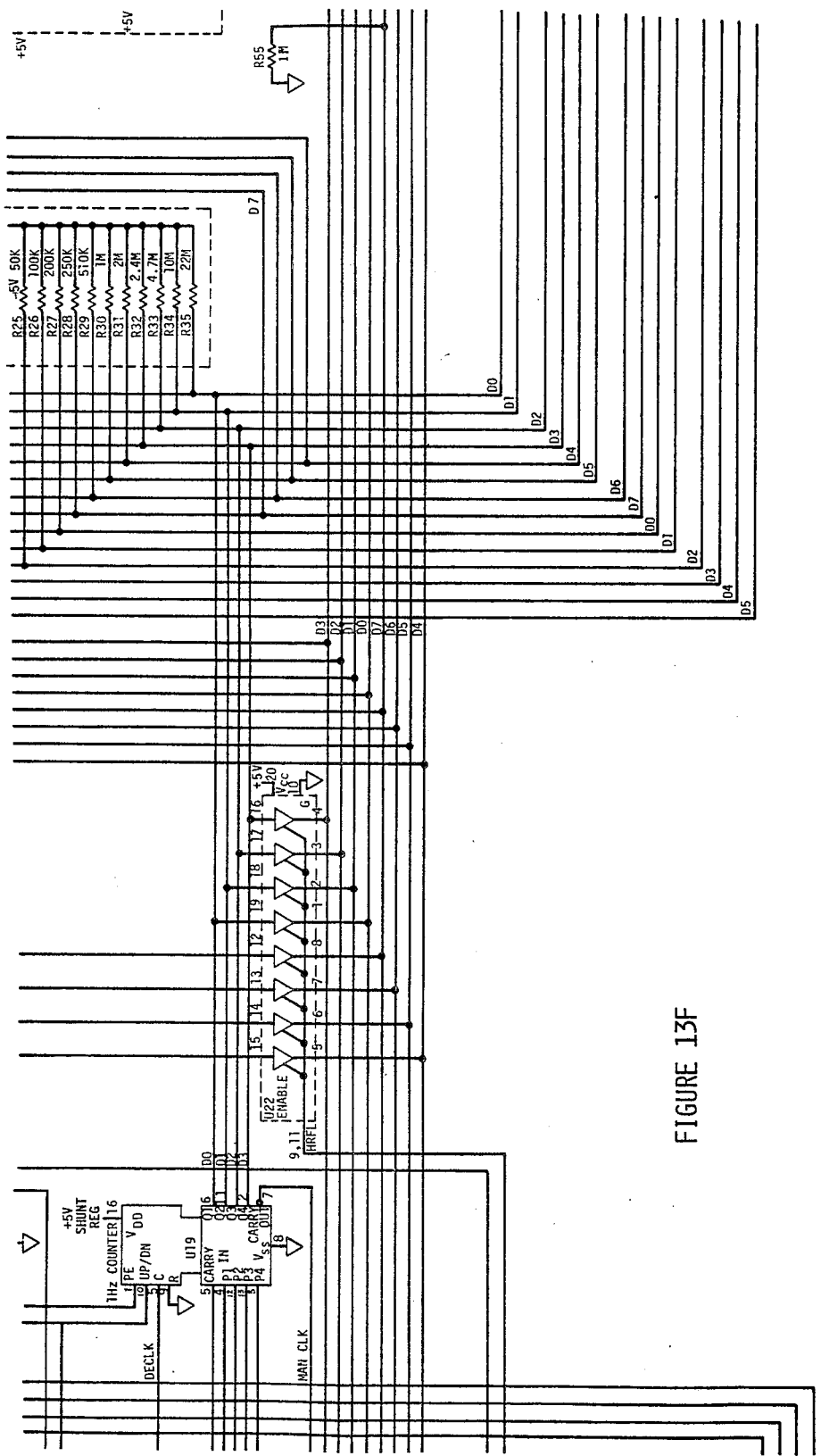
Figure 13G:
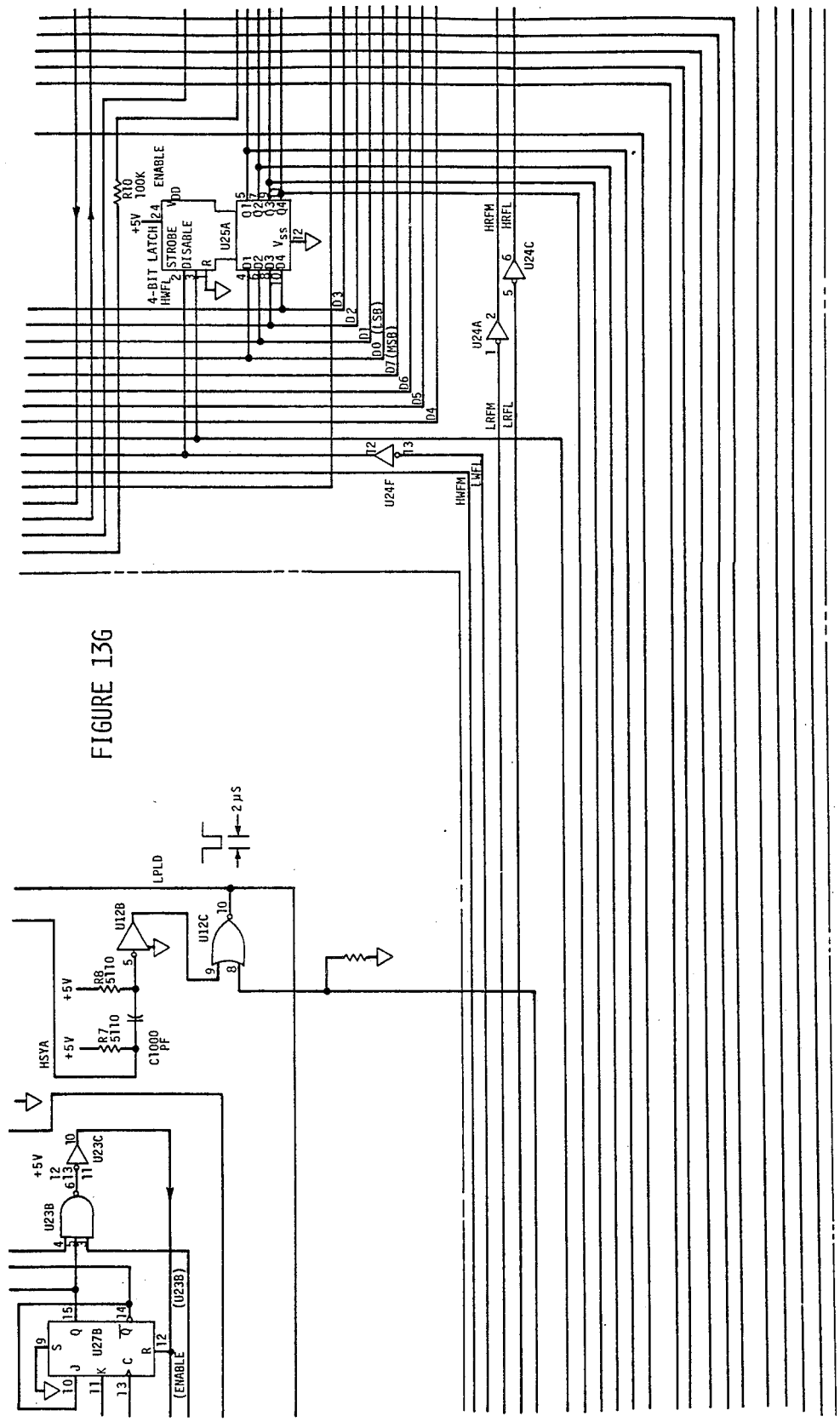
Figure 13H:
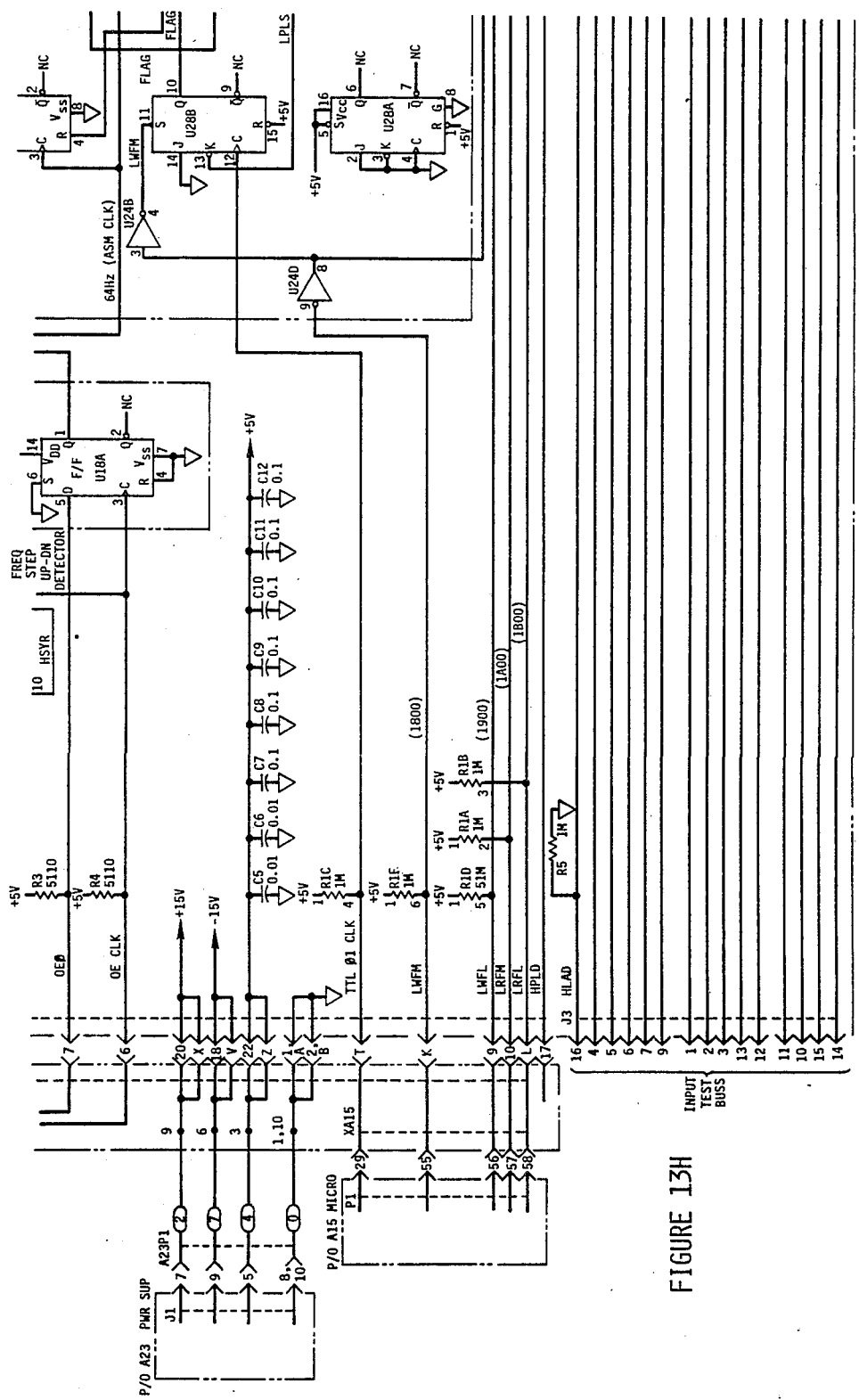
Figure 14:
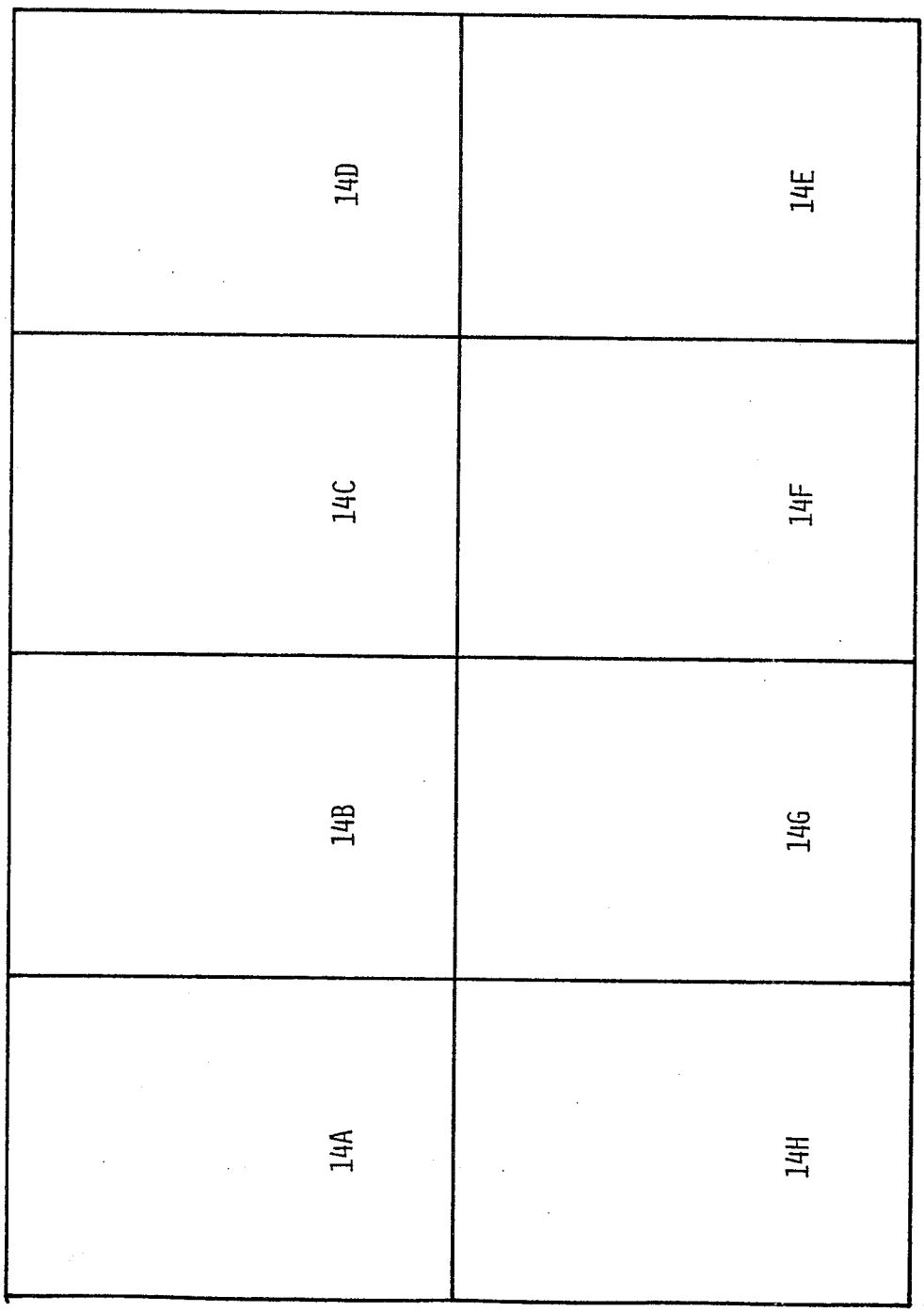
Figure 14A:
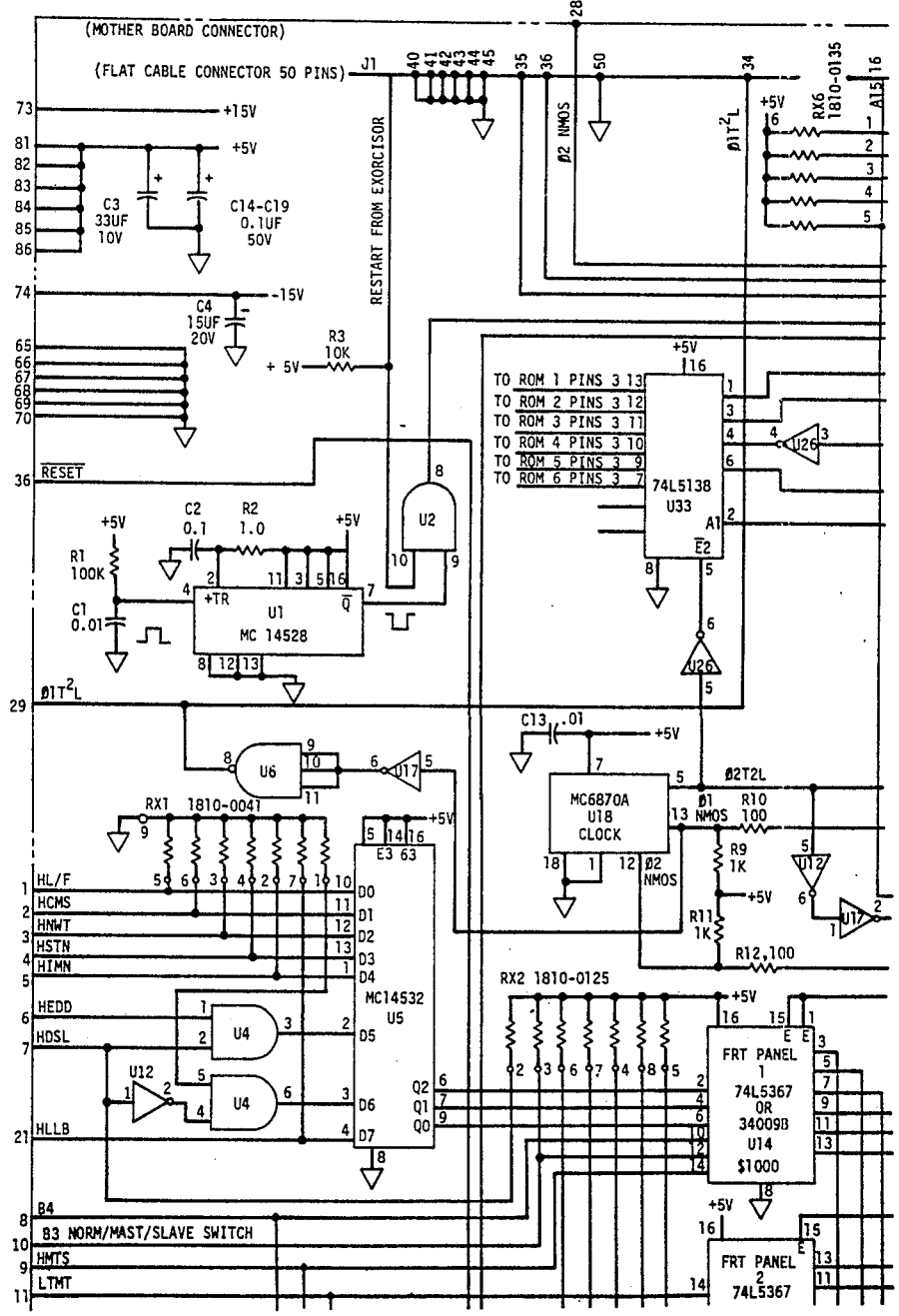
Figure 14B:
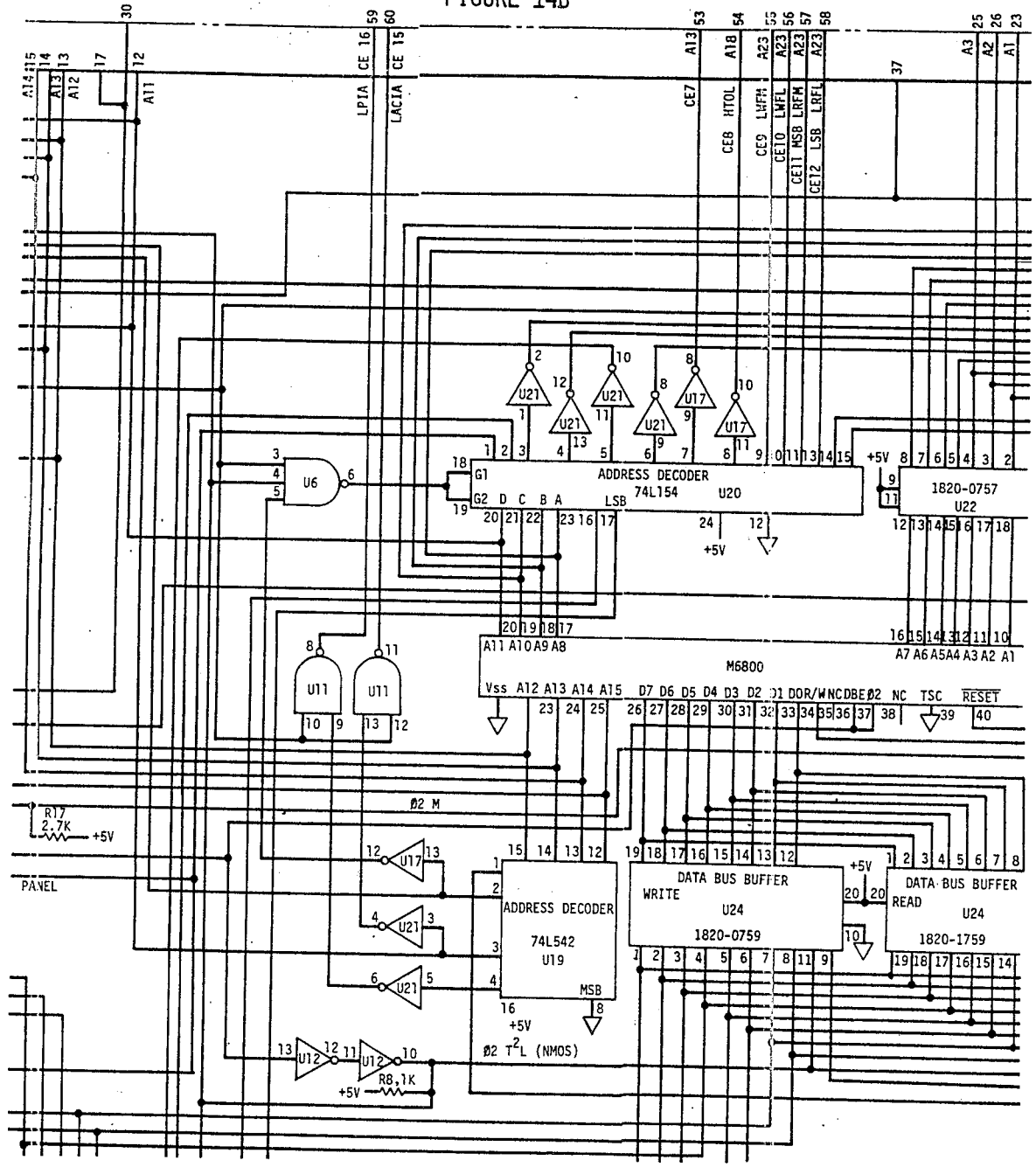
Figure 14C:
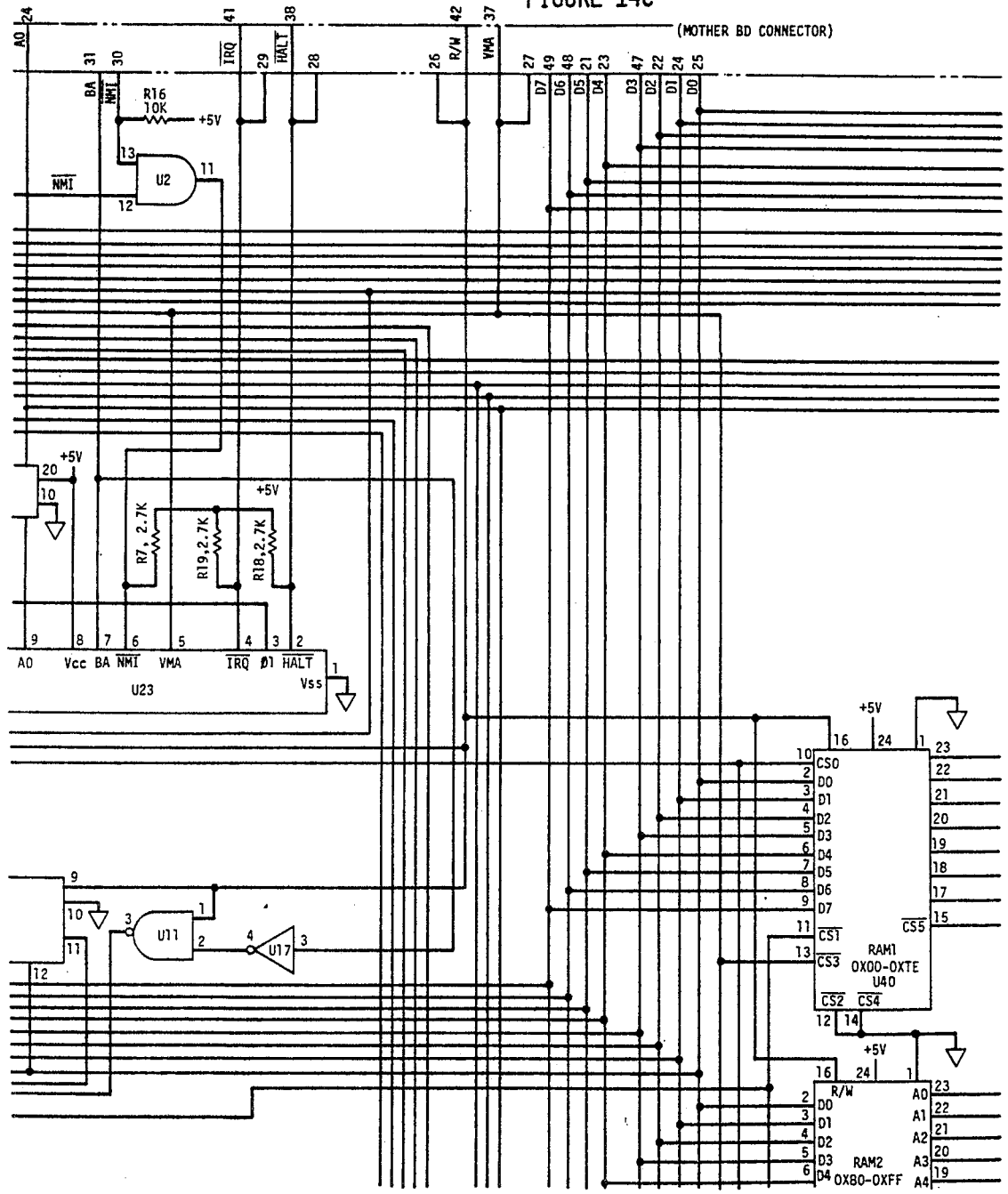
Figure 14D:
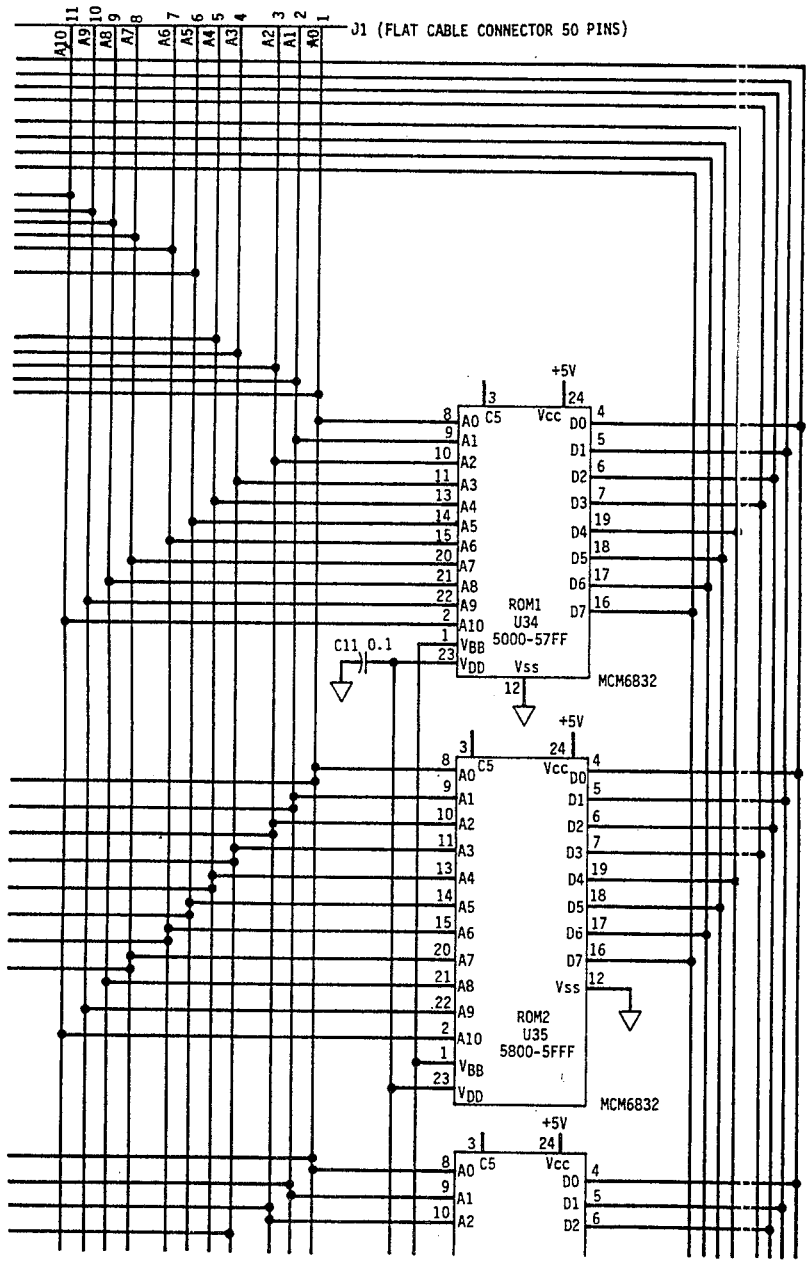
Figure 14E:
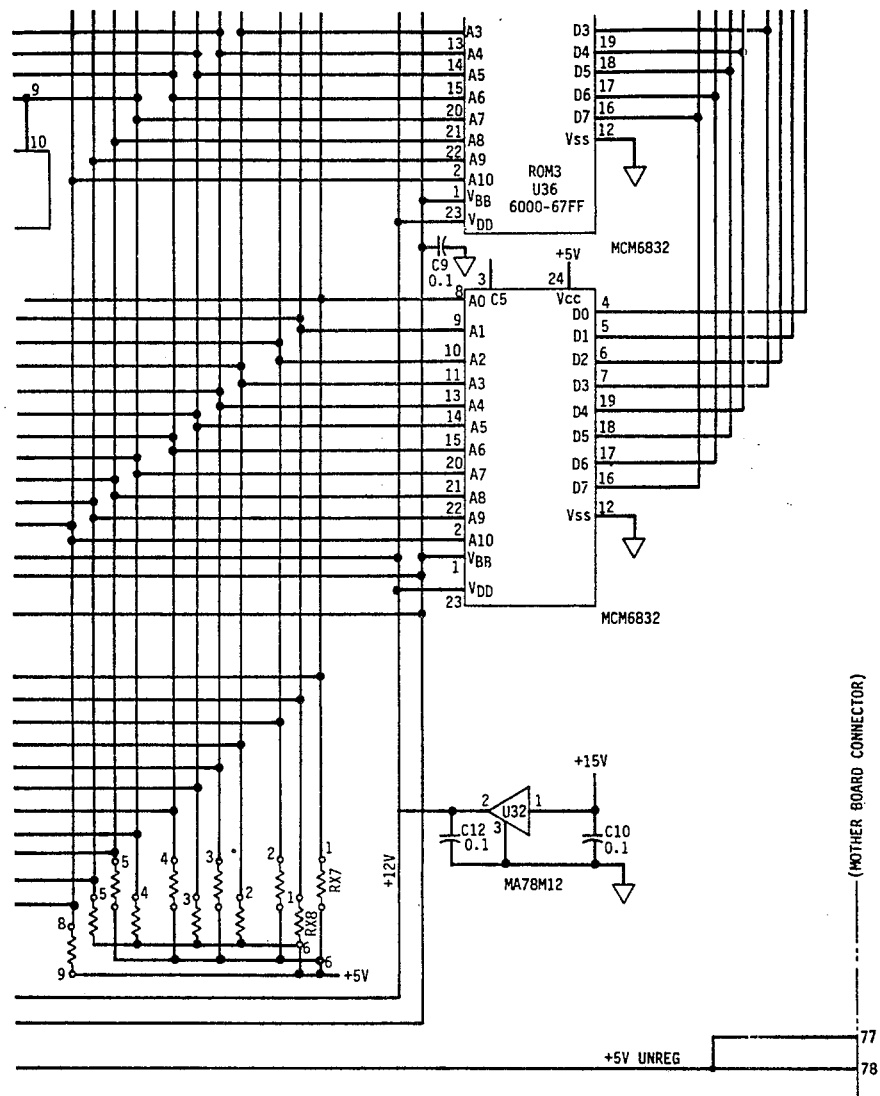
Figure 14F:
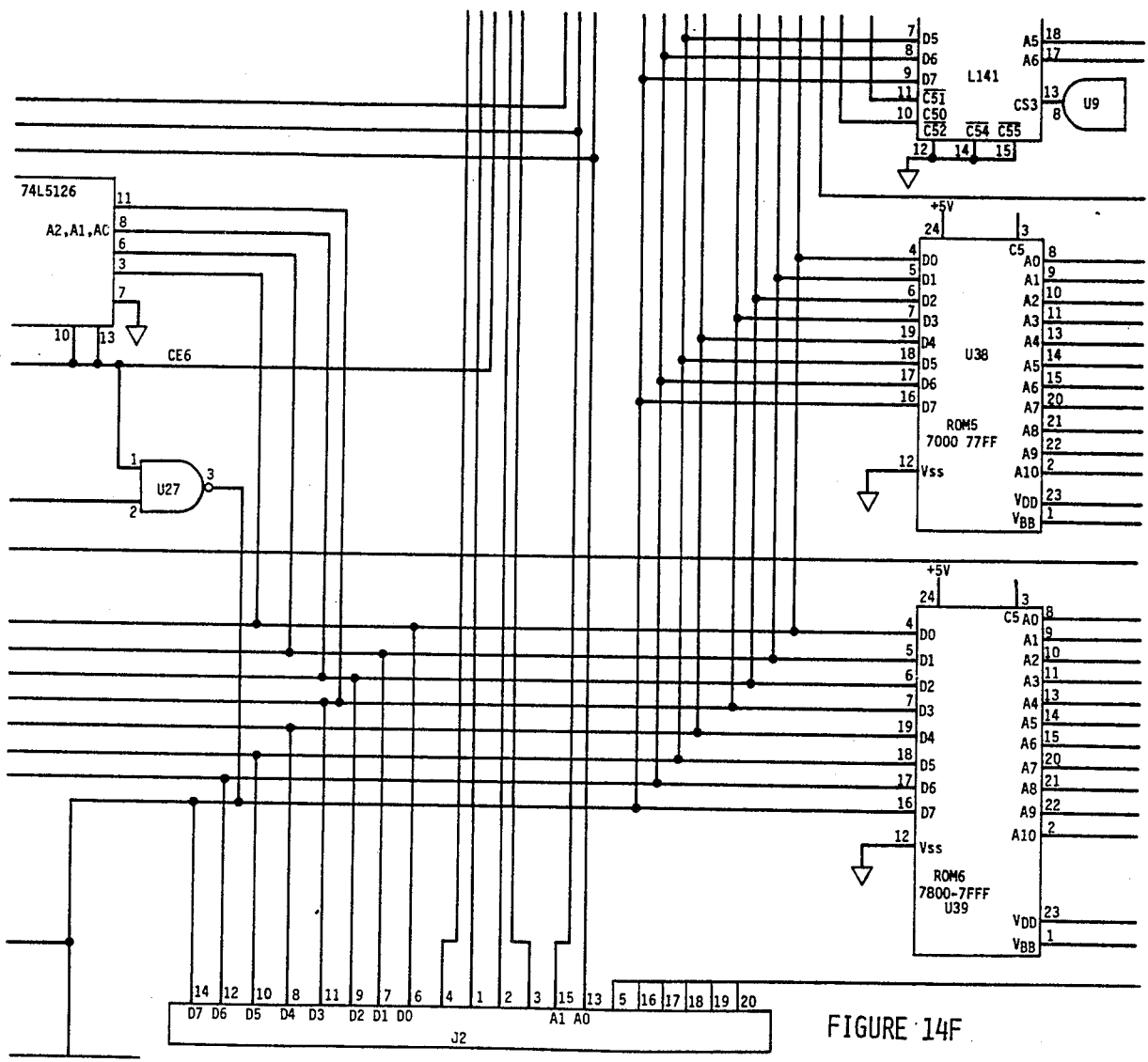
Figure 14G:
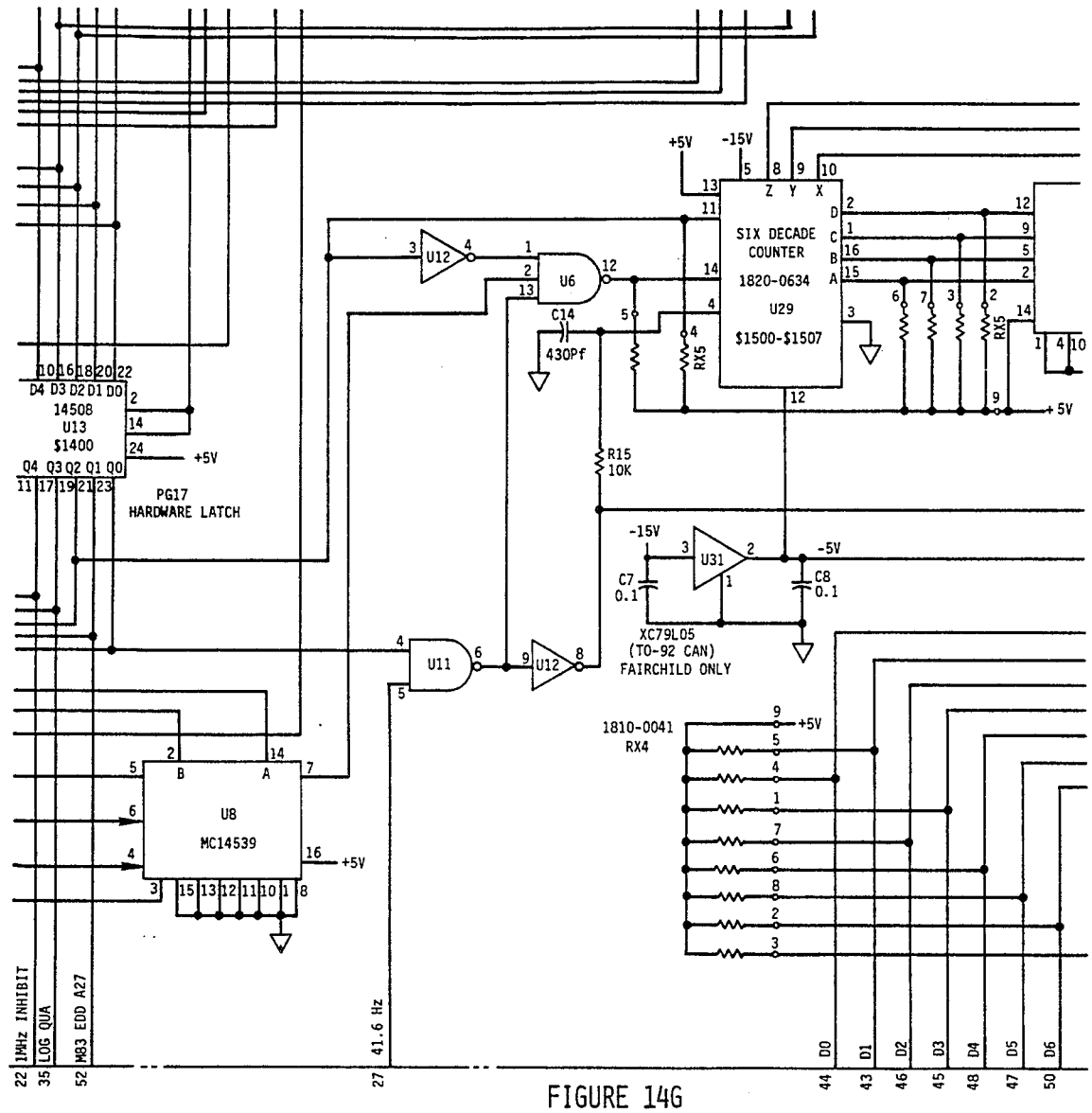
Figure 14H:
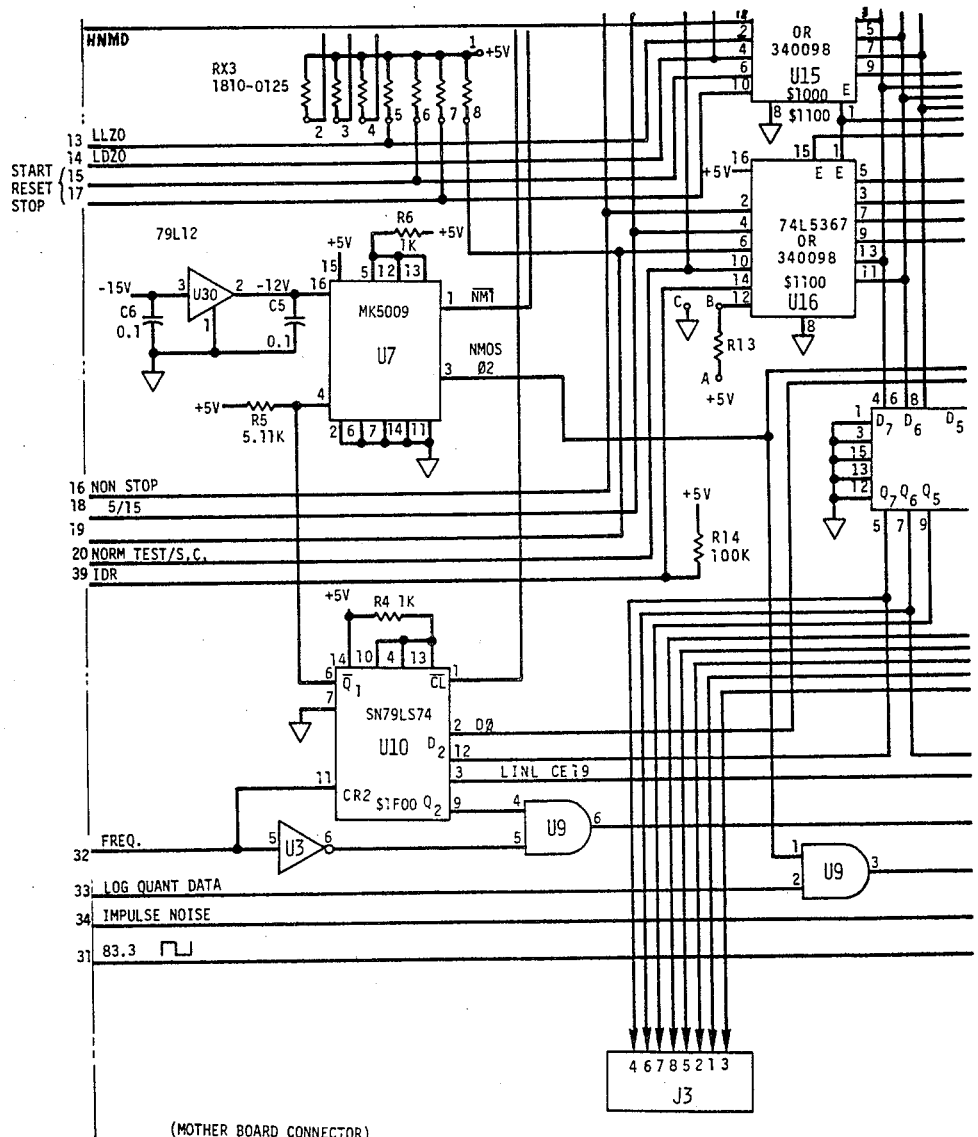
Figure 15:
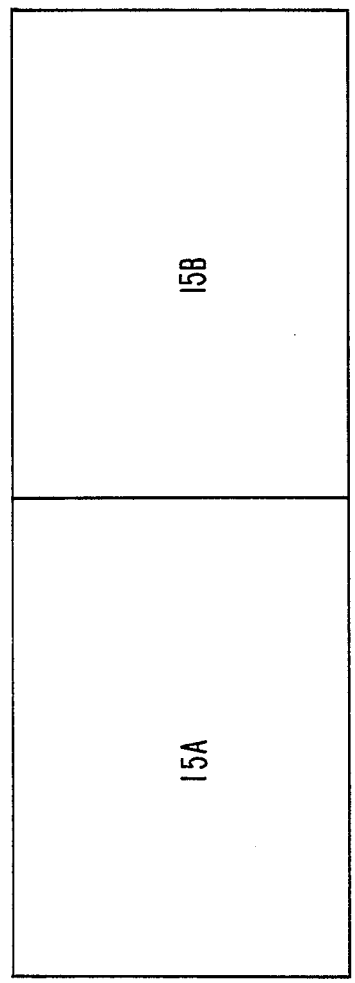
Figure 15A:
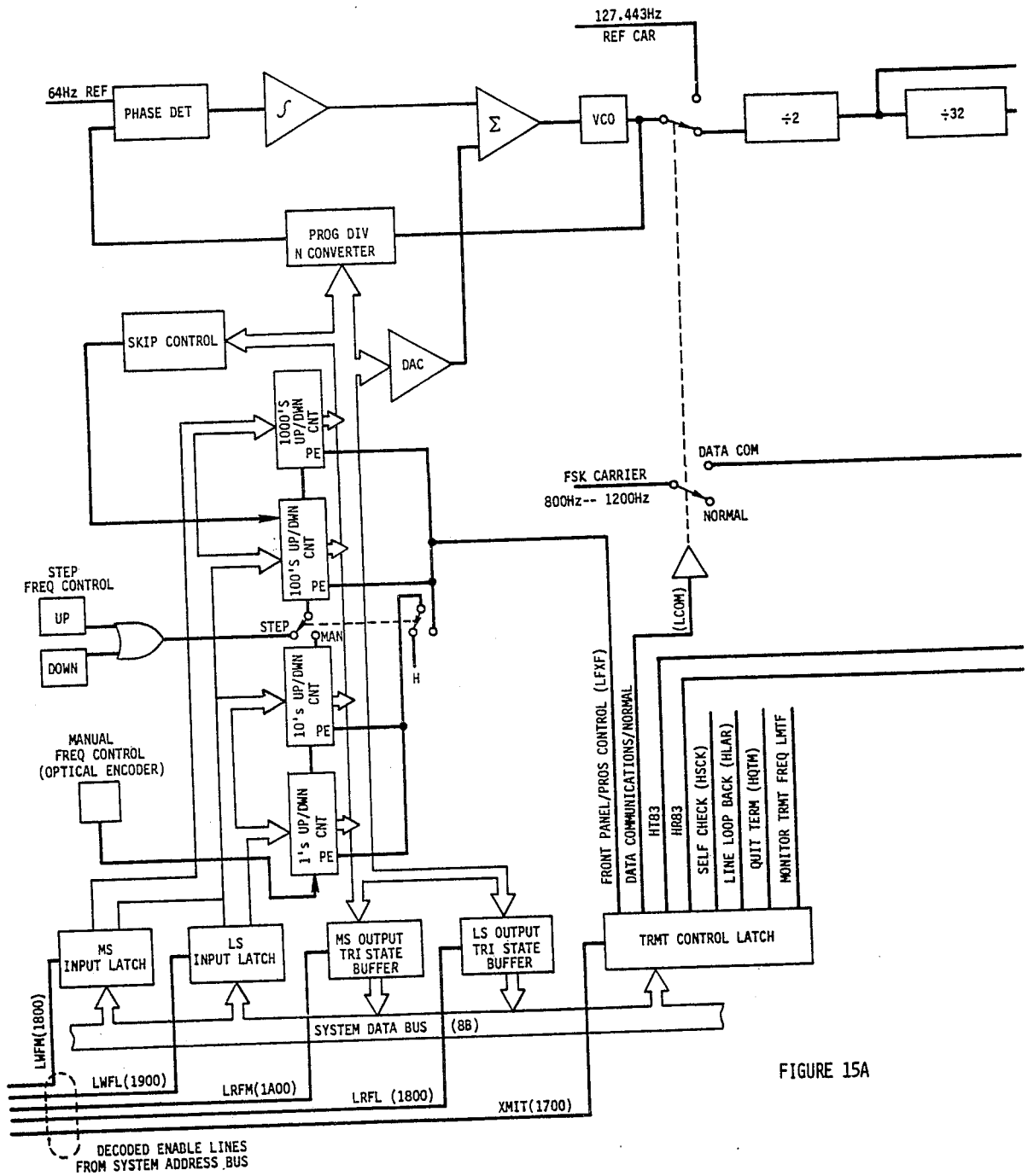
Figure 15B:
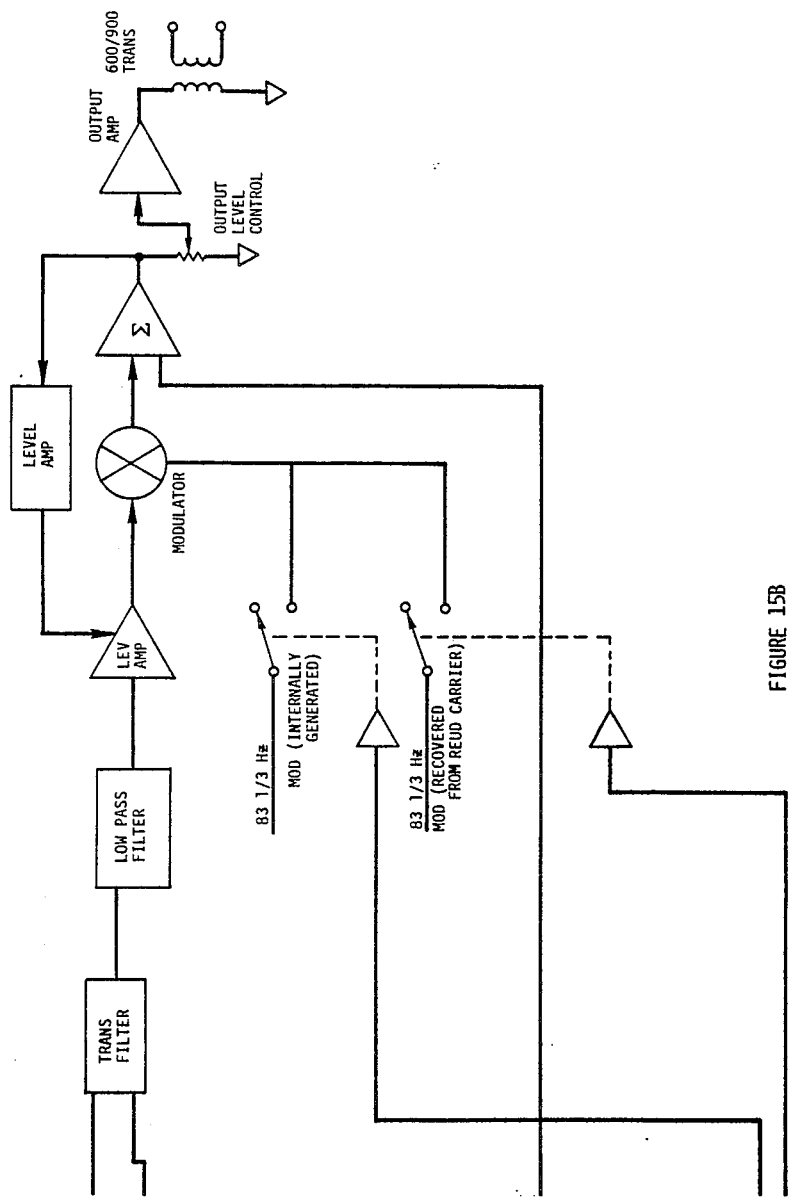
Figure 16:
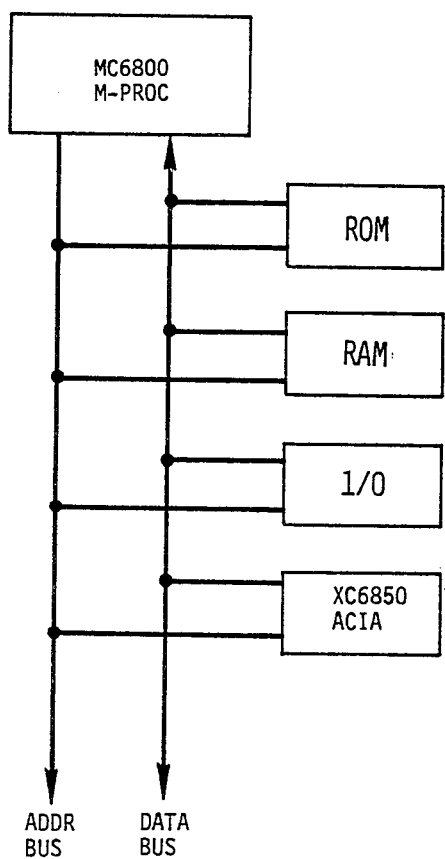
FIG. 16 is a block diagram illustrating how the ACIA is connected to the microprocessor system.
Figure 17:
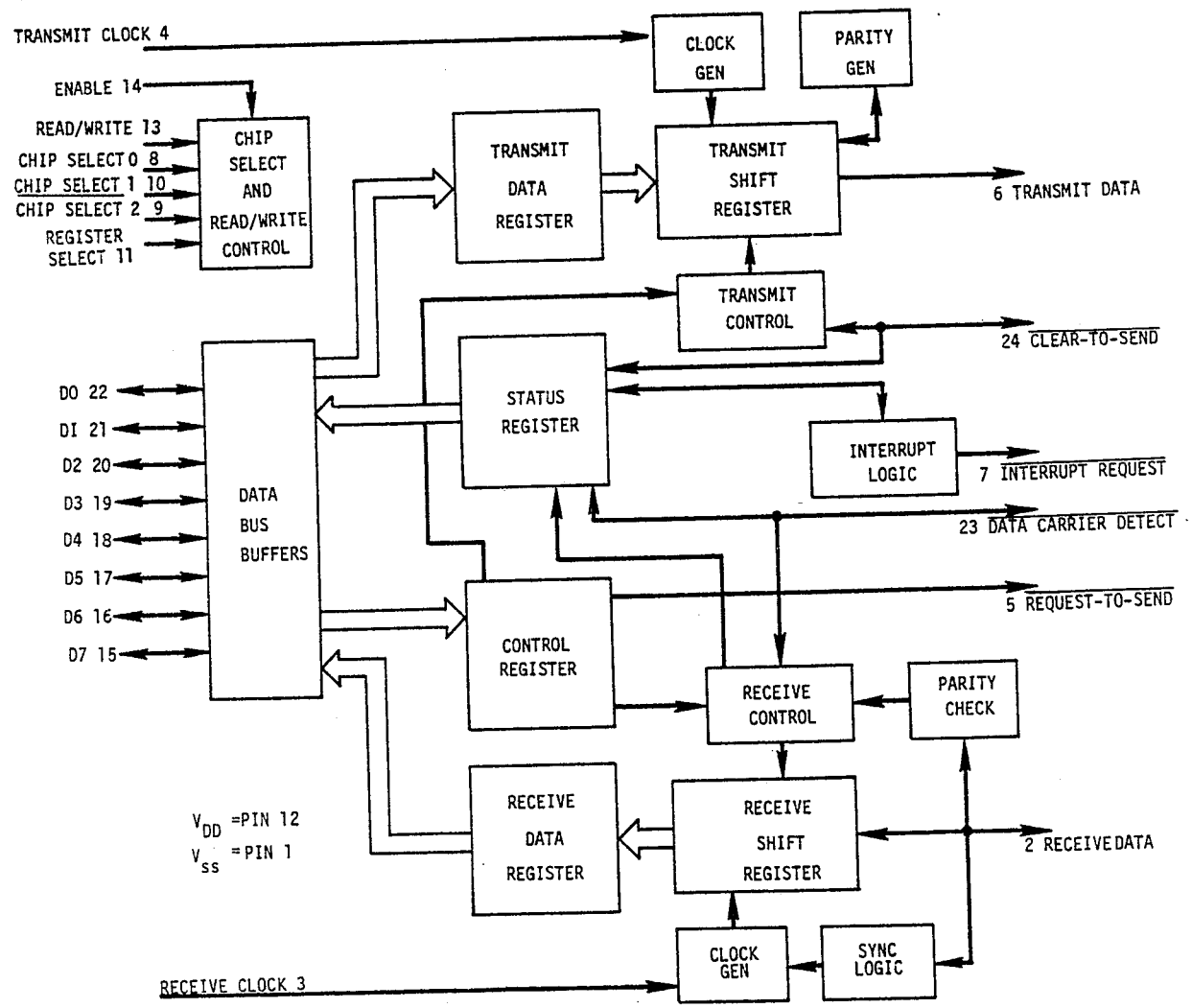
FIG. 17 is an expanded block diagram of FIG. 16.

Referring to FIGS. 9–11, the front panel of the preferred embodiment is read periodically by the executive routine. When measurement switch 64 shown in FIG. 4 is set to EDD the executive routine reads the "Normal 48, Master, Slave 92"; "NORM, REPEAT 94"; "TRMT, RCV 60"; and "LEVEL, DELAY 62" switches and determines from that these how the transmitter has to be set up and which annuciators shall be lit up. It does most of the so-called "housekeeping" tasks. Once this is completed the executive routine hands control to the "Envelope Delay Routine". This routine checks the contents of a buffer called "F PANEL" at address $1000 to ascertain whether the set is a Slave. If it is a Slave it programs the "Hardware Control Latch" to switch U10 so that EDD board A14 receives its signal from the Modem Board. Then the EDD Routine goes through an autorange cycle. Should the input signal be below $-40$dBm or above $+10$dBm the displays will be blanked and a "$-$" sign displayed. In the case where a proper signal level is received the EDD routine synchronizes itself with the 83.3Hz modulation. This is described under "HOW DOES THE PROGRAM MEASURE THE EDD PHASE DIFFERENCE". Once sync has been established the "Hardware Control Latch" at address $1400 is programmed to route the signal from the main phase via the detector to the multiplexer U8 (on Board A15) to the input of the 6 decode counter (U29). The counter is reset and enabled for a period of 12000$\mu$s. At the end of the 12000 $\mu$s - this is the period of the 83⅓Hz modulation - the number of 1MHz transition is latched in the counter and readout and stored in RAM (Random Access Memory).

The next step is to check if the delay zero switch 68 is active or not. If it is active, the routine jumps to a subroutine called Delzer (at $7199 of software listing). This subroutine determines whether the phase difference is greater or smaller than 3000$\mu$s and calculates by how many microseconds the reference 83⅓ has to be delayed so that the resulting phase difference is 3000μs. The delay is accomplished by inhibiting the 1MHz φ2 signal on U21C - input to the divide by 12000. This enable pulse is generated by the software with the "Hardware Control Latch". From this subroutine operation returns to the main EDD Routine. Next operation is the frequency measurement. This is described in detail in the "Level/Frequency" Measurement. The execution time of the EDD routine is normally about 70ms. At the end of the EDD routine, control is handed back to the executive routine which checks the front panel to find out whether it has been altered.

From the executive routine operation returns to the EDD routine. The EDD routine executes the steps outlined above.

HOW DOES THE PROGRAM MEASURE THE EDD PHASE DIFFERENCE?

Referring to FIG. 10, the output of the phase detector (U23A, U22A,B,C on the EDD Board) is a squarewave with a repetition rate of 83⅓Hz. The pulse width is directly proportional to the phase difference - and can have any duration from 1 – 12000μs. This signal is logically added with the 1mHz φ2 clock signal and applied to the input of the 6 decade counter. The phase measurement is done by counting the number of 1mHz transition of that signal. Frequency and the EDD phase measurement are similar. In the frequency measurement the routine generates a 32 ms gating pulse which enables the frequency signal to be connected to the counter. Since the frequency signal is a continuous signal it does not matter when this 32 ms gating pulse is generated. Envelope delay is different in that respect. The phase detector signal (PIN 1 of U23A) is analogous to the gating signal in the frequency measurement. It should be noted that this "gating" signal in the EDD measurement is not generated by the software and, therefore, its timing relationship is completely arbitrary. This makes it necessary to develop a special routine plus hardware to synchronize this "gating" signal to the software. The synchronization is established in the following way:

Whenever the routine executes a LDAA $1507 an enable pulse is generated which enables the memory location to be read, in our case it is 1507. 1507 is the address of that memory location - it really is a tri-state address of the 6 decade counter. This enable pulse is "nanded" with the 83⅓/2Hz waveform. The logical NAND of those two waveforms controls Data Bus bit 7. So when LDAA $1507 is executed a word whose bit 7 is controlled by the polarity and repetition rate is loaded into the accumulator. Data bits 6-0 are always high.

Referring to FIG. 9 there is shown a flow chart of the section of the program which is relevant for the synchronization and reading of the 6 decade counter. First it checks whether bit 7 is low or high. If the enable pulse of this LDAA $1507 command occurs during time period 1 data bus bit 7, is high and the program stays in a loop until 831⅓/2 goes positive. Referring to FIG. 10, the program continues and resets the 6 decade counter. Referring to illustrated time slot 2 LDAA $1507 is used and this time whether data bit 7 is low is checked. The processor will execute those instructions as many times as necessary until 83-1/3/2 goes low as shown in time slot 3. It is during this time that the 6 decade counter will actually count the number of φ2 pulses (1mHz), which is a measure of the phase difference. Now the program will wait another 12 msec. before is used, i.e. reading the 6 decade counter. Again, we use the same technique LDAA $1507 and check whether Bit 7 is high. The processor will execute those instructions over and over until time slot 4. Now read the counter is read. The number read from the counter corresponds to the absolute phase difference in microseconds. If "delay zero" switch 13 is pressed down, the routine establishes a 3000μsec. phase difference. This phase difference in microseconds is then subtracted from the number read from the 6 decade counter and displayed in the left display.

DISPLAY THEORY OF OPERATION

The preferred embodiment uses 2, 4 digit displays to output test results. The displays use 7-segment Red LED's. Along with these numerical displays are 10 annunciators which indicate the units of measure. The annunciators also preferably use LED's for lighting.

A counter selects a proper digit which will be turned on, and selects the proper word from a 4 × 4 RAM addressed. 00 is the most significant digit and 11 is the least significant (far right) digit. The input to each of the two RAMS is connected to the system data bus, and they have address 1D00 & C00.

The data comes from the processor in BCD (Binary Coded Decimal) form, in four consecutive bytes.

The processor controls the display annunciators by loading CMOS latches. The addresses for these latches are 1200 and 1300 Hex.

MODEM BOARD

THEORY OF OPERATION

Referring to FIGS. 20 and 21, the modem board (A8) enables two units to communicate in the master slave mode. This board represents the analog world of the telephone system.

The heart of the modem for the preferred embodiment is the ACIA-XC6850. This device interfaces to the MPU. It takes parallel information from the microprocessor and converts it to a serial bit stream with a few extra bits added. One serial word has eleven bits, eight data, one start, one parity and one stop.

This is the information which is transmitted in an analog manner between instruments. In the reverse direction, the ACIA will take serial information, strip off the start, stop and parity bits and convert it to an eight bit parallel word for the microprocessor. In performing this task it also checks to see that the proper start and stop bits are there, and checks for the proper parity. If either of these are missing an internal error flag is set and then fed to the microprocessor.

Looking now at the analog portions of the modem, we first have the transmitter. The input to transmitter is the serial bit stream from the ACIA. The method used here is FSK (Frequency shift keying) wherein two frequencies are set; one representing a high, and one representing a low. In our case 800 HZ represents a zero, and 1200 HZ represents a one.

In the preferred embodiment this switching is done primarily by two IC's, U9 and U10. U9 is a solid state switch and U10 is an oscillator. The data stream is fed to the control line of U9. Switch U9, selects one of two timing resisters for oscillator U10. The output of the oscillator is filtered with a 1000 HZ low-pass, and then fed to A9 transmitter. The oscillator is turned off via Q3, when the modem is not needed. This reduces the system noise by several db. A 1990 HZ tone is added to the FSK signal and used to carry the 83⅓ HZ reference in envelope delay distortion. It also serves a secondary purpose in the receiver.

The receiver portion of the modem decodes this string of frequency shifts and converts them to digital one's and zero's. Since the receiver is a frequency detector, theoretically it should be insensitive to level. However there is an ALC loop at the input, (U13, U14 and Q1) for making other signal measurements which are sensitive to level, i.e., data carrier detect. In order for the modem to recognize a valid word, two qualifiers must be satisfied:

1. data is being sent,
2. 1990 carrier is present.

Two sets of filters, one at 1KHZ and the other at 1990 HZ, divide the input signal into two paths. (Remember, the transmitter signal is always the combination of FSK and 1990 HZ). After the signal is passed through the 1990 HZ filter, (U15 and U16) it is full wave rectified and integrated (U3). This output is compared against a reference where it has two choices (U2B):

1. $V_{out}$ is greater than $V_{ref-high}$ output to gate U26B,
2. $V_{out}$ is less than $V_{ref-low}$ output to gate U26B.

The circuit checks for energy around 1990HZ of the frequency spectrum. If there is, then one of the conditions is fulfilled for valid data transmission. If there is inadequate energy here, then the modem is disabled, and ignores any data it may see.

The other path, for the FSK processing, flows first to a 1KHZ filter which removes the 1990HZ (U11 and U12). At this point two processes are performed on the signal.

(1) The signal is full wave rectified and integrated at U1 and compared to a reference at U2A. This output is then connected to the input of gate 26B. If there is data being transmitted this line is high, and if no data is transmitted then the line is low. This satisfies the condition for valid data.

(2) The signal is limited and converted to a zero to +15V square wave (U17 and Q2) and then fed to a one shot of 670 msec. (U18). As the frequency changes the duty cycle of the one shot output changes. This is averaged (U27, low pass filtered) and fed to a comparator (U19). For a high frequency (1200HZ) there is a high duty cycle, and thus a high output from the comparator. If 800HZ is seen, then the duty cycle is low, and the comparator output is low. This circuitry converts the FSK back to one's and zero's. These one's and zero's are then read by the microprocessor via the ACIA.

One set of filters exist which are not normally for data transmission, the 1990HZ bandpass filters (U5, U4, U6, U7, U11). The input is connected to the output of the auto range, and the filters have a gain of unity. In envelope delay distortion, slave to master, it is necessary to send two pieces of information to the slave:

1. frequency data,
2. 83⅓ HZ reference.

This filter strips the data from the 1990 HZ and 83⅓ AM and sends the clean carrier to the envelope delay board. The requirements for this filter are that it remain stable in phase and gain with changes in temperature. For this reason, silvermica capacitors and wire wound resisters are used.

A central phase locked loop (U20, U22, U23, U25) provides a common source for all frequencies used of the modem. The PLL multiplies a 333.334 HZ clock signal of 382 to get 127.334 KHZ. This goes directly to A9 (filter modulator) where it is divided by 64 and filtered yielding a 1990HZ sine wave. Within the modem, it goes to U21 and U25 which divides it by 22 to get a 5787.8HZ signal which is the ACIA receiver and transmitter clock.

This completes the loop, the modem can transmit digital information by use of FSK, and can decode this analog signal back to digital. The modem provides the means by which two preferred embodiment can operate in the master slave mode.

TRANSMITTER BOARD A13

THEORY OF OPERATION

Referring to FIGS. 25A-D, the transmitter/board output is a squarewave 64 times the transmitter output frequency. This is generated by a phase lock loop which selectively locks on a harmonic at a multiple of 200 to 3950 times a 64Hz reference frequency. Which harmonic is determined by a 4 decade ÷N counter, controlled by the 14 bit output bus shown in the block diagram.

In order to speed up the response time to a change in frequency, the UCD is pretuned to close to the right frequency by a DAC operating off the output bus. Sync control is provided so that the programmable divider and phase lock loop do not respond in the middle of a reference cycle. In this fashion the loop never really loses lock as the frequency is changed. The loop only responds to small phase errors caused by inaccuracies in the DAC and VCO voltage vs. frequency characteristic.

ROM

A ROM is provided, driven by a Step/Manual line, an up-down line and the most significant output bus lines. The ROM senses the frequency with 50Hz resolution. The purpose of the ROM is to provide various control functions dependent on a particular operating frequency.

The ROM is divided into two major pages - STEP and MANUAL. Each of these pages is divided into two sections. Count UP and Count DOWN. Half of the Step page is not used, since normally the units and 10's digits are loaded with an 04. The following is a description of each of the ROM output lines, describing each function.

Pulse is generated so the UP down counters will read the input Bus controlled by the data bus input latches. This state also disables the phase lock loop and presets the program divider to start counting on the leading edge of the next reference clock cycle. The 2μsec. load pulse also resets the flag so that the transmitter board will service any new data update which may occur in the transmitter blind period occurring during states 01 and 10. Do (Least significant output bit) is used to control the end of range. 204Hz to 390Hz in Step, 200Hz to 3950Hz in Manual. A high stops counting in Step. Since this output passes through an inverting gate (U6) in manual the output goes low to stop counting.

01 (Out of range) — causes the synchronous control latch to toggle and thus force the 100's counter to step into range in the event it is out of state during power supply turn on.

02 (Skip) — Goes high from 2450Hz to 2750Hz in manual (2504Hz, 2604Hz, 2704Hz in step).

03 Low pass filter control goes low 900Hz to 4000Hz.

04 Phase detector gain constant control goes high from 550Hz to 4000Hz.

05 Phase detector gain constant control goes high from 1450 to 4000Hz.

06 UP/Down Line - follows input up down line except in out of range or forbidden states, in which case it is always high.

The 14 line output bus, and the eventual transmitter output frequency, is controlled by four up/down counters. Three modes of operation control these counters (1) Step 100Hz mode. In this mode the two most significant counters are stepped serially from the front panel, while the two least significant remain fixed at a state that is pre-programmed into the input bus via the input latches.

(2) Manual Mode — In this mode the least significant counter is stepped by pulses generated by the optical encoder, which is the manual frequency control. The optical encoder consists of two tracks of alternating transparent and dark areas such that 120 pulses are generated as the control is rotated 260°. The two tracks are 90° out of phase with each other, thus providing direction of rotation information. In the manual mode the transmitter is actually stepped in 1Hz increments.

Here loading the units counter is not synchronized. To do so allows the frequency to be changed only 32Hz in one second, which is too slow. Fortunately the phase correction required by running the units counter asynchronous is small enough that no serious slew problems are presented.

Freq. Skip is provided in Step and Manual Modes in a similar fashion. A high from the ROM combined with a high from the front panel Single Frequency Skip switch enables the output compliment from the Synchronous Control FF to be fed back to the D input. This causes this Flop to change state every clock cycle (clock cycle is 64Hz). The counters are stepped 100Hz every other clock cycle, even in manual via the override provided by 4U11 nand gate to the 100Hz counter enable.

(3) Program Mode — Changing frequency in the program mode, as in the other two transmitter modes, must be done synchronously with the 64Hz clock frequency. In the program mode, the system microprocessor first loads the units and 10's information into the least significant latch via the LWFL command. Then the 100's and 1000's information is double loaded into the most significant latch via the LWFM command. The LWFM command is the trigger for the transmitter that the microprocessor has updated the input data and the frequency is to be changed. This is done by setting a flag U28 Pin 13. This forces the DATA BUS LOAD counter from state 11 to state 00, the counter will then count up from 00 to 11 on the next three clock cycles of the 64Hz reference. State 11 is defined as a rest state where further counting is inhibited. State 01 is the control state on whose leading edge a 2$\mu$sec. load pulse is generated so the UP down counters will read the input Bus controlled by the data bus input latches. This state also disables the phase lock loop and presets the program divider to start counting on the leading edge of the next reference clock cycle as explained in the other modes. The 2$\mu$sec. load pulse also resets the flag so that the transmitter board will service any new data update which may occur in the transmitter blind period occurring during states 01 and 10.

FREQUENCY TRACKING LOOP A19

The function of the frequency tracking in the preferred embodiment is to clean up a received signal in the presence of noise so that the frequency of the received signal can be reliably measured. Referring to the simplified block diagram shown in FIG. 33A, the frequency tracking loop includes phase locked loop and an automatic frequency control loop coupled to receive the applied signal 301 for producing a signal having the frequency of the applied signal 301. An auxiliary phase detector 302 is coupled to receive the applied signal 301 and the output frequency for producing a control signal 303 in response to the output frequency being within a predetermined phase range of the applied signal 301. Bandwidth control and AFC disable circuitry 304 are coupled to receive the control signal 303 and to the phase locked loop and the AFC loop for disabling the AFC loop and decreasing the phase locked loop bandwidth in response to receiving the control signal 303. A dropout detector 305 is coupled to receive the applied signal 301 and to the phase locked loop and the AFC loop for simultaneously decreasing loop gains in response to loss of the applied signal 301.

Referring to FIG. 33B, a detailed schematic diagram illustrating a preferred embodiment of the loop is shown.

The Frequency Tracking Loop cleans up the received signal so that the frequency can reliably be measured in the presence of noise. It multiplies the frequency by 32 times and thereby reduces by 32 the gaiting pulse for the frequency measurement. It acts as a signal detector in the impulse noise measurement. Whenever the 1kHz signal drops below 42dBm the Frequency Tracking Loop tells the Microprocessor. The phase locked loop, PLL hereafter, basically consists in the preferred embodiment of a phase detector, an active filter, a voltage controlled oscillator, a startup switch and a bandwith switch.

Referring to FIG. 33C, the basic loop shown works well for only a small range of input frequencies because the phase detector generates the same output voltage at the fundamental frequency and any harmonic frequency thereof. In spite of this shortcoming of the phase detector it was chosen because of its good performance in the presence of noise. To overcome the problem of locking to harmonics of the input frequency, the AFC circuit was added in a unique manner.

Referring to FIG. 33D, a Frequency Difference Detector 306 was added to the Phase Locked Loop to overcome erroneous locking. The Frequency Diff. Det. 306 responds to frequency only. Every time input frequency differs from the internally generated frequency an error voltage is generated. This voltage is summed in the integrator to the signal from the phase detector. A circuit called auxiliary Phase Lock Detector controls switch Q4. The signal from the Freq. Difference Detector is summed only if the Phase Locked Loop, PLL hereafter, is not locked. The weighting of the two summing resistors is such that the signal from the AFC overrides the PLL signal.

SIGNAL DROPOUT DETECTOR

The input signal to the PLL is taken off before the Autorange in the Impulse Noise measurement. It is amplified by U15 and filtered with a 1kHz bandpass U13A,B and applied to a voltage comparator. If the input signal to the preferred embodiment drops below $\simeq$ 42dBm, the comparator remains in a high or low state. When this occurs, the retriggerable one shot U11B changes its output states which are read by the MPU.

The same circuit is used when signal is lost in any other measurement mode, but for a different purpose. In this case the FET Q5 shorts the Integrator U4 feedback thereby forcing the VCO to put out a frequency of 600–900Hz. This is necessary because without signal this integrator could force the VCO outside its operating range and further lock up would not be possible. The VCO signal is also connected to a retriggerable one shot U11A which turns FET Q5 on or off. In the absence of the VCO signal FET Q5 is turned on.

THE FREQUENCY DIFFERENCE DETECTOR

The Frequency Difference Detector operates on the principle of comparing the outputs of two one shots in a Differential Amplifier. The pulse durations the two one shots are equal and independent of the input frequency. If fin = floc the two squarewaves on the output of the two one shots have equal DC voltages which, when compared in the Diff. Amp. result in a zero DC voltage at U7. The sense is such that if fin increases floc will follow.

Every time the PLL is unlocked the AFC is switched in. The PLL can thereby lock up without slipping cycles if the frequency error is smaller than the loop bandwidth. This results in a fairly constant loop lock-up time.

PHASE LOCK DETECTOR

An auxiliary phase detector (U3A) has the received signal applied as one input and a 90° phase shift version of the VCO as the other. The phase difference on the input of this phase detector is 180°. (The phase diff. on the main phase detector is 90°.) The output of the auxiliary phase detector is filtered and applied to a voltage comparator. The voltage comparator threshold is such that if the phase difference on the main phase detector is 90° ± 30° the comparator indicates that the PLL is locked. When the loop is unlocked the outputs of both phase detectors are beat notes. The auxiliary detector DC voltage is in that case approximately half of what it is when the loop is locked.

WIDE BANDWIDTH PLL

Whenever the loop is unlocked Q4 is turned on and sums Freq. Diff. Error Signal and switches R39 in parallel to R38. This results in a wide band PLL resulting in rapid acquisition so that the loop locks quickly.

TRANSMITTER/MICROPROCESSOR INTERFACE

Referring to FIG. 37, the transmitter system mainly consists of:
1. A Phase Lock Loop which is controlled by a programmable divide by N counter. The eventual output frequency is controlled by this counter.
2. A front panel interfaces to the Programmable divide by N so that the divide ratio can be changed by single unit and 100 unit increments.
3. A data bus interfaces to the programmable counter, so the system microprocessor can control the Programmable divide by N counter in single unit increments.
4. A front panel interfaces to the data bus so the system microprocessor can remotely control a slave unit while the system is operating as a master.
5. Skip control forces the transmitter out of the range from 2450Hz to 2750Hz when the transmitter is under front panel control and the SF skip switch is on.
6. A divide by M counter and transversal filter to convert the XM square wave of the VCO to a stepped sinewave of the divided output frequency. By choosing M equal to the incoming reference frequency of the phase lock loop, the transmitter can be stepped in 1Hz increments for unit incremental changes in the programmable divide by M counter. In this system the reference frequency was chosen as 64Hz.
7. A low pass filter to convert the stepped sign wave into a true sign wave.
8. Level Amplifier provides a leveled transmitter output over the frequency range.
9. A modulator to allow the carrier to be modulated in Envelope Delay measurements.
10. A level control, output amplifier, and output transformers to provide a balanced 600 or 900 ohm output at various transmitted output levels.
11. Switching, which allows the transmitter to be converted over to a data communications mode by transmitting a modulated 1.00kHz tone summed with a 900Hz–1200Hz FSK signal. This is used when the unit is transmitting data to a companion Master/Slave unit. The modulated 1.99kHz carrier allows the units to maintain phase reference in ED, while at the same time transmitting data.
12. TRMT control latch allows the microprocessor to control the transmitter operating mode.

In order to speed up the response time to a change in frequency, the VCO is pretuned to close to the right frequency by a DAC operating off the output bus. The output bus is a 14 line bus from the 4 decade up/down counters to the input of the Prog. Divide by N counter. Sync control is provided so that the programmable divider and phase lock loop do not respond in the middle of a reference cycle. In this fashion the loop never really loses lock as the frequency is changed. The loop only responds to small phase errors caused by inaccuracies in the DAC and VCO voltage vs. frequency characteristic.

The programmable divide by N counter and the eventual transmitter output frequency is controlled by four up/down counters. Three modes of operation control these counters:
1. Step 100Hz Mode. In this mode the two most significant counters are stepped serially from the front panel, while the two least significant remain fixed at a state that is pre-programmed into the input latches. A vixes 4Hz offset in the step 100Hz mode is thus easily provided.

An R.S. Flip Flop together with a D F.F. provide sync control, and at the same time provide debounce for the front panel STEP UP/STEP DOWN momentary switches. A leading edge from either the STEP UP or STEP DOWN switch sets the R.S.F.F. which in turn makes the D input of the D F.F. high. The leading edge of the incoming reference signal, applied to the clock input of the D F.F. thus forces its output high. This sync output is used to step the 100's UP/DOWN counter, thus causing a 100's increment, disable the phase detector, internally load the input data in the divide by N counter, and reset the R.S.F.F. for the duration for which it is high. Thus the VCO is pretuned to the updated frequency at the exact instant that the programmable divide by N counter starts its count down. Since the phase detector looks at the output edge of the divide by N, it is disabled for one reference cycle so as not to output erroneous phase information as the programmable divide by N counter is being reset.

It is this method of synchronous load that prevents the phase lock loop from losing lock as the frequency is changed, but only corrects for the small phase error caused by inaccuracies in the DAC and VCO voltage vs. freqency characteristic.

The afore mentioned sync control provides a convenient method of implementing the S.F. skip requirement. The design of the instrument is such that whenever SF SKIP, a front panel control switch, is on the instrument will not be allowed to transmit frequencies from 2450Hz to 2750Hz. A ROM addressed from the most significant lines from the output bus (the ROM is also used to provide other control functions) detects if the control counters are in the SF Skip range. This is used to enable the EFF to toggle every reference cycle, and thus step the control counters out of the SF Skip range.

Manual Mode: Refer to Manual Mode, A13 Theory of Operation

Program Mode: Refer to Program Mode, A13 Theory of Operation

OPERATION OF THE TRANSMITTER UNDER THE VARIOUS CONTROL MODES NORMAL MODE: In this operating mode the transmitter is operating under front panel control in Level Frequency and Ed. In all other measurements except Line Loop Back the transmitter is programmed to a fixed freq. (1004Hz). In line loop back the transmitter section is not used except for the output level control, output amplifier, and output transformer.

The Manual/STEP 100Hz switch, the frequency control, the Up and Down Momentary switches, and the SF Skip switch control the transmitter output frequency under front panel control.

When the Manual/Step 100Hz switch is in Step 100Hz, the frequency is stepped in 100Hz increments using the UP and DWN momentary switches.

In this mode the 100's UP/DWN counter is incremented either up or down by the respective momentary. The microprocessor has no control over the transmit frequency other than programming it into front panel control via the TRMT CONTROL latch and pre-programming the 04Hz offset into the least significant input latch.

When in manual, the 1's and 10's counters are in a serial rather than parallel load mode. Refer to Manual Mode operation in the A13 Theory of Operation for a more complete description.

In fixed freqency the microprocessor informs the transmitter of this operation via the TRMT control latch, and loads a 10 in the most significant input latch, and an 04 in the least significant input latch.

The transmitter knows that data has been updated by sensing the most significant input latch enable. Refer to Program Mode operation in the A13 Theory of Operation for a more complete description. MASTER MODE: Transmitter operations in this mode depend on which line is under test (Master to Slave or Slave to Master switch).

When in Master to Slave, the microprocessor initially instructs the transmitter to go to its data communications mode via the TRMT control latch. After the Master has linked with the Slave unit and passed data to properly instruct the Slave unit, the microprocessor instructs the transmitter to operate the same as in the Normal Mode.

When in Slave to Master, the microprocessor keeps the transmitter in a continuous data communications mode. Under this condition the Master's front panel control settings must be continuously sent to the Slave to control the Slave's transmitter. Thus when the Master's Measurement switch is in the noise measurements the Slave is instructed to transmit back a fixed frequency.

When the Master's measurement switch is in Level Frequency or ED the Slave is instructed to send back the proper frequency dependent on the Master settings. This is done by instructing the Master Transmitter that it is under front panel control in addition to being in the data communications mode. Thus, the phase lock loop (frequency synthesizer) while being disconnected from the transmitter output, operates the same as in the normal mode. The state of the transmit control counters is read by the microprocessor via two tri-state octal buffers.

SLAVE MODE OPERATION of the transmitter under Slave mode is covered as the companion unit in the description of Master operation hereinbefore. Its operation depends on the setting of the Master's Master to Slave/Slave to Master switch. When in Master to Slave, the Slave transmitter is continuously in the data communications mode, sending back the Slave's receiver data. When in Slave to Master the transmitter is under program control after linking. For more detailed information of the transmitter operation refer to Program Mode Operation in the A13 Theory of Operation.

ACIA-MICROPROCESSOR INTERFACE

Referring to FIG. 37, there is shown in a simple and literal fashion where the ACIA is connected to the microprocessor system. It basically needs the address and data bus. How the ACIA communicates via these buses to the microprocessor, and how this information is passed to and taken from the modem will now be discussed.

To the microprocessor the ACIA appears as two addressable memory locations. However, internally there are four registers: two read only and two write only. The read only consists of the status register and the receive data register, while the write only consists of the control register and the transmit data register. Once the ACIA is enabled by one of the chip select lines (CS0, CS1, CS2) any one of the four registers can be selected through the register select and read/write lines.

The ACIA interfaces with the microprocessor through the use of several lines:
1. 8-bit bi-directional data bus
2. register select line
3. three chip select lines
4. read/write lines
5. enable line
6. interrupt request line

| Data Bus Line Number | Buffer Address | | | |
|---|---|---|---|---|
| | RS · R/W Transmit Data Register (Write Only) | RS · R/W Receive Data Register (Read Only) | RS · R/W Control Register (Write Only) | RS · R/W Status Register (Read Only) |
| 0 | Data Bit 0* | Data Bit 0 | Counter Divide | Receive Data Register |

-continued

| Data Bus Line Number | Buffer Address | | | |
|---|---|---|---|---|
| | RS · R/W Transmit Data Register (Write Only) | RS · R/W Receive Data Register (Read Only) | RS · R/W Control Register (Write Only) | RS · R/W Status Register (Read Only) |
| 1 | Data Bit 1 | Data Bit 1 | Select 1 (CRO) Counter Divide Select 2 (CR1) | Full (RDRF) Transmit Data Register Empty (TDRE) |
| 2 | Data Bit 2 | Data Bit 2 | Word Select 1 (CR2) | Data Carrier Detect (DCD) |
| 3 | Data Bit 3 | Data Bit 3 | Word Select 2 (CR3) | Clear to Send (CTS) |
| 4 | Data Bit 4 | Data Bit 4 | Word Select 3 (CR4) | Framing Error (FE) |
| 5 | Data Bit 5 | Data Bit 5 | Transmit Control 1 (CR5) | Receiver Overrun (OVRN) |
| 6 | Data Bit 6 | Data Bit 6 | Transmit Control 2 (CRG) | Parity Error (PE) |
| 7 | Data Bit 7*** | Data Bit 7** | Receive Interrupt Enable (CR7) | Interrupt Request (IRQ) |

The above table summarizes the contents of the four internal registers.

TRANSMIT DATA REGISTER

Data is written in the transmit data register during the negative transition of the enable (in our case, 02) when the ACIA has been addressed (2XXX HEX, X - dont't care), and RS and R/W is selected. Writing data into the transmit data register causes transmit data register empty bit in the status register to go low. Data can then be transmitted. The transfer of data causes the transmit data register empty (TDRE) bit to indicate empty.

RECEIVE DATA REGISTER

Data is automatically transferred into the empty receive data register from the receive shift register upon receiving a complete character. This causes the receive data register full bit (FDRF) in the status register to go high. If the ACIA is enabled and RS and R/W are high, the data may then be read, and transferred to the data bus. The non-destructive read cycle causes the RDRF bit to be cleared to empty although the data is retained. The status of RDRF indicates how current the data is. When RDRD is high, the transfer of new data from the receive shift register to the receive data register is prohibited.

CONTROL REGISTER

The ACIA control register consists of eight bits that are selected when RS and R/W are low. This register controls the function of the receiver, transmitter, interrupt enable, and the request-to-send modem control output.

| BIT DEFINITION | | |
|---|---|---|
| CR1 | CR0 | FUNCTION |
| 0 | 0 | 1 |
| 0 | 1 | 16 |
| 1 | 0 | 64 |
| 1 | 1 | Master Reset |

For the preferred embodiment CRO=0 and CR1=1 which selects "divided by 16". This divide ratio says that the baude rate (data rate) is 1/16 the clock frequency (5788/16 = 360 bits/sec). Master request is done once when first addressed to initialize the ACIA.

| CR4 | CR3 | CR2 | FUNCTION |
|---|---|---|---|
| 0 | 0 | 0 | 7 Bits = even Parity = 25B |
| 0 | 0 | 1 | 7 Bits = odd Parity = 25B |
| 0 | 1 | 0 | 7 Bits even Parity = 15B |
| 0 | 1 | 1 | 7 Bits odd Parity = 15B |
| 1 | 0 | 0 | 8 Bits = 2 stop Bits |
| 1 | 0 | 1 | 8 Bits = 1 stop Bit |
| 1 | 1 | 0 | 8 Bits = even Parity = 15B |
| 1 | 1 | 1 | 8 Bits = odd Parity = 15B |

Word length parity, and stop bit changes are not buffered and, therefore, become effective immediately.

| CR6 | CR5 | FUNCTION | |
|---|---|---|---|
| 0 | 0 | RTS - Low | Trans Int. Disabled |
| 0 | 1 | RTS - Low | Trans Int. Enabled |
| 1 | 0 | RTS - High | Trans Int. Disabled |
| 1 | 1 | RTS - Low | Trans a break level Trans Int. Disabled |

The interrupt is disabled for the transmitter, so CR6 and CR5 = 0. CR7 = 1--enable the receive interrupt. The preferred embodiment sets this bit high which causes an interrupt to the microprocessor when a word is received. By doing this the processor is free to perform other tasks until the next data word comes, at which time an interrupt is generated and the processor reads the receive data register and the status register.

STATUS REGISTER

The status register is selected when RS is low and R/W is high. Information stored in this register indicates the status of the transmit data register, the receive register and error logic (parity, framing, overrun) and modem inputs.

Bit 0 Receive data register full- indicates that data has been transferred to the receive data register.
1 Transmit data register empty- indicates that the transmit data register's contents have been transferred, and new data may be entered.
2 Data carrier detect (DCD) - ths bit indicaes the presence of a modem carrier, this bit going high causes and IRQ.
3 Clear-to-send- not used in our case for the 4942A.
4 Framing error- framing error indicates that the received character does not have the proper start and stop bits.

5 Receiver overrun- overrun is an error flag that indicates that one or more characters in the data stream were lost.
6 Parity error- the parity error indicates that the parity selected did not agree with the parity of the word received.
7 Interrupt request- indicates the condition of the IRQ line.

ADDR

2001 — transmit data register receiver data register
2000 — control register status register
Control register - Data 9D - HEX This breaks down to
(1) divided by 16 clock
(2) eight bits of data, odd parity-one stop bit
(3) RTS-low-transmitter interrupt disabled
(4) receive interrupt enabled Data is fed to the ACIA from the microprocessor at a rate slower than the maximum capability. The reasons for doing this is to ensure that extra stops are placed between each word. If this were not done, it would be possible for the ACIA to get out of sync and valid data would not be received. With the extra stop bits, if the ACIA misses the proper start bit, it will find a stop and be ready for the next word.

The receiver register is read by the processor when the register becomes filled. The IRQ lines inform the processor that the receiver data register has become filled. It is important that this data be read immediately to avoid data being lost to an overrun.

MNEMONIC TABLE

| MNEMONIC | FUNCTION |
|---|---|
| ACD | Accept Data |
| ACH | Acceptor Hand Shake |
| ALC | Automatic Level Control |
| ALT | Segment A, Left Display |
| AN2 thru AN9 | Display Anodes |
| ART | Segment A, Right Display |
| ATN | Attention |
| A/R | Autorange |
| A = B | HP-IB Address Present |
| BAC | Byte ACCEPTED |
| BAV | Bus Available |
| BKL | Break Loop |
| BLT | Segment B, Left Display |
| BPF | Band Pass Filter |
| BRG | Bridged |
| BRT | Segment B, Right Display |
| CE1 | Chip Enable 1 |
| CE2 | Chip Enable 2 |
| CE3 | Chip Enable 3 (See WA2) |
| CE4 | Chip Enable 4 (see WA1) |
| CE5 | Chip Enable 5 |
| CE6 | Chip Enable 6 |
| CE7 | Chip Enable 7 (See RCL) |
| CE8 | Chip Enable 8 (See TCL) |
| CE9 | Chip Enable 9 (See WFM) |
| CE10 | Chip Enable 10 (See WFL) |
| CE11 | Chip Enable 11 (See RFM) |
| CE12 | Chip Enable 12 (See RFL) |
| CE13 | Chip Enable 13 (See WRD) |
| CE14 | Chip Enable 14 (See WLD) |
| CE15 | Chip Enable 15 (See MOM) |
| CE16 | Chip Enable 16 (See HPB) |
| CE17 | Chip Enable 17 |
| CLT | Segment C, Left Display |
| CMS | C-Message Noise |
| CRT | Segment C, Right Display |
| CTR | Counter Enable |
| CTS | Counts Annunciator |
| DAC | Data Accepted |
| DAV | Data Valid |
| DBA | Data Byte Accepted |
| DBM | DBM Annunciator |
| DBC | DBRNC Annunciator |
| DBV | Data Byte Valid |
| DBX | DB Annunciator |
| DCD | Data Carrier Detect |
| DCL | Device Clear |
| DI01 thru DI08 | Data Input/Output Lines |

-continued

MNEMONIC TABLE

| MNEMONIC | FUNCTION |
|---|---|
| | On HP-IB Bus |
| DLT | Segment D, Left Display |
| DPL | Decimal Point, Left Display, Least Significant Digit |
| DRT | Segment D, Right Display |
| DRV | Drive |
| DSL | Display Level |
| DZO | Delay Zero |
| D/T | Dial/Talk |
| D0 thru D7 | Data Bus Bits |
| EDD | Envelope Delay Distortion |
| EDP | ED Carrier Present |
| ELT | Segment E, Left Display |
| ENW | Enable Weighting Filters |
| EOI | End or Identify |
| EOR | End of Range (TRMT Freq.) |
| ERT | Segment E, Right Display |
| FLA | Flat Input (no notch) |
| FLT | Segment F, Left Display |
| FPD | Front Panel Disable |
| FP1 | Front Panel Enable #1 |
| FP2 | Front Panel Enable #2 |
| FP3 | Front Panel Enable #3 |
| FP4 | Front Panel Enable #4 |
| FRT | Segment F, Right Display |
| FSK | Frequency Shift Keying |
| FSP | FSK Present |
| FST | FSK Transmit |
| FWA | Full Wave Average |
| FXF | Fixed Frequency |
| GET | Group Execute Trigger |
| GLT | Segment G, Left Display |
| GRT | Segment G, Right Display |
| GTL | Go to Local |
| HLD | Hold |
| HLT | Halt |
| HPB | HP-IB Enable (CE16) |
| HPF | High Pass Filter |
| IDR | Impulse Noise Sig Dropout |
| IFC | Interface Clear |
| ILO | Impulse Noise Loop |
| IMN | Impulse Noise |
| IND | Impulse Noise Data |
| INL | Impulse Noise Latch (CE19) |
| INP | In Process |
| IRQ | Interrupt Request |
| I1M | Inhibit 1 MHz |
| JSC | Phase Jitter Self Check |
| LAD | Listener Addressed |
| LAR | Loop Around |
| LIS | Listener Block Address |
| LLB | Line Loop Back |
| LLS | Load Least Significant Bits |
| LMS | Load Most Significant Bits |
| LPF | Low Pass Filter |
| LZO | Level Zero |
| L/F | Level & Frequency |
| MAN | Manual Frequency |
| MBR | Minus Bar |
| MLA | My Listen Address |
| MOM | Modem Enable (CE15) |
| MRS | Master Reset |
| MSC | Microseconds Annunciator |
| MTA | My Talk Address |
| MTF | Monitor Transmit Frequency |
| MTL | Monitor Transmit Level |
| MTS | Master-to-Slave |
| M83 | 83-⅓ Hz from Modem |
| NCH | Notch |
| NMD | Normal (Delay Switch) |
| NMI | Non-Maskable Interrupt |
| NMR | Normal (Remote Switch) |
| NSP | Non-Stop |
| NWT | Noise-with-Tone |
| OOR | Out of Range |
| OTA | Other Talk Address |
| OVF | Overflow |
| OVR | Override |
| PBR | Plus Bar |
| PCD | Phase Correction Disable |
| PEN | Polarity Enable |
| PLD | Parallel Load Frequency Counters |
| PSE | Polarity Select |
| QRM | Quasi RMS Detector |
| QTM | Quiet Termination |
| QTZ | Quantize |
| RCL | Receive Latch (CE7) |
| RCV | Receive |
| REM | Remote |
| REN | Remote Enable |
| RES | Reset/Start |

-continued
MNEMONIC TABLE

| MNEMONIC | FUNCTION |
|---|---|
| REV | Reverse |
| RFD | Ready for Data |
| RFL | Read Frequency Least Significant Bits (CE12) |
| RFM | Read Frequency Most Significant Bits (CE11) |
| RHZ | Receive Hz |
| RSG | Receive Sig Select |
| R83 | Receive 83-⅓ Hz to Modulator |
| SCK | Self Check |
| SDN | Step Down |
| SFS | Single Frequency Skip |
| SKP | Skip 2450 to 2750 Hz |
| SLA | Slave |
| SLR | Slave (Remote Switch) |
| SPA | Serial Poll Active |
| SPD | Serial Poll Disable |
| SPE | Serial Poll Enable |
| SPM | Serial Poll Mode |
| SRQ | Service Request |
| STM | Slave-to-Master |
| STN | Signal-to-Noise Ratio |
| STP | Stop |
| SUP | Step Up |
| SWF | Select Weighting Filters |
| SYR | System Reset |
| SYS | System Set |
| TAC | Talker Active |
| TAD | Talker Address |
| TCL | Transmit Control Latch (CE8) |
| THZ | Transmit Hz |
| TKB | Talk Battery |
| TLK | Talk Block Address |
| TMN | Transit Level Monitor |
| TMT | Display Connected to Transmitter |
| T83 | Transit 83-⅓ Hz to Modulator |
| UNL | Unlisten |
| VMA | Valid Memory Address |
| WA1 | Write Annunciator #1 |
| WA2 | Write Annunciator #2 |
| WFL | Write Frequency, Least Significant Bit (CE10) |
| WFM | Write Frequency, Most Significant Bit (CE9) |
| WLD | Write Left Display |
| WRD | Write Right Display |
| 4KF | 4kHz Low Pass Filter Select |
| 15M | 15 Minutes |
| 3KF | 3kHz Low Pass Filter Select |
| 600 | 600 Ohms |
| 900 | 900 Ohms |

System Program Routines and Subroutines

```
00001                        NAM    MINI-TIMS
00002                        OPT    PAGE=80,55,1
00003                        OPT    SYM
00004            ******                  DIVISION******
00005            ****** PROJECT CODE NAME: "6-TRON" ******
00006            ****** PROJECT NUMBER: 3851-1605 ******
00007            ****** DATE:                     ******
00008            ******                           ******
00009            ****** MINI-TIMS SOFTWARE DEVELOPMENT ******
00010            ***********************************************
00011            ***********************************************
00012            *
00013            *
00014            ******
00015            * EQUIVALENCES
00016            ******
00017            *
00018            *
00019   00FF     DLLA   EQU    $FF
00020   00F2     EXECUT EQU    $F2
00021   0072     ABORTA EQU    $72
00022   008A     START  EQU    $8A
00023   0076     SWEEP  EQU    $76
00024   008E     ABORT  EQU    $8E
00025            *
00026            *
00027   1000     FPANEL EQU    $1000   ADDRESS OF FRONT PANEL FUNCTION CONT
00028   1100     PANEL  EQU    $1100   ADDRESS OF FRONT PANEL QUALIFIER CON
00029   1200     ANNUNL EQU    $1200   LEFT DISPLAY ANNUNCIATOR LATCH
00030   1300     ANNUNR EQU    $1300   RIGHT DISPLAY ANNUNCIATOR LATCH
00031   1400     CONTRL EQU    $1400   ADDRESS OF HARDWARE CONTROL LATCH
00032   1500     COUNTR EQU    $1500   BEGINNING ADDRESS OF DATA AQUISITION
00033   1600     RCVR   EQU    $1600   ADDRESS OF RECEIVER CONTROL LATCH
00034   1700     XMIT   EQU    $1700   ADDRESS OF TRANSMIT CONTROL LATCH
00035   1800     HWFM   EQU    $1800   WRITE ADDRESS OF MSBYTE OF TRANSMIT
00036   1900     HWFL   EQU    $1900   WRITE ADDRESS OF LSBYTE OF TRANSMIT
00037   1A00     HRFM   EQU    $1A00   READ ADDRESS OF MSBYTE OF TRANSMIT F
00038   1B00     HRFL   EQU    $1B00   READ ADDRESS OF LSBYTE OF TRANSMIT F
00039   1C00     LEFTD  EQU    $1C00   BEGINNING ADDRESS OF LEFT DISPLAY
00040   1D00     RIGHTD EQU    $1D00   BEGINNING ADDRESS OF RIGHT DISPLAY
00041   1E00     DROP   EQU    $1E00   IMPULSE NOISE SIGNASL CHECK INPUT
00042   1F00     CLOCKR EQU    $1F00   ADDRESS OF CLOCK CONTROL REGISTER
00043   2000     ACIA0  EQU    $2000   ADDRESS OF ACIA CONTROL REGISTERS
00044   2001     ACIA1  EQU    $2001   ADDRESS OF ACIA TRANSMIT,RECEIVE REG
00045   3000     HPIBP  EQU    $3000       INTERFACE BUSS PIA
00046   5000     DIAROM EQU    $5000
00047            *
00048            *
```

```
00049                   *****
00050                   * RAM ALLOCATION
00051                   *****
00052                   *
00053                   *
00054 0075                      ORG     $75
00055                   *
00056                   *
00057 0075 0001         SPANEL  RMB     1         STORAGE OF FRONT PANEL STATUS
00058 0076 0002         TEMP    RMB     2         TEMPORARY STORAGE OF INDIRECT ADDRES
00059 0078 0002         IRTEMP  RMB     2         INTERRUPT ROUTINE TEMP STORAGE FOR T
00060 007A 0001         MODE    RMB     1         LEAST SIGNIFICANT BYTE OF VECTOR TO
00061 007B 0005         PROG    RMB     5         RECORD TABLE STORED IN THESE MEMORY
00062 0080 0006         AREG    RMB     6         SOFTWARE WORKING REGISTER "A"
00063 0086 0006         BREG    RMB     6         SOFTWARE WORKING REGISTER "B"
00064 008C 0006         CREG    RMB     6         SOFTWARE WORKING REGISTER "C"
00065 0092 0006         DREG    RMB     6         SOFTWARE WORKING REGISTER "D"
00066 0098 0006         EREG    RMB     6         SOFTWARE WORKING REGISTER "E"
00067 009E 0006         FREG    RMB     6         SOFTWARE WORKING REGISTER "F"
00068 00A4 0006         GREG    RMB     6         LEVEL/FREQ REFERENCE STORAGE REGISTE
00069 00AA 0001         STAT1   RMB     1         STATUS REGISTER #1
00070 00AB 0001         STAT2   RMB     1         STATUS REGISTER #2
00071 00AC 0001         STAT3   RMB     1         STATUS REGISTER #3
00072 00AD 0001         RANGE   RMB     1         AUTORANGE LIMITS ARE STORED IN THIS
00073 00AE 0001         ANSWER  RMB     1         STORAGE FOR ANSWER IN MASTER/SLAVE V
00074 00AF 0005         DATA    RMB     5         FOUR BYTE BUFFER USED IN MASTER/SLAV
00075 00B4 0001         COMND   RMB     1
00076 00B5 0001         ACIAOT  RMB     1
00077 00B6 0001         ACIA1T  RMB     1
00078                   *
00079 00B7 0001         LURA    RMB     1
00080 00B8 0003         LENNY   RMB     3
00081 00BB 0001         LADY    RMB     1
00082 00BC 0001         GLORIA  RMB     1
00083 00BD 0001         TENSCO  RMB     1
00084 00BE 0001         DIVIS   RMB     1
00085 00BF 0001         FREVAR  RMB     1
00086 00C0 0001         EXFCON  RMB     1
00087 00C1 0006         SCHF    RMB     6
00088 00C7 0006         SCHL    RMB     6
00089 00CD 001B         ERRORT  RMB     $1B
00090 00E8 0002         TEMPSC  RMB     2
00091 00EA 0001         SCHSTO  RMB     1
00092 00EB 0002         STACK   RMB     2
00093                   *
00094 00ED 0001         HPB     RMB     1         INPUT FREQ DATA REGISTER #1
00095 00EE 0001         HPB1    RMB     1         INPUT FREQ. DATA REGISTER #2
00096 00EF 0001         FPAN    RMB     1         HPIB "FPANEL"
00097 00F0 0001         HFPAN   RMB     1         FPAN BUFFER
00098 00F1 0001         PAN     RMB     1         HPIB "PANEL"
00099 00F2 0001         HPAN    RMB     1         PAN BUFFER
00100 00F3 0001         HSTAT1  RMB     1         HPIB STATUS REGISTER #1
00101 00F4 0001         HSTAT2  RMB     1         HPIB SERIAL POLL STATUS BYTE
00102 00F5 0001         HPREG1  RMB     1         LEFT DISPLAY MSB BUFFER(HPIB)
00103 00F6 0001         HPREG2  RMB     1         LEFT DISPLAY LSB BUFFER (HPIB)
00104 00F7 0001         HPREG3  RMB     1         RIGHT DISPLAY MSB BUFFER (HPIB)
00105 00F8 0001         HPREG4  RMB     1         RIGHT DISPLAY LSB BUFFER (HPIB)
00106 00F9 0004         HREG    RMB     4         HPIB FREQ REGSTER
00107 5800                      ORG     $5800
00108                   *
00109                   *
```

```
00002           *****                             DIVISION*****
00003           ******PROJECT CODE NAME- "6-IRON"******
00004           ******PROJECT NUMBER- 3852-1605******
00005           ******DATE-                  ******
00006           ******                       ******
00007           ******MINI-TIMS SOFTWARE DEVELOPMENT******
00008           *
00009           ******VERSION 1.1******
00010           ****************************************************************
00011           ****************************************************************
00012           *
00013           *
00014           * FORMAT OF HPIB PIA REGISTERS
00015           *
00016           *HPIBP
00017           *
00018           *  B7  *  B6  *  B5  *  B4  *  B3  *  B2  *  B1  *  B0  *
00019           ****************************************************************
00020           *     *     *     *     *     *     *     *     *
00021           *     *Z    *     *     *     *     *     *     *
00022           * DIO8 * DIO7 * DIO6 * DIO5 * DIO4 * DIO3 * DIO2 * DIO1 *
00023           ****************************************************************
00024           *              (NEGATIVE TRUE LOGIC)
00025           * *
00026           *
00027           *HPIBP+1
00028           *
00029           *  B7  *  B6  *  B5  *  B4  *  B3  *  B2  *  B1  *  B0  *
00030           ****************************************************************
00031           *     *     *     *     *     *     *     *     *
00032           **************  CA2 CONTROL PIN 39*   DDR  * CA1 CONTROL *
00033           *     *     *     *     *     *     *     *     *
00034           ****************************************************************
00035           *
00036           *
00037           *
00038           *HPIBP+3
00039           *
00040           *
00041           *  B7  *  B6  *  B5  *  B4  *  B3  *  B2  *  B1  *  B0  *
00042           ****************************************************************
00043           * TAC  * SPA  * LAD  *     *     *     *     *     *
00044           *     *     *     *     *     *     *     *     *
00045           *     *     *     * TERT * SRQ  * DAV  * NRFD * NDAC *
00046           ****************************************************************
00047           *
00048           *      TAC = TALKER ACTIVE STATE
00049           *      SPA = SERIAL POLL ACTIVE STATE
00050           *      TEST = OPTION TEST VIT
00051           *      SRQ = SERVICE REQUEST LINE
00052           *      DAV = DATA VALID
00053           *      NRFD = NOT READY FOR DATA
00054           *      NDAC = NOT DATA ACCEPTED
00055           *
00056           *
00057           *HPIBP+3
00058           *
00059           *  B7  *  B6  *  B5  *  B4  *  B3  *  B2  *  B1  *  B0  *
00060           ****************************************************************
00061           * SPA  * DCL  *     *     *     *     *     *     *
00062           *     *     *     * CB2 CONTROL PIN 19*  DDR  * CB1 CONTROL *
00063           *     *     *     *     *     *     *     *     *
00064           ****************************************************************
00065           *
00066           *
00067           *
00068           ****************************************************************
00069           * INTERRUPT POLLING ROUTINE
00070           * THIS ROUTINE ESTABLISHES THE INTERRUPTING
00071           * DEVICE AND GENERATES THE VECTORS TO
00072           * THE APPROPRIATE SERVICE ROUTINES.
00073           ****************************************************************
00074           *
00075           *
00076 5800 B6 3001 FINDIT LDA A  HPIBP+1    A SIDE CONTROL REG
```

```
00077 5803 2B OF            BMT    TAKIT      BR IF HPIB HAS DATA
00078 5805 17               TBA               PUT B SIDE CONTROL RIGISTER IN A ACC
00079 5806 2A 05            BPL    FIND1
00080 5808 BD 5D0B          JSR    SPOLL
00081 580B 20 06            BRA    FIND2
00082 580D 49         FIND1 ROL  A
00083 580F 2A 03            BPL    FIND2
00084 5810 BD 5AD2          JSR    DCLEAR
00085 5813 39         FIND2 RTS
00086                    *
00087                    *
00088                    ********************************************************
00089                    * HPIB BRANCHING ROUTINE
00090                    * THIS ROUTINE IDENTIFIES THE GROUP LETTER SENT
00091                    * AND BRANCHES TO THE APPROPRIATE ROUTINE TO HANDLE
00092                    * THE LETTER.
00093                    ********************************************************
00094                    *
00095 5814 96 F3     TAKIT  LDA  A HSTAT1     LOAD THE STATUS REGISTER
00096 5816 85 20            BIT  A #$20       SEE IF CONFIGURED TO LISTEN
00097 5818 27 03            BEQ    LSTNOK     BR IF CONFIGURED TO LISTEN
00098 581A BD 5CD7          JSR    CLSTN      CONFIGURE TO LISTEN
00099 581D B6 3000   LSTNOK LDA  A HPIBP      LOAD THE DATA
00100 5820 43               COM  A
00101 5821 81 40            CMP  A #$40       IS DATA LETTER?
00102 5823 2E 01            BGT    PICKET
00103 5825 39               RTS               SYNTAX ERROR
00104 5826 81 45     PICKET CMP  A #$45
00105 5828 26 03            BNE    TAKE1
00106 582A 7E 5A21          JMP    HEND       BR IF LETTER E (END)
00107 582D 81 46     TAKE1  CMP  A #$46
00108 582F 26 03            BNE    TAKE2
00109 5831 7E 5874          JMP    HFREQ      JMP IF LETTER F (FREQ)
00110 5834 81 44     TAKE2  CMP  A #$44
00111 5836 26 03            BNE    TAKE3
00112 5838 7E 5904          JMP    HDISP      JMP IF LETTER D (DISPLAY)
00113 583B 81 49     TAKE3  CMP  A #$49
00114 583D 26 03            BNE    TAKE4
00115 583F 7E 5966          JMP    HIMPN      JMP IF LETTER I (IMPULSE NOISE)
00116 5842 81 4D     TAKE4  CMP  A #$4D
00117 5844 26 03            BNE    TAKE5
00118 5846 7E 5983          JMP    HMEAS      JMP IF LETTER M (MEASUREMENT)
00119 5849 81 4F     TAKE5  CMP  A #$4F
00120 584B 26 03            BNE    TAKE6
00121 584D 7E 5A6E          JMP    HOUT       JMP IF LETTER O (OUTPUT)
00122 5850 81 50     TAKE6  CMP  A #$50
00123 5852 26 03            BNE    TAKE7
00124 5854 7E 5941          JMP    HPER       JMP IF LETTER P (PERIOD)
00125 5857 81 52     TAKE7  CMP  A #$52
00126 5859 26 03            BNE    TAKE9
00127 585B 7E 59D4          JMP    HREM       JMP IF LETTER R (REMOTE)
00128 585E 81 5A     TAKE9  CMP  A #$5A
00129 5860 26 03            BNE    TAKE0
00130 5862 7E 5A04          JMP    HZERO      JMP IF LETTER Z (ZERO)
00131 5865 81 53     TAKE0  CMP  A #$53
00132 5867 26 03            BNE    TAKE11
00133 5869 7E 5AAB          JMP    HSCHK      BR IF LETTER S (SELF CHECK)
00134 586C 81 4C     TAKE11 CMP  A #$4C
00135 586F 26 03            BNE    TAKE12
00136 5870 7E 5ABA          JMP    HDELAY     BR IF LETTER L (DELAY REPEATER)
00137 5873 39         TAKE12 RTS              SYNTAX ERROR, ABORT
00138                    *
00139                    *
00140                    *
00141                    ********************************************************
00142                    * FREQUENCY SET ROUTINE
00143                    * THIS ROUTINE TAKES THE DATA DESIGNATED AS
00144                    * FREQUENCY, DETERMINES IF IT IS 3 OR 4 BITS LONG,
00145                    * THEN GENERATES 2 PACKED BCD WORDS FOR LOADING
00146                    * INTO HWFM AND HWFL FROM HPB AND HPB2 RESPECTIVELY.
00147                    ********************************************************
00148                    *
00149                    *
00150 5874 C6 FF     HFREQ  LDA  B #$FF
00151 5876 CE 00F9          LDX    #HREG      LOCATION OF WHERE TO PUT FREQ DATA
```

```
00152 5879 BD 58D3 HWAIT  JSR     LDNBR      LOADS NUMBER FROM PIA
00153 587C 29 08          BVS     LDFREQ     BR IF LETTER LOADED. LOAD FREQ INFO
00154 587E 8C 00FD        CPX     #HREG+4    SEE IF TOO MANY FREQ DIGITS HAVE BE
00155 5881 26 01          BNE     F1         BR IF NOT MORE THAN 4 DIGITS
00156 5883 39             RTS                FREQ TOO HIGH, ABORT
00157 5884 A7 00      F1  STA A   X          STORE FREQ DIGIT
00158 5886 08             INX
00159 5887 20 F0          BRA     HWAIT      WAITING FOR ANOTHER DIGIT OR LETTER
00160 5889 97 76  LDFREQ  STA A   TEMP       STORE LETTER FOR FUTURE USE
00161 588B 8C 00FC        CPX     #HREG+3
00162 588E 27 06          BEQ     FQ3NIB     3 FREQ DIGITS
00163 5890 8C 00FD        CPX     #HREG+4
00164 5893 27 11          BEQ     FQ4NIB     4 FREQ DIGITS
00165 5895 39             RTS                FREQ TOO LOW
00166                  *
00167                  * THIS SECTION GENERATES THE WORDS FOR 3 NIBBLES
00168                  *
00169 5896 96 FA  FQ3NIB  LDA A   HREG+1     LOADS MIDDLE NIBBLE OF FREQ
00170 5898 48             ASL A
00171 5899 48             ASL A
00172 589A 48             ASL A
00173 589B 48             ASL A
00174 589C 9A FB          ORA A   HREG+2     CREATES PACKED BCD WORD: LSB FREQ.
00175 589E 97 FF          STA A   HPB1       LOADS PACKED BCD FOR TEMP STORAGE
00176 58A0 96 F9          LDA A   HREG
00177 58A2 97 ED          STA A   HPB
00178 58A4 20 14          BRA     LDLTR      DETERMINE LETTER READ AND STORED
00179                  *
00180                  * THIS SECTION GENERATES THE WORDS FOR 4 NIBBLES
00181                  *
00182 58A6 96 FB  FQ4NIB  LDA A   HREG+2     LOADS M.S. NIBBLE OF LSB
00183 58A8 48             ASL A
00184                  *
00185 58A9 48             ASL A
00186 58AA 48             ASL A
00187 58AB 48             ASL A
00188 58AC 9A FC          ORA A   HREG+3     CREATES PACKED BCD OF LSB
00189 58AE 97 EF          STA A   HPB1       STORES IN TEMP.STORAGE
00190 58B0 96 F9          LDA A   HREG       LOADS M.S. NIBBLE OF MSB
00191 58B2 48             ASL A
00192 58B3 48             ASL A
00193 58B4 48             ASL A
00194 58B5 48             ASL A
00195 58B6 9A FA          ORA A   HREG+1     CREATES PACKED BCD OF MSB
00196 58B8 97 ED          STA A   HPB        STORES IN TEMP STORAGE
00197                  *
00198 58BA 86 40  LDLTR   LDA A   #$40       LOADS MSB OF FREQ
00199 58BC 90 ED          SUB A   HPB        SUB FREQ FROM MAX
00200 58BE 2E 01          BGT     GOOD1      BR IF FREQ NOT ABOVE BOUNDS
00201 58C0 39             RTS                FREQ TOO HIGH
00202 58C1 96 ED  GOOD1   LDA A   HPB
00203 58C3 80 02          SUB A   #$02       SUB MIN FREQ FROM INPUT FREQ
00204 58C5 2C 01          BGE     GOOD2      BR IF FREQ NOT BELOW BOUNDS
00205 58C7 39             RTS                FREQ TOO LOW, AVORT
00206 58C8 96 76  GOOD2   LDA A   TEMP       RETRIEVES LETTER
00207 58CA D6 F3          LDA B   HSTAT1
00208 58CC CA 01          ORA B   #$01       SETS FREQ FLAG
00209 58CE D7 F3          STA B   HSTAT1     PUTS THE GOODIES AWAY
00210 58D0 7E 5826        JMP     PICKET     DONE
00211                  *
00212                  *
00213                  * LOAD NUMBER SUBROUTINE
00214                  * THIS ROUTINE LOADS THE NUMBERS FROM THE HPIB AND
00215                  * CONVERTS THEM TO BINARY FROM ASCII>
00216                  *
00217                  *
00218 58D3 B6 3001 LDNBR   LDA A   HPIB+1     LOADS STATUS REGISTER
00219 58D6 2B 10          BMI     HREAD      BR TO DATA READY
00220 58D8 B6 1000        LDA A   FPANEL     GET FRONT PANEL INFO
00221 58DB 84 18          AND A   #$18       SEE IF HPIB CONTROLLED (REMOTE)
00222 58DD 26 19          BNE     GOOF       NOT IN REMOTE (HPIB)
00223 58DF B6 3002        LDA A   HPIB+2     GET B SIDE PIA
00224 58E2 85 20          BIT A   #$20       CHECK IF STILL ADDRESSED TO LISTEN
00225 58E4 26 ED          BNE     LDNBR      BR IF STILL ADDRESSED (CONTINUE TO W
00226 58E6 20 10          BRA     GOOF       BR IF NOT ADDRESSED
00227 58E8 B6 3000 HREAD   LDA A   HPIB       READ DATA
```

```
00228 58EB 43              COM A
00229 58EC 81 20           CMP A  #$20      SEE IF LEADING SPACES
00230 58EE 27 E3            BEQ    LDNBR     BR IF LEADING SPACES. IGNORE
00231 58F0 81 39           CMP A  #$39
00232 58F2 23 07           BLS    NUM1      BR IF POSSIBLE NUMBER
00233 58F4 C1 FF           CMP B  #$FF      SEE IF IN FREQ MODE.
00234 58F6 27 0A           BEQ    HHERE     BR IF IN FREQ MODE (CHAR READ IS POS
00235 58F8 32       GOOF   PUL A
00236 58F9 32              PUL A           LETTER BUT NOT IN FREQ MODE.ERROR.PU
00237 58FA 39              RTS             JUMPS DIRECTLY OUT OF ROUTINE  STASC
00238 58FB 80 30    NUM1   SUB A  #$30      PUT NUMBER INTO A RECOGNIZED FORM  A
00239 58FD 2B F9           BMI    GOOF      BR IF NEG (NOT NUMBER)
00240 58FF 0A              CLV
00241 5900 20 01           BRA    HHERE1
00242 5902 0B       HHERE  SEV             LET FREQ ROUTINE KNOW LETTER RECEIVE
00243 5903 39       HHERE1 RTS
00244                *
00245                *
00246                *
00247                ****************************************************
00248                * DISPLAY REQUESTED I.D. ROUTINE
00249                * THIS ROUTINE DECODES THE NUMBER USED TO
00250                * REQUEST THE DESIRED DISPLAY AND SETS THE
00251                * REGISTER FPAN TO REFLECT THIS DISPLAY.  FPAN IS
00252                * LOADED INTO HFPAN DURING THE END OF DATA ROUTINE.
00253                * HFPAN IS THEN READ IN PLACE OF FPANEL DURING THE
00254                * NORMAL OPERATING SYSTEM ROUTINE.
00255                ****************************************************
00256                *
00257                *
00258 5904 BD 58D3  HDISP  JSR    LDNBR
00259 5907 81 00           CMP A  #$0
00260 5909 27 21           BEQ    DIS1      BR RECEIVE.
00261 590B 81 01           CMP A  #$01
00262 590D 27 16           BEQ    DIS0      BR TRANSMIT.
00263 590F D6 FF           LDA B  FPAN      GET FRONT PANEL WORKING IMAGE
00264 5911 C4 E0           AND B  #$E0      GET FUNCTION BITS
00265 5913 C1 A0           CMP B  #$A0      SEE IF IN EDD
00266 5915 27 05           BEQ    DIS4      BR IF IN EDD/DELAY
00267 5917 C1 C0           CMP B  #$C0      IN THIS EDD MODE?
00268 5919 27 01           BEQ    DIS4      BR IF IN EDD / LEVEL
00269 591B 39              RTS
00270 591C 81 02    DIS4   CMP A  #$2
00271 591E 27 13           BEQ    DIS2      BR IF EDD/DELAY
00272 5920 81 03           CMP A  #$3
00273 5922 27 16           BEQ    DIS3      BR IF EDD LEVEL
00274 5924 39              RTS
00275                *
00276 5925 86 FD    DIS0   LDA A  #%11111101
00277 5927 C6 00           LDA B  #%00000000
00278 5929 7E 5ABF         JMP    LDFPAN
00279                *
00280 592C 86 FF    DIS1   LDA A  #%11111111
00281 592E C6 02           LDA B  #%00000010
00282 5930 7E 5ABF         JMP    LDFPAN
00283                *
00284 5933 86 BF    DIS2   LDA A  #%10111111
00285 5935 C6 A0           LDA B  #%10100000
00286 5937 7E 5ABF         JMP    LDFPAN
00287                *
00288 593A 86 DF    DIS3   LDA A  #%11011111
00289 593C C6 C0           LDA B  #%11000000
00290 593F 7E 5ABF         JMP    LDFPAN
00291                *
00292                *
00293                *
00294                *
00001                *
00002                *
00003                ******                       DIVISION******
00004                ****** PROJECT CODE NAME* "6-IRON"******
00005                ****** PROJECT NUMBER 3852-1605******
00006                ****** DATE-                  ******
00007                ******                        ******
00008                ****** MINI-TIMS SOFTWARE DEVELOPMENT******
```

```
00009                ****** VERSION 1.2******
00010          *
00011          *************************************************************
00012          *
00013          *
00014          *************************************************************
00015          * IMPULSE NOISE INTEGRATION PERIOD
00016          * THIS ROUTINE DECODES THE IMPULSE
00017          * NOISE INTEGRATION PERIOD REQUESTED
00018          * AND LOADS THE PROPER CODE INTO MEMORY
00019          * LOCATION "PAN" THRU SUBROUTINE "LDPAN".
00020          *************************************************************
00021          *
00022          *
00023 5941 BD 58D3  HPER    JSR     LDNBR       LOADS NUMBER
00024 5944 81 00            CMP A   #$0
00025 5946 27 09            BEQ     P0          BR 5 MINUTES
00026 5948 81 01            CMP A   #$1
00027 594A 27 0C            BEQ     P1          BR 15 MINUTES
00028 594C 81 02            CMP A   #$2
00029 594E 27 0F            BEQ     P2          BR CONTINUOUS
00030 5950 39              RTS                  SYNTAX ERROR
00031                *
00032 5951 86 F1   P0      LDA A   #%11110001
00033 5953 C6 00           LDA B   #%00000000
00034 5955 7E 5A98         JMP     LDPAN
00035                *
00036 5958 86 F9   P1      LDA A   #%11111001
00037 595A C6 08           LDA B   #%00001000
00038 595C 7E 5A98         JMP     LDPAN
00039                *
00040 595F 86 FD   P2      LDA A   #%11111101
00041 5961 C6 0C           LDA B   #%00001100
00042 5963 7E 5A98         JMP     LDPAN
00043                *
00044                *
00045                *
00046                *************************************************************
00047                * IMPULSE NOISE CONTROL
00048                * THIS ROUTINE DECODES THE START
00049                * STOP/RESET FUNCTIONS AND LOADS THE
00050                * PROPER CODE INTO LOCATION" PAN."   WHEN
00051                *************************************************************
00052                *
00053                *
00054 5966 BD 5AA1 HIMPN   JSR     MOCONI      SET THE INTERNAL MOM CONT FLAG
00055 5969 BD 58D3         JSR     LDNBR       LOADS NUMBER
00056 596C 81 00            CMP A  #$0
00057 596E 27 05            BEQ    I0           BR STOP
00058 5970 81 01            CMP A  #$1
00059 5972 27 08            BEQ    I1           BR START/RESET
00060 5974 39              RTS                  SYNTRAX ERROR
.0061                *
00062 5975 86 DD   I0      LDA A   #%11011101
00063 5977 C6 10           LDA B   #%00010000
00064 5979 7E 5A98         JMP     LDPAN
00065                *
00066 597C 86 ED   I1      LDA A   #%11101101
00067 597F C6 20           LDA B   #%00100000
00068 5980 7E 5A98         JMP     LDPAN
00069                *
00070                *
00071                *
00072                *************************************************************
00073                * MEASUREMENT SWITCH ROUTINE
00074                * THIS ROUTINE DECODES THE MEASUREMENT
00075                * REQUESTED AND LOADS THE PROPER WORD
00076                * INTO FPAN.
00077                *************************************************************
00078                *
00079                *
00080 5983 BD 58D3 HMEAS   JSR     LDNBR       LOADS NUMBER
00081 5986 81 01            CMP A  #$1
00082 5988 27 19            BEQ    M0           BR LEVEL FREQ.
00083 598A 81 02            CMP A  #$2
```

```
00084 598C 27 1C           BEQ      M1         BR C-MESS NOISE
00085 598F 81 03            CMP A    #$3
00086 5990 27 1F           BEQ      M2         BR NOISE WITH TONE
00087 5992 81 04            CMP A    #$4
00088 5994 27 22           BEQ      M3         BR SIGNAL TO NOISE
00089 5996 81 05            CMP A    #$5
00090 5998 27 25           BEQ      M4         R IMPULSE NOISE
00091 599A 81 06            CMP A    #$6
00092 599C 27 28           BEQ      M6         BR ENVELOPE DELAY DISP. EDD/FREQ
00093 599E 81 07            CMP A    #$7
00094 59A0 27 28           BEQ      M7         LINE LOOPBACK
00095 59A2 39              RTS                 SYNTAX ERROR
00096                *
00097 59A3 86 1F   M0      LDA A    #%00011111
00098 59A5 C6 00           LDA B    #%00000000
00099 59A7 7E 5A8F         JMP      LDFPAN
00100                *
00101 59AA 86 3F   M1      LDA A    #%00111111
00102 59AC C6 20           LDA B    #%00100000
00103 59AE 7E 5A8F         JMP      LDFPAN
00104                *
00105 59B1 86 5F   M2      LDA A    #%01011111
00106 59B3 C6 40           LDA B    #%01000000
00107 59B5 7E 5A8F         JMP      LDFPAN
00108                *
00109 59B8 86 7F   M3      LDA A    #%01111111
00110 59BA C6 60           LDA B    #%01100000
00111 59BC 7E 5A8F         JMP      LDFPAN
00112                *
00113 59BF 86 9F   M4      LDA A    #%10011111
00114 59C1 C6 80           LDA B    #%10000000
00115 59C3 7E 5A8F         JMP      LDFPAN
00116                *
00117                *
00118 59C6 86 BF   M6      LDA A    #%10111111
00119 59C8 C6 A0           LDA B    #%10100000
00120 59CA 7E 5A8F         JMP      LDFPAN
00121                *
00122 59CD 86 FF   M7      LDA A    #%11111111
00123 59CF C6 E0           LDA B    #%11100000
00124 59D1 7E 5A8F         JMP      LDFPAN
00125                *
00126                *
00127                *
00128                ******************************************************
00129                * REMOTE CONTROL ROUTINE
00130                * THIS ROUTINE DECODES THE REMOTE
00131                * SWITCHES AND LOADS THE APPROPRIATE
00132                * WORD INTO FPAN. POSSIBLE STATES
00133                * ARE NORMAL, SLAVE, MASTER MTS,
00134                * AND MASTER STM.
00135                ******************************************************
00136                *
00137                *
00138                *
00139                *
00140 59D4 BD 58D3 HREM    JSR      LDNBR      LOADS NUMBER
00141 59D7 81 00            CMP A    #$0
00142 59D9 27 0D           BEQ      R0         BR NORMAL
00143 59DB 81 01            CMP A    #$1
00144 59DD 27 17           BEQ      R2         BR MASTER,MASTER TO SLAVE
00145 59DF 81 02            CMP A    #$2
00146 59E1 27 1A           BEQ      R3         BR MASTER, SLAVE TO MASTER
00147 59E3 81 03            CMP A    #$3
00148 59E5 27 08           BEQ      R1         BR SLAVE
00149 59E7 39              RTS                 SYNTAX ERROR
00150                *
00151 59E8 86 F7   R0      LDA A    #%11110111
00152 59EA C6 10           LDA B    #%00010000
00153 59EC 7E 5A8F         JMP      LDFPAN
00154                *
00155 59EF 86 EF   R1      LDA A    #%11101111
00156 59F1 C6 08           LDA B    #%00001000
00157 59F3 7E 5A8F         JMP      LDFPAN
00158                *
```

```
00159 59F6 86 FF    R2    LDA A    #%11111111
00160 59F8 C6 1C          LDA B    #%00011100
00161 59FA 7E 5A8F        JMP      LDFPAN
00162                *
00163 59FD 86 FB    R3    LDA A    #%11111011
00164 59FF C6 18          LDA B    #%00011000
00165 5A01 7E 5A8F        JMP      LDFPAN
00166                *
00167                *
00168                *
00169                ************************************************************
00170                * ZERO ROUTINE
00171                * THIS ROUTINE DECODES AND SETS THE
00172                * PROPER BITS FOR BOTH LEVEL AND DELAY ZERO.
00173                * THE PROPER BITS ARE LOADED INTO PAN. AFTER PAN IS READ,
00174                * THE BITS ARE RESET TO ONE BY THE HEND ROUTINE.
00175                ************************************************************
00176                *
00177                *
00178 5A04 BD 5AA1 HZERO JSR       MOMCNT   SET THE INTERNAL MOM CNOT FLAG
00179 5A07 BD 59D3        JSR      LDNBR
00180 5A0A 81 00          CMP A    #$0
00181 5A0C 27 05          BEQ      Z0       BR LEVEL ZERO
00182 5A0F 81 01          CMP A    #$1
00183 5A10 27 08          BEQ      Z1       BR DELAY ZERO
00184 5A12 39            RTS               SYNTAX ERROR
00185                *
00186 5A13 86 7D    Z0    LDA A    #%01111101
00187 5A15 C6 00          LDA B    #%00000000
00188 5A17 7E 5A9B        JMP      LDPAN
00189                *
00190 5A1A 86 BD    Z1    LDA A    #%10111101
00191 5A1C C6 00          LDA B    #%00000000
00192 5A1E 7E 5A9B        JMP      LDPAN
00193                *
00194                *
00195                *
00196                *
00197                ************************************************************
00198                * END ROUTINE
00199                * THIS ROUTINE SETS A FLAG INDICATING
00200                * DATA IN PAN AND FPAN ARE VALID. IT
00201                * LOADS IN FREQUENCY INFORMATION TOHWFL
00202                * AND HWFM. THE ROUTINE IS EXITED BY A
00203                * JUMP BACK TO FINDIT TO CHECKON ANY OTHER
00204                * INTERRUPTS PENDING BEFORE RETURNING TO THE
00205                * MAIN PROGRAM.
00206                ************************************************************
00207                *
00208                *
00209                * FPAN
00210                *   B7       B6      B5      B4      B3      B2      B1      B0
00211                ************************************************************
00212                *   *        *       *       *       *       * MTS  * XMIT * NORM *
00213                *   F2   *   F1  *   F0  *   A1  *   A0  *----------*------*------*
00214                *   *        *       *       *       *       * STM  * RCV  * RPT  *
00215                ************************************************************
00216                *
00217                * F2 F1 F0    MEASUREMENT FORMAT
00218                * 0  0  0    LEVEL/FREQ
00219                * 0  0  1    C-MESS NOISE
00220                * 0  1  0    NOISE WITH TONE
00221                * 0  1  1    SIGNAL TO NOISE
00222                * 1  0  0    IMPULSE NOISE
00223                * 1  0  1    EDD/DISPLAY EDD
00224                * 1  1  0    EDD/DISPLAY LEVEL
00225                * 1  1  1    LINE LOOP BACK
00226                *
00227                *
00228                * A1 A0      SYSTEM MODE CONTROL
00229                * 0  0       UNDEF (HPIB)
00230                * 0  1       SLAVE
00231                * 1  0       NORMAL
00232                * 1  1       MASTER
00233                *
```

```
00234            *
00235            * PAN
00236            *  B7       B6       B5       B4       B3       B2       B1       B0
00237            ************************************************************
00238            *LEVEL1 *DELAY *        *        *        *        * DIAL  * S.C. *
00239            *       *       *  B1   *  B0   *  A1   *  A0   *        ********
00240            * ZERO  * ZERO  *        *        *        *        * TALK  *NORMAL*
00241            ************************************************************
00242            *
00243            * A1 A0        IMPULSE NOISE INTEGRATION PERIOD
00244            *  0  0        5 MINUTE
00245            *  1  0        15 MUNUTE IN
00246            *  0  1        UNDEFINED
00247            *  1  1        CONTINUOUS
00248            *
00249            *
00250            * B1 B0        IMPULSE NOISE CONTROL BITS
00251            *  0  0        UNDEFINED
00252            *  0  1        STOP
00253            *  1  0        START/RESET
00254            *  1  1        RUN
00255            *
00256            *
00257            *LEVEL ZERO AND DELAY ZERO ARE ACTIVE LOW
00258            *
00259            *
00260            *
00261 5A21 96 EF    HEND   LDA A   FPAN
00262 5A23 97 F0           STA A   HFPAN    LOAD FPAN INTO HPIB BUFFER
00263 5A25 96 F1           LDA A   PAN
00264 5A27 97 F2           STA A   HPAN     LOAD PAN INTO HPIB BUFFER
00265 5A29 96 F3           LDA A   HSTAT1   GET STATUS
00266 5A2B 46             ROR A            PUT FREQ FLAG INTO CARRY BIT
00267 5A2C 24 19          BCC     E2       BR IF FREQ NOT SET THIS ROUND
00268 5A2E 48             ASLA             SHIFT BACK AND SET FREQ TO ZERO
00269 5A2F 97 F3           STA A   HSTAT1   PUT THE GOODIES BACK
00270 5A31 96 7C           LDA A   PROG+1   GET CURRENT XMITTER PROGRAM
00271 5A33 84 DF           AND A   #$DF     SET FOR FIXED FREQ
00272 5A35 97 7C           STA A   PROG+1   PUT 'EM ALL BACK
00273 5A37 B7 1700         STA A   XMIT     THAT MEANS YOU TOO (PROGRAM TRANSMITT
00274 5A3A D6 EE           LDA B   HPB1
00275 5A3C F7 1900         STA B   HWFL1    WRIGHTS LOWEST FREQ BYTE
00276 5A3F D6 ED           LDA B   HPB
00277 5A41 F7 1800         STA B   HWFM     STORE MSB FREQ
00278 5A44 F7 1800         STA B   HWFM     DO IT TWICE FOR THE TRANSMITTER'S SAK
00279 5A47 96 F3    E2     LDA A   HSTAT1
00280 5A49 85 04           BIT A   #$04     SEE IF MOCONI IS SET (MOMENTARY CONT/
00281 5A4B 27 06           BEQ     E3       BR IF NOT SET
00282 5A4D 8A 02           ORA A   #$02     SET MOCONX (MOMENTARY CONTACT EXTER
00283 5A4F 84 F9           AND A   #$F9     CLEAR MOCOMI
00284 5A51 97 F3           STA A   HSTAT1
00285 5A53 96 F3    E3     LDA A   HSTAT1
00286 5A55 85 08           BIT A   #$08     SEE IF THE INTERNAL OUTPUT FLAG IS S'
00287 5A57 27 05           BEQ     E4       BR IF NOT SET
00288 5A59 8A 40           ORA A   #$40     SET THE SERVICE REQUEST OUTPUT FLAG
00289 5A5B 97 F3           STA A   HSTAT1
00290 5A5D 39             RTS
00291 5A5E 84 BF    E4     AND A   #$BF     RESET THE SRQ FLAG
00292 5A60 97 F3           STA A   HSTAT1
00293 5A62 B6 3002         LDA A   HPIBP+2
00294 5A65 8A 08           ORA A   #$08     SET SRQ LINE HIGH (INACTIVE)
00295 5A67 B7 3002         STA A   HPIBP+2
00296 5A6A 7F 00F4         CLR     HSTAT2   CLEARS THE STATUS BYTE
00297 5A6D 39             RTS
00298            *
00299            *
00300            *
00301            *  STATUS BYTE
00302            *
00303            *HSTAT1
00304            *
00305            *  B7       B6       B5       B4       B3       B2       B1       B0
00306            ************************************************************
00307            *OUTPUT* SRQ * TALK *        *        *        *        * FREQ *
00308            *-----------*-----*IMPSRQ*INTOUT*MOCONI*MOCONX*       *
```

```
00309                  *     *NORMAL*LISTEN*     *         *        *    * FLAG *
00310                  ***********************************************************
00311                  *            OUTPUT
00312                  *
00313                  *   MOCONT=MOMENTARY CONTACT INTERNAL FLAG (BETWEEN HPTB FRO
00314                  *
00315                  *   MOCONX=MOMENTARY CONTACT EXTERNAL FLAG (BETWEEN HPTB AND
00316                  *
00317                  *
00318                  *
00319                  *
00320                  ***********************************************************
00321                  * OUTPUT REQUESTED ROUTINE
00322                  * THIS ROUTINE DECODES THE DESIRED OUTPUT
00323                  * MODE OF THE UNIT AND LOADS THE INFORMATION
00324                  * INTO HSTAT1 FOR FUTURE USE
00325                  ***********************************************************
00326                  *
00327                  *
00328 5A6F BD 58D3 HOUT    JSR     LDNBR
00329 5A71 81 00             CMP A   #$0
00330 5A73 27 05             BEQ     00         BR IF OUTPUT WHEN ADDRESSED
00331 5A75 81 01             CMP A   #$1
00332 5A77 27 07             BEQ     01         BR IF SERVICE REQUEST WHEN DATA READ
00333 5A79 39                RTS                ERROR
00334                  *
00335 5A7A 86 27  00          LDA A   #%00100111
00336 5A7C C6 00              LDA B   #%00000000
00337 5A7E 20 06              BRA     LDSTAT
00338                  *
00339 5A80 86 2F  01          LDA A   #%00101111
00340 5A82 C6 08              LDA B   #%00001000
00341 5A84 20 00              BRA     LDSTAT
00342                  *
00343                  *
00344                  *
00345                  *
00346                  ***********************************************************
00347                  * REGISTER LOADING SUBROUTINES
00348                  * THESE SUBROUTINES TAKE THE MEMORY LOCATION
00349                  * SPECIFIED AND ANDS IT WITH THE A ACCUMULATOR,
00350                  * ORS IT WITH THE B ACCUMULATOR AND THEN PLACES
00351                  *THE NEW WORD BACK INTO THE MEMORY LOCATION.
00352                  *
00353                  *
00354 5A86 94 F3   LDSTAT  AND A   HSTAT1
00355 5A88 97 F3           STA A   HSTAT1
00356 5A8A DA F3           ORA B   HSTAT1
00357 5A8C D7 F3           STA B   HSTAT1
00358 5A8E 39              RTS
00359                  *
00360 5A8F 94 EF   LDFPAN  AND A   FPAN
00361 5A91 97 EF           STA A   FPAN
00362 5A93 DA EF           ORA B   FPAN
00363 5A95 D7 EF           STA B   FPAN
00364 5A97 39              RTS
00365                  *
00366 5A98 94 F1   LDPAN   AND A   PAN
00367 5A9A 97 F1           STA A   PAN
00368 5A9C DA F1           ORA B   PAN
00369 5A9E D7 F1           STA B   PAN
00370 5AA0 39              RTS
00371                  *
00372                  *
00373 5AA1 86 04   MOCONT  LDA A   #$04        SETS MOCONT FLAG
00374 5AA3 9A F3           ORA A   HSTAT1
00375 5AA5 97 F3           STA A   HSTAT1
00376 5AA7 39              RTS
00377                  *
00378                  *
00379                  *
00380                  *
00381                  *******************
00382                  *SELF CHECK ROUTINE PROGRAMMING
00383                  *"S0"=NORMAL!
```

```
00384                 *"S1"=SELF CHECK
00385                 ********************
00386                 *
00387 5AA8 BD 5BD3 HSCHK  JSR    LDNBR      LOAD THE NUMBER
00388 5AAB 81 02            CMP A  #$2        SEE IF NUMBER IS TOO HIGH
00389 5AAD 2D 01            BLT    HSCK1      BR IF NUMBER IS OK
00390 5AAF 39               RTS               JMP IF NUMBER IS TOO HIGH  NOT 0 OR
00391 5AB0 D6 F1  HSCK1    LDA B  PAN        LOAD THE HPIB SOFTWARE "PANEL"
00392 5AB2 C4 FE            AND B  #$FE       GET RID OF THE SELF CHECK BIT
00393 5AB4 1B              ABA               ADD IN THE SELF CHECK BIT FROM HPIB
00394 5AB5 97 F1            STA A  PAN
00395 5AB7 39               RTS               GO BACK AND SEE WHAT ELSE IS THERE
00396                 *
00397                 *
00398                 *
00399                 *******
00400                 *ENVELOPE DELAY REPEATER
00401                 * 0=NORMAL
00402                 * 1=REPEAT
00403                 *******
00404                 *
00405                 *
00406 5AB8 BD 5BD3 HDELAY JSR    LDNBR      LOAD THE NUMBER
00407 5ABB 81 00            CMP A  #$0
00408 5ABD 27 05            BEQ    DEL0       BR IF NORMAL:
00409 5ABF 81 01            CMP A  #$1
00410 5AC1 27 08            BEQ    DEL1       BR IF REPEATER
00411 5AC3 39               RTS
00412                 *
00413 5AC4 86 FF  DEL0     LDA A  #%11111111
00414 5AC6 C6 01            LDA B  #%00000001
00415 5AC8 7E 5A8F          JMP    LDFPAN
00416                 *
00417 5ACB 86 FF  DEL1     LDA A  #%11111110
00418 5ACD C6 00            LDA B  #%00000000
00419 5ACF 7E 5A8F          JMP    LDFPAN
00420                 *
00421                 *

00002                 *
00003                 ***********************************************
00004                 * THIS INTERRUPT SUBROUTINE SETS THE DEVICE INTO A KNOWN
00005                 * STATE.  THIS STATE WHEN REQUESTED BY HPIB SETS THE UNIT T
00006                 * LEVEL/FREQ, 1004 HZ., NORMAL MODE DISPLAYING RECEIVER
00007                 * INFORMATION.  A "NO OUTPUT" IS SELECTED.  THIS INFORMATIO
00008                 * IS LOADED DIRECTLY INTO BOTH BUFFER AND ACTIVE REGISTERS.
00009                 *
00010                 *
00011 5AD2 B6 3002 DCLEAR LDA A  HPIBP+2    CLEARS INTERRUPT FLAG
00012 5AD5 8A 08            ORA A  #$08       RESET THE SRQ LINE  (NEED NO LONGER
00013 5AD7 B7 3002          STA A  HPIBP+2
00014 5ADA D6 7C            LDA B  PROG+1     GET TRANSMITTER IMAGE
00015 5ADC C4 DF            AND B  #$DF       SETS FOR PROGRAMMABLE FREQ
00016 5ADE D7 7C            STA B  PROG+1     PUT IT BACK AWAY
00017 5AE0 F7 1700          STA B  XMIT       LET THE TRANSMITTER IN ON THE GOOD N
00018 5AE3 86 04            LDA A  #$04
00019 5AE5 B7 1900          STA A  HNFL       STORES LOWEST SIG BYTE FREQ
00020 5AE8 97 EE            STA A  HPB1
00021 5AEA 86 10            LDA A  #$10
00022 5AEC B7 1800          STA A  HNFM       STORES MOST SIG BYTE FREQ
00023 5AEF B7 1800          STA A  HNFM       DO IT TWICE SO PAUL GET IT
00024 5AF2 97 ED            STA A  HPB
00025 5AF4 86 15            LDA A  #%00010101   L/F,NORMAL,MTS,RCV,NORM
00026 5AF6 97 EF            STA A  FPAN
00027 5AF8 97 F0            STA A  HFPAN      STORE IN BUFFER FOR HPIB
00028 5AFA 86 FC            LDA A  #%11111100   RUN, CONTINUOUS, NORMAL
00029 5AFC 97 F1            STA A  PAN
00030 5AFE 97 F2            STA A  HPAN       STORE IN BUFFER FOR HPIB
00031 5B00 7F 00F3          CLR    HSTAT1     CLEAR THE STATUS REGISTER
00032 5B03 7F 00F4          CLR    HSTAT2     CLEARS THE STTUS BYTE
00033 5B06 39               RTS
00034                 *
00035                 *
```

```
00002                   *                              DIVISION******
00003                   ****** 
00004                   ****** PROJECT CODE NAME: 6-IRON******
00005                   ****** PROJECT NUMBER 3852-1605******
00006                   ****** DATE:            *****
00007                   ******                  ******
00008                   ****** MINI-TIMS SOFTWARE DEVELOPMENT******
00009                   ****** VERSION 1.1******
00010                   ****************************************************
00011                   *
00012                   *
00013                   *OUTPUT DATA FORMAT TO HPIB PRINTER
00014                   *
00015                   *    +DDDD , DDDD(CR)(LF)
00016                   *OR
00017                   *    +DD.D , DDDD(CR)(LF)
00018                   *
00019                   *
00020                   ****************************************************
00021                   * HPIB TALK ROUTINE
00022                   * THIS ROUTINE TAKES THE OUTPUT DISPLAY DATA
00023                   * AS STORED IN HPREG1, 2, 3, 4 AND PUTS IT
00024                   * INTO THE PROPER DATA FORMAT AND HPIB COMPATABLE.
00025                   * IT DETECTS DECIMAL POINT AND PLACES IT ACCORDINGLY.
00026                   * SINCE ONLY 4 SPACES ARE ALLOWED FOR DATA, ONLY 3
00027                   * SIGNIFICANT FIGURES ARE AVAILABLE FOR DATA WITH DECIMAL
00028                   * POINT.  BLANKED DIGITS ARE INDICATED BY SPACES.  THIS
00029                   * ROUTINE CALLS HDSK TO HANDSHAKE THE INFORMATION ONTO
00030                   * THE HPIB.
00031                   *
00032                   ****************************************************
00033                   *
00034                   *
00035 5807 96 F6   HPTLK  LDA A  HPREG2      LOADS LSB OF LEFT SIDE
00036 5809 81 FF          CMP A  #$FF        SEE IF BLANKED
00037 580B 26 07          BNE    SRQ         BR IF NOT BLANKED
00038 580D 96 7D          LDA A  PROG+2
00039 580F 84 20          AND A  #$20        SEE IF NO POLARITY
00040 5811 26 01          BNE    SRQ         POLARITY THEREFORE OVER OR UNDER RAN
00041 5813 39             RTS                DISPLAY BLANKED  THEREFORE LINK-UP
00042 5814 96 F3   SRQ    LDA A  HSTAT1
00043 5816 85 40          BIT A  #$40        SEE IF SRQ OUTPUT
00044 5818 27 10          BEQ    NSRQ        BR IF SRQ OUTPUT NOT REQUESTED
00045 581A D6 F0          LDA B  HFPAN       GE FRONT PANEL
00046 581C C4 E0          AND B  #$E0        GET CONRRO:1 BITS
00047 581E C1 80          CMP B  #$80        SEE IF IN IMPULSE NOTE SE
00048 5820 26 08          BNE    SETIT       BR IF NOT IN IMPULSE NTISE    OISE
00049 5822 85 10          BIT A  #$10        SEE IF IMPSRQ FLAG IS SET
00050 5824 27 10          BEQ    NSRQ        BR IF NOT COMPLETE
00051 5826 84 EF          AND A  #$EF        RESET IMPSRQ BIT
00052 5828 97 F3          STA A  HSTAT1      RESTORE THE REGISTER
00053 582A C6 50   SETIT  LDA B  #$50
00054 582C D7 F4          STA B  HSTAT2      CREATE STATUS BYTE
00055 582E F6 3002        LDA B  HPIBP+2
00056 5831 C4 F7          AND B  #$F7
00057 5833 F7 3002        STA B  HPIBP+2     SETS SRQ BIT
00058 5836 F6 3002 NSRQ   LDA B  HPIBP+2
00059 5839 C5 80          BIT B  #$80        SEE IF TALKER ACTIVE STATE
00060 583B 27 0A          BEQ    LISTEN
00061 583D 85 80          BIT A  #$80        IS OUTPUT BIT SET
00062 583F 26 0E          BNE    CONFIG      BR IF BIT SET
00063 5841 85 20          BIT A  #$20        CONFIGURED TO TALK?
00064 5843 26 09          BNE    BYEALL      R BR IF CONFIGURED  ALREADY OUTPUTTE
00065 5845 20 08          BRA    CONFIG
00066                   *
00067 5847 85 20   LISTEN BIT A  #$20        SEE IF CONFIGURED TO LISTEN
00068 5849 27 03          BEQ    BYEALL
00069 584B BD 5CD7        JSR    CLSTN       CONFIGURE TO LISTEN
00070 584E 39      BYEALL RTS
00071                   *
00072 584F BD 5CF1 CONFIG JSR    CTALK       CONFIGURE TO TALK
00073 5852 B6 3002        LDA A  HPIBP+2
00074 5855 8A 08          ORA A  #$08        RESET SRQ BIT
00075 5857 B7 3002        STA A  HPIBP+2
00076 585A 7F 00F4        CLR    HSTAT2      CLEAR THE STATUS BYTE
```

```
00077 585D 96 F3          LDA A   HSTAT1    RESET OUTPUT BIT
00078 585F 84 7F          AND A   #$7F
00079 5861 97 F3          STA A   HSTAT1
00080 5863 96 F5          LDA A   HPREG1    SEE IF ERROR ON DISPLAY
00081 5865 81 BE          CMP A   #$BE
00082 5867 26 0B          BNE     LFTFLD    BR IF NO ERROR (NO "H-")
00083 5869 86 20          LDA A   #$20      SPACE
00084 586B BD 5C94        JSR     HDSK
00085 586E 86 99          LDA A   #$99
00086 5870 97 F5          STA A   HPREG1    LOADS "99" IN PLACE OF "H-"
00087 5872 20 21          BRA     HDIG1
00088 5874 96 7D  LFTFLD  LDA A   PROG+2    LOADS LEFT DISPLAY ANNUNCIATOR IMAGE
00089 5876 85 20          BIT A   #$20      IS SIGN PRESENT
00090 5878 27 08          BEQ     HSIGN     BR IF SIGN
00091 587A 86 20          LDA A   #$20      NO SIGN.  SPACE
00092 587C BD 5C94        JSR     HDSK      HANDSHAKE
00093 587F 28 14          BVC     HDIG1     BR IF NO PROBLEMS IN HANDSGAKE
00094 5881 39             RTS               HANDSHAKE ERROR  RTS
00095 5882 85 40  HSIGN   BIT A   #$40      PLUS OR MINUS
00096 5884 27 08          BEQ     HPLUS     BR IF PLUS
00097 5886 86 2D          LDA A   #$2D      MINUS
00098 5888 BD 5C94        JSR     HDSK      SHAKE IT
00099 588B 28 08          BVC     HDIG1     BR IF NO SHAKE PROBLEMS
00100 588D 39             RTS
00101 588E 86 2B  HPLUS   LDA A   #$2B      PLUS
00102 5890 BD 5C94        JSR     HDSK      SHAKE IT
00103 5893 29 1A          BVS     RTS1      BR IF HANDSHAKE ERROR  RTS
00104                *
00105 5895 96 F5  HDIG1   LDA A   HPREG1
00106 5897 43             COM A             CHECK IF BOTH DIGITS BLANKED (FF)
00107 5898 26 16          BNE     HBLAN1    BR IF ONE NOT BLANKED
00108 589A 96 7E          LDA A   PROG+3    BOTH BLANKED
00109 589C 85 20          BIT A   #$20      CHECK FOR DECIMAL POINT
00110 589F 26 08          BNE     HSPC1     BR IF D.P. SET (IGNORE MSD)
00111 58A0 86 20          LDA A   #$20      SPACE
00112 58A2 BD 5C94        JSR     HDSK      HANDSHAKE
00113 58A5 28 01          BVC     HSPC1     BR IF NO PROBLEMS
00114 58A7 39             RTS
00115 58A8 86 20  HSPC1   LDA A   #$20      SPACE FOR SECOND (FIRST) DIGIT
00116 58AA BD 5C94        JSR     HDSK
00117 58AD 28 2C          BVC     HDIG3
00118 58AF 39     RTS1    RTS
00119                *
00120 58B0 D6 7E  HBLAN1  LDA B   PROG+3
00121 58B2 C5 20          BIT B   #$20      CHECK FOR DECIMAL
00122 58B4 26 1A          BNE     HDIG2     BR IF DECIMAL PRINT
00123 58B6 43             COM A
00124 58B7 84 F0          AND A   #$F0      MASK OFF LOWER DIGIT
00125 58B9 81 F0          CMP A   #$F0      IS DIGIT BLANKED
00126 58BB 27 0C          BEQ     HSPC2     BR IF BLANKED
00127 58BD 44             LSR A             DIGIT NOT BLANKED
00128 58BE 44             LSR A             UNPACK
00129 58BF 44             LSR A
00130 58C0 44             LSR A
00131 58C1 83 30          ADD A   #$30      PUT INTO ACCII
00132 58C3 BD 5C94        JSR     HDSK      DUMP FIRST DIGIT (MDD)
00133 58C6 28 08          BVC     HDIG2     BR IF NO HDSK PROBLEMS
00134 58C8 39             RTS
00135                *
00136 58C9 86 20  HSPC2   LDA A   #$20      SPACE (IGNORED NSB DUE TO DP)
00137 58CB BD 5C94        JSR     HDSK
00138 58CE 29 0F          BVS     RTS1
00139                *
00140 58D0 96 F5  HDIG2   LDA A   HPREG1    LOADS B3 & B2
00141 58D2 84 0F          AND A   #$0F      MASK OFF UPPER DIGIT )B3)
00142 58D4 8B 30          ADD A   #$30
00143 58D6 BD 5C94        JSR     HDSK      B2 SENT
00144 58D9 29 04          BVS     RTS1
00145                *
00146 58DB 96 F6  HDIG3   LDA A   HPREG2    LOADS B1,B0
00147 58DD 43             COM A
00148 58DE 26 1C          BNE     HBLAN2    BR IF BOTH NOT BLANKED
00149 58E0 D6 7F          LDA B   PROG+3
00150 58E2 C5 20          BIT B   #$20      CKECK FOR D.P.
00151 58E4 27 07          BEQ     HSKIP     BR IF NO D.P.
```

```
00152 59E6 86 20            LDA A  #$20
00153 59E8 BD 5C94          JSR    HDSK    EXTRA SPACE FOR D.P.
00154 59EB 29 C2            BVS    RTS1
00155 59ED 86 20    HSKIP   LDA A  #$20
00156 59EF BD 5C94          JSR    HDSK    SPACE FOR B1 BLANKED
00157 59F2 29 BB            BVS    RTS1
00158 59F4 86 20            LDA A  #$20
00159 59F6 BD 5C94          JSR    HDSK    SPACE FOR B0 BLANKED
00160 59F9 28 33            BVC    HSPACE  GO TO TRIPLE SPACE
00161 59FB 39               RTS
00162                *
00163 59FC 43      HBLAN2   COM A          B1,B0
00164 59FD 84 F0            AND A  #$F0    MASK OF LOWER DIGIT
00165 59FF 81 F0            CMP A  #$F0
00166 5C01 27 0C            BEQ    HSPC3   BR IF B1 BLANKED DEFAULT B0 VALID
00167 5C03 44               LSR A          ALL DIGITS PRESENT
00168 5C04 44               LSR A          UNPACK AND SEND
00169 5C05 44               LSR A
00170 5C06 44               LSR A
00171 5C07 8B 30            ADD A  #$30    INTO ASCII
00172 5C09 BD 5C94          JSR    HDSK    OUTPUT B1
00173 5C0C 28 08            BVC    HDIG4
00174 5C0E 39               RTS
00175                *
00176 5C0F 86 20    HSPC3   LDA A  #$20    B1 BLANKED SPACE
00177 5C11 BD 5C94          JSR    HDSK    SPACE B1
00178 5C14 29 46            BVS    RTS2
00179                *
00180 5C16 D6 7E    HDIG4   LDA B  PROG+3
00181 5C18 C5 20            BIT B  #$20    CKECK FOR D.P.
00182 5C1A 27 07            BEQ    DSKIP   BR IF NO DP
00183 5C1C 86 2E            LDA A  #$2E
00184 5C1E BD 5C94          JSR    HDSK    DECIMAL POINT
00185 5C21 29 39            BVS    RTS2
00186 5C23 96 F6    DPSKIP  LDA A  HPREG2  LOADS B1,B0
00187 5C25 84 0F            AND A  #$0F    MASK B1
00188 5C27 8B 30            ADD A  #$30    ASCII
00189 5C29 BD 5C94          JSR    HDSK    SEND B0
00190 5C2C 29 2E            BVS    RTS2
00191                *
00192 5C2E 86 20    HSPACE  LDA A  #$20
00193 5C30 BD 5C94          JSR    HDSK    SPACE
00194 5C33 29 27            BVS    RTS2
00195 5C35 86 2C            LDA A  #$2C
00196 5C37 BD 5C94          JSR    HDSK    COMMA
00197 5C3A 29 20            BVS    RTS2
00198 5C3C 86 20            LDA A  #$20
00199 5C3E BD 5C94          JSR    HDSK    SPACE
00200 5C41 29 19            BVS    RTS2
00201                *
00202                *
00203 5C43 CE 00F7  RTFLD   LDX    #HPREG3 1ST REGISTER OF RIGHT FIELD
00204 5C46 20 01            BRA    RTFLD2
00205 5C48 08      RTFLD1   INX
00206 5C49 A6 00   RTFLD2   LDA A  X       LOAD WITH DATA IN LOC. INDEX REG.
00207 5C4B 43               COM A
00208 5C4C 26 0F            BNE    HBLAN3  BR IF NOT BLANKED
00209 5C4E 86 20            LDA A  #$20    BOTH DIGITS BLANKED
00210 5C50 BD 5C94          JSR    HDSK    SPACE
00211 5C53 29 07            BVS    RTS2
00212 5C55 86 20            LDA A  #$20
00213 5C57 BD 5C94          JSR    HDSK    SPACE
00214 5C5A 28 26            BVC    CRLF    BR CARRIAGE RET. LINE FEED
00215 5C5C 39      RTS2     RTS
00216 5C5D 43      HBLAN3   COM A
00217 5C5F 84 F0            AND A  #$F0    MASKS OUT LOWER DIGIT
00218 5C60 81 F0            CMP A  #$F0    IS UPPER DIGIT BLANKED
00219 5C62 27 0C            BEQ    HBLAN4  BR IF UPPER BIT BLANKED
00220 5C64 44               LSR A          UPPER BIT NOT BLANKED
00221 5C65 44               LSR A          UNPACK BITS
00222 5C66 44               LSR A
00223 5C67 44               LSR A
00224 5C68 8B 30            ADD A  #$30    PUT INTO ASCII
00225 5C6A BD 5C94          JSR    HDSK    OUTPUT UPPER BIT
00226 5C6D 28 08            BVC    RTFLD3  BR TO LOAD LOWER BIT
```

```
00227 5C6F 39                    RTS
00228 5C70 86 20     HBLAN4 LDA A  #$20
00229 5C72 BD 5C94          JSR    HDSK
00230 5C75 29 E5            BVS    RTS2
00231 5C77 A6 00     RTFLD3 LDA A  X
00232 5C79 84 0F            AND A  #$0F     MASK OFF UPPER BIT
00233 5C7B 8B 30            ADD A  #$30     INTO ASCII
00234 5C7D BD 5C94          JSR    HDSK
00235 5C80 29 DA            BVS    RTS2
00236 5C82 8C 00FB   CRLF   CPX    #HPREG4  HAS SECOND BYTE BEEN LOADED?
00237 5C85 26 C1            BNE    RTFLD1   BR IF NOT
00238 5C87 86 0D            LDA A  #$0D
00239 5C89 BD 5C94          JSR    HDSK     CARRIAGE RETURN
00240 5C8C 29 CE            BVS    RTS2
00241 5C8E 86 0A            LDA A  #$0A
00242 5C90 BD 5C94          JSR    HDSK     LINE FEED
00243 5C93 39                    RTS
00244                       *
00245                       *
00246                       ************************************************
00247                       * TALKER SOURCE HANDSHAKE SUBROUTINE
00248                       * THIS SUBROUTINE TAKES THE DATA IN A
00249                       * AND HANDSHAKES IT THRU HPIB.
00250                       ************************************************
00251                       *
00252                       *
00253 5C94 43        HDSK   COM A           INVERTS DATA FOR HPIB
00254 5C95 F6 3002          LDA B  HPIB+2
00255 5C98 53               COM B
00256 5C99 C4 03            AND B  #$03     CHECK IF NRFD AND NDAC HIGH
00257 5C9B 26 02            BNE    SHAKIT
00258 5C9D 0B               SEV             NRFD AND NDAC BOTH HIGH. ERROR
00259 5C9E 39               RTS
00260 5C9F B7 3000  SHAKIT  STA A  HPIB     PUTS DATA ON LINE
00261 5CA2 BD 5CC7  SHDSK   JSR    ADDTLK   MAKE SURE STILL ADDRESSED TO TALK
00262 5CA5 29 1F            BVS    RTS3     BR IF NOT ADDRESSED TO TALK
00263 5CA7 F6 3002          LDA B  HPIB+2   UPDATE
00264 5CAA C5 02            BIT B  #$02
00265 5CAC 27 F4            BEQ    SHDSK    WAIT FOR NRFD TO GO HIGH
00266                       *               READY FOR DATA
00267 5CAE 86 08            LDA A  #$08     SET DAV LOW (ASSUMES SRQ HIGH)
00268 5CB0 B7 3002          STA A  HPIB+2
00269 5CB3 BD 5CC7  NDAC    JSR    ADDTLK   MAKE SURE STILL ADDRESSED TO TALK
00270 5CB6 29 0E            BVS    RTS3     BR IF NOT ADDRESSED TO TALK
00271 5CB8 F6 3002          LDA B  HPIB+2
00272 5CBB 56               ROR B
00273 5CBC 24 F5            BCC    NDAC     WAIT FOR NDAC TO GO HIGH
00274 5CBE 86 0F            LDA A  #$0F
00275 5CC0 B7 3002          STA A  HPIB+2   DAV HIGH, SRQ HIGH
00276 5CC3 BD 5CC7          JSR    ADDTLK   MAKE SURE STILL TALKER
00277 5CC6 39        RTS3   RTS
00278                       *
00279                       *
00280                       * SUBROUTINES
00281                       *
00282 5CC7 F6 3002  ADDTLK  LDA B  HPIB+2
00283 5CCA 2B 09            BMI    TLKOK
00284 5CCC C5 40            BIT B  #$40
00285 5CCE 26 05            BNE    TLKOK
00286 5CD0 BD 5CD7  TLKNOK  JSR    CLSTN
00287 5CD3 0B               SEV
00288 5CD4 39               RTS
00289 5CD5 0A        TLKOK  CLV
00290 5CD6 39               RTS
00291                       *
00292 5CD7 7F 3001  CLSTN   CLR    HPIB+1   CLEARS CONTROL REGISTER A SIDE
00293 5CDA 7F 3000          CLR    HPIB     A DATA DIRECTION REG
00294 5CDD C6 2D            LDA B  #$2D     SET CONTROL REGISTER A SIDE
00295 5CDF F7 3001          STA B  HPIB+1   A CONT REG
00296 5CE2 B6 3002          LDA A  HPIB+2   B SIDE
00297 5CE5 8A 04            ORA A  #$04     RESET DAV LINE
00298 5CE7 B7 3002          STA A  HPIB+2
00299 5CEA 86 DF            LDA A  #$DF
00300 5CEC 94 F3            AND A  HSTAT1
00301 5CEE 97 F3            STA A  HSTAT1   SET LISTNER FLAG
00302 5CF0 39               RTS
```

```
00303                        *
00304                        *
00305 5CF1 C6 FF     CTALK   LDA B   #$FF
00306 5CF3 F7 3000           STA B   HPIBP     SET DATA LINE HI
00307 5CF6 7F 3001           CLR     HPIBP+1   SET CONTROL REG A TO 00
00308 5CF9 F7 3000           STA B   HPIBP     SET DDR
00309 5CFC 86 30             LDA A   #$30
00310 5CFE B7 3001           STA A   HPIBP+1   SET CONTROL REG A
00311 5D01 86 20             LDA A   #$20
00312 5D03 9A F3             ORA A   HSTAT1
00313 5D05 97 F3             STA A   HSTAT1    SETS TALKER FLAG
00314 5D07 39              RTS

00002                        *
00003                        *
00004                        ****************************************************
00005                        * SERIAL POLL ROUTINE
00006                        * THIS ROUTINE IS ENTERED BY THE INTERRUPT SERVICE ROUTINE.
00007                        * IT CLEARS THE SERVICE REQUEST LINE AND SENDS THE STATUS
00008                        * BYTE TO THE CONTROLLER.  IT ALSO CLEARS THE INTERRUPT
00009                        * OUTPUT FLAG IF IT WAS SET.
00010                        ****************************************************
00011                        *
00012                        *
00013                        * STBYTE
00014                        *
00015                        *  B7  *  B6  *  B5  *  B4  *  B3  *  B2  *  B1  *  B0  *
00016                        ****************************************************
00017                        * NOT  *      *      *OUTPUT*      *      *      *      *
00018                        *      * RQS  *ERROR *------*UNDEF *  E2  *  E1  *  E0  *
00019                        * USED *      *      * BUSY *      *      *      *      *
00020                        ****************************************************
00021                        *
00022                        *
00023 5D08 F6 3002   SPOLL   LDA B   HPIBP+2   CLEARS INTERRUPT FLAG
00024 5D0B CA 08             ORA B   #$08
00025 5D0D F7 3002           STA B   HPIBP+2   CLEARS SRQ
00026 5D10 96 F3             LDA A   HSTAT1
00027 5D12 85 40             BIT A   #$40
00028 5D14 27 00             BEQ     SPOLL2    BR IF NO INTERRUPT OUTPUT
00029 5D16 BD 5CF1   SPOLL2  JSR     CTALK     NOT CONFIGURED. DOIT
00030 5D19 96 F4             LDA A   HSTAT2
00031 5D1B BD 5C94           JSR     HDSK
00032 5D1E BD 5CD7           JSR     CLSTN
00033 5D21 7F 00F4           CLR     HSTAT2
00034 5D24 39              RTS
00035                        *
00036                        *

00001                        *
00002                        *
00003                        ****************************************************
00004                        * BEGINNING OF LINK TABLE
00005                        * THIS TABLE CONTAINS VECTORS TO THE ENTRY POINTS
00006                        * OF THE RECORD TABLE. THE NUMBER OF LINKS PER
00007                        * MEASUREMENT VARY DEPENDENT UPON THE NUMBER OF
00008                        * SWITCHES ACTIVE IN THAT MEASUREMENT.
00009                        ****************************************************
00010                        *
00011                        *
00012                        * LEVEL/FREQUENCY PROGRAM LINKS.
00013 5D25 45       TABLE   FCC     '8,EXTRA!'
      5D26 58
      5D27 54
      5D28 52
      5D29 41
      5D2A 21
      5D2B 20
      5D2C 20
00014 5D2D 5E21             FDB     LRSSTM
00015 5D2F 5E21             FDB     LRSSTM
00016 5D31 5E1D             FDB     LRSMTS
00017 5D33 5E1D             FDB     LRSMTS
```

```
00018 5035 5E09            FDB     LNRCVR
00019 5037 5E05            FDB     LNXMIT
00020 5039 5E09            FDB     LNRCVR
00021 503B 5E05            FDB     LNXMIT
00022 503D 5E19            FDB     LRMSTR
00023 503F 5E15            FDB     LRMSTT
00024 5041 5E11            FDB     LRMMTR
00025 5043 5E0D            FDB     LRMMTT
00026              * C-MESSAGE NOISE PROGRAM LINKS.
00027 5045 45              FCC     8,EXTRA!
      5046 58
      5047 54
      5048 52
      5049 41
      504A 21
      504B 20
      504C 20
00028 504D 5E41            FDB     CRSSTM
00029 504F 5E41            FDB     CRSSTM
00030 5051 5E3D            FDB     CRSMTS
00031 5053 5E3D            FDB     CRSMTS
00032 5055 5E29            FDB     CNRCVR
00033 5057 5E25            FDB     CNXMIT
00034 5059 5E29            FDB     CNRCVR
00035 505B 5E25            FDB     CNXMIT
00036 505D 5E39            FDB     CRMSTR
00037 505F 5E35            FDB     CRMSTT
00038 5061 5E31            FDB     CRMMTR
00039 5063 5E2D            FDB     CRMMTT
00040              * NOISE-WITH-TONE PROGRAM LINKS.
00041 5065 45              FCC     8,EXTRA!
      5066 58
      5067 54
      5068 52
      5069 41
      506A 21
      506B 20
      506C 20
00042 506D 5E61            FDB     NRSSTM
00043 506F 5E61            FDB     NRSSTM
00044 5071 5E5D            FDB     NRSMTS
00045 5073 5E5D            FDB     NRSMTS
00046 5075 5E49            FDB     NNRCVR
00047 5077 5E45            FDB     NNXMIT
00048 5079 5E49            FDB     NNRCVR
00049 507B 5E45            FDB     NNXMIT
00050 507D 5E59            FDB     NRMSTR
00051 507F 5E55            FDB     NRMSTT
00052 5081 5E51            FDB     NRMMTR
00053 5083 5E4D            FDB     NRMMTT
00054              * SIGNAL-TO-NOISE RATIO PROGRAM LINKS.
00055 5085 45              FCC     8,EXTRA!
      5086 58
      5087 54
      5088 52
      5089 41
      508A 21
      508B 20
      508C 20
00056 508D 5E81            FDB     SRSSTM
00057 508F 5E81            FDB     SRSSTM
00058 5091 5E7D            FDB     SRSMTS
00059 5093 5E7D            FDB     SRSMTS
00060 5095 5E69            FDB     SNRCVR
00061 5097 5E65            FDB     SNXMIT
00062 5099 5E69            FDB     SNRCVR
00063 509B 5E65            FDB     SNXMIT
00064 509D 5E79            FDB     SRMSTR
00065 509F 5E75            FDB     SRMSTT
00066 50A1 5E71            FDB     SRMMTR
00067 50A3 5E6D            FDB     SRMMTT
00068              * IMPULSE NOISE PROGRAM LINKS.
00069 50A5 45              FCC     8,EXTRA!
      50A6 58
      50A7 54
```

```
              5DA8 52
              5DA9 41
              5DAA 21
              5DAB 20
              5DAC 20
00070 5DAD 5EA1          FDB     TRSSTM
00071 5DAF 5EA1          FDB     TRSSTM
00072 5DB1 5E9D          FDB     TRSMTS
00073 5DB3 5E9D          FDB     TRSMTS
00074 5DB5 5E89          FDB     INRCVR
00075 5DB7 5E85          FDB     INXMIT
00076 5DB9 5E89          FDB     INRCVR
00077 5DBB 5E85          FDB     INXMIT
00078 5DBD 5E99          FDB     IRMSTR
00079 5DBF 5E95          FDB     IRMSTT
00080 5DC1 5E91          FDB     IRMMTR
00081 5DC3 5E8D          FDB     IRMMTT
00082               * ENVELOPE DELAY DISTORTION PROGRAM LINKS.
00083 5DC5 45           FCC     8,EXTRA!
      5DC6 58
      5DC7 54
      5DC8 52
      5DC9 41
      5DCA 21
      5DCB 20
      5DCC 20
00084 5DCD 5EC5          FDB     EDSSTM
00085 5DCF 5EC5          FDB     EDSSTM
00086 5DD1 5EC9          FDB     EDSMTS
00087 5DD3 5EC9          FDB     EDSMTS
00088 5DD5 5EB1          FDB     EDNRTR
00089 5DD7 5EA9          FDB     EDNRTT
00090 5DD9 5EAD          FDB     EDNVMR
00091 5DDB 5EA5          FDB     EDNVMT
00092 5DDD 5EB9          FDB     EDMSTR
00093 5DDF 5EB5          FDB     EDMSTT
00094 5DE1 5EC1          FDB     EDMMTR
00095 5DE3 5EBD          FDB     EDMMTT
00096               * ENVELOPE DELAY DISTORTION,LEVEL MONITOR,PROGRAM LINKS.
00097 5DE5 45           FCC     8,EXTRA!
      5DE6 58
      5DE7 54
      5DE8 52
      5DE9 41
      5DEA 21
      5DEB 20
      5DEC 20
00098 5DED 5EED          FDB     ELSSTM
00099 5DEF 5EED          FDB     ELSSTM
00100 5DF1 5EF1          FDB     ELSMTS
00101 5DF3 5EF1          FDB     ELSMTS
00102 5DF5 5ED9          FDB     ELNRTR
00103 5DF7 5ED1          FDB     ELNRTT
00104 5DF9 5ED5          FDB     ELNVMR
00105 5DFB 5ECD          FDB     ELNVMT
00106 5DFD 5EF1          FDB     ELMSTR
00107 5DFF 5EDD          FDB     ELMSTT
00108 5E01 5EE9          FDB     ELMMTR
00109 5E03 5EE5          FDB     ELMMTT
00111               *
00112               *
00113               ***********************************************************
00114               * BEGINNING OF RECORD TABLE
00115               **********FORMAT OF RECORD TABLE**********
00116               * NAME FCB %XXXXXXXX    AUTORANGE PROGRAM
00117               *      FCB %XXXXXXXX    TRANSMIT PROGRAM
00118               *      FCB %XXXXXXXX    LEFT DISPLAY ANNUNCIATOR
00119               *      FCB %XXXXXXXX    RIGHT DISPLAY ANNUNCIATOR
00120               ***********************************************************
00121               *
00122               *
00123               *
00124               *
00125               * RECEIVER PROGRAMMING LATCH CONFIGURATION
00126               * A1 A0    PROG. CONTROL
```

```
00127       *  0  0     FLAT RECEIVER
00128       *  0  1     NOTCH RECEIVER
00129       *  1  0     MONITOR TRANSMITTER
00130       *  1  1     FLAT RECEIVER
00131       *
00132       *   B7       B6       B5       B4       B3       B2       B1       B0
00133       ***********************************************************
00134       *        *        *  AR2   *  AR1   *  AR0   *        *        *IMPLSE*
00135       *LQRMS *HCMESS*--------*--------*--------*  A1    *  A0    *--------*
00136       *        *        *  MSB   *        *  LSB   *        *        * NOTSE *
00137       ***********************************************************
00138       *
00139       *
00141       *
00142       *
00143       * TRANSMITTER PROGRAMMING LATCH CONFIGURATION
00144       *
00145       *   B7       B6       B5       B4       B3       B2       B1       B0
00146       ***********************************************************
00147       *        *        *        *        *        *        *        *        *
00148       * HLAR * LMTF * LFXF * HQTM * HRB3 * HTB3 * HSCK * LCOM *
00149       *        *        *        *        *        *        *        *        *
00150       ***********************************************************
00151       *
00152       * TRANSMITTER PROGRAMMING PRECEDENCE
00153       * D/T => DIAL/TALK
00154       * HSCK => SELF CHECK
00155       * HQTM => QUIET TERMINATE THE TRANSMITTER
00156       * HLAR => DATA LEVEL LOOP AROUND
00157       * REMAINDER OF CONTROL BITS HAVE INDEPENDENT CONTROL
00158       *
00159       *
00160       *
00161       *
00162       * LEFT DISPLAY ANNUNCIATOR PROGRAMMING LATCH
00163       *
00164       *   B7       B6       B5       B4       B3       B2       B1       B0
00165       ***********************************************************
00166       *        *POLAR *POLAR *        *        *MICRO *        *        *
00167       * OVF  *        *        *   DB  *DBRNC *        *  DBM  *SLAVE *
00168       *        *SELECT*ENABLE*        *        * SEC   *        *        *
00169       ***********************************************************
00170       *

00172       *
00173       * RIGHT DISPLAY ANNUNCIATOR PROGRAMMING LATCH
00174       *
00175       *   B7       B6       B5       B4       B3       B2       B1       B0
00176       ***********************************************************
00177       * SLAVE*MASTER*        * TRMT *  IN   *        *  RCV  *        *
00178       *        *        *  D.P. *        *        *COUNTS*        * HPTB *
00179       * IND  *  IND  *        *        *  HZ   *PROCES*        *  HZ   *
00180       ***********************************************************
00181       *
00182       *
00183       *
00184       *
00185       * SYSTEM HARDWARE PROGRAMMING LATCH CONFIGURATION
00186       * A1 A0    DATA SELECT LINES
00187       *  0  0    LOG QUANTIZER DATA
00188       *  0  1    FREQUENCY DATA
00189       *  1  0    IMPULSE NOISE DATA
00190       *  1  1    ENVELOPE DELAY DISTORTION DATA
00191       *
00192       *   B7       B6       B5       B4       B3       B2       B1       B0
00193       ***********************************************************
00194       * FREQ *        *        * EDD  * LOG  *COUNTR* EDD  * EDD  *
00195       *        *  A1   *  A0   *        *        *        *        *        *
00196       * GATE *        *        * GATE * GATE * RST  * RST  *TRNSFR*
00197       ***********************************************************
00198       *
00199       *
```

```
00201              *
00202              *
00203              * LEVEL/FREQUENCY,NORMAL,TRANSMIT.
00204 5E05 BC      LNXMIT FC3    %10111100
00205 5E06 21             FC3    %00100001
00206 5E07 E2             FC3    %11100010
00207 5E08 30             FC3    %00110000
00208              * LEVEL/FREQUENCY,NORMAL,RECEIVE
00209 5E09 BE      LNRCVR FC3    %10111110
00210 5E0A 61             FC3    %01100001
00211 5E0B E2             FC3    %11100010
00212 5E0C 22             FC3    %00100010
00213              * LEVEL,MASTER,MASTER-TO-SLAVE,TRANSMIT.
00214 5E0D BC      LRMMTT FC3    %10111100
00215 5E0E 21             FC3    %00100001
00216 5E0F E2             FC3    %11100010
00217 5E10 30             FC3    %00110000
00218              * LEVEL,MASTER,MASTER-TO-SLAVE,RECEIVE.
00219 5E11 BE      LRMMTR FC3    %10111110
00220 5E12 21             FC3    %00100001
00221 5E13 F1             FC3    %11110001
00222 5E14 70             FC3    %01110000
00223              * LEVEL,MASTER,SLAVE-TO-MASTER,TRANSMIT.
00224 5E15 BC      LRMSTT FC3    %10111100
00225 5E16 21             FC3    %00100001
00226 5E17 E2             FC3    %11100010
00227 5E18 30             FC3    %00110000
00228              * LEVEL,MASTER,SLAVE-TO-MASTER,RECEIVE.
00229 5E19 BE      LRMSTR FC3    %10111110
00230 5E1A 60             FC3    %01100000
00231 5E1B E2             FC3    %11100010
00232 5E1C A2             FC3    %10100010
00233              * LEVEL,SLAVE,MASTER-TO-SLAVE.
00234 5E1D BE      LRSMTS FC3    %10111110
00235 5E1E 60             FC3    %01100000
00236 5E1F E3             FC3    %11100011
00237 5E20 40             FC3    %01000000
00238              * LEVEL,SLAVE,SLAVE-TO-MASTER.
00239 5E21 BE      LRSSTM FC3    %10111110
00240 5E22 41             FC3    %01000001
00241 5E23 E3             FC3    %11100011
00242 5E24 80             FC3    %10000000
00243              * C-MESSAGE NOISE,NORMAL,TRANSMIT.
00244 5E25 BC      CNXMIT FC3    %10111100
00245 5E26 11             FC3    %00010001
00246 5E27 E2             FC3    %11100010
00247 5E28 00             FC3    %00000000
00248              * C-MESSAGE NOISE,NORMAL,RECEIVE.
00249 5E29 5E      CNRCVR FC3    %01011110
00250 5E2A 51             FC3    %01010001
00251 5E2B E8             FC3    %11101000
00252 5E2C 00             FC3    %00000000
00253              * C-MESSAGE NOISE,MASTER,MASTER-TO-SLAVE,TRANSMIT.
00254 5E2D BC      CRMMTT FC3    %10111100
00255 5E2E 11             FC3    %00010001
00256 5E2F E2             FC3    %11100010
00257 5E30 00             FC3    %00000000
00258              * C-MESSAGE NOISE,MASTER,MASTER-TO-SLAVE,RECEIVE.
00259 5E31 5E      CRMMTR FC3    %01011110
00260 5E32 51             FC3    %01010001
00261 5E33 E9             FC3    %11101001
00262 5E34 40             FC3    %01000000
00263              * C-MESSAGE NOISE,MASTER,SLAVE-TO-MASTER,TRANSMIT.
00264 5E35 BC      CRMSTT FC3    %10111100
00265 5E36 11             FC3    %00010001
00266 5E37 E2             FC3    %11100010
00267 5E38 00             FC3    %00000000
00268              * C-MESSAGE NOISE,MASTER,SLAVE-TO-MASTER,RECEIVE.
00269 5E39 5E      CRMSTR FC3    %01011110
00270 5E3A 40             FC3    %01000000
00271 5E3B E9             FC3    %11101001
00272 5E3C 80             FC3    %10000000
00273              * C-MESSAGE,SLAVE,MASTER-TO-SLAVE
00274 5E3D 7E      CRSMTS FC3    %01111110
00275 5E3E 40             FC3    %01000000
```

```
00276 5E3F E9            FC3     %11101001
00277 5E40 40            FC3     %01000000
00278           * C-MESSAGE NOISE,SLAVE,SLAVE-TO-MASTER.
00279 5E41 BE    CRSSTM  FC3     %10111110
00280 5E42 11            FC3     %00010001
00281 5E43 E9            FC3     %11101001
00282 5E44 80            FC3     %10000000
00283           * NOISE-WITH-TONE,NORMAL,TRANSMIT.
00284 5E45 BC    NNXMIT  FC3     %10111100
00285 5E46 01            FC3     %00000001
00286 5E47 E2            FC3     %11100010
00287 5E48 30            FC3     %00110000
00288           * NOISE-WITH-TONE,NORMAL,RECEIVE.
00289 5E49 5A    NNRCVR  FC3     %01011010
00290 5E4A 41            FC3     %01000001
00291 5E4B E8            FC3     %11101000
00292 5E4C 02            FC3     %00000010
00293           * NOISE-WITH-TONE,MASTER,MASTER-TO-SLAVE,TRANSMIT.
00294 5E4D BC    NRMMTT  FC3     %10111100
00295 5E4E 01            FC3     %00000001
00296 5E4F E2            FC3     %11100010
00297 5E50 30            FC3     %00110000
00298           * NOISE-WITH-TONE,MASTER,MASTER-TO-SLAVE,RECEIVE.
00299 5E51 9E    NRMMTR  FC3     %10011110
00300 5E52 01            FC3     %00000001
00301 5E53 E9            FC3     %11101001
00302 5E54 50            FC3     %01010000
00303           * NOISE-WITH-TONE,MASTER,SLAVE-TO-MASTER,TRANSMIT.
00304 5E55 BC    NRMSTT  FC3     %10111100
00305 5E56 01            FC3     %00000001
00306 5E57 42            FC3     %01000010
00307 5E58 22            FC3     %00100010
00308           * NOISE-WITH-TONE,MASTER,SLAVE-TO-MASTER,RECEIVE.
00309 5E59 5A    NRMSTR  FC3     %01011010
00310 5E5A 68            FC3     %01101000
00311 5E5B 88            FC3     %10001000
00312 5E5C 82            FC3     %10000010
00313           * NOISE-WITH-TONE,SLAVE,MASTER-TO-SLAVE.
00314 5E5D 5A    NRSMTS  FC3     %01011010
00315 5E5E 28            FC3     %00101000
00316 5E5F E9            FC3     %11101001
00317 5E60 42            FC3     %01000010
00318           * NOISE-WITH-TONE,SLAVE,SLAVE-TO-MASTER.
00319 5E61 BE    NRSSTM  FC3     %10111110
00320 5E62 01            FC3     %00000001
00321 5E63 E9            FC3     %11101001
00322 5E64 82            FC3     %10000010
00323           * SIGNAL-TO-NOISE,NORMAL,TRANSMIT.
00324 5E65 BC    SNXMIT  FC3     %10111100
00325 5E66 01            FC3     %00000001
00326 5E67 A2            FC3     %10100010
00327 5E68 30            FC3     %00110000
00328           * SIGNAL-TO-NOISE,NORMAL,RECEIVE.
00329 5E69 7E    SNRCVR  FC3     %01111110
00330 5E6A 41            FC3     %01000001
00331 5E6B 80            FC3     %10110000
00332 5E6C 02            FC3     %00000010
00333           * SIGNAL-TO-NOISE,MASTER,MASTER-TO-SLAVE,TRANSMIT.
00334 5E6D BC    SRMMTT  FC3     %10111100
00335 5E6E 01            FC3     %00000001
00336 5E6F A2            FC3     %10100010
00337 5E70 30            FC3     %00110000
00338           * SIGNAL-TO-NOISE,MASTER,MASTER-TO-SLAVE,RECEIVE.
00339 5E71 BE    SRMMTR  FC3     %10111110
00340 5E72 01            FC3     %00000001
00341 5E73 B1            FC3     %10110000
00342 5E74 50            FC3     %01010000
00343           * SIGNAL-TO-NOISE,MASTER,SLAVE-TO-MASTER,TRANSMIT
00344 5E75 BC    SRMSTT  FC3     %10111100
00345 5E76 01            FC3     %00000001
00346 5E77 A2            FC3     %10100010
00347 5E78 30            FC3     %00110000
00348           * SIGNAL-TO-NOISE,MASTER,SLAVE-TO-MASTER,RECEIVE.
00349 5E79 7E    SRMSTR  FC3     %01111110
00350 5E7A 40            FC3     %01000000
```

```
00351 5E7B 80            FCB    %10110000
00352 5E7C 82            FCB    %10000010
00353         * SIGNAL-TO-NOISE,SLAVE,MASTER-TO-SLAVE.
00354 5E7D 7E    SRSMTS  FCB    %01111110
00355 5E7E 40            FCB    %01000000
00356 5E7F 81            FCB    %10110001
00357 5E80 40            FCB    %01000000
00358         * SIGNAL-TO-NOISE,SLAVE,SLAVE-TO-MASTER.
00359 5E81 BE    SRSSTM  FCB    %10111110
00360 5E82 41            FCB    %01000001
00361 5E83 81            FCB    %10110001
00362 5E84 80            FCB    %10000000
00363         * IMPULSE NOISE,NORMAL,TRANSMIT.
00364 5E85 BC    INXMIT  FCB    %10111100
00365 5E86 41            FCB    %01000001
00366 5E87 A2            FCB    %10100010
00367 5E88 30            FCB    %00110000
00368         * IMPULSE NOISE,NORMAL,RECEIVE.
00369 5E89 7B    INRCVR  FCB    %01111011
00370 5E8A 41            FCB    %01000001
00371 5E8B A0            FCB    %10100000
00372 5E8C 04            FCB    %00000100
00373         * IMPULSE NOISE,MASTER,MASTER-TO-SLAVE,TRANSMIT.
00374 5E8D BC    TRMMTT  FCB    %10111100
00375 5E8E 61            FCB    %01100001
00376 5E8F A2            FCB    %10100010
00377 5E90 30            FCB    %00110000
00378         * IMPULSE NOISE,MASTER,MASTER-TO-SLAVE,RECEIVE.
00379 5E91 BE    TRMMTR  FCB    %10111110
00380 5E92 41            FCB    %01000001
00381 5E93 A1            FCB    %10100001
00382 5E94 04            FCB    %01000100
00383         * IMPULSE NOISE,MASTER,SLAVE-TO-MASTER,TRANSMIT.
00384 5E95 BC    TRMSTT  FCB    %10111100
00385 5E96 61            FCB    %01100001
00386 5E97 A2            FCB    %10100010
00387 5E98 30            FCB    %00110000
00388         * IMPULSE NOISE,MASTER,SLAVE-TO-MASTER,RECEIVE.
00389 5E99 7B    TRMSTR  FCB    %01111011
00390 5E9A 40            FCB    %01000000
00391 5E9B A0            FCB    %10100000
00392 5E9C 84            FCB    %10000100
00393         * IMPULSE NOISE,SLAVE,MASTER-TO-SLAVE.
00394 5E9D 7B    TRSMTS  FCB    %01111011
00395 5E9E 40            FCB    %01000000
00396 5E9F A1            FCB    %10100001
00397 5EA0 04            FCB    %01000100
00398         * IMPULSE NOISE,SLAVE,SLAVE-TO-MASTER.
00399 5EA1 7B    TRSSTM  FCB    %01111011
00400 5EA2 41            FCB    %01000001
00401 5EA3 A1            FCB    %10100001
00402 5EA4 84            FCB    %10000100
00403         * ENVELOPE DELAY,DELAY,NORMAL,NORMAL,TRANSMIT
00404 5EA5 BE    EDNNMT  FCB    %10111110
00405 5EA6 25            FCB    %00100101
00406 5EA7 A4            FCB    %10100100
00407 5EA8 10            FCB    %00010000
00408         * ENVELOPE DELAY,DELAY,NORMAL,REPEAT,TRANSMIT.
00409 5EA9 BE    EDNRTT  FCB    %10111110
00410 5EAA 29            FCB    %00101001
00411 5EAB A0            FCB    %10100000
00412 5EAC 10            FCB    %00010000
00413         * ENVELOPE DELAY,DELAY,NORMAL,NORMAL,RECEIVE.
00414 5EAD BE    EDNNMR  FCB    %10111110
00415 5EAE 65            FCB    %01100101
00416 5EAF A4            FCB    %10100100
00417 5EB0 02            FCB    %00000010
00418         * ENVELOPE DELAY,DELAY,NORMAL,REPEAT,RECEIVE.
00419 5EB1 BE    EDNRTR  FCB    %10111110
00420 5EB2 69            FCB    %01101001
00421 5EB3 A0            FCB    %10100000
00422 5EB4 02            FCB    %00000010
00423         * ENVELOPE DELAY,DELAY,MASTER,SLAVE-TO-MASTER,TRANSMIT.
00424 5EB5 BE    EDMSTT  FCB    %10111110
00425 5EB6 24            FCB    %00100100
```

```
00426 5EB7 A4              FCB     %10100100
00427 5EB8 10              FCB     %00010000
00428              *ENVELOPE DELAY,DELAY,MASTER,SLAVE-TO-MASTER,RECEIVE.
00429 5EB9 BE     EDMSTR   FCB     %10111110
00430 5EBA 64              FCB     %01100100
00431 5EBB A4              FCB     %10100100
00432 5EBC 82              FCB     %10000010
00433              * ENVELOPE DELAY,DELAY,MASTER,MASTER-TO-SLAVE,TRANSMIT.
00434 5EBD BE     EDMMTT   FCB     %10111110
00435 5EBE 25              FCB     %00100101
00436 5EBF A4              FCB     %10100100
00437 5EC0 10              FCB     %00010000
00438              * ENVELOPE DELAY,DELAY,MASTER,MASTER-TO-SLAVE,RECEIVE.
00439 5EC1 BE     EDMMTR   FCB     %10111110
00440 5EC2 25              FCB     %00100101
00441 5EC3 A5              FCB     %10100101
00442 5EC4 50              FCB     %01010000
00443              * ENVELOPE DELAY,DELAY,SLAVE,SLAVE-TO-MASTER.
00444 5EC5 BE     EDSSTM   FCB     %10111110
00445 5EC6 09              FCB     %00001001
00446 5EC7 A5              FCB     %10100101
00447 5EC8 80              FCB     %10000000
00448              * ENVELOPE DELAY,DELAY,SLAVE,MASTER-TO-SLAVE.
00449 5EC9 BE     EDSMTS   FCB     %10111110
00450 5ECA 09              FCB     %00001001
00451 5ECB A5              FCB     %10100101
00452 5ECC 40              FCB     %01000000
00453              * ENVELOPE DELAY,LEVEL,NORMAL,TRANSMIT.
00454 5ECD BC     ELNVMT   FCB     %10111100
00455 5ECE 25              FCB     %00100101
00456 5ECF A2              FCB     %10100010
00457 5ED0 30              FCB     %00110000
00458              * ENVELOPE DELAY,LEVEL,REPEAT,TRANSMIT.
00459 5ED1 BC     ELNRTT   FCB     %10111100
00460 5ED2 29              FCB     %00101001
00461 5ED3 A2              FCB     %10100010
00462 5ED4 30              FCB     %00110000
00463              * ENVELOPE DELAY,LEVEL,NORMAL,RECEIVE.
00464 5ED5 BE     ELNVMR   FCB     %10111110
00465 5ED6 65              FCB     %01100101
00466 5ED7 A2              FCB     %10100010
00467 5ED8 22              FCB     %00100010
00468              * ENVELOPE DELAY,LEVEL,REPEAT,RECEIVE.
00469 5ED9 BE     ELNRTR   FCB     %10111110
00470 5EDA 69              FCB     %01101001
00471 5EDB A2              FCB     %10100010
00472 5EDC 22              FCB     %00100010
00473              * ENVELOPE DELAY,LEVEL,MASTER,SLAVE-TO-MASTER,TRANSMIT.
00474 5EDD BC     ELMSTT   FCB     %10111100
00475 5EDE 25              FCB     %00100101
00476 5EDF A2              FCB     %10100010
00477 5EE0 30              FCB     %00110000
00478              * ENVELOPE DELAY,LEVEL,MASTER,SLAVE-TO-MASTER,RECEIVE.
00479 5EE1 1C     FLMSTR   FCB     %00011100
00480 5EE2 08              FCB     %00001000
00481 5EE3 04              FCB     %00000100
00482 5EE4 45              FCB     %01000101
00483              * ENVELOPE DELAY,LEVEL,MASTER,MASTER-TO-SLAVE,TRANSMIT.
00484 5EE5 BC     FLMMTT   FCB     %10111100
00485 5EE6 25              FCB     %00100101
00486 5EE7 A2              FCB     %10100010
00487 5EE8 30              FCB     %00110000
00488              * ENVELOPE DELAY,LEVEL,MASTER,MASTER-TO-SLAVE,RECEIVE.
00489 5EE9 1C     FLMMTR   FCB     %00011100
00490 5EEA 00              FCB     %00000000
00491 5EEB C4              FCB     %11000100
00492 5EEC C6              FCB     %11000110
00493              * ENVELOPE DELAY,LEVEL,SLAVE,SLAVE-TO-MASTER.
00494 5EED 1C     FLSSTM   FCB     %00011100
00495 5EEE 00              FCB     %00000000
00496 5EEF 20              FCB     %00100000
00497 5EF0 01              FCB     %00000001
00498              * ENVELOPE DELAY,LEVEL,SLAVE,MASTER-TO-SLAVE.
00499 5EF1 1C     FLSMTS   FCB     %00011100
00500 5EF2 08              FCB     %00001000
```

```
00501 5EF3 20            FC3    %00100000
00502 5EF4 02            FC3    %00000010

00002                *
00003                *
00004                ******
00005                *
00006                * TABLE OF SUPERVISORY COMMANDS FOR MASTER-SLAVE OPERATION
00007                *
00008                ******
00009                *
00010                *
00011                *
00012 5EF5 08   TABLE2 FC3   %00001000
00013 5EF6 02          FC3   %00000010
00014                *
00015 5EF7 0C          FC3   %00001100
00016 5EF8 06          FC3   %00000110
00017                *
00018 5EF9 28          FC3   %00101000
00019 5EFA 0A          FC3   %00001010
00020                *
00021 5EFB 2C          FC3   %00101100
00022 5EFC 0E          FC3   %00001110
00023                *
00024 5EFD 48          FC3   %01001000
00025 5EFE 1A          FC3   %00011010
00026                *
00027 5EFF 4C          FC3   %01001100
00028 5F00 1E          FC3   %00011110
00029                *
00030 5F01 68          FC3   %01101000
00031 5F02 2A          FC3   %00101010
00032                *
00033 5F03 6C          FC3   %01101100
00034 5F04 2E          FC3   %00101110
00035                *
00036 5F05 88          FC3   %10001000
00037 5F06 3A          FC3   %00111010
00038                *
00039 5F07 8C          FC3   %10001100
00040 5F08 3E          FC3   %00111110
00041                *
00042 5F09 A8          FC3   %10101000
00043 5F0A 6A          FC3   %01101010
00044                *
00045 5F0B AC   FTABLM FC3   %10101100
00046 5F0C 6E   FTABLS FC3   %01101110
00047                *
00001                *
00003                *
00004                *      RESERVED CODE WORDS FOR
00005                *      MASTER TO SLAVE OPERATION.
00006                *
00007                *LEVEL/FREQUENCY
00008                *
00009                *      STM $02 => $FE
00010                *
00011                *      MTS $06 => $FA
00012                *
00013                *
00014                *MESSAGE CIRCUIT NOISE
00015                *
00016                *   C-MESSAGE WEIGHTING
00017                *
00018                *      STM $04 => $F6
00019                *
00020                *      MTS $0E => $F2
00021                *
00022                *   3KHZ FLAT WEIGHTING
00023                *
00024                *      STM $12 => $EE
00025                *
00026                *      MTS $16 => $EA
00027                *
```

```
00028           *
00029           *NOISE WITH TONE
00030           *
00031           *   C-MESSAGE WEIGHTING
00032           *
00033           *       STM $1A => $E6
00034           *
00035           *       MTS $1E => $E2
00036           *
00037           *   3KHZ FLAT WEIGHTING
00038           *
00039           *       STM $22 => $DE
00040           *
00041           *       MTS $26 => $DA
00042           *
00043           *
00044           *SIGNAL TO NOISE RATIO
00045           *
00046           *   C-MESSAGE WEIGHTING
00047           *
00048           *       STM $2A => $D6
00049           *
00050           *       MTS $2E => $D2
00051           *
00052           *   3KHZ FLAT WEIGHTING
00053           *
00054           *       STM $32 => $CE
00055           *
00056           *       MTS $36 => $CA
00057           *
00058           *
00059           *IMPULSE NOISE
00060           *
00061           *   C-MESSAGE WEIGHTING
00062           *
00063           *       STM $3A => $C6
00064           *
00065           *       MTS $3E => $C2
00066           *
00067           *   3KHZ FLAT WEIGHTING
00068           *
00069           *       STM $42 => $BE
00070           *
00071           *       MTS $46 => $BA
00072           *
00073           *
00074           *NOISE TO GROUND
00075           *
00076           *   C-MESSAGE WEIGHTING
00077           *
00078           *       STM $4A => $B6
00079           *
00080           *       MTS $4E => $B2
00081           *
00082           *   3KHZ FLAT WEIGHTING
00083           *
00084           *       STM $52 => $AE
00085           *
00086           *       MTS $56 => $AA
00087           *
00088           *
00089           *TRANSIENT PHENOMENA
00090           *
00091           *   C-MESSAGE WEIGHTING
00092           *
00093           *       STM $5A => $A6
00094           *
00095           *       MTS $5E => $A2
00096           *
00097           *   3KHZ FLAT WEIGHTING
00098           *
00099           *       STM $62 => $9E
00100           *
00101           *       MTS $66 => $9A
00102           *
00103           *
```

```
00104        *ENVELOPE DELAY DISTORTION
00105        *
00106        *      STM $6A => $96
00107        *
00108        *      MTS $6E => $92
00109        *
00110        *
00111        *NONLINEAR DISTORTION CHECK SIGNAL
00112        *
00113        *      STM $72 => $8E
00114        *
00115        *      MTS $76 => $8A
00116        *
00117        *
00118        *NONLINEAR DISTORTION---2ND&3RD ORDER
00119        *
00120        *      STM $7A => $86
00121        *
00122        *      MTS $7E => $82
00123        *
00124        *
00125        *PHASE JITTER
00126        *
00127        *      STM $82 => $7E
00128        *
00129        *      MTS $86 => $7A
00130        *
00131        *
00132        *AMPLITUDE JITTER
00133        *
00134        *      STM $8A => $76
00135        *
00136        *      MTS $8E => $72
00137        *
00138        *

00002        *
00003        *
00004        *
00005        *
00006        ********                          ******
00007        ********SERVICE ROUTINE TO PROGRAM SYSTEM HARDWARE********
00008        * THIS PROGRAM EMULATES AN INDIRECT JUMP THROUGH THE
00009        * USE OF A LINK TABLE. THE FRONT PANEL STATUS IS
00010        * READ AND USED AS THE LEAST SIGNIFICANT 8 BITS OF
00011        * A 16 BIT ADDRESS. THE MOST SIGNIFICANT 8 BITS
00012        * ARE LOADED AS $08. THIS 16 BIT ADDRESS ACCESSES A
00013        * LINK TABLE WHICH CONTAINS VECTORS TO THE VARIOUS
00014        * ENTRY POINTS OF THE RECORD TABLE.
00015        ********VERSION 1.1********
00016        ***********************************************************
00017        *
00018        *
00019        * READ FRONT PANEL STATUS,STORE IN MEMORY LOCATION "SPANEL"
00020        * MACHINE STATUS INPUT FORMAT.
00021        * A1 A0   SYSTEM MODE CONTROL
00022        * 0  1    SLAVE MODE
00023        * 1  1    MASTER MODE
00024        * 0  0    HPIB CONTROL BITS
00025        * 1  0    NORMAL MODE
00026        *
00027        *  B7      B6      B5      B4      B3      B2      B1      B0
00028        ****************************************************************
00029        *   *     *     *     *     *     * MTS * XMIT * NORM *
00030        * F2  * F1  * F0  * A1  * A0  *------*------*------*
00031        *   *     *     *     *     *     * STM * RCV  * RPT  *
00032        ****************************************************************
00033        * CARE MUST BE TAKEN TO ASSURE THAT THIS BIT
00034        * IS ZERO. OTHERWISE THE INDIRECT WILL BOMB!
00035        * THE LDX INSTRUCTION WOULD LOAD THE LSBYTE
00036        * FROM ONE RECORD LINK AND THE MSBYTE FROM
00037        * ANOTHER RECORD LINK;RESULTING IN A VECTOR
00038        * TO NEVER;NEVER LAND.
00039        *
00040        *
```

```
00042                 *
00043                 * FRONT PANEL PROGRAM CONTROL BYTE
00044                 *
00045                 * A1 A0    IMPULSE NOISE INTEGRATION PERIOD SELECT
00046                 * 0  0     5 MINUTE INTEGRATION PERIOD
00047                 * 1  0     15 MINUTE INTEGRATION PERIOD
00048                 * 0  1     UNDEFINED
00049                 * 1  1     CONTINUOUS INTEGRATION
00050                 *
00051                 * B1 B0    IMPULSE NOISE MODE CONTROL BITS
00052                 * 0  0     UNDEFINED
00053                 * 0  1     STOP
00054                 * 1  0     START/RESET
00055                 * 1  1     RUN
00056                 *
00057                 *  B7      B6      B5      B4      B3      B2      B1      B0
00058                 *********************************************************
00059                 *LEVEL*  *DELAY *   *       *       *       *       * DIAL  *NORMAL*
00060                 *   *       *       * B1    * B0    * A1    * A0    *       *       *
00061                 * ZERO *  ZERO *   *       *       *       *       * TALK  * S.C. *
00062                 *********************************************************
00063                 *
00064                 *
00065                 *
00066                 *
00067                 ******
00068                 * START OF MONITOR *
00069                 ******
00070 5F0D 4F         SYSTEM  CLR A                    FIX THE HARDWARE GLITCH BY STORING 7
00071 5F0E B7 1F00            STA A   CLOCKR
00072 5F11 86 03              LDA A   #$03
00073 5F13 97 BC              STA A   GLORIA           INITIALIZE EDD AVERAGE LOOP CTR
00074 5F15 96 AB              LDA A   STAT2
00075 5F17 85 40              BIT A   #$40             MASTER/SLAVE FLAG SET?
00076 5F19 26 05              BNE     SAVEFG
00077 5F1B 7F 00AA            CLR     STAT1
00078 5F1E 20 06              BRA     NOSAVE
00079 5F20 96 AA     SAVEFG  LDA A   STAT1
00080 5F22 84 30              AND A   #$30             SAVE ABORT FLAGS;CLEAR REST!
00081 5F24 97 AA              STA A   STAT1
00082 5F26 96 AB     NOSAVE  LDA A   STAT2            GET CONTENTS OF STATUS REGISTER #2
00083 5F28 84 90              AND A   #$90             CLEAR ALL BUT THE HPIB FLAG
00084 5F2A 97 AB              STA A   STAT2
00085 5F2C BD 7549            JSR     BLANKR           BLANK RIGHT DISPLAY
00086 5F2F BD 753A            JSR     BLANKL           BLANK LEFT DISPLAY
00087 5F32 86 40              LDA A   #$40             FIX 808'S GLITCH
00088 5F34 B7 1200            STA A   ANNUNL           TO BLANK THE LEFT DISPLAY ANNUNCIATOR
00089 5F37 7F 1300            CLR     ANNUNR           BLANK RIGHT DISPLAY ANNUNCIATOR
00090 5F3A 7F 00F5            CLR     HPREG1           CLEAR HPIB DISPLAY REGISTERS
00091 5F3D 7F 00F6            CLR     HPREG2
00092 5F40 7F 00F7            CLR     HPREG3
00093 5F43 7F 00F8            CLR     HPREG4
00094 5F46 B6 1000  WATCH   LDA A   FPANEL           GET THE PRESENT FRONT PANEL STATUS
00095 5F49 84 18              AND A   #$18             GET THE MODE CONTROL BITS
00096 5F4B 26 18              BNE     WATCHR           BR IF NOT IN HPIB
00097 5F4D 96 AB              LDA A   STAT2            GET THE CONTENTS OF STATUS REGISTER
00098 5F4F 2B 0C              BMI     LEMON            BR IF FLAG SET
00099 5F51 8A 80              ORA A   #$80             FLAG NOT SET, SET FLAG
00100 5F53 97 AB              STA A   STAT2            STORE NEW STATUS
00101 5F55 0F               SEI
00102 5F56 BD 5AD2            JSR     DCLEAR           SET INSTRUMENT TO KNOWN STATE
00103 5F59 BD 5CD7            JSR     CLSIN            INITIALIZES PIA
00104 5F5C 0E               CLI
00105 5F5D 86 01     LEMON   LDA A   #$01
00106 5F5F B7 1300            STA A   ANNUNR           LIGHTS HPIB LIGHT
00107 5F62 9A 7F              ORA A   PROG+3           UPDATES INFORMATION IN RIGHT DISPLAY
00108 5F64 97 7F              STA A   PROG+3           STORES IT AWAY
00109 5F66 20 15              BRA     NORM11
00110 5F68 96 AB     WATCHR  LDA A   STAT2            GETS STATUS DATA
00111 5F6A 84 7F              AND A   #$7F             CLEARS HPIB FLAG
00112 5F6C 97 AB              STA A   STAT2            STORES NEW STATUS
00113 5F6E D6 7F              LDA B   PROG+3           GETS RIGHT SIDE ANNUNCIATOR
00114 5F70 C4 FE              AND B   #$FE             RESETS HPIB ANNUNCIATOR
00115 5F72 D7 7F              STA B   PROG+3           PUTS DATA BACK IN REGISTER
00116 5F74 96 F3              LDA A   HSTAT1
```

```
00117 5F76 84 20             AND A   #$20      CLEAR ALL BUT THE LISTEN TALK BIT
00118 5F78 97 F3             STA A   HSTAT1
00119 5F7A 7F 00F4            CLR    HSTAT2    CLEAR THE STATUS BYTE
00120 5F7D B6 1100 NORM11 LDA A  PANEL
00121 5F80 84 02             AND A   #$02      IS INSTRUMENT IN DIAL/TALK
00122 5F82 26 1A             BNE     DIAL      BR IF IN DIAL/TALK
00123 5F84 C6 FF             LDA B   #$FF
00124 5F86 BD 65C6           JSR     LDPVLA
00125 5F89 84 01             AND A   #$01      SEE IF IN SELF-CHECK
00126 5F8B 27 1B             BEQ     NORM10    BR IF NOT IN SELF-CHECK
00127                 ******
00128                 * SELF-CHECK REQUESTED,SET S.C. FLAG AND GO *
00129                 ******
00130 5F8D 96 AA             LDA A   STAT1
00131 5F8F 8A 02             ORA A   #$02
00132 5F91 97 AA             STA A   STAT1
00133 5F93 86 01             LDA A   #$01
00134 5F95 BD 64A3           JSR     WAITR     WAIT 100 MSEC. FOR SWITCH BOUNCE TO
00135 5F98 BD 78C3           JSR     SCHK
00136 5F9B 7E 5F0D           JMP     SYSTEM
00137 5F9E 86 A6  DIAL       LDA A   #$A6      PROGRAM THE RECEIVER TO THE -40DBM G
00138 5FA0 B7 1600           STA A   RCVR      WITH NO INPUT FILTERS
00139 5FA3 20 A1             BRA     WATCH
00140 5FA5 BD 65BA NORM10 JSR  LDFPLA           FRONT PANEL STATUS FROM HDWE OR HPIB
00141 5FA8 97 75             STA A   SPANEL    STORE IN MEMORY LOCATION SPANEL
00142 5FAA 85 02             BIT A   #$02      MONITORING TRANSMIT?
00143 5FAC 27 12             BEQ     PATCH3
00144 5FAE 16                TAB
00145 5FAF 84 F8             AND A   #$F8
00146 5FB1 81 B8             CMP A   #$B8
00147 5FB3 26 28             BNE     NORM12
00148 5FB5 96 75             LDA A   SPANEL
00149 5FB7 84 1F             AND A   #$1F
00150 5FB9 C6 C0             LDA B   #$C0
00151 5FBB 1B                ABA
00152 5FBC 97 75             STA A   SPANEL
00153 5FBE 20 1D             BRA     NORM12
00154 5FC0 84 18  PATCH3 AND A   #$18         GET MODE CONTROL BITS
00155 5FC2 81 18             CMP A   #$18      MASTER?
00156 5FC4 26 17             BNE     NORM12
00157 5FC6 96 75             LDA A   SPANEL
00158 5FC8 16                TAB
00159 5FC9 C4 F8             AND B   #$F8      GET THE FUNCTION & MODE CONTROL BITS
00160 5FCB C1 D8             CMP B   #$D8      MASTER*EDD*LEVEL?
00161 5FCD 26 07             BNE     MASSER
00162 5FCF 86 B8             LDA A   #$B8
00163 5FD1 D6 75             LDA B   SPANEL    GET PAST STATUS
00164 5FD3 C4 04             AND B   #$04      EXTRACT MTS/STM CONTROL BIT
00165 5FD5 1B                ABA              PERFORM LOGICAL "OR"
00166 5FD6 84 FC  MASSER AND A   #$FC         BUMP XMIT/RCV & NORM/RPT CONTROL BIT
00167 5FD8 97 75             STA A   SPANEL    STORE NEW STATUS
00168 5FDA 7E 6217           JMP     MASTER
00169 5FDD 96 75  NORM12 LDA A   SPANEL        GET PREVIOUS FRONT PANEL STATUS
00170 5FDF 84 F8             AND A   #$F8      DETERMINE IF REQUESTED MEASUREMENT T
00171 5FE1 81 B0             CMP A   #$B0      NORMAL ENVELOPE DELAY DISTORTION. IF
00172 5FE3 27 04             BEQ     SWAP      IS REPLACE THE STATE OF THE MTS/STM
00173 5FE5 81 D0             CMP A   #$D0      BIT WITH THE STATE OF THE NORMAL/REPE
00174 5FE7 26 0D             BNE     MOVE1
00175 5FE9 96 75  SWAP   LDA A   SPANEL        LOAD THE PREVIOUS FRONT PANEL STATUS
00176 5FEB 16                TAB
00177 5FEC 84 FB             AND A   #$FB      CLEAR MTS/STM BIT
00178 5FEE C4 01             AND B   #$01      GET THE NORMAL/REPEAT SWITCH
00179 5FF0 58                ASL B
00180 5FF1 58                ASL B
00181 5FF2 1B                ABA              REPLACE THE MTS/STM BIT WITH REPEAT/
00182 5FF3 16                TAB
00183 5FF4 20 02             BRA     MOVE2
00184 5FF6 D6 75  MOVE1  LDA B   SPANEL        LOAD THE PREVIOUS FRONT PANEL STATUS
00185 5FF8 C4 FE  MOVE2  AND B   #$FE          CLEAR B0 TO PREVENT THE INDIRECT FRO
00186 5FFA D7 7A             STA B   MODE      STORE THE LEAST SIGNIFICANT BYTE OF
00187 5FFC 96 75             LDA A   SPANEL    LOAD THE PREVIOUS FRONT PANEL STATUS
00188 5FFE 16                TAB
00189 5FFF 84 18             AND A   #$18      GET MODE CONTROL BITS
00190 6001 81 08             CMP A   #$08      SLAVE?
00191 6003 26 03             BNE     PROG1
```

```
00192 6005 7E 6124              JMP      SLAVE      INSTRUMENT IN SLAVE MODE
00193                   ******
00194                   * GENERATE VECTOR TO LINK TABLE
00195                   ******
00196 6008 CE 5D25 PROG1 LDX    #TABLE
00197 600B DF 76              STX      TEMP
00198 600D D6 7A              LDA B    MODE
00199 600F D3 77              AND B    TEMP+1
00200 6011 D7 77              STA B    TEMP+1
00201 6013 24 03              BCC      VECTOR
00202 6015 7C 0076            INC      TEMP
00203 6018 DE 76    VECTOR LDX        TEMP
00204 601A EE 00              LDX      X          LOAD INDEX REGISTER WITH DATA RECORD
00205 601C A6 00              LDA A    X
00206 601E 97 7B              STA A    PROG       RECEIVER CONTROL WORD
00207 6020 B7 1600            STA A    RCVR
00208 6023 A6 01              LDA A    1,X
00209 6025 85 20              BIT A    #$20       SEE IF FIXID FREQUENCY
00210 6027 27 04              BEQ      FXFREQ     BR IF FIXED FREQUENCY
00211 6029 D6 AB              LDA B    STAT2      SEE IF IN HPTR
00212 602B 2B 14              BMI      HPTBFQ     BR IF IN HPTR
00213 602D 97 7C    FXFREQ STA A      PROG+1     STORE TRANSMITTER CONTROL WORD
00214 602F B7 1700            STA A    XMIT       PROGRAM TRANSMITTER
00215 6032 86 04              LDA A    #$04
00216 6034 C6 10              LDA B    #$10
00217 6036 B7 1900            STA A    HWFL       PROGRAM TRANSMITTER FREQUENCY
00218 6039 F7 1800            STA B    HWFM       PROGRAM TRANSMITTER FREQUENCY
00219 603C F7 1800            STA B    HWFM       DO IT TWICE SO PAUL GETS IT
00220 603F 20 14              BRA      THRU2
00221                   *
00222                   * NOTE ON ABOVE: IF MEASUREMENT IS NOT FIXED FREQ AND NOT H
00223                   * THE TRANSMITTER IS STILL PROGRAMMED WITH 1004 HZ. THE CO
00224                   * BOARD WILL ONLY LOOK AT THE "04" AND WILL IGNORE THE "10X
00225                   *
00226 6041 84 DF    HPTBFQ AND A      #$DF       CHANGE TO FIXED FREQ (INTERNAL PROGR
00227 6043 97 7C              STA A    PROG+1     STORE XMIT CONTROL WORD
00228 6045 B7 1700            STA A    XMIT       PROGRAM TRANSMITTER
00229 6048 96 EE              LDA A    HPB1       LSB OF FREQUENCY IN HPTR
00230 604A D6 ED              LDA B    HPB        MSB OF FREQUENCY IN HPTR
00231 604C B7 1900            STA A    HWFL       PROGRAM GTRANSMITTER FREQUENCY
00232 604F F7 1800            STA B    HWFM       PROGRAM TRANSMITTER FREQUENCY
00233 6052 F7 1800            STA B    HWFM       DO IT TWICE SO PAUL GETS IT
00234 6055 A6 02    THRU2 LDA A       2,X
00235 6057 97 7D              STA A    PROG+2     LEFT DISPLAY ANNUNCIATOR CONTROL WOR
00236 6059 A6 03              LDA A    3,X
00237 605B D6 AB              LDA B    STAT2      HPTR FLAG SET?
00238 605D 2A 02              BPL      NOHPTB
00239 605F 8A 01              ORA A    #$01       LIGHT HPTR ANNUNCIATOR
00240 6061 97 7E    NOHPTB STA A      PROG+3     RIGHT DISPLAY ANNUNCIATOR CONTROL WO
00241 6063 96 7B              LDA A    PROG       GET IMAGE OF RCVR STATUS
00242 6065 2B 10              BMI      AVER
00243 6067 C6 08              LDA B    #$08
00244 6069 96 AB              LDA A    STAT2
00245 606B 2A 02              BPL      NOHPB2     BRANCH IF NOT IN HPTR CONTROL
00246 606D CA 01              ORA B    #$01       LIGHT HPTR INDICATOR
00247 606F F7 1300 NOHPB2 STA B      ANNUNR     LIGHT IN-PROCESS
00248 6072 86 05              LDA A    #$05
00249 6074 BD 64A3            JSR      WAITR      WAIT 600 MSEC. IF QRMS DETECTOR
00250 6077 86 01    AVER  LDA A       #$01
00251 6079 BD 64A3            JSR      WAITR      WAIT 100 MSEC. IF AVERAGE DETECTOR
00252                   ******
00253                   * JUMP TO REQUESTED MEASUREMENT ROUTINE
00254                   ******
00255 607C 96 75              LDA A    SPANEL     LOAD THE PREVIOUS FRONT PANEL STATUS
00256 607E 84 F0              AND A    #$F0       MASK OFF NON-FUNCTION CONTROL BITS
00257 6080 26 06              BNE      TRY001
00258 6082 7F 007F            CLR      PROG+4
00259 6085 7E 66D3            JMP      LEVEL
00260 6088 81 20    TRY001 CMP A      #$20
00261 608A 26 06              BNE      TRY010
00262 608C 7F 007F            CLR      PROG+4
00263 608F 7E 68E8            JMP      MCNOIS     JUMP TO MESSAGE CIRCUIT NOISE MAIN P
00264 6092 81 40    TRY010 CMP A      #$40
00265 6094 26 06              BNE      TRY011
00266 6096 7F 007F            CLR      PROG+4
```

```
00267 6099 7E 69FF           JMP     NWTONE    JUMP TO NOISE WITH TONE MAIN PROGRAM
00268 609C 81 60    TRY011   CMP A   #$60
00269 609F 26 06             BNE     TRY100
00270 60A0 7F 007F           CLR     PROG+4
00271 60A3 7E 6827           JMP     SIGNAL    JUMP TO SIGNAL TO NOISE RATIO MAIN P
00272 60A6 81 80    TRY100   CMP A   #$80
00273 60A8 26 06             BNE     TRY101
00274 60AA 7F 007F           CLR     PROG+4
00275 60AD 7E 6D01           JMP     IMPLSE    JUMP TO IMPULSE NOISE MAIN PROGRAM
00276 60B0 81 A0    TRY101   CMP A   #$A0
00277 60B2 26 07             BNE     TRY110
00278 60B4 86 73             LDA A   #$73
00279 60B6 97 7F             STA A   PROG+4
00280 60B8 7E 6FDF           JMP     FDDFRE    JUMP TO FDD.DISPLAY LEVEL MAIN PROGR
00281 60BB 81 C0    TRY110   CMP A   #$C0
00282 60BD 26 07             BNE     DLLB1
00283 60BF 86 D2             LDA A   #$D2
00284 60C1 97 7F             STA A   PROG+4
00285 60C3 7E 66D3           JMP     LEVEL     JUMP TO FDD.DISPLAY EDD MAIN PROGRAM
00286                ******
00287                * DATA LEVEL LOOP BACK SERVICE ROUTINE *
00288                ******
00289 60C6 86 3F    DLLB1    LDA A   #$3E      FLAT RECEIVER WITH QRMS DETECTOR
00290 60C8 97 7B             STA A   PROG
00291 60CA B7 1600           STA A   RCVR      PROG. THE RECEIVER
00292 60CD 86 81             LDA A   #$81
00293 60CF 97 7C             STA A   PROG+1
00294 60D1 B7 1700           STA A   XMIT      PROG. THE TRANSMITTER
00295 60D4 7F 007F           CLR     PROG+4
00296 60D7 4F              CLR A
00297 60D8 B7 1400           STA A   CONTRL
00298 60DB 86 07             LDA A   #$07
00299 60DD 97 AD             STA A   RANGE     STORE THE AUTORANGE LIMITS
00300 60DF 86 A2             LDA A   #$A2
00301 60E1 97 7D             STA A   PROG+2    LEFT DISPLAY ANNUNCIATOR IMAGE
00302 60E3 86 08             LDA A   #$08
00303 60E5 B7 1300           STA A   ANNJVR
00304 60E8 7F 007F           CLR     PROG+3
00305 60EB BD 7429 DLLB3     JSR     ARANGE
00306 60EE 29 0B             BVS     DLLB4
00307 60F0 BD 610A           JSR     SPLOOP
00308 60F3 BD 64C6 DLLB2     JSR     LOOKJP
00309 60F6 28 F3             BVC     DLLB3
00310 60F8 7E 5F0D           JMP     SYSTEM
00311 60FB 86 05    DLLB4    LDA A   #$05
00312 60FD BD 64A3           JSR     WAITR
00313 6100 BD 610A           JSR     SPLOOP
00314 6103 86 05             LDA A   #$05
00315 6105 BD 64A3           JSR     WAITR
00316 6108 20 E9             BRA     DLLB2
00317                *
00318                *
00319 610A 86 A0    SPLOOP   LDA A   #$A0
00320 610C B7 1200           STA A   ANNJVL
00321 610F 7F 1300           CLR     ANNJVR
00322 6112 86 04             LDA A   #$04
00323 6114 B7 1000           STA A   RIGHTD
00324 6117 4F              CLR A
00325 6118 B7 1001           STA A   RIGHTD+1
00326 611B B7 1002           STA A   RIGHTD+2
00327 611E 86 0C             LDA A   #$0C
00328 6120 B7 1003           STA A   RIGHTD+3  DISPLAY THE WORD LOOP1
00329 6123 39               RTS
00330                *
00332                *
00333                * FORMAT OF THE ACIA STATUS AND CONTROL REGISTERS
00334                *
00335                *
00336                ******
00337                * STATUS REGISTER
00338                ******
00339                *
00340                *
00341                * RDRF => RECEIVE DATA REGISTER FULL
00342                * TDRE => TRANSMIT DATA REGISTER EMPTY
```

```
00343              * DCD => DATA CARRIER DETECT
00344              * CTS => CLEAR TO SEND
00345              * FE => FRAMING ERROR
00346              * OVRN => RECEIVER OVERRUN
00347              * PE => PARITY ERROR
00348              * IRQ => INTERRUPT REQUEST
00349              *
00350              *
00351              *
00352              *   B7     B6     B5     B4     B3     B2     B1     B0
00353              ****************************************************************
00354              *      *      *      *      *      *      *      *      *
00355              * IRQ  *  PE  * OVRN *  FE  * CTS' * DCD' * TDRE * RDRF *
00356              *      *      *      *      *      *      *      *      *
00357              ****************************************************************
00358              *
00359              *
00361              ******
00362              * CONTROL REGISTER
00363              ******
00364              *
00365              **
00366              * CR1 CR0
00367              *  0   0             /1
00368              *  0   1             /16
00369              *  1   0             /64
00370              *  1   1             MASTER RESET
00371              **
00372              *
00373              **
00374              * CR4 CR3 CR2
00375              *  0   0   0         7 BITS,EVEN PARITY,2 STOP BITS
00376              *  0   0   1         7 BITS,ODD PARITY,2 STOP BITS
00377              *  0   1   0         7 BITS,EVEN PARITY,1 STOP BIT
00378              *  0   1   1         7 BITS,ODD PARITY,1 STOP BIT
00379              *  1   0   0         8 BITS,2 STOP BITS
00380              *  1   0   1         8 BITS,1 STOP BIT
00381              *  1   1   0         8 BITS,EVEN PARITY,1 STOP BIT
00382              *  1   1   1         8 BITS,ODD PARITY,1 STOP BIT
00383              **
00384              *
00385              **
00386              * CR6 CR5
00387              *  0   0             RTS'=LOW,TRANSMIT INTERRUPT DISABLED
00388              *  0   1             RTS'=LOW,TRANSMIT INTERRUPT ENABLED
00389              *  1   0             RTS'=HIGH,TRANSMIT INTERRUPT DISABLED
00390              *  1   1             RTS'=LOW,TRANSMIT A BREAK,INTERRUPT DISA
00391              **
00392              *
00393              *
00394              *   B7     B6     B5     B4     B3     B2     B1     B0
00395              ****************************************************************
00396              *      *      *      *      *      *      *      *      *
00397              * RIE  * CR6  * CR5  * CR4  * CR3  * CR2  * CR1  * CR0  *
00398              *      *      *      *      *      *      *      *      *
00399              ****************************************************************
00400              *
00402              *
00403              *
00404              * SLAVE INITIALIZER ROUTINE *
00405              *
00406              *
00407 6124 86 BF   SLAVE  LDA A   #$BE
00408 6126 97 7B          STA A   PROG
00409 6128 B7 1600        STA A   RCVR
00410 612B 86 40          LDA A   #$40
00411 612D 97 7C          STA A   PROG+1
00412 612F B7 1700        STA A   XMIT
00413 6132 86 04          LDA A   #$04
00414 6134 C6 10          LDA B   #$10
00415 6136 B7 1900        STA A   HNFL
00416 6139 F7 1800        STA B   HNFM
00417 613C F7 1800        STA B   HNFM    PROGRAM XMIT TO 1004 HZ.
00418 613F 86 A1          LDA A   #$A1
00419 6141 97 7D          STA A   PROG+2  LEFT DISPLAY ANNUNCIATOR IMAGE
```

```
00420 6143 B7 1200            STA A   ANNJNL    LIGHT THE SLAVE INDICATOR
00421 6146 86 08              LDA A   #$08
00422 6148 D5 AB              LDA B   STAT2
00423 614A 2A 02              BPL     NOTHP
00424 614C 8A 01              ORA A   #$01
00425 614E 97 7E      NOTHP   STA A   PROG+3    RIGHT DISPLAY ANNUNCIATOR IMAGE
00426 6150 B7 1300            STA A   ANNJNR    LIGHT THE IN-PROCESS INDICATOR
00427 6153 7F 007F            CLR     PROG+4    CLEAR THE CONTROL LATCH IMAGE
00428 6156 4F                 CLR A
00429 6157 B7 1400            STA A   CONTRL    FIX THE HARDWARE GLITCH BY STORING 7
00430                 ******
00431                 * OUTPUT FSK! WAIT 800 MSEC. FOR DCD TO STABLIZE
00432                 ******
00433 615A 86 08              LDA A   #$08
00434 615C BD 64A3            JSR     WAITR
00435 615F BD 65BA  LOOP5    JSR     LDFPLA    LOAD STATUS FROM HDWE OR HPIB
00436 6162 84 18              AND A   #$18
00437 6164 81 08              CMP A   #$08      SLAVE?
00438 6166 27 03              BEQ     CONTJ2
00439 6168 7E 5F00            JMP     SYSTEM    INSTRUMENT IS NO LONGER A SLAVE-ABOR
00440 616B 96 7B     CONTU2   LDA A   PROG
00441 616D B7 1600            STA A   RCVR
00442 6170 96 7C              LDA A   PROG+1
00443 6172 B7 1700            STA A   XMIT
00444 6175 86 37              LDA A   #$37
00445 6177 97 AD              STA A   RANGE     SET THE AUTORANGE LIMITS
00446 6179 BD 7429            JSR     ARANGE
00447 617C 29 E1              BVS     LOOP5     OUT OF RANGE CHECK FRONT PANEL
00448 617F 96 7D              LDA A   PROG+2
00449 6180 B7 1200            STA A   ANNJNL    CLEAR OVER/UNDER RANGE INDICATOR
00450 6183 96 AA              LDA A   STAT1
00451 6185 85 20              BIT A   #$20      ABORT FLAG SET
00452 6187 26 4B              BNE     ABORTC
00453 6189 0F                 SEI
00454 618A 96 B5              LDA A   ACIAOT    GET THE ACIA STATUS REGISTER
00455 618C D6 B6              LDA B   ACIA1T
00456 618E 7F 00B5            CLR     ACIAOT
00457 6191 0E                 CLI
00458 6192 85 01              BIT A   #$01      CHARACTER RECEIVED?
00459 6194 27 C9              BEQ     LOOP5
00460 6196 85 70              BIT A   #$70      CHECK IT FOR PARITY,FRAMING,AND OVER
00461 6198 26 C5              BNE     LOOP5     ERRORS-IGNORE THE RECEIVED CHARACTER
00462 619A 17                 TBA               TRANSFER THE ACCUMULATORS
00463 619B 84 03              AND A   #$03
00464 619D 81 02              CMP A   #$02      CHECKING FOR STATUS FORMAT
00465 619F 26 BF              BNE     LOOP5     RECEIVED WORD DID NOT HAVE STATUS FO
00466 61A1 C1 BE              CMP B   #ABORT
00467 61A3 27 2C              BEQ     ABORTC
00468 61A5 C1 F2              CMP B   #EXECUT
00469 61A7 27 3A              BEQ     EXECRQ
00470 61A9 C1 76              CMP B   #SWEEP    IGNORE REQUEST
00471 61AB 27 B2              BEQ     LOOP5
00472 61AD C1 BA              CMP B   #START    IGNORE REQUEST
00473 61AF 27 AE              BEQ     LOOP5
00474 61B1 C1 72              CMP B   #ABORTA
00475 61B3 27 AA              BEQ     LOOP5     IGNORE THE REQUEST!
00476                 *
00477                 ******
00478                 *
00479                 * RECEIVED WORD MUST BE NEW STATUS REQUEST
00480                 * SEARCH THE TABLE FOR A MATCH
00481                 *
00482                 ******
00483                 *
00484 61B5 CE 5FF6            LDX     #TABLE2+1
00485 61B8 E1 00     RELAT2   CMP B   X
00486 61BA 27 09              BEQ     MATCH2    MATCH FOUND
00487 61BC 8C 5F0C            CPX     #ETABLS   END OF TABLE
00488 61BF 27 4C              BEQ     NMATCH
00489 61C1 08                 INX
00490 61C2 08                 INX
00491 61C3 20 F3              BRA     RELAT2
00492                 ******
00493                 * MATCH FOUND
00494                 ******
```

```
00495 61C5 09        MATCH2 DEX
00496 61C6 A6 00            LDA A   X
00497 61C8 97 7A            STA A   MODE
00498 61CA D7 B4            STA B   CONWD    STORE RECEIVED WORD
00499 61CC BD 64B1           JSR    XMITRQ
00500 61CF 20 8E            BRA     LOOPS    TRANSMIT MATCH TO MASTER.WAIT FOR EX
00501                 ******
00502                 * ABORT REQUEST! ACKNOWLEDGE.
00503                 ******
00504 61D1 96 AA     ABORTC LDA A   STAT1
00505 61D3 85 20            BIT A   #$20
00506 61D5 27 88            BEQ     LOOPS
00507 61D7 84 CF            AND A   #$CF     CLEAR FLAGS
00508 61D9 97 AA            STA A   STAT1
00509 61DB C6 72            LDA B   #ABORTA  TRANSMIT ABORT ACKNOWLEDGE
00510 61DD BD 64B1           JSR    XMITRQ
00511 61E0 7E 615F           JMP    LOOPS
00512                 ******
00513                 * EXECUTE COMMAND RECEIVED
00514                 ******
00515 61E3 D6 B4     EXECRQ LDA B   CONWD
00516 61E5 50              NEG B             TWO'S COMPLEMENT
00517 61E6 BD 64B1           JSR    XMITRQ
00518 61E9 7F 00AA           CLR    STAT1    CLEAR STATUS REGISTER #1
00519 61EC 96 A9            LDA A   STAT2
00520 61EE 84 80            AND A   #$80     LFT DEL HAVE HPIB-SLAVE MODE!
00521 61F0 97 A9            STA A   STAT2
00522 61F2 86 01            LDA A   #$01
00523 61F4 BD 64A3           JSR    WAITR    WAIT 100 MSEC.
00524 61F7 96 7A            LDA A   MODE
00525 61F9 97 75            STA A   SPANEL
00526 61FB 96 A9            LDA A   STAT2
00527 61FD 8A 40            ORA A   #$40
00528 61FF 97 A9            STA A   STAT2
00529 6201 96 7A            LDA A   MODE
00530 6203 81 EE            CMP A   #DLLB    DATA LEVEL LOOP BACK?
00531 6205 26 03            BNE     PROG2
00532 6207 7E 60C6           JMP    DLLB1    YES! LOOP THE SET
00533 620A 7E 600B   PROG2  JMP     PROG1    NO! CONTINUE WITH NORMAL EXIT
00534                 ******
00535                 * NO MATCH FOUND IN TABLE
00536                 ******
00537 620D C6 EF     NMATCH LDA B   #DLLB    ABORT TO DATA LEVEL LOOP BACK
00538 620F D7 7A            STA B   MODE
00539 6211 BD 64B1           JSR    XMITRQ
00540 6214 7E 615F           JMP    LOOPS
00541                 *
00542                 *
00544                 *
00545                 *
00546                 ******
00547                 *
00548                 * MASTER-SLAVE ERROR CODES
00549                 *
00550                 ******
00551                 *
00552                 * H-00    FRONT PANEL SWITCHES CONTROLLING FUNCTION WERE CH
00553                 *
00554                 * H-01    NO CARRIER RECEIVED FROM SLAVE
00555                 *
00556                 * H-02    CARRIER RECEIVED,NO ANSWER FROM SLAVE
00557                 *
00558                 * H-03    10 CONSECUTIVE ANSWERS WITH PARITY,FRAMING,OR OVE
00559                 *
00560                 * H-04    10 CONSECUTIVE ANSWERS WITHOUT ERRORS BUT DO NOT
00561                 *
00562                 * H-05    INAPPROPRIATE RESPONSE TO "EXECUTE" COMMAND
00563                 *
00564                 * H-06    SLAVE DID NOT ACKNOWLEDGE "ABORT" COMMAND
00565                 *
00566                 * H-07    SLAVE RESPONDED TO A SUPERVISORY COMMAND WITH DLL
00567                 *
00568                 * H-08    UNEXPECTED ERROR,PROBABLE SYSTEM FAILURE
00569                 *
00570                 * H-09    NO DATA AFTER 6 SECONDS WHEN DATA IS EXPECTED
```

```
00571                *
00572                * H-10      RECEIVED LEVEL OUTSIDE SLAVES OPERATING LIMITS
00573                *
00574                * H-11      (DCD)'=>1:SIGNAL IS NOT DATA CARRIER
00575                *
00576                * H-12      IMPULSE NOISE ACCUMULATOR OVERFLOW
00577                *
00578                * H-13      SLAVE INITIATED A MASTER/SLAVE LINK ABORT
00579                *
00580                * H-14      SIGNAL DROPOUT OF > 1 SEC.  TEST ABORTED!!!
00581                *
00582                ******
00583                *
00584                *
00585                *
00586                ******
00587                * MASTER/SLAVE EQUIVALENCES
00588                ******
00589                *
00590                *
00591     0086   LOOP    EQU     BREG
00592     0087   ERROR1  EQU     BREG+1
00593     0088   ERROR2  EQU     BREG+2
00594     0089   ERROR3  EQU     BREG+3
00595     008A   ERROR4  EQU     BREG+4
00596                *
00597                *
00598                *
00600                *
00601                ******
00602                * INITIALIZE THE MASTER-SLAVE LINK
00603                ******
00604                *
00605 6217 86 BE   MASTER LDA A   #$BE
00606 6219 97 7B          STA A   PROG       INITIALIZE THE RCVR IMAGE
00607 621B B7 1600        STA A   RCVR
00608 621E 86 40          LDA A   #$40
00609 6220 97 7C          STA A   PROG+1     INITIAL THE XMIT IMAGE
00610 6222 B7 1700        STA A   XMIT
00611 6225 86 04          LDA A   #$04
00612 6227 C6 10          LDA B   #$10
00613 6229 B7 1900        STA A   HWFL
00614 622C F7 1800        STA B   HWFM
00615 622F F7 1800        STA B   HWFM       PROGRAM XMIT TO 1004 HZ.
00616 6232 86 37          LDA A   #$37
00617 6234 97 AD          STA A   RANGE      SET THE AUTO RANGE LIMITS
00618 6236 86 A0          LDA A   #$A0
00619 6238 97 7D          STA A   PROG+2
00620 623A B7 1200        STA A   ANNJVL     PROG LEFT DISPLAY ANNUNCIATOR
00621 623D 86 08          LDA A   #$08
00622 623F D6 AB          LDA B   STAT2
00623 6241 2A 02          BPL     NOHPB1     BR IF NOT IN HPIB
00624 6243 8A 01          ORA A   #$01       ADD THE HPIB LIGHT
00625 6245 97 7F   NOHPB1 STA A   PROG+3
00626 6247 B7 1300        STA A   ANNJVR     LIGHT IN-PROCESS INDICATOR
00627 624A 7F 007F        CLR     PROG+4     CLEAR THE CONTROL LATCH IMAGE
00628 624D 4F            CLR A
00629 624E B7 1400        STA A   CONTRL     FIX THE HARDWARE GLITCH BY STORING 7
00630                ******
00631                * WAIT 1.5 SECONDS FOR DCD TO STABLIZE AND
00632                * FOR SLAVE TO HAVE AUTORANGED TO PROPER RANGE
00633                ******
00634 6251 86 0F          LDA A   #$0F
00635 6253 97 76          STA A   TEMP
00636 6255 86 01   WAITS  LDA A   #$01
00637 6257 BD 64A3        JSR     WAITR      WAIT 100 MILI-SECONDS
00638 625A 7A 0076        DEC     TEMP
00639 625D 27 08          BEQ     INITAL
00640 625F BD 645F        JSR     CHECKR
00641 6262 28 F1          BVC     WAITS
00642 6264 7E 5F0D        JMP     SYSTEM
00643 6267 96 7B   INITAL LDA A   PROG
00644 6269 B7 1600        STA A   RCVR
00645 626C 96 7C          LDA A   PROG+1
00646 626F B7 1700        STA A   XMIT       PROGRAM THE RCVR AND XMIT
```

```
00647 6271 96 AA            LDA A    STAT1
00648 6273 85 20            BIT A    #$20      ABORT FLAG SET?
00649 6275 27 0F            BEQ      NABORT
00650 6277 84 CF            AND A    #$CF
00651 6279 97 AA            STA A    STAT1     CLEAR ABORT FLAGS!
00652 627B C6 13            LDA B    #$13
00653 627D BD 751C           JSR      ERROR     WRITE ERROR MESSAGE
00654 6280 86 1F            LDA A    #$1F
00655 6282 BD 64A3           JSR      WAITR
00656 6285 7F 00B5 NABORT   CLR      ACIAOT    CLEAR STATUS REGISTER IMAGE
00657 6288 7F 00B6           CLR      ACIA1I    CLEAR RECEIVE WORD REGISTER IMAGE
00658 628B 96 AB            LDA A    STAT2     LOADS STATUS REGISTER
00659 628D 84 80            AND A    #$80      CLEARS ALL BUT HPTR FLAG
00660 628F 97 AB            STA A    STAT2     PUT THE GOODIES BACK WHERE YOU FOUND
00661 6291 CE 0086          LDX      #BREG     SET THE POINTER
00662 6294 BD 768B           JSR      CLEAR
00663 6297 96 75            LDA A    SPANEL    GET FRONT PANEL IMAGE
00664 6299 84 E4            AND A    #$E4
00665 629B 8A 08            ORA A    #$08      ADD SLAVE CONTROL BITS
00666 629D CE 5EF5          LDX      #TABLE2
00667 62A0 A1 00  RELATE    CMP A    X         SEARCH THE TABLE FOR A MATCH
00668 62A2 27 16            BEQ      MATCH
00669 62A4 8C 5F0B          CPX      #ETABLM   END OF TABLE?
00670 62A7 27 04            BEQ      ERROR8
00671 62A9 08              INX
00672 62AA 08              INX
00673 62AB 20 F3            BRA      RELATE
00674               ******
00675               * UNEXPECTED ERROR,PROBABLE SYSTEM FAILURE *
00676               *
00677               * ERROR #8
00678               ******
00679 62AD C6 08  ERROR8    LDA B    #$08      ERROR NUMBER
00680 62AF BD 751C           JSR      ERROR
00681 62B2 BD 64C6           JSR      LOOKUP
00682 62B5 29 80            BVC      INITAL
00683 62B7 7E 5F0D          JMP      SYSTEM
00684               ******
00685               * MATCH FOUND
00686               ******
00687 62BA 08  MATCH         INX
00688 62BB A6 00            LDA A    X
00689 62BD 97 7A            STA A    MODE
00690               ******
00691               * START LINKING PROCEDURE
00692               ******
00693 62BF 86 02  READY     LDA A    #$02
00694 62C1 97 86            STA A    LOOP      NUMBER OF REPETITIONS
00695 62C3 86 8F            LDA A    #ABORT
00696 62C5 97 94            STA A    CONAD     TRANSMIT ABORT!
00697 62C7 BD 63C2           JSR      WORK
00698 62CA 4D              TST A              GOOD EXIT?
00699 62CB 27 07            BEQ      WORD
00700 62CD 85 01            BIT A    #$01
00701 62CF 27 EE            BEQ      READY
00702 62D1 7E 5F0D EXIT2    JMP      SYSTEM    EXIT TO SYSTEM
00703               ******
00704               * A WORD HAS BEEN RECEIVED!
00705               * CHECK FOR ABORT ACKNOWLEDGE
00706               ******
00707               *
00708               * NOTE: IF PREVIOUS MEASUREMENT DIRECTION WAS
00709               * MASTER-TO-SLAVE THEN DATA WORDS BEING SENT
00710               * BY THE SLAVE MAY CAUSE THE PROGRAM TO ENTER
00711               * THIS SEGMENT.
00712               *
00713 62D4 C5 70  WORD      BIT B    #$70      ERRORS?
00714 62D6 26 06            BNE      ERRORS
00715 62D8 96 AF            LDA A    ANSWER    GET RECEIVED WORD
00716 62DA 81 72            CMP A    #ABORTA
00717 62DC 27 2C            BEQ      FUNCTN    ABORT ACKNOWLEDGE
00718 62DE CE A000 ERRORS   LDX      #$A000
00719 62E1 86 09  READ      LDA A    #$09
00720 62E3 4A   WASTE        DEC A
00721 62E4 26 FD            BNE      WASTE     WAIT 72 USEC.
```

```
00722 62E6 0F              SEI            DISABLE IRQ WHILE READING BUFFER
00723 62E7 96 85            LDA A  ACIAOI
00724 62E9 D6 36            LDA B  ACIA1I
00725 62EA 7F 00B5          CLR    ACIAOI  TRY TO RECOVER
00726 62EE 0E               CLI            ENABLE IRQ SYSTEM
00727 62EF 85 01             BIT A  #$01
00728 62F1 27 08             BEQ    ERROR6
00729 62F3 85 70             BIT A  #$70
00730 62F5 26 04             BNE    ERROR6
00731 62F7 C1 72             CMP B  #ABORTA  ABORT ACKNOWLEDGE
00732 62F9 27 0F             BEQ    FUNCTV
00733                ******
00734                * ERROR #6
00735                ******
00736 62FB 09     ERROR6 DEX
00737 62FC 26 F3             BNE    READ
00738 62FE C6 06             LDA B  #$06     PASS ERROR NUMBER
00739 6300 BD 751C            JSR    ERROR    WRITE ERROR MESSAGE
00740 6303 86 0A             LDA A  #$0A
00741 6305 BD 64A3            JSR    WAITR    WAIT 1 SECOND
00742 6308 20 85             BRA    READY
00743                ******
00744                * ABORT ACKNOWLEDGE RECEIVED!
00745                * TRANSMIT MEASUREMENT CODE WORD
00746                ******
00747 630A 86 01   FUNCTV LDA A  #$01
00748 630C 97 96             STA A  LOOP     STORE NUMBER OF REPETITIONS
00749 630F 96 7A             LDA A  MODE
00750 6310 97 84             STA A  CONWD    STORE REQUESTED FUNCTION
00751 6312 BD 63C2            JSR    WORK
00752 6315 4D               TST A           GOOD RETURN?
00753 6316 27 06             BEQ    PASS1
00754 6318 85 01             BIT A  #$01
00755 631A 27 FE             BEQ    FUNCTV
00756 631C 20 93   EXIT4  BRA    EXIT2
00757 631E C5 70   PASS1  BIT B  #$70
00758 6320 27 18             BEQ    GOODRP   RECEIVED WORD-NO ERRORS!
00759 6322 7C 0089            INC    ERROR3
00760 6325 86 0A             LDA A  #$0A
00761 6327 91 89             CMP A  ERROR3
00762 6329 26 DF             BNE    FUNCTV
00763 632B 7F 0089            CLR    ERROR3
00764                ******
00765                * ERROR #3
00766                ******
00767 632E C6 03             LDA B  #$03     PASS ERROR NUMBER
00768 6330 BD 751C            JSR    ERROR    WRITE ERROR MESSAGE
00769 6333 86 0A             LDA A  #$0A
00770 6335 BD 64A3            JSR    WAITR    WAIT 1 SECOND
00771 6338 20 D0             BRA    FUNCTV
00772                ******
00773                * SELECTED MEASUREMENT CODE WORD HAS BEEN ECHOED!
00774                ******
00775 633A 7F 0089 GOODRP CLR    ERROR3
00776 633D D6 AF             LDA B  ANSWER   GET RECEIVED WORD
00777 633F D1 84             CMP B  CONWD
00778 6341 27 1E             BEQ    PASS2A
00779 6343 C1 FF             CMP B  #DLLB    DATA LEVEL LOOP BACK?
00780 6345 26 0D             BNE    NODLLB
00781                ******
00782                * ERROR #7
00783                ******
00784 6347 C6 07             LDA B  #$07     PASS ERROR NUMBER
00785 6349 BD 751C OTPUT1 JSR    ERROR    WRITE ERROR MESSAGE
00786 634C 86 0A             LDA A  #$0A
00787 634E BD 64A3            JSR    WAITR    WAIT 1 SECOND
00788 6351 7E 630A EXIT3  JMP    FUNCTV
00789 6354 7C 008A NODLLB INC    ERROR4
00790 6357 86 0A             LDA A  #$0A
00791 6359 91 8A             CMP A  ERROR4
00792 635B 26 F4             BNE    EXIT3
00793                ******
00794                * ERROR #4
00795                ******
00796 635D C6 04             LDA B  #$04
```

```
00797 635F 20 F8              BRA      OTPJT1
00798                  ******
00799                  * TRANSMIT "EXECUTE" CODE WORD
00800                  ******
00801 6361 86 01       PASS2A LDA A    #$01
00802 6363 97 86              STA A    LOOP       NUMBER OF REPETITIONS
00803 6365 86 F2              LDA A    #EXECUTE
00804 6367 97 B4              STA A    CONWD      STORE CODE WORD
00805 6369 BD 63C2             JSR      WORK
00806 636C 4D                  TST A              GOOD RETURN?
00807 636D 27 0A                BEQ     PASS2B
00808 636F 85 01                BIT A   #$01
00809 6371 27 03                BEQ     ONWARD
00810 6373 7E 5F0D              JMP     SYSTEM
00811 6376 7E 62BF ONWARD JMP   READY
00812 6379 C5 70    PASS2B BIT B #$70               ERRORS?
00813 637B 26 1B              BNE      ERRORS
00814 637D D6 AF              LDA B    ANSWER     GET RECEIVED WORD
00815 637F 50                 NEG B
00816 6380 D1 7A              CMP B    MODE       COMPARE 2'S COMPLEMENT
00817 6382 26 02              BNE      RCOVER
00818 6384 20 26              BRA      PROG3
00819 6386 D6 7A    RCOVER LDA B MODE
00820 6388 D1 AF              CMP B    ANSWER     COMPARE NORMAL
00821 638A 26 0C              BNE      ERRORS
00822 638C CE 0200             LDX     #$0200
00823 638F 96 85    MWHILE LDA A ACIAOI
00824 6391 85 01              BIT A    #$01
00825 6393 26 10              BNE      DCOVER
00826 6395 09                 DEX
00827 6396 26 F7              BNE      MWHILE
00828                  ******
00829                  * INAPPROPRIATE RESPONSE TO "EXECUTE" COMMAND.
00830                  *
00831                  * ERROR #5
00832                  ******
00833 6398 C6 05    ERRORS LDA B #$05               PASS ERROR NUMBER
00834 639A BD 751C             JSR      ERROR      WRITE ERROR MESSAGE
00835 639D 86 0A               LDA A    #$0A
00836 639F BD 6443             JSR      WAITR      WAIT 1 SECOND
00837 63A2 7E 62BF             JMP      READY
00838 63A5 96 86    DCOVER LDA A ACIAII
00839 63A7 40                 NEG A
00840 63A8 91 7A              CMP A    MODE
00841 63AA 26 EC              BNE      ERRORS
00842 63AC 96 7A    PROG3  LDA A MODE
00843 63AE 97 B4              STA A    CONWD
00844 63B0 96 75              LDA A    SPANEL
00845 63B2 84 FE              AND A    #$FE
00846 63B4 97 7A              STA A    MODE
00847 63B6 7F 00AA             CLR      STAT1
00848 63B9 96 AB              LDA A    STAT2
00849 63BB 8A 40              ORA A    #$40
00850 63BD 97 AB              STA A    STAT2
00851 63BF 7E 6008             JMP      PROG1
00852                  *
00853                  *
00854                  *
00855                  ******
00856                  * WORK SUBROUTINE
00857                  ******
00858                  *
00859                  *    FUNCTION: HANDLES THE TRANSMISSION OF DATA
00860                  *              WHILE MONITORING THE STATUS OF THE
00861                  *              INSTRUMENT. INFORMATION REGARDING
00862                  *              STATUS IS RETURNED IN ACCA
00863                  *
00864                  * PARAMETERS PASSED:
00865                  *
00866                  *              ACCA => CONTAINS STATUS OF PROGRAM
00867                  *
00868                  *                      0 => GOOD RETURN
00869                  *                      1 => FRONT PANEL CHANGED
00870                  *                      2 => NO SIGNAL LEVEL RECEIVED
00871                  *                      4 => CARRIER, NO ANSWER
```

```
00872              *                    B => SIGNAL IS NOT CARRIER
00873              *
00874              *                    ACCB => N/A
00875              *
00876              *                    X REGISTER => USED LOCALLY
00877              *
00878              *
00879              * ENTRY POINT: WORK
00880              *
00881              ******
00882              *
00883              *
00884              *
00885 63C2 D6 B4        WORK   LDA B  CONWD
00886 63C4 BD 64B1             JSR    XMITRQ     TRANSMIT THE CODE WORD
00887 63C7 7A 0086             DEC    LOOP
00888 63CA 26 F6               BNE    WORK       DO IT AGAIN
00889 63CC 7F 0087             CLR    ERROR1
00890 63CF 7F 0088             CLR    ERROR2
00891 63D2 BD 645F  RANGE2 JSR        CHECKR     CHECK FOR CHANGE IN FPANEL
00892 63D5 29 29               BVS    EXITR
00893 63D7 BD 7429             JSR    ARANGE     AUTORANGE IF NECESSARY
00894 63DA 28 35               BVC    RGECHK
00895 63DC 7F 0088             CLR    ERROR2
00896 63DF 7C 0087             INC    ERROR1
00897 63E2 86 30               LDA A  #$30
00898 63E4 91 87               CMP A  ERROR1
00899 63E6 27 07               BEQ    BE01
00900 63E8 86 01               LDA A  #$01
00901 63EA BD 64A3             JSR    WAITR      WAIT 100 MSEC.
00902 63ED 20 E3               BRA    RANGE2
00903 63EF 7F 0087  BE01       CLR    ERROR1
00904              ******
00905              * ERROR #1
00906              ******
00907 63F2 C6 01               LDA B  #$01       PASS ERROR NUMBER
00908 63F4 BD 751C             JSR    ERROR      WRITE ERROR MESSAGE
00909 63F7 86 0A               LDA A  #$0A
00910 63F9 BD 64A3             JSR    WAITR      WAIT 1 SECOND
00911 63FC 86 02               LDA A  #$02       RETURN THE STATUS
00912 63FE 20 50               BRA    RTURN1
00913 6400 85 01     EXITR BIT A    #$01        STATUS PASSED IN ACCA
00914 6402 26 4C               BNE    RTURN1
00915 6404 5F                  CLR B
00916 6405 BD 751C             JSR    ERROR      WRITE ERROR MESSAGE
00917 6408 86 0A               LDA A  #$0A
00918 640A BD 64A3             JSR    WAITR      WAIT 1 SECOND
00919 640D 86 01               LDA A  #$01
00920 640F 20 3F               BRA    RTURN1
00921 6411 CE 1388  RGECHK LDX        #$1388
00922 6414 09       WAIT2      DEX
00923 6415 26 FD               BNE    WAIT2      WAIT 40 MSEC.
00924 6417 7F 0087             CLR    ERROR1
00925 641A 0F                  SEI               DISABLE IRQ WHILE READING BUFFER
00926 641B 96 85               LDA A  ACIA0I     READ WORD STATUS
00927 641D D6 86               LDA B  ACIA1I     READ WORD
00928 641F 7F 0085             CLR    ACIA0I
00929 6422 0E                  CLI               ENABLE IRQ SYSTEM
00930 6423 85 04               BIT A  #$04       CARRIER DETECTED?
00931 6425 26 0A               BNE    NORPSE
00932 6427 85 01               BIT A  #$01       CHARACTER RECEIVED?
00933 6429 27 06               BEQ    NORPSE
00934 642B D7 AE               STA B  ANSWER     STORE RECEIVED WORD
00935 642D 16                  TAB               TRANSFER STATUS TO ACCB
00936 642E 4F                  CLR A
00937 642F 20 1F               BRA    RTURN1     EXIT: NO PROBLEM!
00938 6431 7C 0088  NORPSE INC        ERROR2
00939 6434 86 30               LDA A  #$30
00940 6436 91 88               CMP A  ERROR2
00941 6438 26 98               BNE    RANGE2
00942 643A 7F 0088             CLR    ERROR2
00943 643D B6 2000             LDA A  ACIA0
00944 6440 85 04               BIT A  #$04       CARRIER?
00945 6442 26 0D               BNE    BE11
00946              ******
```

```
00947                   * ERROR #2
00948                   ******
00949 6444 C6 02              LDA B    #$02
00950 6446 BD 751C             JSR     ERROR     WRITE ERROR MESSAGE
00951 6449 86 0A              LDA A    #$0A
00952 644B BD 64A3             JSR     WAITR     WAIT 1 SECOND
00953 644E 86 04              LDA A    #$04
00954 6450 39       RTURN1    RTS
00955                   ******
00956                   * ERROR #11
00957                   ******
00958 6451 C6 11       RE11   LDA B    #$11
00959 6453 BD 751C             JSR     ERROR     WRITE ERROR MESSAGE
00960 6456 86 0A              LDA A    #$0A      WAIT 1 SECOND
00961 6459 BD 64A3             JSR     WAITR
00962 645B 86 08              LDA A    #$08      PASS THE STATUS
00963 645D 20 F1              BRA     RTURN1
00964                   *
00965                   *
00966                   *
00967                   ******
00968                   * CHECK FRONT PANEL SUBROUTINE
00969                   ******
00970                   *     FUNCTION: EXAMINES THE PRESENT FRONT PANEL
00971                   *               STATUS AND DETERMINES IF THE THE
00972                   *               MASTER/SLAVE INITIALIZATION SHOULD
00973                   *               BE ABORTED!
00974                   *
00975                   *     PARAMETER PASSING:
00976                   *
00977                   *               CCR => V=1: ABORT
00978                   *                   => V=0: CONTINUE EXECUTING
00979                   *
00980                   *
00981                   *     ENTRY POINT: CHECKR
00982                   *
00983                   ******
00984                   *
00985                   *
00986 645F B6 1100 CHECKR LDA A   PANEL
00987 6462 85 03              BIT A    #$03      DIAL/TALK OR SELF CHECK?
00988 6464 26 35              BNE     BAD
00989 6466 96 A4              LDA A    STATP
00990 6468 2A 09              BPL     CHEKR1    HPTB FLAG SET?
00991 646A B6 1000             LDA A    FPANEL
00992 646D 84 18              AND A    #$18
00993 646F 27 07              BEQ     CHEKR2    CONTROL BITS = HPTB?
00994 6471 20 26              BRA     BAD1
00995 6473 B6 1000 CHEKR1 LDA A   FPANEL    HARDWARE FRONT PANEL
00996 6476 20 02              BRA     CHEKR3
00997 6478 96 EF  CHEKR2 LDA A   FPAN      HPTB FRONT PANEL IMAGE
00998 647A 85 02  CHEKR3 BIT A   #$02      MONITORING XMIT?
00999 647C 26 1B              BNE     BAD1      ABORT
01000 647E 16              TAB
01001 647F C4 F8              AND B    #$F8      GET FUNCTION AND MODE CONTROL BITS
01002 6481 C1 D8              CMP B    #$D8      DELAY*LEVEL
01003 6483 26 05              BNE     CHEKR4
01004 6485 C6 88              LDA B    #$88
01005 6487 84 04              AND A    #$04      GET MTS/STM CONTROL BIT
01006 6489 1B              ABA              LOGICAL "OR"
01007 648A 84 FC  CHEKR4 AND A   #$FC
01008 648C D6 75              LDA B    SPANEL
01009 648F C4 FC              AND B    #$FC
01010 6491 11              CBA
01011 6491 27 0D              BEQ     GOODY
01012 6493 84 18              AND A    #$18
01013 6495 81 18              CMP A    #$18
01014 6497 27 04              BEQ     BAD2
01015 6499 86 01  BAD1   LDA A    #$01
01016 649B 0B     BAD    SEV
01017 649C 39     BYE6   RTS
01018 649D 4F     BAD2   CLR A
01019 649E 20 FB              BRA     BAD
01020 64A0 0A     GOODY  CLV
01021 64A1 20 F9              BRA     BYE6
```

```
01022              *
01023              *
01024              *
01025              ******
01026              * WAIT SUBROUTINE
01027              ******
01028              *
01029              *     FUNCTION: GENERATES A WAIT INTERVAL
01030              *               IN 100 MSEC. STEPS
01031              *
01032              *     PARAMETERS PASSED:
01033              *
01034              *               ACCA => CONTAINS NUMBER OF
01035              *                       100 MSEC. INTERVALS
01036              *                       TO WAIT BEFORE RETURNING.
01037              *
01038              *               ACCB => N/A
01039              *
01040              *               X REGISTER => USED LOCALLY
01041              *
01042              *
01043              *     ENTRY POINT: WAIT
01044              *
01045              ******
01046              *
01047              *
01048 6443 4D      WAITR   TST  A
01049 6444 27 0A           BEQ  BYEBYE    CALLED WITH ACCA=0
01050 6446 CE 2710 REPET   LDX  #$2710    EXIT
01051 6449 09      SYNC10  DEX
01052 644A 01              NOP
01053 644B 26 FC           BNE  SYNC10
01054 644D 4A              DEC  A
01055 644F 26 F6           BNE  REPET
01056 6450 39      BYEBYE  RTS
01057              *
01058              *
01059              *
01060              *
01061              ******
01062              * TRANSMIT SUBROUTINE
01063              ******
01064              *
01065              *     FUNCTION: TRANSMITS CODE WORD WHEN THE
01066              *               TRANSMITTER COMES READY.
01067              *
01068              *     PARAMETERS PASSED:
01069              *
01070              *               ACCA => N/A
01071              *
01072              *               ACCB => CONTAINS CODE WORD TO
01073              *                       BE TRANSMITTED.
01074              *
01075              *               X REGISTER => USED LOCALLY;ITS
01076              *                       ENTRY VALUE IS SAVED
01077              *                       AND RETURNED AT COMPLETION.
01078              *
01079              *
01080              *     ENTRY POINT: XMITRQ
01081              *
01082              ******
01083 6481 DF 76   XMITRQ  STX   TEMP
01084 6483 B6 2000         LDA A ACIA0
01085 6486 84 02           AND A #$02
01086 6488 27 F7           BEQ   XMITRQ
01087 648A CE 186A         LDX   #$186A   INITIALIZE 50MSEC WAIT LOOP
01088 648D 09      SYNC2   DEX            KEEP THE ACIA HAPPY BY --
01089 648E 26 FD           BNE   SYNC2    GIVING IT 7 EXTRA STOP BITS
01090 64C0 F7 2001         STA B ACIA1
01091 64C3 DE 76           LDX   TEMP
01092 64C5 39              RTS
01093              *
01094              *
01095              ******
01096              * EXECUTIVE SUBROUTINE
```

```
01097                *****
01098                *
01099                *    FUNCTION: DETERMINES IF A PARTICULAR
01100                *              PROGRAM MODULE SHOULD
01101                *              CONTINUE EXECUTING OR IF
01102                *              SHOULD BE ABORTED.
01103                *
01104                *    PARAMETER PASSING:
01105                *
01106                *              CCR => V=1:ABORT
01107                *                  => V=0:CONTINUE EXECUTING
01108                *
01109                *    ENTRY POINT: LOOKUP
01110                *
01111                *****
01112                *
01113 64C6 96 AB    LOOKUP  LDA A   STAT2       LOAD THE CONTENTS OF STATUS REGISTER
01114 64C8 84 DF            AND A   #$DF        CLEAR THE DEBOUNCE FLAG
01115 64CA 97 AB            STA A   STAT2       STORE THE NEW STATUS
01116 64CC 2A 04            BPL     LOOK1B      BR IF HPTB FLAG NOT SET
01117 64CE B6 1000          LDA A   FPANEL      GET HPTB CONTROL BITS
01118 64D1 84 18            AND A   #$18        EXTRACT THE CONTROL BITS
01119 64D3 27 03            BEQ     LOOK1B      BR IF CONTROL BITS HAVE NOT CHANGED
01120 64D5 7E 65B5          JMP     BYE2        BITS CHANGED  EXIT FROM HPTB CONTROL
01121 64D8 96 75    LOOK1B  LDA A   SPANEL      GET FRONT PANEL STATUS
01122 64DA 84 1B            AND A   #$1B        MODE=SLAVE?
01123 64DC 81 08            CMP A   #$08
01124 64DE 26 03            BNE     NOSLAV
01125 64E0 7E 65B6          JMP     SLAVE2      YES!
01126 64E3 96 AA    NOSLAV  LDA A   STAT1
01127 64E5 84 02            AND A   #$02        S.C. FLAG SET
01128 64E7 27 03            BEQ     DTORSC
01129 64E9 7E 65BA          JMP     BYE1
01130 64EC C6 FF    DTORSC  LDA B   #$FF
01131 64EE BD 65C6          JSR     LDPNLA
01132 64F1 84 01            AND A   #$01        ENTERED SELF-CHECK?
01133 64F3 26 44            BNE     NDELAY
01134 64F5 F6 1100          LDA B   PANEL
01135 64F8 C4 02            AND B   #$02        ENTERED DIAL/TALK?
01136 64FA 26 3D            BNE     NDELAY
01137 64FC BD 65BA          JSR     LDFPLA      GET PRESENT FRONT PANEL STATUS
01138 64FF 84 18            AND A   #$18        GET MODE CONTROL BITS
01139 6501 81 18            CMP A   #$18        MASTER?
01140 6503 26 46            BNE     NORML1
01141 6505 96 AA            LDA A   STAT1       CHECK THE ABORT FLAGS
01142 6507 85 20            BIT A   #$20
01143 6509 26 2E            BNE     NDELAY
01144 650B 96 75            LDA A   SPANEL      GET PAST STATUS
01145 650D 85 02            BIT A   #$02        MONITORING TRANSMIT LEVEL?
01146 650F 26 08            BNE     PATCH1
01147 6511 84 F8            AND A   #$F8        EXTRACT FUNCTION CONTROL BITS
01148 6513 81 B8            CMP A   #$B8        EDD*DELAY?
01149 6515 26 25            BNE     NEDDM
01150 6517 20 06            BRA     PATCH2
01151 6519 84 F8    PATCH1  AND A   #$F8
01152 651B 81 D8            CMP A   #$D8
01153 651D 26 1D            BNE     NEDDM
01154 651F BD 65BA  PATCH2  JSR     LDFPLA
01155 6522 16               TAB                 GET PRESENT STATUS & TRANSFER
01156 6523 84 E0            AND A   #$E0
01157 6525 81 A0            CMP A   #$A0        EDD*DELAY?
01158 6527 27 04            BEQ     DDELAY
01159 6529 81 C0            CMP A   #$C0
01160 652B 26 0C            BNE     NDELAY
01161 652D 96 75    DDELAY  LDA A   SPANEL      GET PAST STATUS
01162 652F 84 06            AND A   #$06
01163 6531 C4 06            AND B   #$06        COMPARE MTS/STM STATUS BITS
01164 6533 11               CBA
01165 6534 26 03            BNE     NDELAY
01166 6536 7E 65BA          JMP     BYE1
01167 6539 7E 65B5  NDELAY  JMP     BYE2        STATUS CHANGE ABORT!
01168 653C D6 75    NEDDM   LDA B   SPANEL
01169 653E C4 FF            AND B   #$FE
01170 6540 BD 65BA          JSR     LDFPLA
01171 6543 84 FF            AND A   #$FE
```

```
01172 6545 11                 CBA
01173 6546 26 2A              BNE    LOOK3
01174 6548 7E 65BB            JMP    BYE1
01175              ******
01176              * CHECK FOR NORMAL ENVELOPE DELAY
01177              ******
01178 654B BD 65BA NORML1 JSR  LDFPLA    GET THE FRONT PANEL STATUS
01179 654E 84 FB             AND A  #$FB
01180 6550 81 B0             CMP A  #$B0     NORMAL ENVELOPE DELAY?
01181 6552 27 04             BEQ    LEVDLY
01182 6554 81 D0             CMP A  #$D0     DELAY*LEVEL?
01183 6556 26 0E             BNE    NOTEDD
01184 6558 BD 65BA LEVDLY JSR  LDFPLA
01185 655B 84 FB             AND A  #$FB     GET FUNCTION & MODE CONTROL BITS
01186 655D D6 75             LDA B  SPANEL
01187 655F C4 FB             AND B  #$FB
01188 6561 11                CBA
01189 6562 27 54             BEQ    BYE1
01190 6564 20 0C             BRA    LOOK3
01191 6566 BD 65BA NOTEDD JSR  LDFPLA
01192 6569 84 FA             AND A  #$FA     REMOVE THE NORMAL/REPEAT SWITCH
01193 656B D6 75             LDA B  SPANEL
01194 656D C4 FA             AND B  #$FA     REMOVE THE NORMAL/REPEAT SWITCH
01195 656F 11                CBA
01196 6570 27 46             BEQ    BYE1
01197 6572 96 AB  LOOK3 LDA A  STAT2    LOAD THE CONTENTS OF STATUS REGISTER
01198 6574 84 20             AND A  #$20     DEBOUNCE FLAG SET?
01199 6576 26 30             BNE    BYE2
01200 6578 86 01             LDA A  #$01
01201 657A BD 64A3            JSR    WAITR    WAIT 100 MSEC.
01202 657D 96 AB             LDA A  STAT2    LOAD THE CONTENTS OF STATUS REGISTER
01203 657F 84 20             ORA A  #$20     SET THE DEBOUNCE FLAG
01204 6581 97 AB             STA A  STAT2    STORE IN STATUS REGISTER #2
01205 6583 7E 64DB           JMP    LOOKTB
01206 6586 BD 65BA SLAVE2 JSR  LDFPLA    GET THE PRESENT FRONT PANEL STATUS
01207 6589 84 18             AND A  #$18     GET THE MODE CONTROL BITS
01208 658B 81 08             CMP A  #$08     SLAVE?
01209 658D 27 1A             BEQ    SLAVE3
01210              ******
01211              * INSTRUMENT IS NO LONGER A SLAVE! INFORM MASTER SET
01212              ******
01213 658F 86 05             LDA A  #$05
01214 6591 97 80             STA A  AREG     NO LONGER A SLAVE;TRANSMIT "ABORT"
01215 6593 C6 60             LDA B  #$60
01216 6595 F7 1700           STA B  XMIT     PROGRAM FSK OUTPUT
01217 6598 86 08             LDA A  #$08
01218 659A BD 64A3            JSR    WAITR    WAIT 800 MSEC. FOR DCD VALID
01219 659D C6 BF  AGAIN1 LDA B  #ABORT
01220 659F BD 64B1            JSR    XMITRO
01221 65A2 7A 0080           DEC    AREG
01222 65A5 26 F6             BNE    AGAIN1
01223 65A7 20 0C             BRA    BYE2     RETURN AN ABORT REQUEST
01224 65A9 96 AB  SLAVE3 LDA A  STAT2
01225 65AB 84 40             AND A  #$40
01226 65AD 27 06             BEQ    BYE2
01227 65AF 96 AA             LDA A  STAT1
01228 65B1 84 20             AND A  #$20     ABORT FLAGS SET?
01229 65B3 27 03             BEQ    BYE1
01230 65B5 0B   BYE2  SEV
01231 65B6 20 01             BRA    BYEWON
01232 65B8 0A   BYE1  CLV
01233 65B9 39   BYEWON RTS
01234              *
01235              *
01236              ********
01237              *
01238              * FRONT PANEL OR HPIB DECISION ROUTINES
01239              *
01240              ********
01241              *
01242 65BA 96 AB  LDFPLA LDA A  STAT2
01243 65BC 2B 05             BMI    DAVE1    BR IF HPIB
01244 65BE B6 1000           LDA A  FPANEL   NOT HPIB
01245 65C1 20 02             BRA    DAVE2
01246 65C3 96 F0  DAVE1 LDA A  HFPAN    IN HPIB
```

```
01247 65C5 39            DAVE2 RTS
01248                          *
01249                          *
01250                          *
01251                          *
01252 65C6 96 A9          LDPVLA LDA A    STAT2
01253 65C8 2B 05                 BMI      CAROL1    BR IF HPIR
01254 65CA B6 1100               LDA A    PANEL     NOT HPIR
01255 65CD 20 17                 BRA      CAROL3
01256 65CF 96 F2          CAROL1 LDA A    HPAN      IN HPIR
01257 65D1 5D             CAROL2 TST B              CHECK IF MOM. CONT.SWITCH TO BE RESE
01258 65D2 26 12                 BNE      CAROL3    BR IF NOT TO BE RESET
01259 65D4 D6 F3                 LDA B    HSTAT1
01260 65D6 C5 02                 BIT B    #$02      SEE IF MOCONX IS SET
01261 65D8 27 0C                 BEQ      CAROL3    BR IF NOT SET
01262 65DA C4 FD                 AND B    #$FD      CLEAR MOCONX
01263 65DC D7 F3                 STA B    HSTAT1
01264 65DE C6 F0                 LDA B    #$F0      RESETS MOMENTARY CONTACT SWITCHES TO
01265 65E0 DA F1                 ORA B    PAN
01266 65E2 D7 F1                 STA B    PAN       STORE IN TEMP REG
01267 65E4 D7 F2                 STA B    HPAN      STORE IN REFERENCE REGISTER
01268 65E6 39             CAROL3 RTS

00002                          *
00003                          *
00004                          *
00005                          *
00006                          ********                    ********
00007                          ********INTERRUPT SERVICE ROUTINE********
00008                          * THIS PROGRAM IS THE SOFTWARE AND HARDWARE INTERRUPT SERVI
00009                          * THE HIERARCHY OF IMPORTANCE IS HPIR,ACIA RCV,ACIA XMIT, T
00010                          * INTERRUPT INSTRUCTION CAUSES A VECTOR TO THE MIDDLE OF TH
00011                          * THEREBY BYPASSING THE POLLING OPERATION. THIS ROUTINE OPE
00012                          * TWO REGISTERS, "STAT1" AND "STAT2". THESE REGISTERS GIVE
00013                          * TO THE MAIN PROGRAMS ABOUT THE STATUS OF THE MACHINE.
00014                          ********VERSION 1.00********
00015                          ********ENTRY POINTS "HWIRQ" , "SWIRQ"********
00016                          ****************************************************
00017                          *
00018                          *
00019                          * FORMAT OF STATUS REGISTER #1
00020                          *
00021                          *  B7      B6      B5      B4      B3      B2      B1      B0
00022                          ****************************************************
00023                          * BAD  *ANSWER*      *       *STATUS* S.C. * DROP *
00024                          *------*------*ABORT1*ABORT2*SWEEP *------*      * OUT  *
00025                          *ANSWER* FLAG *      *       *      * WORD * FLAG * FLAG *
00026                          ****************************************************
00027                          *
00028                          *
00029                          * FORMAT OF STATUS REGISTER #2
00030                          *
00031                          *  B7      B6      B5      B4      B3      B2      B1      B0
00032                          ****************************************************
00033                          *      * M/S  * DE-  * DR  *BUFFER* XFER *BUFFER* DATA *
00034                          * HPIR *      *BALNCE*     *      *      *      *      *
00035                          *      * FLAG * FLAG * FLAG *INHIBT*INHIBT*READY * FLAG *
00036                          ****************************************************
00037                          *
00038                          *
00039 65E7 F6 3003 HWIRQ  LDA B    HPIRP+3   SAVE THE INTERRUPT FLAGS
00040 65EA B6 3002        LDA A    HPIRP+2
00041 65ED 85 10          BIT A    #$10      SEE IF HPIR OPTION IS INSTALLED
00042 65EF 26 03          BNE      ANIRQ     BR IF NOT INSTALLED
00043 65F1 BD 5800        JSR      FINDIT    SEE IF INTERRUPT IS CAUSED BY HPIR
00044 65F4 96 A4   ANIRQ  LDA A    STAT1     SEE IF SELF-CHECK FLAG IS SET
00045 65F6 85 02          BIT A    #$02
00046 65F8 27 03          BEQ      HWIRQ1    BR IF NOT IN SELF-CHECK
00047 65FA 7E 669B        JMP      SCIRQ     GO TO THE SELF-CHECK SERVICE ROUTINE
00048 65FD B6 2000 HWIRQ1 LDA A    ACIA0     GET THE ACIA STATUS REGISTER
00049 6600 2A 30          BPL      BYE4      IRQ WAS NOT FROM ACIA
00050 6602 F6 2001        LDA B    ACIA1
00051 6605 85 04          BIT A    #$04      DCD => 1?
00052 6607 26 60          BNE      CLRABT    DON'T STORE CHARACTERS?
00053 6609 97 B5          STA A    ACIA0I    STORE STATUS IN IMAGE
```

```
00054 660B 07 86              STA B   ACIA1I      STORE WORD IN IMAGE
00055 660D 85 70              BIT A   #$70        PARITY,FRAMING,OR OVERRUN ERRORS?
00056 660F 26 5A              BNE     CLRABT
00057 6611 96 86              LDA A   ACIA1I      GET THE RECEIVED WORD
00058 6613 16                 TAB
00059 6614 84 03              AND A   #$03        GET THE CONTROL BITS
00060 6616 81 02              CMP A   #$02        STATUS WORD
00061 6618 26 27              BNE     DATACK
00062 661A 96 AB              LDA A   STAT2
00063 661C 84 FC              AND A   #$FC        CLEAR THE FLAGS
00064 661F 97 AB              STA A   STAT2       RESTORE STATUS REGISTER
00065 6620 C1 BE              CMP B   #ABORT      ABORT REQUEST?
00066 6622 27 51              BEQ     ABORT4
00067 6624 96 AA              LDA A   STAT1
00068 6626 85 20              BIT A   #$20        ABORT FLAG SET?
00069 6628 26 04              BNE     BYE5
00070 662A 84 CF              AND A   #$CF
00071 662C 97 AA              STA A   STAT1
00072 662E C1 76   BYE5       CMP B   #SWEEP      SWEEP RQUEST? IF YES IGNORE AND
00073 6630 27 55              BEQ     RETURN      CLEAR THE DATA FLAGS.
00074 6632 C1 BA              CMP B   #START      START DATA BLOCK?
00075 6634 26 51              BNE     RETURN      SET ABORT FLAGS IF NOT
00076 6636 96 AB              LDA A   STAT2
00077 6638 8A 01              ORA A   #$01        SET THE DATA FLAG
00078 663A 97 AB              STA A   STAT2
00079 663C 7F 00B3            CLR     DATA+4      CLEAR THE DATA POINTER
00080 663F 20 56   BYE4       BRA     BYE
00081 6641 81 01   DATACK     CMP A   #$01        DATA FORMAT?
00082 6643 26 42              BNE     RETURN
00083 6645 96 AB              LDA A   STAT2
00084 6647 84 01              AND A   #$01        GET THE DATA FLAG
00085 6649 27 4C              BEQ     BYE
00086 664B 96 B3              LDA A   DATA+4      GET THE DATA POINTER
00087 664D CE 00AF            LDX     #DATA
00088 6650 DF 78              STX     IRTEMP      STORE THE VECTOR
00089 6652 9B 79              ADD A   IRTEMP+1
00090 6654 97 79              STA A   IRTEMP+1
00091 6656 24 03              BCC     SKIP3
00092 6658 7C 0078            INC     IRTEMP
00093 665B DE 78   SKIP3      LDX     IRTEMP      GET THE NEW POINTER
00094 665D E7 00              STA B   X
00095 665F 8C 00B2            CPX     #DATA+3     END OF BUFFER? **
00096 6662 27 2B              BEQ     CLOSEB      CLOSE THE BUFFER
00097 6664 7C 00B3            INC     DATA+4
00098 6667 20 2E              BRA     BYE
00099 6669 96 AA   CLRABT     LDA A   STAT1
00100 666B 85 20              BIT A   #$20
00101 666D 26 1B              BNE     RETURN
00102 666F 84 CF              AND A   #$CF
00103 6671 97 AA              STA A   STAT1
00104 6673 20 12              BRA     RETURN
00105 6675 96 AA   ABORT4     LDA A   STAT1
00106 6677 85 10              BIT A   #$10        FIRST REQUEST?
00107 6679 27 06              BEQ     ABORT5
00108 667B 8A 20              ORA A   #$20        INFORM EXECUTIVE TO ABORT
00109 667D 97 AA              STA A   STAT1
00110 667F 20 06              BRA     RETURN
00111 6681 8A 10   ABORT5     ORA A   #$10        SET FIRST ABORT REQUEST FLAG
00112 6683 97 AA              STA A   STAT1
00113 6685 20 00              BRA     RETURN
00114 6687 96 AB   RETURN     LDA A   STAT2
00115 6689 84 FE              AND A   #$FE        CLEAR THE DATA FLAGS
00116 668B 97 AB              STA A   STAT2
00117 668D 20 08              BRA     BYE
00118 668F 96 AB   CLOSEB     LDA A   STAT2
00119 6691 84 FF              AND A   #$FE        CLEAR DATA FLAG
00120 6693 8A 02              ORA A   #$02        SET THE READY FLAG
00121 6695 97 AB              STA A   STAT2
00122 6697 3B      BYE        RTI
00123 6698 B6 2000 SCIRQ      LDA A   ACIA0
00124 669B 97 C7              STA A   SCHL
00125 669D B6 2001            LDA A   ACIA1       RECEIVE DATA
00126 66A0 97 C8              STA A   SCHL+1
00127 66A2 3B                 RTI
```

```
00002                *
00003                *
00004                *
00005                *
00006                       ******                      ******
00007                       ****** NONMASKABLE INTERRUPT SERVICE ROUTINE ******
00008                       ***************************************************
00009                * THIS ROUTINE SERVICES THE NONMASKABLE INTERRUPT. THIS
00010                * INTERRUPT IS CAUSED BY A TIME BASE GENERATOR WHICH
00011                * CAUSES AN INTERRUPT ONCE EACH SECOND. THE ROUTINE
00012                * INCREMENTS THE SOFTWARE CLOCK USED IN IMPULSE NOISE.
00013                * UPON TIME OUT THIS ROUTINE WILL CLOSE THE IMPULSE NOISE
00014                * GATE. THIS ASSURES AN ACCURATE TIME INTERVAL REGARDLESS
00015                * OF THE NUMBER OF INTERRUPTS FROM HPIB OR MASTER/SLAVE.
00016                ***************************************************
00017                ****** VERSION: 1.00
00018                ****** ENTRY POINT: NMIRQ
00019                *
00020                ******
00021                * EQUIVALENCES
00022                ******
00023                *
00024                *
00025       0048     CLOCK   EQU    GREG+4         DEFINE SOFTWARE CLOCK TO BE MSBYTE D
00026       0096     TIME    EQU    DREG+4         STORAGE LOCATION FOR TIME PERIOD
00027                *
00028                *
00029                *
00030                *
00031 66A3 86 01     NMIRQ   LDA A  #$01
00032 66A5 9B 49             ADD A  CLOCK+1
00033 66A7 19                DAA                   INCREMENT THE SECONDS OF SOFTWARE CL
00034 66A8 81 60             CMP A  #$60           60 SECONDS?
00035 66AA 27 04             BEQ    CLOCK0         NO!
00036 66AC 97 49             STA A  CLOCK+1        STORE NEW TIME AND RETURN FROM INTE
00037 66AF 20 22             BRA    BYE000
00038 66B0 7F 0049 CLOCK0    CLR    CLOCK+1        SECONDS=60.INCREMENT MINUTES.CLEAR
00039 66B3 86 01             LDA A  #$01
00040 66B5 9B 48             ADD A  CLOCK
00041 66B7 19                DAA
00042 66B8 97 48             STA A  CLOCK
00043 66BA 96 96             LDA A  TIME           GET TIME INTERVAL REQUESTED
00044 66BC 27 14             BEQ    BYE000
00045 66BE 91 48             CMP A  CLOCK          CLOCK=TIME INTERVAL REQUESTED?
00046 66C0 27 02             BEQ    CLOSE0         YES.CLOSE THE GATE
00047 66C2 20 0F             BRA    BYE000
00048 66C4 4F     CLOSE0     CLR A                 FIX THE HARDWARE GLITCH BY STORING 7
00049 66C5 B7 1400           STA A  CONTRL
00050 66C8 4F                CLR A                 FIX THE HARDWARE GLITCH BY STORING 7
00051 66C9 B7 1F00           STA A  CLOCKR         HALT THE TIME BASE MARKER GENERATOR
00052 66CC 96 4B             LDA A  STAT2
00053 66CE 8A 0C             ORA A  #$0C
00054 66D0 97 4B             STA A  STAT2          SET THE BUFFER INHIBIT FLAG
00055 66D2 3B     BYE000     RTI

00002                *
00003                *
00004                *
00005                *
00006                       ******                      ******
00007                       ****** LEVEL/FREQUENCY ROUTINE ******
00008                       ***************************************************
00009                * THIS IS THE LEVEL/FREQUENCY MAIN ROUTINE. IT CALLED BY SY
00010                * AND PERFORMS THE TASKS OF MEASURING THE LEVEL AND FREQUEN
00011                * THE INPUT SIGNAL. IT HANDLES THE DATA BUFFER USED IN MAST
00012                * AND MONITORS THE STATUS OF THE FRONT PANEL. IF THERE IS A
00013                * IN THE FUNCTION CONTROL SWITCHES THE PROGRAM RELINQUISHES
00014                * BACK TO SYSTEM. THE "DB" FLAG AND LEVEL REFERENCE REGISTE
00015                * ONLY BE CLEARED IF THERE WAS A CHANGE IN MEASUREMENT OR A
00016                * MODE, I.E. A CHANGE FROM "MTS" TO "STM".
00017                ***************************************************
00018 66D3 96 4A    LEVEL    LDA A  STAT1
00019 66D5 85 02             BIT A  #$02           SELF CHECK FLAG SET?
00020 66D7 27 04             BEQ    LNORM          NO! LOAD NORMAL RANGE LIMITS
00021 66D9 86 07             LDA A  #$07
00022 66DB 20 02             BRA    LSCHK
```

```
00023 66DD 86 37     LNORM   LDA A   #$37
00024 66DF 97 AD     LSCHK   STA A   RANGE
00025 66E1 BD 7429           JSR     ARANGE      CALL AUTORANGE SUBROUTINE
00026 66E4 28 03             BVC     BFIX01      FIX THE BRANCH LIMIT PROBLEM
00027 66E6 7E 68C5            JMP     BADRGE      OUT OF RANGE
00028 66E9 96 75     BFIX01  LDA A   SPANEL      LOAD PREVIOUS FRONT PANEL STATUS
00029 66EB 16                TAB
00030 66EC 84 18             AND A   #$18        OBTAIN THE INSTRUMENTS OPERATING MOD
00031 66EE 81 08             CMP A   #$08        SLAVE?
00032 66F0 26 03             BNE     BFIX15      FIX THE BRANCH LIMIT PROBLEM
00033 66F2 7E 6888            JMP     LSLAVE      MODE=SLAVE,DETERMINE MEASUREMENT DIR
00034 66F5 C4 02     BFIX15  AND B   #$02        IS INSTRUMENT MONITORING THE OUTPUT
00035 66F7 26 0B             BNE     NORM
00036 66F9 D6 75             LDA B   SPANEL      LOAD THE PREVIOUS FRONT PANEL STATUS
00037 66FB C4 1C             AND B   #$1C        GET THE FUNCTION AND DIRECTION CONTR
00038 66FD C1 1C             CMP B   #$1C        MASTER*MTS?
00039 66FF 26 03             BNE     NORM
00040 6701 7E 686B            JMP     LEVMTR      INSTRUMENT IN THE MASTER MODE
00041                ******
00042                * MEASURE DETECTOR OUTPUT LEVEL
00043                ******
00044 6704 CE 0080   NORM    LDX     #AREG       SET POINTER TO ADDRESS OF SOFTWARE R
00045 6707 BD 768B           JSR     CLEAR       0->[A],CLEAR REGISTER "A"
00046 670A BD 7568           JSR     DRM         GET THE AUTORANGE RECORD
00047 670D A6 01             LDA A   1,X         LOAD THE FIRST WORD OF RECORD
00048 670F 97 84             STA A   AREG+4
00049 6711 A6 00             LDA A   X           GET THE SECOND WORD OF RECORD
00050 6713 27 06             BEQ     PLUS        POSITIVE QUANTITY,DO NOT COMPLEMENT
00051 6715 CE 0080           LDX     #AREG       SET POINTER TO ADDRESS OF SOFTWARE R
00052 6718 BD 75FC           JSR     CMPIT       [A]'->[A] GENERATE THE 10'S COMPLEME
00053 671B CE 0086   PLUS    LDX     #BREG       SET POINTER TO ADDRESS OF SOFTWARE R
00054 671E BD 768B           JSR     CLEAR       0->[B],CLEAR REGISTER "B"
00055 6721 BD 7698           JSR     READIT      COUNTER->[B],6 DECADES
00056 6724 BD 7636           JSR     BCDADD      [A]+[B]->[A],DECIMAL ADDITION
00057 6727 96 AA             LDA A   STAT1       GET STATUS REGISTER #1
00058 6729 85 02             BIT A   #$02        SELF-CHECK?
00059 672B 26 3B             BNE     ABSOLT      BRANCH IF YES
00060 672D 96 75             LDA A   SPANEL      LOAD PREVIOUS FRONT PANEL STATUS
00061 672F 84 18             AND A   #$18        SLAVE?
00062 6731 81 08             CMP A   #$08        SLAVE?
00063 6733 26 02             BNE     REFER
00064 6735 20 31             BRA     ABSOLT      ROUND TO NEAREST 0.1 DB AND TRANSMIT
00065                ******
00066                * CHECK FOR REFERENCE MODE
00067                ******
00068 6737 96 75     REFER   LDA A   SPANEL
00069 6739 84 02             AND A   #$02        MONITORING THE TRANSMITTER LEVEL?
00070 673B 26 13             BNE     NOLREF
00071 673D 5F               CLR B
00072 673E BD 65C6           JSR     LDPVLA
00073 6741 49                ROL A               CHECK TO SEE IF SET LEVEL REFERENCE
00074 6742 25 0C             BCS     NOLREF
00075 6744 CE 00A4           LDX     #GREG       SET POINTER TO REFERENCE STORAGE REG
00076 6747 BD 76FF           JSR     MOVE        [A]->[G],MOVE THE CONTENTS
00077 674A 96 AB             LDA A   STAT2       LOAD STATUS REGISTER #2
00078 674C 8A 10             ORA A   #$10        SET THE DB FLAG
00079 674E 97 AB             STA A   STAT2       STORE NEW STATUS
00080 6750 96 AB     NOLREF  LDA A   STAT2       IS DB FLAG SET?
00081 6752 84 10             AND A   #$10
00082 6754 27 12             BEQ     ABSOLT      NO!,ABSOLUTE LEVEL MODE
00083 6756 96 75             LDA A   SPANEL      LOAD PREVIOUS FRONT PANEL STATUS
00084 6758 84 02             AND A   #$02        CHECK TO SEE IF IN RECEIVE MODE
00085 675A 26 0C             BNE     ABSOLT      NO! IS IN TRANSMIT MODE
00086 675C CE 0080           LDX     #AREG       SET POINTERR TO ADDRESS OF SOFTWARE
00087 675F BD 75FC           JSR     CMPIT       [A]'->[A],GENERATE 10'S COMPLEMENT
00088 6762 CE 00A4           LDX     #GREG       SET POINTER TO ADDRESS OF SOFTWARE R
00089 6765 BD 7636           JSR     BCDADD      [A]+[G]->[A],DECIMAL ADDITION
00090                ******
00091                * ABSOLUTE LEVEL MODE
00092                ******
00093 6768 CE 0086   ABSOLT  LDX     #BREG       SET POINTER TO ADDRESS OF SOFTWARE R
00094 676B BD 768B           JSR     CLEAR       0->[B],CLEAR REGISTER "B"
00095 676E 86 05             LDA A   #$05
00096 6770 97 8B             STA A   BREG+5      STORE 05 IN REGISTER "B"
00097 6772 BD 7636           JSR     BCDADD      [A]+[B]->[A],THIS IS THE 0.1 DB ROUN
00098 6775 96 85             LDA A   AREG+5
```

```
00099 6777 84 F0                AND A   #$F0
00100 6779 97 85                STA A   AREG+5    CLEAR THE HUNDREDTHS POSITION
00101 677B 96 75                LDA A   SPANEL    SET FRONT PANEL IMAGE
00102 677D 84 18                AND A   #$18
00103 677F 81 08                CMP A   #$08      SLAVE?
00104 6781 26 0C                BNE     NORM02    IF SLAVE,TRANSMIT DATA
00105               ******
00106               * TRANSMIT LEVEL DATA TO MASTER
00107               ******
00108 6783 CE 0080  MISSLV LDX  #AREG     SET THE WORKING POINTER
00109 6786 BD 7665         JSR  RSHIFT    LOSE THE 0.01 DB POSITION
00110 6789 BD 7813         JSR  WDATA
00111 678C 7E 6813         JMP  NMSTER
00112 678F 96 80   NORM02 LDA A AREG      LOAD MOST SIGNIFICANT BYTE OF REGIST
00113 6791 84 F0          AND A #$F0
00114 6793 27 0E          BEQ   TRUE      BYTE IS ZERO,RESULT IS POSITIVE
00115 6795 CE 0080        LDX   #AREG     SET POINTER TO ADDRESS OF SOFTWARE R
00116 6798 BD 75FC        JSR   CMPIT     [A]'->[A],GENERATE 10'S COMPLEMENT
00117 679B 96 7D          LDA A PROG+2    LOAD LEFT DISPLAY ANNUNCIATOR IMAGE
00118 679D 8A C0          ORA A #$C0
00119 679F 84 DF          AND A #$DF      ENABLE "-",CLEAR OVERFLOW DIGIT
00120 67A1 20 06          BRA   STORE
00121 67A3 96 7D   TRUE   LDA A PROG+2    LOAD LEFTD DISPLAY ANNUNCIATOR IMAGE
00122 67A5 8A 80          ORA A #$80
00123 67A7 84 9F          AND A #$9F      ENABLE "+",CLEAR THE OVERFLOW DIGIT
00124 67A9 97 7D   STORE  STA A PROG+2    STORE NEW ANNUNCIATOR STATUS
00125 67AB CE 009F        LDX   #FREG     SET POINTER TO ADDRESS OF SOFTWARE R
00126 67AE BD 76FF        JSR   MOVE      [A]->[F],MOVE THE CONTENTS
00127 67B1 CE 00C7        LDX   #SC4L
00128 67B4 BD 76FF        JSR   MOVE
00129               ******
00130               * MEASURE FREQUENCY OF PLL
00131               ******
00132 67B7 CE 0080        LDX   #AREG     MEASURE FREQ. AND PLACE IN AREG.
00133 67BA BD 76C9        JSR   FREQ      MEASURE FREQUENCY
00134 67BD CE 00C1        LDX   #SC4F
00135 67C0 BD 76FF        JSR   MOVE
00136               ******
00137               * SHIFT AND DUMP REGISTER TO RIGHT DISPLAY
00138               ******
00139 67C3 CE 0080        LDX   #AREG
00140 67C6 C6 08          LDA B #$08
00141 67C8 BD 767B  SHIFT JSR  LSHIFT     BCD LEFT SHIFT SUBROUTINE
00142 67CB 5A            DEC B            SHIFT 8 DECADES TO MOST SIGNIFICANT
00143 67CC 26 FA         BNE   SHIFT
00144 67CE BD 7741       JSR   RDSPLY     DISPLAY DUMP+ZERO SUPPRESSION SUBROU
00145 67D1 96 7D         LDA A PROG+2
00146 67D3 D6 75         LDA B SPANEL     LOAD THE PREVIOUS FRONT PANEL STATUS
00147 67D5 C4 02         AND B #$02       MONITOR TRANSMITTER?
00148 67D7 26 0C         BNE   XMITLV     YES!
00149 67D9 D6 A9         LDA B STAT2      MONITORING RECEIVE,CHECK FOR DR FLAG
00150 67DB C4 10         AND B #$10
00151 67DD 27 06         BEQ   XMITLV
00152 67DF 84 FD         AND A #$FD       CLEAR THE DRM BIT
00153 67E1 8A 10         ORA A #$10       SET THE DR BIT
00154 67E3 20 06         BRA   STORE1
00155 67E5 96 7D  XMITLV LDA A PROG+2     GET THE LEFT DISPLAY ANNUNCIATOR IMA
00156 67E7 84 EF         AND A #$EF       CLEAR THE DR CONTROL BIT
00157 67E9 8A 02         ORA A #$02       SET THE DRM CONTROL BIT
00158 67EB 97 7D  STORE1 STA A PROG+2     UP-DATE THE LEFTD DISPLAY ANNUNCIATO
00159              ******
00160              * SHIFT AND DUMP REGISTER TO LEFT DISPLAY
00161              ******
00162 67ED CE 009F        LDX   #FREG     SET POINTER TO ADDRESS OF SOFTWARE R
00163 67F0 C6 05          LDA B #$05
00164 67F2 BD 767B SHIFT7 JSR  LSHIFT     BCD LEFT SHIFT SUBROUTINE
00165 67F5 5A            DEC B            SHIFT 5 DECADES
00166 67F6 26 FA         BNE   SHIFT7
00167 67F8 BD 779D       JSR   LDSPLY     DISPLAY DUMP+ZERO SUPPRESSION SUBROU
00168              ******
00169              * TRANSMIT FREQUENCY CONTROL DATA TO SLAVE
00170              ******
00171 67FB 96 75  XFDATA LDA A SPANEL     LOAD PREVIOUS STATUS OF FRONT PANEL
00172 67FD 84 1E         AND A #$1E
00173 67FF 81 18         CMP A #$18       (MASTER*STM*RECEIVE)?
```

```
00174 6801 26 10              BNE    NMSTER
00175 6803 B6 1A00            LDA A  HREM      LOAD MOST SIGNIFICANT BYTE OF XMIT C
00176 6806 97 90              STA A  CREG+4    STORE IN SOFTWARE REGISTER "C"
00177 6808 B6 1B00            LDA A  HREL      LOAD LEAST SIGNIFICANT BYTE OF XMIT
00178 680B 97 91              STA A  CREG+5    STORE IN SOFTWARE REGISTER "C"
00179 680D CE 008C            LDX    #CREG     SET POINTER TO ADDRESS OF SOFTWARE R
00180 6810 BD 7813            JSR    WDATA
00181                  ******
00182                  * CHECK FOR PROGRAM ABORT SITUATION
00183                  ******
00184 6813 96 AA  NMSTER LDA A  STAT1
00185 6815 84 02              AND A  #$02
00186 6817 27 01              BEQ    DRET
00187 6819 39                 RTS
00188 681A BD 64C6 DRET JSR    LOOKUP
00189 681D 29 03              BVS    CLRREF    PROGRAM ABORT PENDING
00190 681F 7E 66D3            JMP    LEVEL     RETURN TO BEGINNING OF PROGRAM
00191                  ******
00192                  * ABORT! CLEAR REFERENCE?
00193                  ******
00194 6822 96 75  CLRREF LDA A  SPANEL    WHERE ARE WE?
00195 6824 84 F8              AND A  #$F8
00196 6826 81 D0              CMP A  #$D0      DELAY*LEVEL?
00197 6828 27 31              BEQ    LDELAY
00198 682A BD 65BA            JSR    LDFPLA    LOAD FRONT PANEL OR HPTB
00199 682D 84 F8              AND A  #$F8      MASK OFF MODE AND FUNCTION
00200 682F D6 75              LDA B  SPANEL    LOAD PREVIOUS FRONT PANEL STATUS
00201 6831 C4 F8              AND B  #$F8      MASK OFF MODE AND FUNTION
00202 6833 11                 CBA              COMPARE PRESENT MODE AND FUNCTION
00203 6834 26 17              BNE    CHANGE    CHANGE IN MODE OR FUNCTION,CLEAR THE
00204 6836 96 75              LDA A  SPANEL    LOAD PREVIOUS FRONT PANEL STATUS
00205 6838 84 18              AND A  #$18
00206 683A 81 18              CMP A  #$18      IS INSTRUMENT IN MASTER MODE
00207 683C 27 0C              BEQ    ABORT1
00208 683E D6 75              LDA B  SPANEL
00209 6840 C4 04              AND B  #$04
00210 6842 BD 65BA            JSR    LDFPLA
00211 6845 84 04              AND A  #$04
00212 6847 11                 CBA              CHANGE IN MEASUREMENT DIRECTION?
00213 6848 26 03              BNE    CHANGE
00214 684A 7E 5F0D ABORT1 JMP    SYSTEM
00215 684D 96 AB  CHANGE LDA A  STAT2     LOAD CONTENTS OF STATUS #2, CLEAR OR
00216 684F 84 EF              AND A  #$EF
00217 6851 97 AB              STA A  STAT2     STORE NEW STATUS IN STAT2
00218 6853 CE 00A4            LDX    #GREG     SET POINTER TO ADDRESS OF SOFTWARE R
00219 6856 BD 768B            JSR    CLEAR     0->IG1,CLEAR THE REFERENCE REGISTER
00220 6859 20 EF              BRA    ABORT1
00221 685B BD 65BA LDELAY JSR    LDFPLA    WHERE ARE WE GOING?
00222 685E 16                 TAB
00223 685F 84 F8              AND A  #$F8
00224 6861 81 D0              CMP A  #$D0
00225 6863 27 E5              BEQ    ABORT1    RETURN WITHOUT CLEARING REFERENCE
00226 6865 81 B0              CMP A  #$B0
00227 6867 27 E1              BEQ    ABORT1
00228 6869 20 E2              BRA    CHANGE
00229                  ******
00230                  * GET LEVEL DATA FROM SLAVE
00231                  ******
00232 686B BD 7877 LEVMTR JSR    RBUFF     CHECK RECEIVED BUFFER
00233 686E 29 43              BVS    NMSTER
00234 6870 96 84              LDA A  AREG+4    CHECK FOR NEGATIVE RESULT
00235 6872 84 F0              AND A  #$F0
00236 6874 81 90              CMP A  #$90
00237 6876 26 0A              BNE    SKIP2
00238 6878 86 99              LDA A  #$99      MOST SIGNIFICANT DATA NIBBLE IS "9"
00239 687A 97 83              STA A  AREG+3    DATA IS IN 10'S COMPLEMENT FORMAT
00240 687C 97 82              STA A  AREG+2    COMPLETE 10'S COMPLEMENT FORMAT
00241 687E 97 81              STA A  AREG+1
00242 6880 97 80              STA A  AREG
00243 6882 BD 767B SKIP2 JSR    LSHIFT
00244 6885 7E 6737            JMP    REFER
00245                  ******
00246                  * MODE=SLAVE,DETERMINE MEASUREMENT DIRECTION
00247                  ******
00248 6888 96 7D  LSLAVE LDA A  PROG+2
```

```
00249 68AA B7 1200           STA A   ANNJVL     UPDATE LEFT DISPLAY ANNUNCIATOR
00250 68AD 96 7E             LDA A   PROG+3
00251 68AF B7 1300           STA A   ANNJVR     UPDATE RIGHT DISPLAY ANNUNCIATOR
00252 68B2 96 75             LDA A   SPANEL
00253 68B4 84 04             AND A   #$04       MODE=SLAVE
00254 68B6 27 03             BEQ     FDATA
00255 68B8 7E 6704           JMP     NORM       MEASUREMENT DIRECTION=SLAVE-TO-MASTE
00256                ******
00257                * GET THE FREQUENCY CONTROL DATA FROM THE MASTER
00258                ******
00259 68BB CE 0080   FDATA   LDX     #AREG      SET THE WORKING POINTER
00260 68BE BD 7877           JSR     RBUFF
00261 68C1 28 02             BVC     STOREX
00262 68C3 20 1D             BRA     ABORT2
00263                ******
00264                * PATCH THE TRANSMITTER
00265                ******
00266 68C5 B6 1A00   STOREX  LDA A   HRFM       GET DIGITS D3 & D2 OF TRANSMITTER
00267 68C8 97 76             STA A   TEMP       SAVE IN TEMP
00268 68CA B6 1B00           LDA A   HRFL       GET DIGITS D1 & D0 OF TRANSMITTER
00269 68CD 97 77             STA A   TEMP+1
00270 68CF DE 84             LDX     AREG+4     GET NEW TRANSMITTER DATA
00271 68D1 9C 76             CPX     TEMP       SAME?
00272 68D3 27 0D             BEQ     ABORT2     YES! DON'T BOTHER THE TRANSMITTER
00273 68D5 96 85             LDA A   AREG+5     LOAD THE TRANSMIT CONTROL COUNT
00274 68D7 B7 1900           STA A   HWFL       STORE IN LEAST SIGNIFICANT TWO DECAD
00275 68DA 96 84             LDA A   AREG+4     LOAD THE TRANSMIT CONTROL COUNT
00276 68DC B7 1800           STA A   HWFM
00277 68DF B7 1800           STA A   HWFM       DO IT TWICE TO MAKE SURE PAUL GETS I
00278 68C2 7E 6813   ABORT2  JMP     NMSTER
00279                ******
00280                * OUT OF RANGE,TRANSMIT "BE10" IF MODE=SLAVE*MTS
00281                ******
00282 68C5 86 FF     BADRGE  LDA A   #$FF       INFORM SELF CHECK THAT LEVEL OUT OF
00283 68C7 97 CA             STA A   SCHL+3
00284 68C9 96 75             LDA A   SPANEL     LOAD PREVIOUS FRONT PANEL STATUS
00285 68CB 84 1C             AND A   #$1C       STATUS=(SLAVE*MASTER-TO-SLAVE)?
00286 68CD 81 0C             CMP A   #$0C
00287 68CF 27 03             BEQ     BFIX07     FIX THE BRANCH LIMIT PROBLEM
00288 68D1 7E 67FB           JMP     XFDATA
00289 68D4 CE 0080   BFIX07  LDX     #AREG      SET POINTER
00290 68D7 BD 768B           JSR     CLEAR
00291 68DA CE BE10            LDX    #$BE10     ERROR CODE B-10
00292 68DD DF 84             STX     AREG+4
00293 68DF CE 0080            LDX    #AREG
00294 68E2 BD 767B           JSR     LSHIFT
00295 68E5 7E 6783           JMP     MTSSLV

00002                *
00003                *
00004                *
00005                *
00006                ******                              ******
00007                ****** MESSAGE CIRCUIT NOISE ROUTINE ******
00008                ************************************************
00009                * THIS IS THE MESSAGE CIRCUIT NOISE ROUTINE. IT IS CALLED B
00010                * AND PERFORMS THE TASK OF MEASURING THE LEVEL OF C-WEIGHTE
00011                * NOISE. IT HANDLES THE DATA BUFFER USED IN MASTER/SLAVE AN
00012                * MONITORS THE STATUS OF THE FRONT PANEL. IF THERE IS A CHA
00013                * IN THE FUNCTION CONTROL SWITCHES THE PROGRAM RELINQUISHES
00014                * BACK TO SYSTEM.
00015                ****** VERSION: 1.00 ******
00016                ****** ENTRY POINT: MCNOIS ******
00017                ************************************************
00018 68E8 96 75     MCNOIS  LDA A   SPANEL     LOAD PREVIOUS STATUS OF FRONT PANEL
00019 68EA 84 02             AND A   #$02       MONITORING THE TRANSMITTER?
00020 68EC 27 06             BEQ     MCNRCC
00021 68EE 86 37             LDA A   #$37       STORING THE TRANSMITTER AUTORANGE LI
00022 68F0 97 AD             STA A   RANGE
00023 68F2 20 04             BRA     MCNRGE
00024 68F4 86 07     MCNRCC  LDA A   #$07       STORING THE RECEIVER AUTORANGE LIMIT
00025 68F6 97 AD             STA A   RANGE
00026 68F8 BD 7429   MCNRGE  JSR     ARANGE     CALL THE AUTORANGE SUBROUTINE
00027 68FB 28 03             BVC     BFIX12     BLANK THE DISPLAY,SIGNAL OUT OF RANG
00028 68FD 7E 69D9           JMP     RGELMT
00029 6900 96 75     BFIX12  LDA A   SPANEL     LOAD PREVIOUS STATUS OF FRONT PANEL
```

```
00030 6902 16                    TAB
00031 6903 84 18                 AND  A   #$18      OBTAIN THE INSTRUMENTS OPERATING MOD
00032 6905 81 08                 CMP  A   #$08      SLAVE?
00033 6907 26 03                 BNE      CONTJ6    FIX THE BRANCH LIMIT PROBLEM
00034 6909 7E 69C7                JMP      SLVMCN    MODE=SLAVE,DETERMINE MEASUREMENT DIR
00035 690C C4 02   CONTU6  AND  B   #$02      IS INSTRUMENT MONITORING THE OUTPUT
00036 690E 26 03                 BNE      MNXMIT    FIX THE BRANCH LIMIT PROBLEM
00037 6910 7E 69A9                JMP      MCNRCV
00038                      ******
00039              * MEASURE DETECTOR OUTPUT LEVEL
00040                      ******
00041 6913 CE 0080 MNXMIT  LDX      #AREG     SET POINTER TO ADDRESS OF SOFTWARE R
00042 6916 BD 76BB                 JSR      CLEAR     0->A,CLEAR REGISTER A
00043 6919 BD 7568                 JSR      DBM       GET THE TRANSMIT RANGE RECORD
00044 691C A6 01   MCRCRD  LDA  A   1,X       LOAD THE FIRST BYTE OF RECORD
00045 691E 97 84                   STA  A   AREG+4    STORE IN SOFTWARE REGISTER A
00046 6920 A6 00                   LDA  A   X         LOAD THE SECOND BYTE OF RECORD
00047 6922 81 90                   CMP  A   #$90      NEGATIVE?
00048 6924 26 06                   BNE      MCNPOS    RECORD IS NEGATIVE,CHANGE TO 10'S CO
00049 6926 CE 0080                 LDX      #AREG     SET POINTER TO ADDRESS OF SOFTWARE R
00050 6929 BD 75FC                 JSR      CMPIT     [A]'->[A],10'S COMPLEMENT
00051 692C CE 0086 MCNPOS  LDX      #BREG     SET POINTER TO ADDRESS OF SOFTWARE R
00052 692F BD 76BB                 JSR      CLEAR     0->B,CLEAR REGISTER B
00053 6932 BD 769B                 JSR      READIT    COUNTER->B,DATA ACQUISITION
00054 6935 BD 7636                 JSR      BCDADD    [A]+[B]->[A],DECIMAL ADDITION
00055 6938 BD 76BB                 JSR      CLEAR     0=>[B]
00056 693B 96 7B                   LDA  A   PROG      GET THE RECEIVER PROGRAM IMAGE
00057 693D 84 80                   AND  A   #$80      WHICH DETECTOR?
00058 693F 26 0C                   BNE      MCNFWA
00059 6941 86 50                   LDA  A   #$50
00060 6943 97 8B                   STA  A   BREG+5
00061 6945 BD 7636                 JSR      BCDADD
00062 6948 7F 0085                 CLR      AREG+5
00063 694B 20 0D                   BRA      CONTJ7
00064 694D 86 05   MCNFWA  LDA  A   #$05      ROUNDUP TO NEAREST 0.1 DB
00065 694F 97 8B                   STA  A   BREG+5
00066 6951 BD 7636                 JSR      BCDADD
00067 6954 96 85                   LDA  A   AREG+5
00068 6956 84 F0                   AND  A   #$F0
00069 6958 97 85                   STA  A   AREG+5
00070 695A 96 75   CONTU7  LDA  A   SPANEL    LOAD PREVIOUS FRONT PANEL STATUS
00071 695C 84 18                   AND  A   #$18
00072 695E 81 08                   CMP  A   #$08      SLAVE?
00073 6960 26 03                   BNE      MCNVOR    INSTRUMENT STATUS=MASTER
00074 6962 7E 69F2                 JMP      MCNSLV
00075 6965 96 80   MCNVOR  LDA  A   AREG      CHECKING FOR NEGATIVE RESULT
00076 6967 84 F0                   AND  A   #$F0
00077 6969 81 90                   CMP  A   #$90      MOST SIGNIFICANT BYTE EQUALS 9,RESUL
00078 696B 26 0E                   BNE      MCPLUS
00079 696D CE 0080                 LDX      #AREG     SET POINTER TO ADDRESS OF SOFTWARE R
00080 6970 BD 75FC                 JSR      CMPIT     [A]'->[A],10'S COMPLEMENT
00081 6973 96 7D                   LDA  A   PROG+2    LOAD LEFT DISPLAY ANNUNCIATOR IMAGE
00082 6975 8A C0                   ORA  A   #$C0
00083 6977 84 DF                   AND  A   #$DF      CLEAR OVERFLOW,ENABLE (-)
00084 6979 20 04                   BRA      NOSCON
00085 697B 96 7D   MCPLUS  LDA  A   PROG+2    LOAD LEFT DISPLAY ANNUNCIATOR IMAGE
00086 697D 84 9F                   AND  A   #$9F      CLEAR OVERFLOW,ENABLE (-)
00087 697F 97 7D   NOSCON  STA  A   PROG+2    STORE NEW ANNUNCIATOR IMAGE
00088 6981 96 7E                   LDA  A   PROG+3    GET THE RIGHT DISPLAY ANNUNCIATOR IM
00089 6983 B7 1300                 STA  A   ANNJVR    UP-DATE RIGHT DISPLAY ANNUNR
00090 6986 CE 0080                 LDX      #AREG     SET POINTER TO ADDRESS OF SOFTWARE R
00091 6989 96 75                   LDA  A   SPANEL    LOAD THE PREVIOUS FRONT PANEL STATUS
00092 698B 84 02                   AND  A   #$02      MONITORING THE TRANSMIT LEVEL
00093 698D 26 04                   BNE      MOVE09
00094 698F C6 04                   LDA  B   #$04      SHIFT REGISTER 4 DECADES TO THE LEFT
00095 6991 20 02                   BRA      MOVE08
00096                      ******
00097              * SHIFT AND DUMP TO LEFT DISPLAY
00098                      ******
00099 6993 C6 05   MOVE09  LDA  B   #$05      SHIFT REGISTER 5 DECADES TO THE LEFT
00100 6995 BD 7678 MOVE08  JSR      LSHIFT
00101 6998 5A                      DEC  B
00102 6999 26 FA                   BNE      MOVE08
00103 699B BD 779D                 JSR      LDSPLY    CALL LEFT DISPLAY ZERO SUPRESS & DUM
00104                      ******
```

```
00105                      * CHECK FOR PENDING ABORT
00106                      ******
00107 699E BD 64C6 MCNCHK  JSR     LOOKUP    IS OPERATOR PLAYING WITH THE SWITCHE
00108 69A1 29 03           BVS     MCNBYE
00109 69A3 7E 68E8         JMP     MCNDIS    RETURN
00110 69A6 7E 5F0D MCNBYE  JMP     SYSTEM    OPERATOR CHANGED SWITCHES,ABORT TO S
00111                      ******
00112                      * MODE=MASTER+RECEIVE,MEASURE LEVEL IN DBRN
00113                      ******
00114 69A9 D6 75  MCNRCV   LDA B   SPANEL    LOAD PREVIOUS FRONT PANEL STATUS
00115 69AB C4 1C           AND B   #$1C      GET INSTRUMENT MODE CONTROL BITS
00116 69AD C1 1C           CMP B   #$1C      NORMAL RECEIVE MODE?
00117 69AF 27 0C           BEQ     MCNMTR
00118 69B1 CE 0080 MCNDRM  LDX     #AREG     SET POINTER TO ADDRESS OF SOFTWARE R
00119 69B4 BD 76BB         JSR     CLEAR     0->A,CLEAR REGISTER A
00120 69B7 BD 75BA         JSR     DBRN      GET RECEIVE RANGE RECORD
00121 69BA 7E 691C         JMP     MCRCRD
00122                      ******
00123                      * GET LEVEL DATA FROM SLAVE
00124                      ******
00125 69BD BD 7877 MCNMTR  JSR     RBUFF
00126 69C0 29 39           BVS     MCNBLK
00127 69C2 BD 767B         JSR     LSHIFT
00128 69C5 20 9E           BRA     MCNVOR
00129                      ******
00130                      * MODE=SLAVE,DETERMINE MEASREMENT DIRECTION
00131                      ******
00132 69C7 96 7F  SLVMCN   LDA A   PROG+3
00133 69C9 B7 1300         STA A   ANNJVR
00134 69CC 96 7D           LDA A   PROG+2
00135 69CE B7 1200         STA A   ANNJVL
00136 69D1 96 75           LDA A   SPANEL    LOAD PREVIOUS FRONT PANEL STATUS
00137 69D3 84 04           AND A   #$04      GET MTS/STM MODE CONTROL BIT
00138 69D5 27 C7           BEQ     MCNCHK
00139 69D7 20 D8           BRA     MCNDRM
00140                      ******
00141                      * OUT OF RANGE,TRANSMIT "BE10" IF MODE=SLAVE*MTS
00142                      ******
00143 69D9 96 75  RGELMT   LDA A   SPANEL    LOAD PREVIOUS FRONT PANEL STATUS
00144 69DB 84 1C           AND A   #$1C
00145 69DD 81 0C           CMP A   #$0C      INSTRUMENT MODE=SLAVE*MTS?
00146 69DF 26 1A           BNE     MCNBLK
00147 69E1 CE 0080         LDX     #AREG
00148 69E4 BD 76BB         JSR     CLEAR
00149 69E7 CE BE10         LDX     #$BE10    ERROR CODE H-10
00150 69EA DF 84           STX     AREG+4
00151 69EC CE 0080         LDX     #AREG
00152 69EF BD 767B         JSR     LSHIFT
00153 69F2 CE 0080 MCNSLV  LDX     #AREG     SET POINTER TO ADDRESS OF SOFTWARE R
00154 69F5 BD 7665         JSR     RSHIFT
00155 69F8 BD 7813         JSR     WDATA     WRITE CONTENTS OF REGISTER A INTO XV
00156 69FB 7E 699E MCNBLK  JMP     MCNCHK
00002                      *
00003                      *
00004                      *
00005                      *
00006                      ******                         ******
00007                      ****** NOISE WITH TONE ROUTINE ******
00008                      ***************************************************
00009                      * THIS IS THE NOISE WITH TONE ROUTINE. IT IS CALLED BY SYST
00010                      * AND PERFORMS THE TASK OF MEASURING THE LEVEL OF C-WEIGHTE
00011                      * NOISE. IT HANDLES THE DATA BUFFER USED IN MASTER/SLAVE AN
00012                      * MONITORS THE STATUS OF THE FRONT PANEL. IF THERE IS A CHA
00013                      * IN THE FUNCTION CONTROL SWITCHES THE PROGRAM RELINQUISHES
00014                      * BACK TO SYSTEM.
00015                      ****** VERSION: 1.00 ******
00016                      ****** ENTRY POINT: NWTONE ******
00017                      ***************************************************
00018 69FE 96 75  NWTONE   LDA A   SPANEL    LOAD THE PREVIOUS STATUS OF FRONT PA
00019 6A00 84 02           AND A   #$02      MONITORING THE TRANSMITTER?
00020 6A02 27 06           BEQ     NWTRCC
00021 6A04 86 37           LDA A   #$37      STORING THE TRANSMIT AUTORANGE LIMIT
00022 6A06 97 AD           STA A   RANGE
00023 6A08 20 04           BRA     NWTRGE
00024 6A0A 86 07  NWTRCC   LDA A   #$07      STORING THE RECEIVE AUTORANGE LIMITS
```

```
00025 6A0C 97 AD              STA A  RANGE
00026 6A0E BD 7429 NWTRGE     JSR    ARANGE    CALL THE AUTORANGE SUBROUTINE
00027 6A11 28 03               BVC    BFIX10    BLANK THE DISPLAY,SIGNAL OUT OF RANG
00028 6A13 7E 6B02             JMP    NWTLMT
00029 6A16 96 75  BFIX10 LDA A SPANEL    LOAD THE PREVIOUS STATUS OF THE FRON
00030 6A18 16                  TAB
00031 6A19 84 18              AND A  #$18      OBTAIN THE INSTRUMENTS OPERATING MOD
00032 6A1B 81 08              CMP A  #$08      SLAVE
00033 6A1D 26 03              BNE    BFIX17    FIX THE BRANCH LIMIT PROBLEM
00034 6A1F 7E 6AF0             JMP    SLVNWT
00035 6A22 C4 02  BFIX17 AND B #$02      IS INSTRUMENT MONITORING THE OUTPUT
00036 6A24 26 03              BNE    BFIX29
00037 6A26 7E 6AD1             JMP    NWTRCV
00038                  ******
00039                  * MEASURE DETECTOR OUTPUT LEVEL
00040                  ******
00041 6A29 CE 0080 BFIX29 LDX  #AREG     SET POINTER TO ADDRESS OF SOFTWARE R
00042 6A2C BD 768B             JSR    CLEAR     0->A,CLEAR REGISTER A
00043 6A2F BD 7568             JSR    DBM       GET THE TRANSMIT RANGE RECORD
00044 6A32 A6 01  NWRCRD LDA A 1,X       LOAD FIRST BYTE OF RECORD
00045 6A34 97 84              STA A  AREG+4    STORE IN REGISTER A
00046 6A36 A6 00              LDA A  X         LOAD SECOND BYTE OF RECORD
00047 6A38 CE 0080             LDX    #AREG     SET POINTER TO ADDRESS OF SOFTWARE R
00048 6A3B 81 90              CMP A  #$90      IS RECORD NEGATIVE?
00049 6A3D 26 03              BNE    NWTPOS
00050 6A3F BD 75FC             JSR    CMPIT     [A]'->[A],10'S COMPLEMENT
00051 6A42 CE 0086 NWTPOS LDX  #BREG     SET POINTER TO ADDRESS OF SOFTWARE R
00052 6A45 BD 768B             JSR    CLEAR     0->B,CLEAR REGISTER B
00053 6A48 BD 769B             JSR    READIT    COUNTER->B,DATA ACQUISITION
00054 6A4B BD 7636             JSR    BCDADD    [A]+[B]->[A],DECIMAL ADDITION
00055 6A4E BD 768B             JSR    CLEAR     0=>[B]
00056 6A51 96 7B              LDA A  PROG      GET THE RECEIVER PROGRAMMING
00057 6A53 84 80              AND A  #$80      WHICH DETECTOR?
00058 6A55 26 0C              BNE    NWTFWA
00059 6A57 86 50              LDA A  #$50      ROUNDUP TO NEAREST 0.5 DB
00060 6A59 97 8B              STA A  BREG+5
00061 6A5B BD 7636             JSR    BCDADD
00062 6A5E 7F 0085             CLR    AREG+5
00063 6A61 20 0D              BRA    NDATA
00064 6A63 86 05  NWTFWA LDA A #$05      ROUNDUP TO NEAREST 0.1 DB
00065 6A65 97 8B              STA A  BREG+5
00066 6A67 BD 7636             JSR    BCDADD
00067 6A6A 96 85              LDA A  AREG+5
00068 6A6C 84 F0              AND A  #$F0
00069 6A6E 97 85              STA A  AREG+5
00070 6A70 96 75  NDATA  LDA A SPANEL    LOAD THE PREVIOUS STATUS OF FRONT PA
00071 6A72 84 18              AND A  #$18
00072 6A74 81 08              CMP A  #$08      SLAVE?
00073 6A76 26 03              BNE    NWTNOR    INSTRUMENT MODE=SLAVE
00074 6A78 7E 6B1B             JMP    NWTSLV
00075 6A7B 96 80  NWTNOR LDA A AREG
00076 6A7D 84 F0              AND A  #$F0
00077 6A7F 81 90              CMP A  #$90      IS THE RESULT NEGATIVE?
00078 6A81 26 0E              BNE    NTPLUS    BRANCH!,RESULT IS POSITIVE
00079 6A83 CE 0080             LDX    #AREG     SET POINTER TO ADDRESS OF SOFTWARE R
00080 6A86 BD 75FC             JSR    CMPIT     [A]'->[A],10'S COMPLEMENT
00081 6A89 96 7D              LDA A  PROG+2    LOAD LEFT DISPLAY ANNUNCIATOR IMAGE
00082 6A8B 8A C0              ORA A  #$C0      CLEAR OVERFLOW,ENABLE (-)
00083 6A8D 84 DF              AND A  #$DF
00084 6A8F 20 04              BRA    NWTCON
00085 6A91 96 7D  NTPLUS LDA A PROG+2    LOAD LEFT DISPLAY ANNUNCIATOR IMAGE
00086 6A93 84 9F              AND A  #$9F      CLEAR OVERFLOW,ENABLE (+)
00087 6A95 97 7D  NWTCON STA A PROG+2    STORE NEW ANNUNCIATOR IMAGE
00088 6A97 CE 009F             LDX    #FREG     SET POINTER TO ADDRESS OF SOFTWARE R
00089 6A9A BD 76FF             JSR    MOVE      [A]->[F],MOVE THE CONTENTS
00090 6A9D 96 75              LDA A  SPANEL    LOAD THE PREVIOUS FRONT PANEL STATUS
00091 6A9F 84 02              AND A  #$02      MONITORING THE TRANSMIT LEVEL?
00092 6AA1 26 04              BNE    MOVE7
00093 6AA3 C6 04              LDA B  #$04      SHIFT REGISTER 6 DECADES TO THE LEFT
00094 6AA5 20 02              BRA    MOVE6
00095 6AA7 C6 05  MOVE7  LDA B #$05      SHIFT REGISTER 7 DECADES TO THE LEFT
00096 6AA9 BD 767B MOVE6  JSR   LSHIFT
00097 6AAC 5A                 DEC    B
00098 6AAD 26 FA              BNE    MOVE6
00099                  ******
```

```
00100                  * MEASURE FREQUENCY OF PLL
00101                  ******
00102 6AAF CE 0080            LDX    #AREG
00103 6AB2 BD 76C9            JSR    FREQ       MEASURE THE FREQUENCY
00104                  ******
00105                  * SHIFT AND DUMP TO RIGHT DISPLAY
00106                  ******
00107 6AB5 C6 08              LDA B  #$08
00108 6AB7 BD 767B  NWTSHT    JSR    LSHIFT     SHIFT CONTENTS 8 DECADES TO THE LEFT
00109 6ABA 5A                 DEC B
00110 6ABB 26 FA              BNE    NWTSHT
00111 6ABD BD 7741            JSR    RDSPLY     CALL RIGHT DISPLAY ZERO SUPPRESS & D
00112                  ******
00113                  * DUMP REGISTER TO LEFT DISPLAY
00114                  ******
00115 6AC0 CE 009F            LDX    #FREG      SET POINTER TO ADDRESS OF SOFTWARE R
00116 6AC3 BD 779D            JSR    LDSPLY     CALL LEFT DISPLAY ZERO SUPPRESS & DU
00117                  ******
00118                  * CHECK FOR PENDING ABORT
00119                  ******
00120 6AC6 BD 64C6  NWTCHK    JSR    LOOKUP     HAS THE OPERATOR PLAYED WITH THE SWT
00121 6AC9 29 03              BVS    NWTBYE     YES!,ABORT TO SYSTEM
00122 6ACB 7E 69FE            JMP    NWTONE     NO!,RETURN
00123 6ACE 7E 5F0D  NWTBYE    JMP    SYSTEM
00124                  ******
00125                  * MODE=MASTER+RECEIVE,MEASURE LEVEL IN DBRN
00126                  ******
00127 6AD1 D6 75    NWTRCV    LDA B  SPANEL     LOAD THE PREVIOUS STATUS OF FRONT PA
00128 6AD3 C4 1C              AND B  #$1C
00129 6AD5 C1 1C              CMP B  #$1C       INSTRUMENT MODE=NORMAL?
00130 6AD7 27 0C              BEQ    NWTMTR
00131 6AD9 CE 0080  NWNORM    LDX    #AREG      SET POINTER TO ADDRESS OF SOFTWARE R
00132 6ADC BD 76BB            JSR    CLEAR      0->A,CLEAR REGISTER A
00133 6ADF BD 75BA            JSR    DBRN       GET THE RECEIVE DATA RECORD
00134 6AE2 7E 6A32            JMP    NWRCRD
00135                  ******
00136                  * GET LEVEL DATA FROM SLAVE
00137                  ******
00138 6AE5 BD 7877  NWTMTR    JSR    RBUFF
00139 6AE8 29 DC              BVS    NWTCHK
00140 6AEA BD 767B            JSR    LSHIFT
00141 6AED 7E 6A7B            JMP    NWTNOR
00142                  ******
00143                  * MODE=SLAVE,DETERMINE MEASUREMENT DIRECTION
00144                  ******
00145 6AF0 96 7D    SLVNWT    LDA A  PROG+2
00146 6AF2 B7 1200            STA A  ANNJVL
00147 6AF5 96 7E              LDA A  PROG+3
00148 6AF7 B7 1300            STA A  ANNJVR
00149 6AFA 96 75              LDA A  SPANEL     LOAD THE PREVIOUS STATUS OF FRONT PA
00150 6AFC 84 04              AND A  #$04       GET THE MTS/STM MODE CONTROL BIT
00151 6AFF 26 D9              BNE    NWNORM
00152 6B00 20 C4              BRA    NWTCHK
00153                  ******
00154                  * OUT OF RANGE,TRANSMIT "BE10" IF MODE=SLAVE*MTS
00155                  ******
00156 6B02 96 75    NWTLMT    LDA A  SPANEL     LOAD THE PREVIOUS STATUS OF FRONT PA
00157 6B04 84 1C              AND A  #$1C
00158 6B06 81 0C              CMP A  #$0C       INSTRUMENT MODE=SLAVE*MTS?
00159 6B08 26 1A              BNE    NWTBLK
00160 6B0A CE 0080            LDX    #AREG      SET POINTER
00161 6B0D BD 76BB            JSR    CLEAR
00162 6B10 CE BE10            LDX    #$BE10     ERROR CODE B-10
00163 6B13 DF 84              STX    AREG+4
00164 6B15 CE 0080            LDX    #AREG
00165 6B18 BD 767B            JSR    LSHIFT
00166 6B1B CE 0080  NWTSLV    LDX    #AREG      SET POINTER TO SOFTWARE REGISTER A
00167 6B1E BD 7665            JSR    RSHIFT
00168 6B21 BD 7813            JSR    WDATA      LOAD DATA INTO TRANSMIT BUFFER *:
00169 6B24 7E 6AC6  NWTBLK    JMP    NWTCHK
```

```
00002                *
00003                *
00004                *
00005                *
00006                ******                           ******
00007                ****** SIGNAL TO NOISE RATIO ROUTINE ******
00008                ************************************************************
00009                * THIS IS THE SIGNAL TO NOISE RATIO ROUTINE. IT IS CALLED B
00010                * AND PERFORMS THE TASK OF MEASURING THE C-WEIGHTED SIGNAL
00011                * RATIO. THIS IS ACCOMPLISHED BY MAKING TWO MEASUREMENTS:FI
00012                * MESSAGE CIRCUIT NOISE MEASUREMENT,THEN A NOISE WITH TONE
00013                * MEASUREMENT. THIS ROUTINE ALSO HANDLES THE DATA BUFFER US
00014                * MASTER/SLAVE AND MONITORS THE STATUS OF THE FRONT PANEL.
00015                * IS A CHANGE IN THE FUNCTION CONTROL SWITCHES THE PROGRAM
00016                * RELINQUISHES CONTROL BACK TO SYSTEM.
00017                ****** VERSION: 1.00 ******
00018                ****** ENTRY POINT: SIGNAL ******
00019                ************************************************************
00020 6327 86 36     SIGNAL LDA A  #$36          INITIAL VALUES FOR THE AUTORANGE
00021 6329 97 A4            STA A  GREG          STORE IN MSBYTE OF REGISTER G
00022 632B 96 75     SIGNL1 LDA A  SPANEL        LOAD THE PREVIOUS FRONT PANEL STATUS
00023 632D 84 02            AND A  #$02          IS INSTRUMENT MONITORING TRANSMIT LE
00024 632F 27 06            BEQ    SNRRCC
00025 6331 86 37            LDA A  #$37          STORE THE TRANSMIT RANGE LIMITS
00026 6333 97 AD            STA A  RANGE
00027 6335 20 04            BRA    SNRRGE
00028 6337 86 37     SNRRCC LDA A  #$37          STORE THE RECEIVE RANGE LIMITS
00029 6339 97 AD            STA A  RANGE
00030 633B BD 7429  SNRRGE JSR    ARANGE        CALL THE AUTORANGE SUBROUTINE
00031 633E 28 03            BVC    BFIX18        FIX THE BRANCH PROBLEM
00032 6340 7E 6C97  NOSWAP JMP    SNRLMT
00033 6343 96 75     BFIX18 LDA A  SPANEL        LOAD THE PREVIOUS FRONT PANEL STATUS
00034 6345 16               TAB
00035 6346 84 18            AND A  #$18          OBTAIN THE INSTRUMENTS OPERATING MOD
00036 6348 81 08            CMP A  #$08          SLAVE?
00037 634A 26 03            BNE    BFIX19        FIX THE BRANCH PROBLEM
00038 634C 7E 6C85          JMP    SLVSNR        MODE=SLAVE,DETERMINE DIRECTION
00039 634F C4 02     BFIX19 AND B  #$02          MONITORING THE TRANSMIT LEVEL?
00040 6351 26 03            BNE    BFIX25
00041 6353 7E 6C66          JMP    SNRRCV
00042                ******
00043                * MEASURE DETECTOR OUTPUT LEVEL
00044                ******
00045 6356 CE 0080  BFIX25 LDX    #AREG         SET POINTER TO ADDRESS OF SOFTWARE R
00046 6359 BD 76BB          JSR    CLEAR         0=>[A],CLEAR REGISTER A
00047 635C BD 756B          JSR    DRM           GET THE AUTORANGE DATA RECORD
00048 635F A6 01     SNRCRD LDA A  1,X           GET FIRST BYTE OF RECORD
00049 6361 97 84            STA A  AREG+4        STORE IN SOFTWARE REGISTER A
00050 6363 A6 00            LDA A  X             GET THE SECOND BYTE OF RECORD
00051 6365 81 90            CMP A  #$90          IS DATA NEGATIVE?
00052 6367 26 06            BNE    SNRPOS
00053 6369 CE 0080          LDX    #AREG         SET POINTER TO ADDRESS OF SOFTWARE RE
00054 636C BD 75FC          JSR    CMPIT         [A]'=>[A],10'S COMPLEMENT
00055 636F CE 0086  SNRPOS LDX    #BREG         SET POINTER TO ADDRESS OF SOFTWARE R
00056 6372 BD 76BB          JSR    CLEAR         0=>[B],CLEAR REGISTER B
00057 6375 BD 769B          JSR    READIT        COUNTER=>[B],6 DECADES
00058 6378 BD 7636          JSR    BCDADD        [A]+[B]=>[A],DECIMAL ADDITION
00059 637B 96 75            LDA A  SPANEL        LOAD THE PREVIOUS STATUS OF FRONT PA
00060 637D 84 02            AND A  #$02          MONITORING TRANSMIT LEVEL?
00061 637F 27 03            BEQ    SRNORM
00062 6381 7E 68FA          JMP    SNRXMT
00063 6384 BD 6C8B  SRNORM JSR    INPUT
00064 6387 CE 008C          LDX    #CREG         SET POINTER TO ADDRESS OF SOFTWARE R
00065 638A BD 76BB          JSR    CLEAR
00066 638D BD 76FF          JSR    MOVE          [A]=>[C]
00067 6390 C6 0A            LDA B  #$0A          INITIALIZE LOOP COUNTER
00068 6392 D7 98            STA B  EREG
00069 6394 CE 0092          LDX    #DREG         SET POINTER TO ADDRESS OF SOFTWARE R
00070 6397 BD 76BB          JSR    CLEAR         0=>[D],CLEAR REGISTER D
00071 639A 86 07            LDA A  #$07
00072 639C 97 AD            STA A  RANGE         STORE NOISE RANGE LIMITS
00073 639E BD 7429  SAMPLE JSR    ARANGE        CALL THE AUTORANGE SUBROUTINE
00074 63A1 28 06            BVC    BFIX27
00075 63A3 BD 6CD9          JSR    OUTPUT
00076 63A6 7E 6C97          JMP    SNRLMT        SIGNAL OUT OF RANGE,BLANK DISPLAY
```

```
00077 6BA9 CE 0080 BFIX27 LDX     #AREG       SET POINTER TO ADDRESS OF SOFTWARE R
00078 6BAC BD 768B        JSR     CLEAR       0=>[A],CLEAR REGISTER A
00079 6BAF BD 75BA        JSR     DBRV        GET THE AUTORANGE DATA RECORD
00080 6BB2 A6 01          LDA A   1,X         LOAD FIRST BYTE OF RANGE RECORD
00081 6BB4 97 84          STA A   AREG+4      STORE IN SOFTWARE REGISTER A
00082 6BB6 CE 0086        LDX     #BREG       SET POINTER TO ADDRESS OF SOFTWARE R
00083 6BB9 BD 768B        JSR     CLEAR       0=>[B],CLEAR REGISTER B
00084 6BBC BD 7698        JSR     READIT      COUNTER=>[B],6 DECADES
00085 6BBF BD 7636        JSR     BCDADD      [A]+[B]=>[A],DECIMAL ADDITION
00086 6BC2 CE 0092        LDX     #DREG       SET POINTER TO ADDRESS OF SOFTWARE R
00087 6BC5 BD 7636        JSR     BCDADD      [A]+[D]=>[A],DECIMAL ADDITION
00088 6BC8 BD 76FF        JSR     MOVE        [A]=>[D]
00089 6BCB 7A 0098        DEC     EREG
00090 6BCE 26 CF          BNE     SAMPLE      TAKE ANOTHER SAMPLE
00091 6BD0 CE 0080        LDX     #AREG       SET POINTER TO SOFTWARE REGISTER A
00092 6BD3 BD 7665        JSR     RSHIFT      DECIMAL RIGHT SHIFT SOFTWARE REGISTE
00093 6BD6 BD 75FC        JSR     CMPIT       [A]'=>[A],10'S COMPLEMENT
00094 6BD9 CE 008C        LDX     #CREG       SIGNAL LEVEL STORED IN REGISTER C
00095 6BDC BD 7636        JSR     BCDADD      [A]+[C]=>[A],RESULT SHOULD ALWAYS BE
00096 6BDF BD 768B        JSR     CLEAR       [0]=>[C]
00097 6BE2 86 50          LDA A   #$50        0.5DB ROUNDUP
00098 6BE4 97 91          STA A   CREG+5
00099 6BE6 BD 7636        JSR     BCDADD      [A]+[C]=>[A],DECIMAL ADDITION
00100 6BE9 BD 76FF        JSR     MOVE        [A]=>[C]
00101 6BEC BD 6CD9        JSR     OUTPUT
00102 6BEF 96 75          LDA A   SPANEL      LOAD PREVIOUS FRONT PANEL STATUS
00103 6BF1 84 18          AND A   #$18        SLAVE?
00104 6BF3 81 08          CMP A   #$08        SLAVE?
00105 6BF5 26 10          BNE     BYEONE
00106 6BF7 7E 6CB0        JMP     SNRSLV
00107 6BFA CE 008C SNRXMT LDX    #CREG       SET POINTER TO ADDRESS OF SOFTWARE R
00108 6BFD BD 768B        JSR     CLEAR       0=>[C]
00109 6C00 86 05          LDA A   #$05        0.05 DB ROUNDUP,POINTER AT "C"
00110 6C02 97 91          STA A   CREG+5
00111 6C04 BD 7636        JSR     BCDADD      [A]+[C]=>[A],DECIMAL ADDITION
00112 6C07 CE 008C BYEONE LDX    #CREG       SET POINTER TO ADDRESS OF SOFTWARE R
00113 6C0A BD 76FF        JSR     MOVE        [A]=>[C]
00114 6C0D 96 8C          LDA A   CREG
00115 6C0F 84 F0          AND A   #$F0
00116 6C11 81 90          CMP A   #$90        NEGATIVE RESULT?
00117 6C13 26 0B          BNE     SRPLUS      RESULT IS POSITIVE
00118 6C15 BD 75FC        JSR     CMPIT       [C]'=>[C]
00119 6C18 96 7D          LDA A   PROG+2      LEFT DISPLAY ANNUNCIATOR IMAGE
00120 6C1A 8A C0          ORA A   #$C0        CLEAR OVERFLOW,ENABLE (-)
00121 6C1C 84 DF          AND A   #$DF
00122 6C1E 20 04          BRA     SNRCON
00123 6C20 96 7D   SRPLUS LDA A   PROG+2      LEFT DISPLAY ANNUNCIATOR IMAGE
00124 6C22 84 9F          AND A   #$9F        ENABLE "+"
00125 6C24 97 7D   SNRCON STA A   PROG+2
00126 6C26 CE 008C        LDX     #CREG       SET POINTER TO ADDRESS OF SOFTWARE R
00127 6C29 96 75          LDA A   SPANEL      LOAD THE PREVIOUS FRONT PANEL STATUS
00128 6C2B 84 02          AND A   #$02        MONITORING THE TRANSMIT LEVEL?
00129 6C2D 26 07          BNE     MOVE8
00130 6C2F 7F 0091        CLR     CREG+5
00131 6C32 C6 04          LDA B   #$04        SHIFT REGISTER 6 DECADES TO THE LEFT
00132 6C34 20 0B          BRA     MOVE9
00133 6C36 96 91   MOVE8  LDA A   CREG+5
00134 6C38 84 F0          AND A   #$F0
00135 6C3A 97 91          STA A   CREG+5
00136 6C3C C6 05          LDA B   #$05        SHIFT REGISTER 5 DECADES TO THE LEFT
00137 6C3E BD 7678 MOVE9  JSR     LSHIFT
00138 6C41 5A            DEC B
00139 6C42 26 FA          BNE     MOVE9
00140                     ******
00141                     * MEASURE FREQUENCY OF PLL
00142                     ******
00143 6C44 CE 0080        LDX     #AREG       MEASURE FREQ. AND PLACE IN AREG.
00144 6C47 BD 76C9        JSR     FREQ        CALL FREQ MEASURING SUBROUTINE
00145                     ******
00146                     * SHIFT AND DUMP TO RIGHT DISPLAY
00147                     ******
00148 6C4A C6 08          LDA B   #$08        INITIALIZE LOOP COUNTER
00149 6C4C BD 7678 SNRSHT JSR     LSHIFT      EIGHT DECADE LEFT SHIFT
00150 6C4F 5A            DEC B
00151 6C50 26 FA          BNE     SNRSHT
00152 6C52 BD 7741        JSR     RDSPLY      UPDATE RIGHT DISPLAY
```

```
00153                    ******
00154                    * DUMP REGISTER TO LEFT DISPLAY
00155                    ******
00156 6C55 CE 008C                LDX     #CREG         SET POINTER TO ADDRESS OF SOFTWARE R
00157 6C58 BD 779D                JSR     LDSPLY        UPDATE LEFT DISPLAY
00158                    ******
00159                    * CHECK FOR PENDING ABORT
00160                    ******
00161 6C5B BD 64C6 SNRCHK JSR     LOOKUP        OPERATOR PLAYING WITH FRONT PANEL?
00162 6C5F 28 03                  BVC     BFIX21
00163 6C60 7E 5F0D SNRBYE JMP     SYSTEM        YES!,ABORT TO SYSTEM
00164 6C63 7E 6B37 BFIX21 JMP     SNRRCC        RETURN
00165                    ******
00166                    * MODE=MASTER+RECEIVE,MEASURE LEVEL IN DBRN
00167                    ******
00168 6C66 D6 75  SNRRCV LDA B   SPANEL         LOAD PREVIOUS FRONT PANEL STATUS
00169 6C68 C4 1C                 AND B   #$1C
00170 6C6A C1 1C                 CMP B   #$1C
00171 6C6C 27 0C                 BEQ     SNRMTR
00172 6C6E CE 0080                LDX     #AREG         SET POINTER TO SOFTWARE REGISTER A
00173 6C71 BD 768B                JSR     CLEAR         0=>[A],CLEAR REGISTER A
00174 6C74 BD 75BA                JSR     DBRN          GET THE AUTORANGE DATA RECORD
00175 6C77 7E 6B5F                JMP     SNRCRD
00176                    ******
00177                    * GET LEVEL DATA FROM SLAVE
00178                    ******
00179 6C7A BD 7877 SNRMTR JSR    RBUFF
00180 6C7D 29 DC                 BVS     SNRCHK
00181 6C7F BD 767B                JSR    LSHIFT
00182 6C82 7E 6C07                JMP    BYEBYE
00183                    ******
00184                    * MODE=SLAVE,DETERMINE MEASUREMENT DIRECTION
00185                    ******
00186 6C85 96 7D  SLVSNR LDA A   PROG+2
00187 6C87 B7 1200                STA A   ANNUNL
00188 6C8A 96 7E                  LDA A   PROG+3
00189 6C8C B7 1300                STA A   ANNUNR
00190 6C8F D6 75                  LDA B   SPANEL        LOAD PREVIOUS FRONT PANEL STATUS
00191 6C91 C4 04                  AND B   #$04          WHAT IS THE MEASUREMENT DIRECTION
00192 6C93 26 D1                  BNE     SNRRCV
00193 6C95 20 19                  BRA     SNRSLV
00194                    ******
00195                    * OUT OF RANGE,TRANSMIT "BE10" IF MODE=SLAVE*MTS
00196                    ******
00197 6C97 D6 75  SNRLMT LDA B   SPANEL
00198 6C99 C4 1C                 AND B   #$1C
00199 6C9B C1 0C                 CMP B   #$0C
00200 6C9D 26 BC                 BNE     SNRCHK
00201 6C9F CE 008C                LDX    #CREG          SET POINTER
00202 6CA2 BD 768B                JSR    CLEAR
00203 6CA5 CE BE10                LDX    #$BE10         ERROR CODE B-10
00204 6CA8 DF 90                  STX    CREG+4
00205 6CAA CE 008C                LDX    #CREG
00206 6CAD BD 767B                JSR    LSHIFT
00207 6CB0 CE 008C SNRSLV LDX    #CREG          SET POINTER TO WORKING REGISTER
00208 6CB3 BD 7665                JSR    RSHIFT
00209 6CB6 BD 7813                JSR    WDATA          WRITE DATA IN TRANSMIT BUFFER
00210 6CB9 20 A0                  BRA    SNRCHK
00211                    ******
00212                    *
00213                    * INPUT THE NOTCH FILTER FOR THE NEXT NOISE LEVEL MEASUREME
00214                    *
00215                    ******
00216 6CBB 96 7B  INPUT  LDA A   PROG           GET PRESENT RECEIVER STATUS
00217 6CBD 84 38                  AND A   #$38           REMOVE RANGE STATE
00218 6CBF 44                     LSR A
00219 6CC0 44                     LSR A                  RESTORING BINARY WEIGHTS
00220 6CC1 44                     LSR A
00221 6CC2 D6 A4                  LDA B   GREG           GET AUTORANGE INITIAL STATES
00222 6CC4 C4 F0                  AND B   #$F0           CLEAR SIGNAL LEVEL INITIAL STATE
00223 6CC6 1B                     ABA                    PERFORM LOGICAL "OR" BY ADDING ACCUM
00224 6CC7 97 A4                  STA A   GREG           STORE NEW INITIAL VALUE
00225 6CC9 54                     LSR B
00226 6CCA 96 7B                  LDA A   PROG           LOAD PRESENT RECEIVER STATUS
00227 6CCC 84 C7                  AND A   #$C7           CLEAR RANGE STATE BITS
```

```
00228 6CCE 1B              ABA              PERFORM LOGICAL "OR" BY ADDING ACCUM
00229 6CCF 97 7B           STA A    PROG    STORE NEW RECEIVER STATUS
00230 6CD1 96 7B           LDA A    PROG    GET THE PRESENT STATUS OF RECEIVER
00231 6CD3 84 F9           AND A    #$F9
00232 6CD5 C6 02           LDA B    #$02
00233 6CD7 20 1C           BRA      SWAPIT
00234                  *
00235                  *
00236                  *
00237                  ******
00238                  *
00239                  * REMOVE THE NOTCH FILTER FOR THE NEXT SIGNAL LEVEL MEASURE
00240                  *
00241                  ******
00242 6CD9 96 7B  OUTPUT LDA A    PROG    LOAD PRESENT RECEIVER STATUS
00243 6CDB 84 38         AND A    #$38    REMOVE RANGE STATE
00244 6CDD 48            ASL A            RESTORE BINARY WEIGHTS
00245 6CDE D6 A4         LDA B    GREG    GET AUTORANGE INITIAL STATES
00246 6CE0 C4 0F         AND B    #$0F    CLEAR NOISE LEVEL INITIAL STATE
00247 6CE2 1B            ABA              PERFORM LOGICAL "OR" BY ADDING ACCUM
00248 6CE3 97 A4         STA A    GREG    STORE NEW INITIAL VALUE
00249 6CE5 58            ASL B
00250 6CE6 58            ASL B
00251 6CE7 58            ASL B            RESTORE THE BINARY WIEGHTS
00252 6CE8 96 7B         LDA A    PROG    LOAD PRESNT RECEIVER STATUS
00253 6CEA 84 C7         AND A    #$C7    CLEAR RANGE STATE BITS
00254 6CEC 1B            ABA              PERFORM LOGICAL "OR" BY ADDING ACCUM
00255 6CED 97 7B         STA A    PROG    STORE NEW RECEIVER STATUS
00256 6CEF 86 F9         LDA A    #$F9
00257 6CF1 94 7B         AND A    PROG
00258 6CF3 C6 06         LDA B    #$06
00259 6CF5 1B      SWAPIT ABA             PERFORM LOGICAL "OR" BY ADDING ACCUM
00260 6CF6 97 7B         STA A    PROG    REMOVE THE NOTCH FILTER
00261 6CF8 B7 1600       STA A    RCVR
00262 6CFB 86 05         LDA A    #$05
00263 6CFD BD 64A3       JSR      WAITR
00264                  ******
00265                  *
00266                  * WAIT FOR 500 MILLISECONDS FOR DETECTOR TO STABILIZE
00267                  *
00268                  ******
00269 6D00 39            RTS
00270                  *
00271                  *

00002                  *
00003                  *
00004                  *
00005                  *
00006                  ******                    ******
00007                  ****** IMPULSE NOISE ROUTINE ******
00008                  ****************************************************
00009                  * THIS IS THE IMPULSE NOISE ROUTINE. IT IS CALLED BY SYSTEM
00010                  * AND HANDLES THE TASK OF MEASURING IMPULSE NOISE. THE 5/15
00011                  * MINUTE TIME INTERVAL IS TIMED THROUGH THE USE OF A TIME
00012                  * MARKER GENERATOR WHICH CAUSES A NONMASKABLE INTERRUPT
00013                  * ONCE PER SECOND. THE NMI SERVICE ROUTINE INCREMENTS THE
00014                  * SOFTWARE CLOCK AND CLOSES THE GATE AT TIME OUT. THIS
00015                  * ASSURES AN ACCURATE TIME INTERVAL REGARDLESS OF THE NUMBE
00016                  * CONDITIONAL BRANCHES OR INTERRUPTS. IT HANDLES THE DATA P
00017                  * USED IN MASTER/SLAVE AND MONITORS THE STATUS OF THE FRONT
00018                  * PANEL.IF THERE IS A CHANGE IN THE FUNCTION CONTROL
00019                  * SWITCHES THE PROGRAM RELINQUISHES CONTROL BACK TO SYSTEM
00020                  ****************************************************
00021                  ****** VERSION: 1.00 ******
00022                  ****** ENTRY POINT: IMPLSE ******
00023                  *
00024                  *
00025                  *
00026 6D01 96 75  IMPLSE LDA A    SPANEL  GET PREVIOUS STATUS
00027 6D03 16           TAB
00028 6D04 84 18        AND A    #$18    GET MODE CONTROL BITS
00029 6D06 81 08        CMP A    #$08    SLAVE?
00030 6D08 26 03        BNE      IPXMIT
00031 6D0A 7E 6D99 INRCV1 JMP    IMNRCV
00032 6D0D C5 02  IPXMIT BIT B    #$02    MONITOR THE TRANSMIT LEVEL?
```

```
00033 600F 27 F9            BEQ    INRCV1
00034                *****
00035                *
00036                * MONITOR TRANSMIT LEVEL
00037                *
00038                *****
00039 6011 86 37             LDA A  #$37       YES! LOAD THE TRANSMIT AUTORANGE LIM
00040 6013 97 AD             STA A  RANGE
00041 6015 BD 7429            JSR    ARANGE     CALL THE AUTORANGE SUBROUTINE
00042 6018 28 03              BVC    THRJ1
00043 601A 7E 6D8E            JMP    IMNBLK     SIGNAL OUT OF RANGE,BLANK THE DISPLA
00044 601D CE 0080  THRJ1    LDX    #AREG      SET POINTER TO ADDRESS OF SOFTWARE R
00045 6020 BD 768B            JSR    CLEAR      0=>[A]
00046 6023 BD 756B            JSR    DBM        GET THE RANGE RECORD
00047 6026 A6 01              LDA A  1,X        GET THE FIRST BYTE OF DATA RECORD
00048 6028 97 84              STA A  AREG+4
00049 602A A6 00              LDA A  X          GET THE SECOND BYTE OF DATA RECORD
00050 602C 81 90              CMP A  #$90       IS THE DATA NEGATIVE?
00051 602E 26 06              BNE    IPLUS
00052 6030 CE 0080            LDX    #AREG      SET POINTER TO ADDRESS OF SOFTWARE R
00053 6033 BD 75FC            JSR    CMPIT      [A]'=>[A],10'S COMPLEMENT
00054 6036 CE 0086  IPLUS    LDX    #BREG      SET POINTER TO ADDRESS OF SOFTWARE R
00055 6039 BD 7698            JSR    READIT     COUNTER=>[B]
00056 603C BD 7636            JSR    BCDADD     [A]+[B]=>[A],DECIMAL ADDITION
00057 603F BD 768B            JSR    CLEAR      CLEAR, =>[B]
00058 6042 86 05              LDA A  #$05       0.1DB ROUNDUP
00059 6044 97 8B              STA A  BREG+5
00060 6046 BD 7636            JSR    BCDADD     [A]+[B]=>[A],DECIMAL ADDITION
00061 6049 96 85              LDA A  AREG+5     0.1DB ROUND UP
00062 604B 84 F0              AND A  #$F0
00063 604D 97 85              STA A  AREG+5
00064 604F 96 80              LDA A  AREG       NEGATIVE RESULT?
00065 6051 84 F0              AND A  #$F0
00066 6053 27 0E              BEQ    ITRJE
00067 6055 CE 0080            LDX    #AREG      SET POINTER TO ADDRESS OF SOFTWARE R
00068 6058 BD 75FC            JSR    CMPIT      [A]'=>[A],10'S COMPLEMENT
00069 605B 96 7D              LDA A  PROG+2     GET THE LEFTD DISPLAY ANNUNCIATOR IM
00070 605D 8A C0              ORA A  #$C0       CLEAR OVERFLOW ENABLE (-)
00071 605F 84 DF              AND A  #$DF
00072 6061 20 04              BRA    ISTORE
00073 6063 96 7D   ITRJE     LDA A  PROG+2     GET THE LEFT DISPLAY ANNUNCIATOR IMA
00074 6065 84 9F              AND A  #$9F       ENABLE (+)
00075 6067 97 7D   ISTORE    STA A  PROG+2     STORE THE NEW LEFT DISPLAY ANNUNCIAT
00076 6069 CE 009E            LDX    #FREG      SET POINTER TO ADDRESS OF SOFTWARE R
00077 606C BD 76FF            JSR    MOVE       [A]=>[F],MOVE THE CONTENTS
00078 606F C6 05              LDA B  #$05       LEFT SHIFT REGISTER 5 DECADES *
00079 6071 BD 7678  MOVE10   JSR    LSHIFT
00080 6074 5A                 DEC B
00081 6075 26 FA              BNE    MOVE10
00082 6077 CE 0080            LDX    #AREG      MEASURE FREQ. AND PLACE IN AREG.
00083 607A BD 76C9            JSR    FREQ       CALL THE FREQUENCY SUBROUTINE
00084 607D C6 08              LDA B  #$08
00085 607F BD 7678  IMSHFT   JSR    LSHIFT     LEFT SHIFT 8 DECADES
00086 6082 5A                 DEC B
00087 6083 26 FA              BNE    IMSHFT
00088 6085 BD 7741            JSR    RDSPLY     CALL THE RIGHT DISPLAY DUMP SUBROUTI
00089 6088 CE 009E            LDX    #FREG      SET POINTER TO ADDRESS OF SOFTWARE R
00090 608B BD 779D            JSR    LDSPLY     CALL THE LEFT DISPLAY DUMP SUBROUTIN
00091 608E BD 64C6  IMNBLK   JSR    LOOKUP     HAS THE OPERATOR CHANGED THE FRONT P
00092 6091 29 03              BVS    BFIX33
00093 6093 7E 6D01            JMP    IMPLSE
00094 6096 7E 5F0D  BFIX33   JMP    SYSTEM
00095                *****
00096                *
00097                * IMPULSE NOISE:RECEIVER ROUTINE
00098                *
00099                *****
00100 6099 86 40   IMNRCV    LDA A  #$40
00101 609B 97 7F              STA A  PROG+4
00102 609D 86 44              LDA A  #$44
00103 609F B7 1400            STA A  CONTRL     CLEAR THE ACCUMMULATOR
00104 60A2 BD 5FD2            JSR    ICLOCK
00105 60A5 BD 6FBF            JSR    CLRBCE
00106 60A8 CE 009E            LDX    #FREG
00107 60AB BD 768B            JSR    CLEAR
00108 60AE CE 0080            LDX    #AREG
```

```
00109 6DB1 BD 768B            JSR    CLEAR
00110 6DB4 96 75     PSTART LDA A  SPANEL    GET PREVIOUS FRONT PANEL STATUS
00111 6DB6 84 18            AND A  #$18
00112 6DB8 81 08            CMP A  #$08      SLAVE?
00113 6DBA 26 08            BNE    BYESLV
00114 6DBC 86 40            LDA A  #$40
00115 6DBE B7 1400           STA A  CONTRL    OPEN IMPULSE NOISE GATE
00116 6DC1 7E 6F53           JMP    ISLAVE
00117              ******
00118              *
00119              * INITIALIZATION OF RECEIVE IMPULSE NOISE COMPLETE
00120              *
00121              ******
00122 6DC4 5F      BYESLV CLR B             USED TO RESET THE MOM CONT SWITCH IN
00123 6DC5 BD 65C6           JSR    LDPNLA   GET FUNCTION CONTROL BITS
00124 6DC8 84 30            AND A  #$30
00125 6DCA 81 30            CMP A  #$30      IN THE RUN MODE?
00126 6DCC 27 0D            BEQ    INRJN
00127 6DCE 81 20            CMP A  #$20      IN THE STOP MODE?
00128 6DD0 26 03            BNE    STOP1
00129 6DD2 7E 6E50           JMP    ISTART
00130              ******
00131              *
00132              * STOP COMMAND RECEIVED
00133              *
00134              ******
00135 6DD5 BD 6FAB  STOP1  JSR    STOPIT
00136 6DD8 7E 6E97           JMP    GETIT
00137              ******
00138              *
00139              * TIME OUT PERIOD STARTED,ABORT IF TIME PERIOD CHANGES
00140              *
00141              ******
00142 6DDB 96 7E   INRJN  LDA A  PROG+3    GET RIGHT ANNUNCIATOR IMAGE
00143 6DDD 85 08            BIT A  #$08
00144 6DDF 26 03            BNE    INRJN1
00145 6DE1 7E 6F94           JMP    DPOSIT
00146 6DE4 96 75   INRJN1 LDA A  SPANEL    GET PREVIOUS FRONT PANEL STATUS
00147 6DE6 84 1C            AND A  #$1C
00148 6DE8 81 1C            CMP A  #$1C      MASTER*MTS?
00149 6DEA 27 3A            BEQ    INRJN2    SKIP THE LEVEL CHECK IF YES
00150 6DEC 96 AA            LDA A  STAT1     DROP-OUT FLAG SET?
00151 6DEF 85 01            BIT A  #$01      BRANCH IF YES
00152 6DF0 26 34            BNE    INRJN2
00153 6DF2 CE FFFF           LDX    #$FFFF
00154 6DF5 B6 1E00  COUNT2 LDA A  DROP      CHECK FOR SIGNAL DROPOUT
00155 6DF8 2B 2C            BMI    INRJN2
00156 6DFA 09              DEX              WAIT FOR 1 SECOND FOR SIGNAL
00157 6DFB 26 F8            BNE    COUNT2
00158 6DFD 96 75            LDA A  SPANEL    GET THE FRONT PANEL IMAGE
00159 6DFF 84 1C            AND A  #$1C
00160 6E01 81 18            CMP A  #$18
00161 6E03 26 13            BNE    DROPR
00162 6E05 86 44            LDA A  #$44
00163 6E07 B7 1400           STA A  CONTRL    CLEAR THE ACCUMMLATOR
00164 6E0A BD 6FAB           JSR    STOPIT
00165 6E0D BD 6FBF           JSR    CLRBCE
00166 6E10 CE BE14           LDX    #$BE14    LOAD THE ERROR MESSAGE NUMBER
00167 6E13 DF 9F            STX    FREG+1
00168 6E15 7E 6F94           JMP    DPOSIT
00169 6E18 96 7D   DROPR  LDA A  PROG+2    NORMAL MODE;LIGHT THE MINUS SIGN
00170 6E1A 8A C0            ORA A  #$C0
00171 6E1C 84 DF            AND A  #$DF
00172 6E1E 97 7D            STA A  PROG+2
00173 6E20 96 AA            LDA A  STAT1
00174 6E22 8A 01            ORA A  #$01      SET THE DROP-OUT FLAG
00175 6E24 97 AA            STA A  STAT1
00176 6E26 C6 FF   INRJN2 LDA B  #$FF      **KEEPS MOM CONT SWITCH FROM BEING
00177 6E28 BD 65C6           JSR    LDPNLA   GET THE FUNCTION CONTROL BITS
00178 6E2B 84 0C            AND A  #$0C      GET THE PRESENT TIME CONTROL BITS
00179 6E2D 27 0B            BEQ    MIN05C
00180 6E2F 81 08            CMP A  #$08
00181 6E31 27 03            BEQ    MIN15C
00182 6E33 4F              CLR A
00183 6E34 20 06            BRA    TIMEC
00184 6E36 86 15   MIN15C LDA A  #$15
```

```
00185 6E38 20 02              BRA     TIMEC
00186 6E3A 86 05      MINO5C  LDA A   #$05
00187 6E3C D6 96      TIMEC   LDA B   TIME
00188 6E3E 11                 CBA
00189 6E3F 27 56              BEQ     GETIT       NO CHANGE IN INTEGRATION PERIOD
00190 6E41 BD 6FD2            JSR     ICLOCK
00191 6E44 BD 6FAB            JSR     STOPIT
00192 6E47 96 7D              LDA A   PROG+2
00193 6E49 8A A0              ORA A   #$A0        TURN OFF NEGATIVE SIGN
00194 6E4B 97 7D              STA A   PROG+2
00195 6E4D 7E 6D99            JMP     IMNRCV      ABORT! RE-INITIALIZE THE MEASUREMENT
00196                 ******
00197                 *
00198                 * INTEGRATION START COMMAND RECEIVED
00199                 *
00200                 ******
00201 6E50 BD 6FD2    ISTART  JSR     ICLOCK
00202 6E53 96 7F              LDA A   PROG+4
00203 6E55 16                 TAB
00204 6E56 CA 04              ORA B   #$04
00205 6E58 F7 1400            STA B   CONTRL      RESET THE DATA ACQUISITION COUNTER
00206 6E5B B7 1400            STA A   CONTRLI
00207 6E5E 96 7E              LDA A   PROG+3      GET THE RIGHT DISPLAY ANNUNCIATOR IM
00208 6E60 8A 08              ORA A   #$08        SET THE IN-PROCESS FLAG
00209 6E62 97 7E              STA A   PROG+3
00210 6E64 96 7D              LDA A   PROG+2
00211 6E66 8A A0              ORA A   #$A0        TURN OFF NEGATIVE SIGN
00212 6E68 97 7D              STA A   PROG+2
00213 6E6A 86 01              LDA A   #$01
00214 6E6C B7 1F00            STA A   CLOCKR      START THE TIME BASE MARKER
00215 6E6F 96 AA              LDA A   STAT1
00216 6E71 84 FE              AND A   #$FE        CLEAR THE DROP-OUT FLAG
00217 6E73 97 AA              STA A   STAT1
00218 6E75 96 AB              LDA A   STAT2
00219 6E77 84 F3              AND A   #$F3        CLEAR FLAG,RELEASE THE DATA BUFFER
00220 6E79 97 AB              STA A   STAT2       CLEAR THE TRANSFER FLAG
00221 6E7B C6 FF              LDA B   #$FF        KEEPS THE MOM CONT SWITCH FROM BEING
00222 6E7D BD 65C6            JSR     LDPVLA
00223 6E80 84 0C              AND A   #$0C
00224 6E82 27 09              BEQ     MIN05
00225 6E84 81 08              CMP A   #$08
00226 6E86 27 0B              BEQ     MIN15
00227                 ******
00228                 * CONTINUOUS INTEGRATION
00229                 ******
00230 6E89 7F 0096            CLR     TIME
00231 6E8B 20 0A              BRA     GETIT
00232                 ******
00233                 * 5 MINUTE INTEGRATION
00234                 ******
00235 6E8D 86 05      MIN05   LDA A   #$05
00236 6E8F 97 96              STA A   TIME
00237 6E91 20 04              BRA     GETIT
00238                 ******
00239                 * 15 MINUTE INTEGRATION
00240                 ******
00241 6E93 86 15      MIN15   LDA A   #$15
00242 6E95 97 96              STA A   TIME
00243 6E97 96 75      GETIT   LDA A   SPANEL      GET THE FRONT PANEL IMAGE
00244 6E99 84 1C              AND A   #$1C
00245 6E9B 81 1C              CMP A   #$1C        MODE=MASTER*MTS?
00246 6E9D 27 08              BEQ     REMOTE
00247 6E9F CE 0086            LDX     #BREG       SET WORKING REGISTER POINTER
00248 6EA2 BD 7698            JSR     READIT      READ DATA ACQUISITION COUNTER
00249 6EA5 20 57              BRA     COUNT1
00250 6EA7 96 AB      REMOTE  LDA A   STAT2
00251 6EA9 85 08              BIT A   #$08        READ ENABLED?
00252 6EAB 26 3A              BNE     SKIP4
00253 6EAD BD 7877            JSR     RBUFF
00254 6EB0 29 16              BVS     ITSOK3
00255 6EB2 96 84              LDA A   AREG+4
00256 6EB4 81 BE              CMP A   #$BE        ERROR PREAMBLE?
00257 6EB6 27 03              BEQ     ISTOP2
00258 6EB8 7E 6FA0            JMP     ABORT3
00259 6EBB BD 6FAB    ISTOP2  JSR     STOPIT
```

```
00260 6E8E BD 6FBF            JSR     CLRBCE
00261 6EC1 DE 84              LDX     AREG+4
00262 6EC3 DF 9F              STX     FREG+1
00263 6EC5 7E 6F94            JMP     DPOSIT
00264 6EC8 CE 008C   ITSOK3   LDX     #CREG       READ DATA INTO STORAGE
00265 6ECB BD 768B            JSR     CLEAR
00266 6ECE BD 76FF            JSR     MOVE
00267 6ED1 96 AB              LDA A   STAT2
00268 6ED3 85 04              BIT A   #$04        TRANSFER TO REFERENCE ENABLED?
00269 6ED5 26 10              BNE     SKIP4
00270 6ED7 8A 04              ORA A   #$04        INHIBIT FUTURE TRANSFERS
00271 6ED9 97 AB              STA A   STAT2
00272 6EDB CE 0098            LDX     #EREG
00273 6EDE BD 768B            JSR     CLEAR
00274 6EE1 BD 76FF            JSR     MOVE        STORE THE REFERENCE VALUE
00275 6EE4 BD 75FC            JSR     CMPIT       CHANGE TO NEGATIVE NUMBER
00276 6EE7 CE 0080   SKIP4    LDX     #AREG
00277 6EEA DF 76              STX     TEMP
00278 6EEC CE 008C            LDX     #CREG
00279 6EEF BD 7718            JSR     MOVET       MOVE PRESENT VALUE TO WORKING REGIST
00280 6EF2 CE 0098            LDX     #EREG
00281 6EF5 BD 7636            JSR     BCDADD      [PRESENT VALUE]-[REFERENCE VALUE]
00282 6EF8 CE 0086            LDX     #BREG       SET WORKING REGISTER POINTER
00283 6EFB BD 76FF            JSR     MOVE        MOVE DIFFERNCE TO BREG
00284                 ******
00285                 * CHECK FOR ACCUMMULATOR OVERFLOW
00286                 *
00287                 * OUTPUT ERROR H-12 IF IT HAS OCCURRED!
00288                 ******
00289 6EFE CE 0000   COUNT1   LDX     #$0000
00290 6F01 9C 86              CPX     BREG
00291 6F03 26 3D              BNE     HALT
00292 6F05 9C 88              CPX     BREG+2
00293 6F07 26 39              BNE     HALT
00294                 ******
00295                 * GET THE TIME
00296                 ******
00297 6F09 96 96     GTIME    LDA A   TIME        GET THE REQUESTED TIME
00298 6F0B 27 2B              BEQ     TIMER
00299 6F0D CE 0080            LDX     #AREG       SET WORKING REGISTER POINTER
00300 6F10 BD 768B            JSR     CLEAR
00301 6F13 96 A8              LDA A   GREG+4      MINUTES OF SOFTWARE CLOCK
00302 6F15 97 84              STA A   AREG+4
00303 6F17 BD 75FC            JSR     CMPIT
00304 6F1A CE 0092            LDX     #DREG       REQUESTED TIME IN DREG+4
00305 6F1D BD 7636            JSR     BCDADD      [REQUESTED TIME]-[SOFTWARE CLOCK]
00306 6F20 96 84              LDA A   AREG+4      TIME TO HALT STORED IN AREG+4
00307 6F22 26 0D              BNE     ISTOP
00308 6F24 BD 6FAB            JSR     STOPIT
00309 6F27 96 F3              LDA A   HSTAT1      SEE IF SRQ OUTPUT REQUIRED
00310 6F29 85 40              BIT A   #$40
00311 6F2B 27 04              BEQ     ISTOP       BR IF NO OUTPUT REQUIRED
00312 6F2D 8A 10              ORA A   #$10        SET IMPSRQ BIT
00313 6F2F 97 F3              STA A   HSTAT1
00314 6F31 96 84     ISTOP    LDA A   AREG+4
00315 6F33 20 02              BRA     SKIP1
00316 6F35 96 A8     TIMER    LDA A   GREG+4
00317 6F37 CE 009E   SKIP1    LDX     #FREG
00318 6F3A BD 768B            JSR     CLEAR
00319 6F3D 97 A0              STA A   FREG+2
00320 6F3F 7E 6F94            JMP     DPOSIT      DUMP TO DISPLAY
00321                 ******
00322                 * ERROR COUNTER OVERFLOW-OUTPUT ERROR MESSAGE
00323                 ******
00324 6F42 BD 6FAB   HALT     JSR     STOPIT
00325 6F45 CE 009F            LDX     #FREG
00326 6F48 BD 768B            JSR     CLEAR       CLEAR SOFTWARE REGISTER "F"
00327 6F4B CE BE12            LDX     #$BE12      LOAD THE ERROR MESSAGE NUMBER
00328 6F4E DF 9F              STX     FREG+1
00329 6F50 7E 6F94            JMP     DPOSIT
00330                 ******
00331                 * MODE=SLAVE,DETERMINE MEASUREMENT DIRECTION
00332                 ******
00333 6F53 96 7D     ISLAVE   LDA A   PROG+2
00334 6F55 B7 1200            STA A   ANNUNL
```

```
00335 6F58 96 7E           LDA A    PROG+3
00336 6F5A B7 1300         STA A    ANNJVR
00337 6F5D 96 75           LDA A    SPANEL
00338 6F5F 84 04           AND A    #$04
00339 6F61 27 3D           BEQ      ABORT3
00340                ******
00341                * DIRECTION=MTS,TRANSMIT DATA TO MASTER
00342                ******
00343 6F63 CE FFFF         LDX      #$FFFF
00344 6F66 B6 1E00 SKIP7   LDA A    DROP           CHECK FOR SIGNAL DROPOUT
00345 6F69 2B 1E           BMI      ITSOK
00346 6F6B 09              DEX
00347 6F6C 26 F8           BNE      SKIP7
00348 6F6E CE BE14 ERR14   LDX      #$BE14         LOAD THE ERROR MESSAGE NUMBER
00349 6F71 DF 84           STX      AREG+4
00350 6F73 CE 0080         LDX      #AREG
00351 6F76 BD 7813         JSR      WDATA          TRANSMIT THE ERROR MESSAGE
00352 6F79 BD 64C6         JSR      LOOKJP
00353 6F7C 28 03           BVC      ITSOK2
00354 6F7E 7E 5F0D         JMP      SYSTEM
00355 6F81 CE A000 ITSOK2  LDX      #$A000
00356 6F84 09       COUNT3 DEX
00357 6F85 26 FD           BNE      COUNT3
00358 6F87 20 E5           BRA      ERR14
00359 6F89 CE 0080 ITSOK   LDX      #AREG
00360 6F8C BD 769B         JSR      READIT
00361 6F8F BD 7813         JSR      WDATA
00362 6F92 20 0C           BRA      ABORT3
00363 6F94 CE 009F DPOSIT  LDX      #FREG
00364 6F97 BD 779D         JSR      LDSPLY
00365 6F9A CE 008A         LDX      #BREG+4
00366 6F9D BD 7741         JSR      RDSPLY
00367 6FA0 BD 64C6 ABORT3  JSR      LOOKJP
00368 6FA3 29 03           BVS      SKIPPR
00369 6FA5 7E 6DB4         JMP      PSTART
00370 6FA8 7E 5F0D SKIPPR  JMP      SYSTEM
00371                ******
00372                *
00373                * SUBROUTINE STOPIT
00374                *
00375                *    FUNCTION: RESET TIME BASE MARKER;CLOSE THE
00376                *              IMPULSE NOISE GATE;TURN OFF IN-
00377                *              PROCESS ANNUNCIATOR AND SET THE
00378                *              DATA BUFFER INHIBIT FLAGS.
00379                *
00380                *    PARAMETERS PASSED:
00381                *              N/A
00382                *
00383                *    ENTRY POINT:
00384                *              STOPIT
00385                *
00386                ******
00387 6FAB 4F       STOPIT CLR A
00388 6FAC B7 1400         STA A    CONTRL         CLOSE IMPULSE NOISE GATE
00389 6FAF B7 1F00         STA A    CLOCKR         TURN OFF TIME BASE MARKER
00390 6FB2 96 7E           LDA A    PROG+3
00391 6FB4 84 F7           AND A    #$F7           TURN OFF IN-PROCESS ANNUNCIATOR
00392 6FB6 97 7E           STA A    PROG+3
00393 6FB8 96 A9           LDA A    STAT2
00394 6FBA 8A 0C           ORA A    #$0C           SET DATA BUFFER INHIBIT FLAGS
00395 6FBC 97 A9           STA A    STAT2
00396 6FBE 39              RTS
00397                *
00398                *
00399                ******
00400                *
00401                * SUBROUTINE CLRBCE
00402                *
00403                *    FUNCTION: CLEARS 6 BYTE SOFTWARE
00404                *              REGISTERS B,C,AND F.
00405                *
00406                *    PARAMETERS PASSED:
00407                *              N/A
00408                *
00409                *    ENTRY POINT:
00410                *              CLRBCE
```

```
00411                 *
00412                 ******
00413 6FBF CE 0086 CLRBCE LDX    #BREG
00414 6FC2 BD 76BB        JSR    CLEAR
00415 6FC5 CE 008C        LDX    #CREG
00416 6FC8 BD 76BB        JSR    CLEAR
00417 6FCB CE 0098        LDX    #EREG
00418 6FCE BD 76BB        JSR    CLEAR
00419 6FD1 39             RTS
00420                 *
00421                 *
00422                 ******
00423                 *
00424                 * SUBROUTINE ICLOCK
00425                 *
00426                 *    FUNCTION: INITIALIZES THE SOFTWARE
00427                 *              USED IN IMPULSE NOISE TIMING
00428                 *
00429                 *    PARAMETERS PASSED:
00430                 *              N/A
00431                 *
00432                 *    ENTRY POINT:
00433                 *              ICLOCK
00434                 *
00435                 ******
00436 6FD2 CE 0092 ICLOCK LDX    #DREG
00437 6FD5 BD 76BB        JSR    CLEAR
00438 6FD8 CE 0044        LDX    #GREG
00439 6FDB BD 76BB        JSR    CLEAR
00440 6FDE 39             RTS
00001                 * THIS IS ENVELOPE DELAY ROUTINE IN A VERY ELEMENTARY FORM
00002        00F0    MASKL  EQU   $F0
00003        000F    MASKH  EQU   $0F
00004        007F    MINJEN EQU   AREG-1
00005        0082    SUBTRH EQU   AREG+2
00006        0085    RSLT   EQU   BREG-1
00007        0088    DIVID  EQU   CREG-1
00008        0091    QUOTT  EQU   DREG-1
00009        0097    RSLT1  EQU   EREG-1
00010                 *
00011                 * BEGIN OF EDDFRE
00012                 *
00013 6FDF 96 75 EDDFRE LDA A    SPANEL
00014 6FE1 84 1C        AND A    #$1C
00015 6FE3 81 08        CMP A    #$08      SLAVE?
00016 6FE5 26 04        BNE      NOAUTO
00017 6FE7 86 71        LDA A    #$71
00018 6FE9 97 7F        STA A    PROG+4    THIS VECTOR WILL ENABLE THE INPUT TO
00019 6FEB 96 7F NOAUTO LDA A    PROG+4
00020 6FED B7 1400       STA A    CONTRL
00021                 *
00022                 *BIT 0  HAS TO BE 1 IN EDD ONLY. PLEASE MAKE SURE THAT IT I
00023                 *       MEASUREMENT
00024                 *BIT1   CONTROLS THE ANALOG SWITCH ON EDD A27.
00025                 *       LOW.......EDD SIGNAL FROM UART BOARD
00026                 *       HIGH......EDD SIGNAL FROM AUTORANGE
00027                 *BIT2   HIGH...... RESETS THE COUNTER (FORCES THE CLOCK IN
00028                 *BIT4   LOW.......INHIBITS 1MHZ PULSES TO DIVIDE BY 12000
00029                 *BIT5   HAS TO BE HIGH FOR EDD
00030                 *BIT6   HAS TO BE HIGH FOR EDD
00031                 *
00032 6FF0 7F 00B7       CLR      LUBA
00033 6FF3 CE 0098       LDX      #EREG
00034 6FF6 BD 76BB       JSR      CLEAR
00035 6FF9 86 37 ZURUCK LDA A    #$37
00036 6FFB 97 AD         STA A    RANGE
00037 6FFD BD 7429       JSR      ARANGE
00038 7000 28 11         BVC      WEITER
00039 7002 96 AA         LDA A    STAT1     CHECK WHETHER IN SELF CHECK OR NOT
00040 7004 84 02         AND A    #$2
00041 7006 26 0B         BNE      WEITER
00042 7008 BD 64C6       JSR      LOOKUP
00043 700B 29 03         BVS      BYETNO
00044 700D 7E 7127       JMP      KRAUT
00045 7010 7E 5F00 BYETNO JMP     SYSTEM
```

```
00046 7013 96 75    WEITER  LDA A   SPANEL      GET FRONT PANEL STATUS
00047 7015 84 18            AND A   #$18        MODE=SLAVE?
00048 7017 81 08            CMP A   #$08        SLAVE?
00049 7019 26 03            BNE     CONTJ8
00050 701B 7E 715B           JMP     EDDSLV
00051 701E 96 75    CONTJ8  LDA A   SPANEL
00052 7020 84 19            AND A   #$19
00053 7022 81 10            CMP A   #$10
00054 7024 26 05            BNE     CONTJ9
00055 7026 86 A0            LDA A   #$A0
00056 7028 B7 1200          STA A   ANNJVL
00057 702B CE 0080  CONTJ9  LDX     #AREG
00058 702E BD 76BB          JSR     CLEAR
00059 7031 CE 0086          LDX     #BREG
00060 7034 BD 76BB          JSR     CLEAR
00061 7037 CE 008C          LDX     #CREG
00062 703A BD 76BB          JSR     CLEAR
00063 703D CE 0092          LDX     #DREG
00064 7040 BD 76BB          JSR     CLEAR
00065 7043 CE 0FFF          LDX     #$0FFF      IF NO 83.3HZ PRESENT PROGRAM WILL CO
00066 7046 B6 1507  CC00    LDA A   $1507
00067 7049 09              DEX
00068 704A 27 1B            BEQ     NOMOD
00069 704C 2B FB            BMI     CC00
00070 704E 96 7F            LDA A   PROG+4
00071 7050 8A 04            ORA A   #$04
00072 7052 B7 1400          STA A   CONTRL      RESETS 6 DECADE COUNTER
00073 7055 96 7F            LDA A   PROG+4
00074 7057 B7 1400          STA A   CONTRL
00075 705A CE 0FFF          LDX     #$0FFF
00076 705D B6 1507  CC03    LDA A   $1507
00077 7060 09              DEX
00078 7061 27 04            BEQ     NOMOD
00079 7063 2A FB            BPL     CC03
00080 7065 20 11            BRA     CC04
00081 7067 86 FF    NOMOD   LDA A   #$FF
00082 7069 97 83            STA A   AREG+3
00083 706B 97 84            STA A   AREG+4
00084 706D 97 85            STA A   AREG+5
00085 706F 7F 008C          CLR     GLORIA
00086 7072 7E 70CE          JMP     ANNA
00087 7075 CE 0FFF          LDX     #$0FFF
00088 7078 B6 1507  CC04    LDA A   $1507
00089 707B 09              DEX
00090 707C 27 E9            BEQ     NOMOD
00091 707F 2B FB            BMI     CC04
00092 7080 CE 0080          LDX     #AREG
00093 7083 BD 769B          JSR     READIT      READS DEC. COUNTER AND PUTS DATA INT
00094 7086 7D 0087  FORT    TST     LUBA
00095 7089 2A 0C            BPL     NORMAL
00096 708B 96 85            LDA A   AREG+5
00097 708D 97 8A            STA A   LENNY+2
00098 708F 96 84            LDA A   AREG+4
00099 7091 97 89            STA A   LENNY+1
00100 7093 96 83            LDA A   AREG+3
00101 7095 97 88            STA A   LENNY
00102 7097 DE 88    NORMAL  LDX     LENNY
00103 7099 DF 80            STX     AREG
00104 709B 96 8A            LDA A   LENNY+2
00105 709D 97 82            STA A   AREG+2
00106 709F 7F 0087          CLR     LUBA
00107 70A2 CE 009A  PLUS2   LDX     #EREG
00108 70A5 BD 72ED          JSR     AVERG1
00109 70A8 7A 008C          DEC     GLORIA
00110 70AB 26 3F            BNE     RPTSET
00111 70AD CE 009A          LDX     #EREG
00112 70B0 BD 7303          JSR     AVERG2
00113 70B3 BD 73DA  NOAVER  JSR     DSUBD
00114 70B6 CE 009A          LDX     #EREG
00115 70B9 BD 76BB          JSR     CLEAR
00116 70BC 96 88            LDA A   BREG+2
00117 70BE 97 85            STA A   AREG+5
00118 70C0 97 CC            STA A   SCHL+5
00119 70C2 96 87            LDA A   BREG+1
00120 70C4 97 84            STA A   AREG+4
```

```
00121 70C6 97 CB              STA A   SCHL+4
00122 70C8 96 86              LDA A   BREG
00123 70CA 97 83              STA A   AREG+3
00124 70CC 97 CA              STA A   SCHL+3    BUFFER REG FOR SELF CHECK
00125 70CE 96 AA    ANNA      LDA A   STAT1
00126 70D0 84 02              AND A   #$02      CHECK FOR SELF-CHECK
00127 70D2 26 08              BNE     HEXEL     SKIP NORM/RPT CHECK IF YES
00128 70D4 96 75              LDA A   SPANEL    PREVIOUS FRONT PANEL STATUS
00129 70D6 84 19              AND A   #$19
00130 70D8 81 10              CMP A   #$10      NORMAL & EDD*NORMAL?
00131 70DA 27 10              BEQ     RPTSET
00132 70DC BD 72A7 HEXEL      JSR     DISPL
00133 70DF 96 7D              LDA A   PROG+2
00134 70E1 B7 1200            STA A   ANNJVL
00135 70E4 96 84              LDA A   AREG+4
00136 70E6 97 F5              STA A   HPREG1    STORE LEFT MSB FOR HPIB
00137 70E8 96 85              LDA A   AREG+5
00138 70EA 97 F6              STA A   HPREG2    STORE LEFT LSB FOR HPIB
00139 70EC 7F 0085 RPTSET     CLR     AREG+5
00140 70EF 7F 0084            CLR     AREG+4
00141 70F2 7F 0083            CLR     AREG+3
00142 70F5 CE 0086            LDX     #BREG
00143 70F8 BD 76BB            JSR     CLEAR
00144 70FB CE 009F            LDX     #FREG     MEASURE FREQ. AND PLACE IN FREG.
00145 70FE BD 76C9            JSR     FREQ
00146 7101 C6 08              LDA B   #$08
00147 7103 BD 767B MOVER      JSR     LSHIFT
00148 7106 5A                 DEC B
00149 7107 26 FA              BNE     MOVER
00150 7109 7D 008C            TST     GLORIA
00151 710C 26 19              BNE     KRAUT
00152 710F 7C 008C            INC     GLORIA
00153 7111 7C 008C            INC     GLORIA
00154 7114 7C 008C            INC     GLORIA
00155 7117 CE 009F            LDX     #FREG
00156 711A BD 7741            JSR     RDSPLY
00157 711D B6 3002            LDA A   HPIBP+2   SEE H TO F HPIB OPTION IS INSTALLED
00158 7120 85 10              BIT A   #$10
00159 7122 26 03              BNE     KRAUT     BR IF NOT INSTALLED
00160 7124 BD 5807            JSR     HPTLK     OUTPUT DATA
00161                  ******
00162                  * TRANSMIT FREQUENCY CONTROL DATA TO SLAVE
00163                  ******
00164 7127 96 75    KRAUT     LDA A   SPANEL    GET FRONT PANEL IMAGE
00165 7129 84 1F              AND A   #$1E
00166 712B 81 18              CMP A   #$18      MODE=MASTER*STM?
00167 712D 26 10              BNE     FIVESA
00168 712F CE 009F            LDX     #FREG     SET WORKING REGISTER POINTER
00169 7132 B6 1400            LDA A   HREM
00170 7135 A7 04              STA A   4,X
00171 7137 B6 1800            LDA A   HREL
00172 713A A7 05              STA A   5,X
00173 713C BD 7813            JSR     WDATA
00174 713F 96 AA    FIVESA    LDA A   STAT1
00175 7141 84 02              AND A   #$02
00176 7143 27 01              BEQ     NOSELF
00177 7145 39                 RTS
00178 7146 5F       NOSELF    CLR B
00179 7147 BD 65C6            JSR     LDPVLA
00180 714A 48                 ASL A
00181 714B 2B 03              BMI     START1
00182 714D BD 7199            JSR     DELZER
00183 7150 BD 64C6 START1     JSR     LOOKUP
00184 7153 28 03              BVC     SONNE
00185 7155 7E 5F0D            JMP     SYSTEM
00186 7158 7E 6FF9 SONNE      JMP     ZURJCK
00187                  ******
00188                  * INSTRUMENT MODE=SLAVE. DETERMINE THE TEST DIRECTION
00189                  ******
00190 715B 96 7D    EDDSLV    LDA A   PROG+2
00191 715D B7 1200            STA A   ANNJVL
00192 7160 96 7E              LDA A   PROG+3
00193 7162 B7 1300            STA A   ANNJVR
00194 7165 96 75              LDA A   SPANEL    GET FRONT PANEL IMAGE
00195 7167 84 04              AND A   #$04      WHICH DIRECTION IS TEST
```

```
00196 7169 26 0A              BNE      EDDMTS
00197 716B CE 0080            LDX      #AREG         SET WORKING REGISTER POINTER
00198 716E BD 7877            JSR      RBUFF
00199 7171 28 07              BVC      SFREQ
00200 7173 20 DB              BRA      START1
00201 7175 CE 1804  EDDMTS    LDX      #$1804
00202 7178 DF 84              STX      AREG+4        PROGRAM TRANSMITTER TO 1804 HERTZ
00203                ******
00204                * PATCH THE TRANSMITTER
00205                ******
00206 717A B6 1A00  SFREQ     LDA A    HRFM          GET DIGITS D3 & D2 OF TRANSMITTER
00207 717D 97 76              STA A    TEMP          SAVE IN TEMP
00208 717F B6 1B00            LDA A    HRFLO         GET DIGITS D1 & D0 OF TRANSMITTER
00209 7182 97 77              STA A    TEMP+1
00210 7184 DE 84              LDX      AREG+4        GET NEW TRANSMITTER DATA
00211 7186 9C 76              CPX      TEMP          SAME?
00212 7188 27 C6              BEQ      START1        YES! DON'T BOTHER THE TRANSMITTER
00213 718A 96 85              LDA A    AREG+5
00214 718C B7 1900            STA A    HWFLO
00215 718F 96 84              LDA A    AREG+4
00216 7191 B7 1800            STA A    HWFM
00217 7194 B7 1800            STA A    HWFM
00218 7197 20 B7              BRA      START1
00219                *
00220                *THIS SUBROUTINE ESTABLISHES A 3000 MICRO SEC PHASE DIFFERE
00221                *
00222 7199 CE 0080  DELZER    LDX      #AREG
00223 719C BD 76BB            JSR      CLEAR
00224 719F CE 008C            LDX      #CREG
00225 71A2 BD 76BB            JSR      CLEAR
00226 71A5 CE 0092            LDX      #DREG
00227 71A8 BD 76BB            JSR      CLEAR
00228 71AB CE 0098            LDX      #EREG
00229 71AE BD 76BB            JSR      CLEAR
00230 71B1 B6 05              LDA A    #$05
00231 71B3 97 B9              STA A    LADY
00232 71B5 7F 00B8            CLR      LENNY
00233 71B8 7F 00B9            CLR      LENNY+1
00234 71BB 7F 00BA            CLR      LENNY+2
00235 71BE B6 FF              LDA A    #$FF
00236 71C0 97 B7              STA A    LUBA
00237 71C2 CE 0FFF            LDX      #$0FFF        THIS TEST WHETHER 83.3HZ IS PRESENT
00238 71C5 B6 1507  SCHLEI    LDA A    $1507
00239 71C8 09                 DEX
00240 71C9 27 7F              BEQ      AVANTI
00241 71CB 2B F8              BMI      SCHLEI
00242 71CD 96 7F              LDA A    PROG+4
00243 71CF 8A 04              ORA A    #$04
00244 71D1 B7 1400            STA A    CONTRL
00245 71D4 96 7F              LDA A    PROG+4
00246 71D6 B7 1400            STA A    CONTRL
00247 71D9 CE 0FFF            LDX      #$0FFF
00248 71DC B6 1507  HERTA     LDA A    $1507
00249 71DF 09                 DEX
00250 71E0 27 6B              BEQ      AVANTI
00251 71E2 2A F8              BPL      HERTA
00252 71E4 B6 1507  JOSEF     LDA A    $1507
00253 71E7 2B FB              BMI      JOSEF
00254 71E9 CE 0080            LDX      #AREG
00255 71EC BD 7698            JSR      READIT        READS 6 DECADE COUNTER AND PUTS IT I
00256                *                 INTO AREG+5
00257 71EF 7F 0080            CLR      MINJEN+1
00258 71F2 CE 3000            LDX      #$3000
00259 71F5 DF 81              STX      MINJEN+2
00260 71F7 CE 0086            LDX      #BREG
00261 71FA BD 76BB            JSR      CLEAR
00262 71FD BD 73DA            JSR      DSUB0         BCD SUBTRACT ROUTINE
00263 7200 DE 87              LDX      RSLT+2
00264 7202 5D                 TST B
00265 7203 2B 14              BMI      AA20          BRANCH IF PHASE DIFF. IS SMALLER THA
00266 7205 B6 01              LDA A    #$01
00267 7207 97 80              STA A    MINJEN+1
00268 7209 CE 2000            LDX      #$2000
00269 720C DF 81              STX      MINJEN+2
00270 720F 96 86              LDA A    RSLT+1
```

```
00271 7210 97 83            STA A   SUBTRH+1
00272 7212 DE 87            LDX     RSLT+2
00273 7214 DF 84            STX     SUBTRH+2
00274 7216 BD 73DA          JSR     DSUB0
00275 7219 86 08    AA20    LDA A   #$8
00276 721B 97 BE            STA A   DIVIS
00277 721D 86 92            LDA A   #$92        TENS COMPLEMENT OF DIVISOR
00278 721F 97 BD            STA A   TENSCO
00279 7221 BD 724B          JSR     DIVIDE
00280 7224 BD 736B          JSR     BCDBIY
00281 7227 7A 00BB          DEC     LADY
00282 722A 26 02            BNE     FORN
00283 722C 20 03            BRA     CONTIN
00284 722E 7E 71C5  FORN    JMP     SCHLEI
00285 7231 DE 98    CONTIN  LDX     EREG
00286 7233 27 15            BEQ     AVANTI      BRANCHES IF INDEX REG IS ZERO
00287 7235 96 7F            LDA A   PROG+4
00288 7237 84 EF            AND A   #$EF
00289 7239 B7 1400          STA A   $1400
00290 723C 09      DELGEN   DEX
00291 723D 26 FD            BNE     DELGEN
00292 723F 96 7F            LDA A   PROG+4
00293 7241 B7 1400          STA A   $1400
00294 7244 CE 00FF          LDX     #$00FF
00295 7247 09      CC20     DEX
00296 7248 26 FD            BNE     CC20
00297 724A 39      AVANTI   RTS
00298                       *
00299                       *THIS SUBROUTINE TAKES DATA STORED INBREG+2(LS DIGIT),BREG+
00300                       *TRANSFERS IT TO CREG. THE NUMBERS IN CREG WILL BE DIVIDED
00301                       *DIVIS.YOU HAVE TO PUT IN THE NUMBER AS WELL AS ITS TENS CO
00302                       *HAS TO BE PUT INTO TENSCO.
00303                       *
00304 724B 0F      DIVIDE   SEI                 SET THE INTERRUPT MASK
00305 724C CE 0003          LDX     #$3
00306 724F A6 85    AA09    LDA A   RSLT,X      LSB OF RSLT FROM SUBTRACT ROUTINE
00307 7251 16               TAB
00308 7252 84 0F            AND A   #MASKH
00309 7254 36               PSH A               PUSH DATA INTO THE STACK
00310 7255 54               LSR B
00311 7256 54               LSR B
00312 7257 54               LSR B
00313 7258 54               LSR B
00314 7259 37               PSH B
00315 725A 09               DEX
00316 725B 26 F2            BNE     AA09
00317 725D CE 0006          LDX     #$6
00318 7260 32      AA10     PUL A               PULL DATA FROM STACK
00319 7261 A7 BB            STA A   DIVID,X
00320 7263 09               DEX
00321 7264 26 FA            BNE     AA10
00322 7266 0E               CLI                 CLEAR INTERRUPT MASK BIT
00323 7267 CE 0006          LDX     #$06        SET COUNTER TO 6
00324 726A 6F 91    AA03    CLR     QUOTI,X
00325 726C 6F 97            CLR     RSLT1,X
00326 726E 09               DEX
00327 726F 26 F9            BNE     AA03
00328                       * START OF DIVIDE ROUTINE
00329 7271 CE 0006          LDX     #$06
00330 7274 A6 BB    SJBT1   LDA A   DIVID,X
00331 7276 97 98            STA A   RSLT1+1
00332 7278 91 BE            CMP A   DIVIS
00333 727A 2D 12            BLT     AA05
00334 727C 96 98    AA07    LDA A   RSLT1+1
00335 727E 9B BD            ADD A   TENSCO
00336 7280 19               DAA                 DECIMAL ADJUST
00337 7281 97 98            STA A   RSLT1+1
00338 7283 6C 91            INC     QUOTI,X
00339 7285 E6 91            LDA B   QUOTI,X
00340 7287 91 BE            CMP A   DIVIS
00341 7289 2D 03            BLT     AA05
00342 728B 7E 727C          JMP     AA07
00343 728E 96 98    AA05    LDA A   RSLT1+1
00344 7290 48               ASL A
00345 7291 48               ASL A
00346 7292 48               ASL A
```

```
00347 7293 48              ASL A
00348 7294 A3 84           AND A    DIVID-1,X
00349 7296 A7 84           STA A    DIVID-1,X
00350 7298 09              DEX
00351 7299 2F 03           BLE      AA08
00352 729B 7E 7274         JMP      SUBT1
00353 729E CE 0006  AA08   LDX      #$6
00354 72A1 A6 91   AA06    LDA A    QUOTI,X
00355 72A3 09              DEX
00356 72A4 26 FB           BNE      AA06
00357 72A6 39              RTS
00358                  *
00359                  *THIS SUBROUTINE SUPPRESSES LEADING ZERO'S AND SERVICES THE
00360                  *DATA HAS TO BE IN THE AREG (SOFTWARE REGISTER) IN LOCATION
00361                  *AND IN AREG+4.
00362                  *
00363 72A7 CE 0080  DISPL  LDX      #AREG
00364 72AA BD 72D8         JSR      BLANKD
00365 72AD 08              INX
00366 72AE 96 84           LDA A    AREG+4
00367 72B0 81 FF           CMP A    #$FF
00368 72B2 26 05           BNE      HANS
00369 72B4 96 85           LDA A    AREG+5
00370 72B6 BD 72DC         JSR      BLAD
00371 72B9 96 85   HANS    LDA A    AREG+5
00372 72BB 16              TAB
00373 72BC 84 0F           AND A    #MASKH
00374 72BE B7 1C03         STA A    $1C03    LSD LEFT DISPLAY
00375 72C1 54              LSR B
00376 72C2 54              LSR B
00377 72C3 54              LSR B
00378 72C4 54              LSR B
00379 72C5 F7 1C02         STA B    $1C02
00380 72C8 96 84           LDA A    AREG+4
00381 72CA 16              TAB
00382 72CB 84 0F           AND A    #MASKH
00383 72CD B7 1C01         STA A    $1C01
00384 72D0 54              LSR B
00385 72D1 54              LSR B
00386 72D2 54              LSR B
00387 72D3 54              LSR B
00388 72D4 F7 1C00         STA B    $1C00    MSD LEFT DISPLAY
00389 72D7 39              RTS
00390 72D8 A6 04   BLANKD  LDA A    4,X
00391 72DA 27 0C           BEQ      CONT1    BRANCHES IF ZERO
00392 72DC 84 F0   BLAD    AND A    #$F0
00393 72DE 26 0C           BNE      CONT2    BRANCHES IF MS DIGIT IS ZERO
00394 72E0 A6 04           LDA A    4,X
00395 72E2 8A F0           ORA A    #$F0
00396 72E4 A7 04           STA A    4,X
00397 72E6 20 04           BRA      CONT2
00398 72E8 86 FF   CONT1   LDA A    #$FF
00399 72EA A7 04           STA A    4,X
00400 72EC 39     CONT2    RTS
00401                  *
00402                  *THIS IS THE AERAGE ROUTINE.
00403                  *IT CONSISTS OF TWO ROUTINES.THE FIRST ONE CALLED AVERG1 AD
00404                  *OF AREG+5 (LS DIGIT)+AREG+4,+AREG+3 TO A SPECIFIED REG(HA
00405                  *INTO THE INDEX REG PRIOR TO CALLING THAT ROUTINE).THE SECO
00406                  *THE RESULT BY THREE AND PUTS THE RESULT INTO THE THE AREG.
00407                  *IT TOOK THE DATA FROM.
00408                  *
00409 72ED 96 85   AVERG1  LDA A    AREG+5    LOAD DIGITS 1&2
00410 72EF A9 05           ADD A    5,X       ADD AREG+5 TO THE SPECIFIED SOFTWARE
00411 72F1 19              DAA                DECIMAL ADJUST
00412 72F2 A7 05           STA A    5,X       STORE THE RESULT IN SPECIFIED S.REG
00413                  *
00414 72F4 96 84           LDA A    AREG+4
00415 72F6 A9 04           ADC A    4,X
00416 72F8 19              DAA
00417 72F9 A7 04           STA A    4,X
00418                  *
00419 72FB 96 83           LDA A    AREG+3    LOAD DIGITS 5&6
00420 72FD A9 03           ADC A    3,X
00421 72FF 19              DAA
```

```
00422 7300 A7 03            STA A   3,X
00423 7302 39               RTS
00424 7303 A6 03   AVERG2   LDA A   3,X         DATA TRANSFER INTO BREG
00425 7305 97 86            STA A   BREG
00426 7307 A6 04            LDA A   4,X
00427 7309 97 87            STA A   BREG+1
00428 730B A6 05            LDA A   5,X
00429 730D 97 88            STA A   BREG+2
00430                    *
00431 730F 86 03            LDA A   #$3         LOAD DIVISOR
00432 7311 97 BE            STA A   DIVIS
00433 7313 86 97            LDA A   #$97        TENS COMPLEMENT OF DIVISOR
00434 7315 97 BD            STA A   TENSCO
00435 7317 BD 724B          JSR     DIVIDE
00436 731A 0F               SEI                 SET INTERRUPT MASK BIT
00437 731B CE 0006          LDX     #$6
00438 731E A6 91   MEHR     LDA A   DREG-1,X
00439 7320 48               ASL A
00440 7321 48               ASL A
00441 7322 48               ASL A
00442 7323 48               ASL A
00443 7324 AA 90            ORA A   DREG-2,X
00444 7326 36               PSH A               PUSH ONTO STACK
00445 7327 09               DEX
00446 7328 09               DEX
00447 7329 26 F3            BNE     MEHR
00448 732B 32               PUL A               PULL DATA FROM STACK
00449 732C 97 85            STA A   AREG+5
00450 732E 32               PUL A
00451 732F 97 84            STA A   AREG+4
00452 7331 32               PUL A
00453 7332 97 83            STA A   AREG+3
00454 7334 0E               CLI                 CLEAR INTERRUPT MASK BIT
00455 7335 39               RTS
00456                    *
00457                    *THIS SUBROUTINE CONVERTS A 4 BCD DIGIT NUMBER INTO A BINAR
00458                    *THE LEAST SIGNIFICANT BCD DIGIT HAS TO BE IN DREG.
00459                    *THE MS BCD DIGIT THAS TO BE IN DREG+3
00460                    *THE MS BYTE OF THE RESULT IS IN EREG
00461                    *THE LS BYTE OF THE RESULT IS IN EREG+1
00462                    *EREG+2 AND EREG+3 ARE USED AS TEMP. STORAGE
00463                    *NONE OF THE SOFTWARE REGISTERS HAS TO BE CLEARED.
00464                    *
00465 7336 00      KONSTA   FCB     $0,$A,$14,$1E,$28,$32,$3C,$46,$50,$5A
      7337 0A
      7338 14
      7339 1E
      733A 28
      733B 32
      733C 3C
      733D 46
      733E 50
      733F 5A
00466 7340 0000             FDB     $0,$64,$C8,$12C,$190,$1F4,$258,$2BC,$320,$384
      7342 0064
      7344 00C8
      7346 012C
      7348 0190
      734A 01F4
      734C 0258
      734E 02BC
      7350 0320
      7352 0384
00467 7354 0000             FDB     $0,$3E8,$7D0,$BB8,$FA0,$1388,$1770,$1B58,$1F4
      7356 03E8
      7358 07D0
      735A 0BB8
      735C 0FA0
      735E 1388
      7360 1770
      7362 1B58
      7364 1F40
      7366 2328
00468 7368 CE 0098 BCDBIY   LDX     #EREG
00469 736B BD 768B          JSR     CLEAR
```

```
00470 736F CE 7336        LDX    #KONSTA
00471 7371 DF 94          STX    EREG+2    STORE ADDRESS OF BINARY KONSTANTS IN
00472 7373 96 92          LDA A  DREG      GET LS BCD DIGIT
00473 7375 97 99          STA A  EREG+1
00474 7377 96 93          LDA A  DREG+1    GET SECOND BCD DIGIT
00475 7379 BD 73D0        JSR    RECHNE
00476 737C DE 94          LDX    EREG+2
00477 737E A6 00          LDA A  ,X        LOAD TEH BINARY KONSTANT INTO THE A
00478 7380 9B 99          ADD A  EREG+1
00479 7382 97 99          STA A  EREG+1
00480 7384 24 03          BCC    BB00
00481 7386 7C 009B        INC    EREG
00482 7389 CE 7336  BB00  LDX    #KONSTA
00483 738C DF 94          STX    EREG+2
00484 738E 96 94          LDA A  DREG+2
00485 7390 48             ASL A            MULTIPLY BY TWO
00486 7391 4C             INC A            ADD ONE
00487 7392 C6 0A          LDA B  #$A       LOAD 10 INTO A ACC.
00488 7394 1B             ABA              ADDD B AVCU. TO A ACCUM.
00489 7395 BD 73D0        JSR    RECHNE
00490 7398 DE 94          LDX    EREG+2
00491 739A A6 00          LDA A  ,X        GET NEXT BINARY KONSTANT
00492 739C 9B 99          ADD A  EREG+1
00493 739E 97 99          STA A  EREG+1
00494 73A0 24 03          BCC    BB01
00495 73A2 7C 009B        INC    EREG
00496 73A5 09       BB01  DEX
00497 73A6 A6 00          LDA A  ,X        GET SECOND BYTE OF BINARY KONSTANT
00498 73A8 9B 9B          ADD A  EREG
00499 73AA 97 9B          STA A  EREG
00500 73AC CE 7336        LDX    #KONSTA
00501 73AF DF 94          STX    EREG+2
00502 73B1 96 95          LDA A  DREG+3    GET LAST (MS) BCD DIGIT
00503 73B3 48             ASL A
00504 73B4 4C             INC A
00505 73B5 C6 1F          LDA B  #30
00506 73B7 1B             ABA
00507 73B8 BD 73D0        JSR    RECHNE
00508 73BB DE 94          LDX    EREG+2
00509 73BD A6 00          LDA A  ,X
00510 73BF 9B 99          ADD A  EREG+1
00511 73C1 97 99          STA A  EREG+1
00512 73C3 24 03          BCC    BB02
00513 73C5 7C 009B        INC    EREG
00514 73C8 09       BB02  DEX
00515 73C9 A6 00          LDA A  ,X
00516 73CB 9B 9B          ADD A  EREG
00517 73CD 97 9B          STA A  EREG
00518 73CF 39             RTS
00519 73D0 9B 9B   RECHNE ADD A  EREG+3
00520 73D2 24 03          BCC    SPRING
00521 73D4 7C 009A        INC    EREG+2
00522 73D7 97 9B   SPRING STA A  EREG+3
00523 73D9 39             RTS
00524                     *
00525                     *BCD SUBTRACT ROUTINE FOR 6 DIGITS (SIGNED)
00526                     *
00527 73DA CE 0003 DSUB0  LDX    #3        SET BYTE COUNTER
00528 73DD 96 7D          LDA A  PROG+2
00529 73DF 84 9F          AND A  #$9F
00530 73E1 8A 40          ORA A  #$40
00531 73E3 97 7D          STA A  PROG+2    POLARITY NEG.
00532 73E5 5F             CLR B
00533 73E6 86 99   DSUB1  LDA A  #$99
00534 73E8 A0 82          SUB A  SUBTRH,X  FIND 9'S COMPLEMENT
00535 73EA A7 85          STA A  RSLT,X    USE RSLT AS TEMP STORAGE
00536 73EC 09             DEX              DECREMENT BYTE COUNTER
00537 73ED 26 F7          BNE    DSUB1
00538 73EF CE 0003        LDX    #3        RESTORE BYTE COUNTER
00539 73F2 0D             SEC
00540 73F3 A6 7F   DSUB2  LDA A  MINUEN,X  ADD SUBTRH TO MINUEN
00541 73F5 A9 85          ADC A  RSLT,X
00542 73F7 19             DAA              DECIMAL ADJUST
00543 73F8 A7 85          STA A  RSLT,X
00544 73FA 09             DEX
```

```
00545 73FB 26 F6            BNE    DSUB2     LOOP UNTIL LAST BYTE
00546 73FD DE 87            LDX    RSLT+2
00547 73FF 96 86            LDA A  RSLT+1    LOADS MBS BYTE OF RESULT
00548 7401 2A 25            BPL    ENDE
00549 7403 CE 0003          LDX    #3
00550 7406 C6 80            LDA B  #$80
00551 7408 86 99    DSUB3   LDA A  #$99
00552 740A A0 85            SUB A  RSLT,X
00553 740C A7 85            STA A  RSLT,X    TAKES THE 9'S COMPLEMENT OF THE RESU
00554 740E 09              DEX
00555 740F 26 F7            BNE    DSUB3
00556 7411 CE 0003          LDX    #3
00557 7414 4F              CLR A
00558 7415 0D              SEC
00559 7416 A9 85    DSUB4   ADC A  RSLT,X    ADD A 1 TO THE RESULT
00560 7418 19              DAA              10'S COMPLEMENT OF THE RESULT
00561 7419 A7 85            STA A  RSLT,X
00562 741B 86 00            LDA A  #$00
00563 741D 09              DEX
00564 741E 26 F6            BNE    DSUB4
00565 7420 DE 87            LDX    RSLT+2
00566 7422 96 7D            LDA A  PROG+2
00567 7424 84 9F            AND A  #$9F
00568 7426 97 7D            STA A  PROG+2
00569 7428 39      ENDE    RTS
00570                       *
00002                       ****** SUBROUTINE LIBRARY ******
00003                       *
00004                       *
00005                       *
00006                       *
00007                       *
00008                       ********                        ******
00009                       * THIS SUBROUTINE IS THE AUTORANGE ROUTINE. BEFORE CALLING
00010                       * ROUTINE THE MAXIMUM AND MINIMUM LIMITS OF THE AUTORANGE
00011                       * ARE TO BE STORED IN MEMORY LOCATION "RANGE". THIS ROUTINE
00012                       * USES THE INDEX REGISTER AND HENCE IF THE VALUE OF THE IND
00013                       * REGISTER IS IMPORTANT IT MUST BE STORED PRIOR TO CALLING
00014                       * ROUTINE. THE FUNCTIONS OF QUANTIZING RESETTING THE DATA
00015                       * ACQUISITION COUNTER,INCREMENTING AND DECREMENTING THE PROG
00016                       * AMPLIFIER ARE PERFORMED BY THIS ROUTINE. IT ALSO BLANKS T
00017                       * DISPLAYS AND LIGHTS + OR - IF AN OVER OR UNDER CONDITION
00018                       * IF THE OVERFLOW FLAG IS SET WHEN CONTROL RETURNS TO THE V
00019                       * PROGRAM THE SIGNAL IS OUT OF RANGE.
00020                       ********VERSION 1.00********
00021                       ********ENTRY POINT"ARANGE"********
00022                       ************************************************
00023 7429 0F      ARANGE  SEI              SET THE INTERRUPT MASK
00024                       ******
00025                       *
00026                       * RESET SIX DECADE COUNTER *
00027                       *
00028                       ******
00029 742A 5F              CLR B
00030 742B 96 7F            LDA A  PROG+4    GET THE HARDWARE LATCH IMAGE
00031 742D 84 92            AND A  #$92      CLEAR RST BIT,SELECT LOG DATA
00032 742F 16              TAB              ACCA=>ACCB
00033 7430 8A 04            ORA A  #$04      SET B2 THE COUNTER RST CONTROL BIT
00034 7432 B7 1400          STA A  CONTRL    OUTPUT CLEAR PULSE TO CONTROL LATCH
00035 7435 F7 1400          STA B  CONTRL    RESTORE STATUS OF CONTROL LATCH
00036                       ******
00037                       *
00038                       * COUNTER CLEARED,QUANTIZE DETECTOR OUTPUT. *
00039                       *
00040                       ******
00041 7438 CE 00FA          LDX    #$00FA    INITIALIZE WAIT LOOP
00042 743B 17              TBA              ACCB=>ACCA
00043 743C 8A 08            ORA A  #$08      SET BIT B3,THE LOG QUANTIZER CONTROL
00044 743E B7 1400          STA A  CONTRL    START 2MSEC QUANTIZATION GATE
00045 7441 09      AGAIN   DEX
00046 7442 26 FD            BNE    AGAIN
00047 7444 F7 1400          STA B  CONTRL    STOP
00048 7447 CE 0080          LDX    #AREG     SET POINTER TO ADDRESS OF SOFTWARE R
00049 744A BD 76BB          JSR    CLEAR     0 => A,CLEAR REGISTER A
```

```
00050  744D  BD 7698            JSR     READIT    COUNTER -> A,LOAD CONTENTS TO REGIST
00051  7450  0E                 CLI               CLEAR INTERRUPT MASK
00052  7451  96 83              LDA  A  AREG+3    LOAD DIGITS D5 & D6
00053  7453  26 06              BNE     OVER10    DETECTOR OUTPUT >10.00
00054  7455  96 84              LDA  A  AREG+4    LOAD DIGITS D3 & D2
00055  7457  84 F0              AND  A  #$F0
00056  7459  27 1A              BEQ     LESS10    DETECTOR OUTPUT <10.00
00057  745B  96 7B   OVER10     LDA  A  PROG      DETECTOR OUTPUT >=10.00
00058  745D  84 38              AND  A  #$38      GET THE PRESENT RANGE STATE
00059  745F  44                 LSR  A
00060  7460  44                 LSR  A
00061  7461  44                 LSR  A
00062  7462  D6 A0              LDA  B  RANGE     GET THE AUTORANGE LIMITS
00063  7464  C4 0F              AND  B  #$0F
00064  7466  11                 CBA               AT THE MIN. GAIN?
00065  7467  27 65              BEQ     OVER      YES!,OVER-RANGE
00066  7469  D6 83              LDA  B  AREG+3    LOAD DIGITS D5 & D4
00067  746B  26 29              BNE     LOWER     DETECTOR OUTPUT >13.00
00068  746D  C6 13              LDA  B  #$13
00069  746F  D1 84              CMP  B  AREG+4
00070  7471  23 23              BLS     LOWER     DETECTOR OUTPUT >=13.00
00071  7473  20 78              BRA     CONTJ
00072  7475  D6 84   LESS10     LDA  B  AREG+4    LOAD DIGITS D3 & D2
00073  7477  26 77              BNE     CONTJ
00074  7479  96 7B              LDA  A  PROG      DETECTOR OUTPUT LESS THAN 1.00
00075  747B  84 38              AND  A  #$38      GET THE PRESENT RANGE STATE
00076  747D  44                 LSR  A
00077  747E  44                 LSR  A
00078  747F  44                 LSR  A
00079  7480  D6 A0              LDA  B  RANGE     GET THE AUTORANGE LIMITS
00080  7482  C4 F0              AND  B  #$F0
00081  7484  54                 LSR  B
00082  7485  54                 LSR  B
00083  7486  54                 LSR  B
00084  7487  54                 LSR  B           BCD SHIFT RIGHT SO THAT COMPARE WILL
00085  7488  11                 CBA              AT THE MAX. GAIN?
00086  7489  22 08              BHI     UPPER
00087  748B  D6 85              LDA  B  AREG+5   DETECTOR OUTPUT =<0020?
00088  748D  C1 10              CMP  B  #$10
00089  748F  23 4B              BLS     UNDER
00090  7491  20 5D              BRA     CONTJ
00091  7493  4A      UPPER      DEC  A           INCREASE GAIN,DECREASE THE RANGE STA
00092  7494  20 01              BRA     UPDATE
00093  7496  4C      LOWER      INC  A           DECREASE GAIN,INCREASE THE RANGE STA
00094  7497  C6 C7   UPDATE     LDA  B  #$C7
00095  7499  D4 7B              AND  B  PROG     CLEAR THE PRESENT RANGE STATE
00096  749B  D7 7B              STA  B  PROG
00097  749D  48                 ASL  A
00098  749E  48                 ASL  A
00099  749F  48                 ASL  A
00100  74A0  9A 7B              ORA  A  PROG
00101  74A2  97 7B              STA  A  PROG     STORE NEW RECEIVER STATUS
00102  74A4  B7 1600            STA  A  RCVR     LOAD RECEIVER LATCH WITH NEW RANGE
00103                  ******
00104                  *
00105                  * WAIT LOOP OF APPROXIMATELY 150 OR 500 MSEC
00106                  * DEPENDENT UPON WHICH DETECTOR IS BEING USED
00107                  *
00108                  ******
00109  74A7  BD 65BA            JSR     IDFPLA
00110  74AA  84 18              AND  A  #$18
00111  74AC  81 08              CMP  A  #$08     SLAVE?
00112  74AE  27 16              BEQ     SLAVE1
00113  74B0  BD 64C6            JSR     LOOKUP   CHECK FRONT PANEL STATUS WHILE RANGI
00114  74B3  29 33              BVS     OUTSID   CHANGE,ABORT!
00115  74B5  96 7B   SLAVE4     LDA  A  PROG     GET THE RECEIVER IMAGE
00116  74B7  2B 05              BMI     AVGE     AVERAGE DETECTOR?
00117  74B9  86 04              LDA  A  #$04
00118  74BB  BD 64A3            JSR     WAITR    600 MSEC. BETWEEN RANGES IF 3RMS
00119  74BE  86 02   AVGE       LDA  A  #$02
00120  74C0  BD 64A3            JSR     WAITR
00121  74C3  7E 7429            JMP     ARANGE
00122  74C6  96 AA   SLAVE1     LDA  A  STAT1
00123  74C8  85 20              BIT  A  #$20     ABORT FLAG SET
00124  74CA  27 E9              BEQ     SLAVE4
```

```
00125 74CC 20 1A              BRA      OUTSID
00126                 ******
00127                 *
00128                 * OVERRANGE-DISPLAY "+".
00129                 *
00130                 ******
00131 74CF BD 74F6 OVER   JSR      BLANK
00132 74D1 96 7D            LDA A    PROG+2    LOAD LEFT DISPLAY ANNUNCIATOR IMAGE
00133 74D3 8A 80            ORA A    #$80      RESET THE OVERFLOW INDICATOR
00134 74D5 84 9F            AND A    #$9F      ENABLE POLARITY AND SELECT "+"
00135 74D7 B7 1200          STA A    ANNJVL    STORE NEW STATUS IN LEFT DISPLAY ANN
00136 74DA 20 0C            BRA      OUTSID
00137                 ******
00138                 *
00139                 * UNDERRANGE-DISPLAY "-"
00140                 *
00141                 ******
00142 74DC BD 74F6 UNDER  JSR      BLANK
00143 74DF 96 7D            LDA A    PROG+2    LOAD LEFT DISPLAY ANNUNCIATOR IMAGE
00144 74E1 8A C0            ORA A    #$C0      SET BIT B6,THE POLARITY SELECT BIT
00145 74E3 84 DF            AND A    #$DF      ENABLE POLARITY AND SELECT "-"
00146 74E5 B7 1200          STA A    ANNJVL
00147                 ******
00148                 *
00149                 * OUT OF RANGE,SET OVERFLOW FLAG.
00150                 *
00151                 ******
00152 74E8 96 7F  OUTSID LDA A    PROG+4
00153 74EA B7 1400          STA A    CONTRL    RESTORE STATUS OF CONTRL LATCH
00154 74ED 0B             SEV               SET THE OVERFLOW FLAG
00155 74EE 20 05            BRA      FINAL
00156 74F0 96 7F  CONTU  LDA A    PROG+4
00157 74F2 B7 1400          STA A    CONTRL    THIS ALSO CLEARS THE OVERFLOW FLAG
00158 74F5 39    FINAL  RTS
00159                 ******** DISPLAY BLANKING SUBROUTINE ********
00160                 * DETECTOR OUTPUT LIMITS NOT SATISFIED,BLANK DISPLAY.
00161 74F6 BD 7534 BLANK  JSR      BLANKL    BLANK LEFT DISPLAY
00162 74F9 BD 7549        JSR      BLANKR    BLANK RIGHT DISPLAY
00163 74FC 96 7E          LDA A    PROG+3    LOAD RIGHT DISPLAY ANNUNCIATOR IMAGE
00164 74FE 84 DF          AND A    #$DF      BLANK THE DECIMAL POINT
00165 7500 B7 1300        STA A    ANNJVR    STORE NEW STATUS IN RIGHT DISPLAY AN
00166 7503 96 7D          LDA A    PROG+2    LOAD LEFT DISPLAY ANNUNCIATOR IMAGE
00167 7505 8A A0          ORA A    #$A0      BLANK THE POLARITY AND OVERFLOW INDI
00168 7507 B7 1200        STA A    ANNJVL    STORE NEW STATUS IN LEFT DISPLAY ANN
00169 750A 86 99          LDA A    #$99      GETS ERHARD'S ATTENTION
00170 750C 97 F5          STA A    HPREG1
00171 750E 97 F6          STA A    HPREG2
00172 7510 97 F7          STA A    HPREG3
00173 7512 97 F8          STA A    HPREG4    SENDS TO HPIB OUT OF RANGE MESSAGE
00174 7514 D6 AB          LDA B    STAT2     GET STATUS REGISTER
00175 7516 2A 03          BPL      BLANKD    BR IF NOT IN HPIB
00176 7518 BD 5B07        JSR      HPILK     IF IN HPIB, SEND THE ERROR MESSAGE
00177 751B 39    BLANKD RTS
00178                 *
00179                 *
00180                 ******** ERROR FORMATTER SUBROUTINE ********
00181 751C CE 0080 ERROR  LDX      #AREG     SET POINTER
00182 751F BD 768B        JSR      CLEAR
00183 7522 86 BE          LDA A    #$BE      ERROR PREAMBLE
00184 7524 A7 01          STA A    1,X
00185 7526 E7 02          STA B    2,X       ERROR # PASSED IN ACCB
00186 7528 BD 779D        JSR      LDSPLY    OUTPUT ERROR MESSAGE
00187 752B 96 7D          LDA A    PROG+2
00188 752D 8A A0          ORA A    #$A0
00189 752F B7 1200        STA A    ANNJVL    BLANK LEFT ANNUNCIATOR
00190 7532 96 7E          LDA A    PROG+3
00191 7534 84 DF          AND A    #$DF
00192 7536 B7 1300        STA A    ANNJVR    BLANK D.P.
00193 7539 39            RTS
00194                 *
00195                 *
00196                 ******
00197                 * DISPLAY BLANKING SUBROUTINES
00198                 ******
00199                 *
00200                 *
```

```
00201 753A 86 FF    BLANKL LDA A  #$FF
00202 753C B7 1C00         STA A  LEFTD     BLANKS THE LEFT DISPLAY
00203 753F B7 1C01         STA A  LEFTD+1
00204 7542 B7 1C02         STA A  LEFTD+2
00205 7545 B7 1C03         STA A  LEFTD+3
00206 7548 39              RTS
00207 7549 86 FF    BLANKR LDA A  #$FF      BLANKS RIGHT DISPLAY
00208 754B B7 1D00         STA A  RIGHTD
00209 754E B7 1D01         STA A  RIGHTD+1
00210 7551 B7 1D02         STA A  RIGHTD+2
00211 7554 B7 1D03         STA A  RIGHTD+3
00212 7557 39              RTS
00213                *
00214                *
00215                *
00216                *
00217                *
00218                ******                        ******
00219                ****** AUTORANGE STATE ROUTINE ******
00220                *******************************************************
00221                * THIS SUBROUTINE GENERATES THE VECTOR TO THE RECORD TABLE
00222                * EACH POSSIBLE AUTORANGE STATE WHEN THE LEVEL IS BEING MEA
00223                * IN DBM. THE SUBROUTINE RETURNS WITH THE VECTOR IN THE IND
00224                *******************************************************
00225                ****** ENTRY POINT: DBM ******
00226                ****** VERSION: 1.00 ******
00227 7558 9070   DBM70   FDB    $9070
00228 755A 9060   DBM60   FDB    $9060
00229 755C 9050   DBM50   FDB    $9050
00230 755E 9040   DBM40   FDB    $9040
00231 7560 9030   DBM30   FDB    $9030
00232 7562 9020   DBM20   FDB    $9020
00233 7564 9010   DBM10   FDB    $9010
00234 7566 0000   DBM00   FDB    $0000
00235 7568 96 78  DBM     LDA A  PROG      LOAD THE STATUS OF THE RECEIVER
00236 756A 84 38          AND A  #$38      OBTAIN THE AUTORANGE STATE
00237 756C 44             LSR A
00238 756D 44             LSR A
00239 756E 44             LSR A
00240 756F 26 05          BNE    DEC1
00241 7571 CE 7558        LDX    #DBM70    MAXIMUM GAIN,STATE=000,70DB GAIN
00242 7574 20 33          BRA    FINISH
00243 7576 44     DEC1    DEC A
00244 7577 26 05          BNE    DEC2
00245 7579 CE 755A        LDX    #DBM60    AUTORANGE STATE=001,60DB GAIN
00246 757C 20 2B          BRA    FINISH
00247 757E 44     DEC2    DEC A
00248 757F 26 05          BNE    DEC3
00249 7581 CE 755C        LDX    #DBM50    AUTORANGE STATE=010,50DB GAIN
00250 7584 20 23          BRA    FINISH
00251 7586 44     DEC3    DEC A
00252 7587 26 05          BNE    DEC4
00253 7589 CE 755E        LDX    #DBM40    AUTORANGE STATE=011,40DB GAIN
00254 758C 20 1B          BRA    FINISH
00255 758E 44     DEC4    DEC A
00256 758F 26 05          BNE    DEC5
00257 7591 CE 7560        LDX    #DBM30    AUTORANGE STATE=100,30DB GAIN
00258 7594 20 13          BRA    FINISH
00259 7596 44     DEC5    DEC A
00260 7597 26 05          BNE    DEC6
00261 7599 CE 7562        LDX    #DBM20    AUTORANGE STATE=101,20DB GAIN
00262 759C 20 0B          BRA    FINISH
00263 759E 44     DEC6    DEC A
00264 759F 26 05          BNE    LOAD01
00265 75A1 CE 7564        LDX    #DBM10    AUTORANGE STATE=110,10DB GAIN
00266 75A4 20 03          BRA    FINISH
00267 75A6 CE 7566 LOAD01 LDX    #DBM00    AUTORANGE STATE=111,00DB GAIN
00268 75A9 39     FINISH  RTS
00269                *
00270                *
00271                *
00272                *
00273                *
00274                ******                        ******
00275                ****** AUTORANGE STATE ROUTINE ******
00276                *******************************************************
```

```
00277                  * THIS SUBROUTINE GENERATES THE VECTOR TO THE RECORD TABLE
00278                  * EACH POSSIBLE AUTORANGE STATE WHEN THE LEVEL IS BEING MEA
00279                  * IN DBM. THE SUBROUTINE RETURNS WITH THE VECTOR IN THE IND
00280                  ************************************************************
00281                  ****** ENTRY POINT: DBRN ******
00282                  ****** VERSION: 1.00 ******
00283 75AA 0020        DBRN20  FDB     $0020
00284 75AC 0030        DBRN30  FDB     $0030
00285 75AE 0040        DBRN40  FDB     $0040
00286 75B0 0050        DBRN50  FDB     $0050
00287 75B2 0060        DBRN60  FDB     $0060
00288 75B4 0070        DBRN70  FDB     $0070
00289 75B6 0080        DBRN80  FDB     $0080
00290 75B8 0090        DBRN90  FDB     $0090
00291 75BA 96 7B       DBRN    LDA A   PROG      LOAD THE STATUS OF THE RECEIVER
00292 75BC 84 38               AND A   #$38      OBTAIN THE AUTORANGE STATE
00293 75BE 44                  LSR A
00294 75BF 44                  LSR A
00295 75C0 44                  LSR A
00296 75C1 26 05               BNE     DEC1R
00297 75C3 CE 75AA             LDX     #DBRN20   MAXIMUM GAIN,STATE=000,70DB GAIN
00298 75C6 20 33               BRA     DONE
00299 75C8 4A         DEC1R    DEC A
00300 75C9 26 05               BNE     DEC2R
00301 75CB CE 75AC             LDX     #DBRN30   AUTORANGE STATE=001,60DB GAIN
00302 75CE 20 2B               BRA     DONE
00303 75D0 4A         DEC2R    DEC A
00304 75D1 26 05               BNE     DEC3R
00305 75D3 CE 75AE             LDX     #DBRN40   AUTORANGE STATE=010,50DB GAIN
00306 75D6 20 23               BRA     DONE
00307 75D8 4A         DEC3R    DEC A
00308 75D9 26 05               BNE     DEC4R
00309 75DB CE 75B0             LDX     #DBRN50   AUTORANGE STATE=011,40DB GAIN
00310 75DE 20 1B               BRA     DONE
00311 75E0 4A         DEC4R    DEC A
00312 75E1 26 05               BNE     DEC5R
00313 75E3 CE 75B2             LDX     #DBRN60   AUTORANGE STATE=100,30DB GAIN
00314 75E6 20 13               BRA     DONE
00315 75E8 4A         DEC5R    DEC A
00316 75E9 26 05               BNE     DEC6R
00317 75EB CE 75B4             LDX     #DBRN70   AUTORANGE STATE=101,20DB GAIN
00318 75EE 20 0B               BRA     DONE
00319 75F0 4A         DEC6R    DEC A
00320 75F1 26 05               BNE     LOAD02
00321 75F3 CE 75B6             LDX     #DBRN80   AUTORANGE STATE=110,10DB GAIN
00322 75F6 20 03               BRA     DONE
00323 75F8 CE 75B8   LOAD02    LDX     #DBRN90   AUTORANGE STATE=111,00DB GAIN
00324 75FB 39         DONE     RTS
00325                  *
00326                  *
00327                  ********                              ********
00328                  * THIS SUBROUTINE IS A DOUBLE PRECISION (12 DIGIT)
00329                  * INTEGER,BCD,10'S COMPLEMENT ROUTINE. THE INDEX REGISTER
00330                  * IS LOADED WITH THE LOCATION+6 (LDX #LABEL+6) OF THE
00331                  * MOST SIGNIFICANT BYTE OF THE SOFTWARE REGISTER TO BE
00332                  * COMPLEMENTED. THE 10'S COMPLEMENT IS PLACED IN THIS
00333                  * SAME REGISTER.
00334                  ********ENTRY POINT:"CMPIT"********
00335                  ********VERSION 1.00********
00336                  ************************************************************
00337 75FC C6 05       CMPIT    LDA B   #$05      INITIALIZE LOOP COUNTER TO 05
00338 75FE 07                   TPA
00339 75FF 84 1F                AND A   #$1F      CLEAR THE HALF CARRY
00340 7601 06                   TAP                 TO BE CERTAIN THE DAA INSTRUCTION NO
00341 7602 A6 05       BYTE     LDA A   5,X       LOAD BYTE FROM INDICATED SOFTWARE REC
00342 7604 27 17                BEQ     NEXT2
00343                  ******
00344                  *
00345                  * FIRST NON-ZERO BYTE ENCOUNTERED.
00346                  * SUBTRACT FROM $9A
00347                  *
00348                  ******
00349 7606 86 9A                LDA A   #$9A
00350 7608 20 02                BRA     DOIT
00351 760A 86 99      LOOP0     LDA A   #$99
```

```
00352 760C A0 05    DOIT   SUB A  5,X       SUBTRACT ACCA FROM SOFTWARE REGISTER
00353 760E 19              DAA
00354 760F A7 05           STA A  5,X       STORE RESULT IN SAME LOCATION IN SOF
00355 7611 09               DEX             DECREMENT REGISTER BYTE POINTER
00356 7612 5A               DEC B           DECREMENT LOOP COUNTER
00357 7613 26 F5            BNE    LOOP0
00358 7615 86 99            LDA A  #$99     LAST BYTE TO BE COMPLEMENTED
00359 7617 A0 05            SUB A  5,X
00360 7619 19               DAA
00361 761A A7 05            STA A  5,X
00362 761C 39       EXIT   RTS
00363 761D 09       NEXT2  DEX              DECREMENT REGISTER BYTE POINTER
00364 761E 5A               DEC B           DECREMENT LOOP COUNTER
00365 761F 26 E1            BNE    BYTE
00366 7621 A6 05            LDA A  5,X
00367 7623 27 F7            BEQ    EXIT
00368              ******
00369              *
00370              * THE MOST SIGNIFICANT BYTE IS THE FIRST
00371              * NON-ZERO BYTE. DETERMINE IF EITHER DIGIT IS ZERO.
00372              *
00373              ******
00374 7625 84 0F            AND A  #$0F     LAST BYTE IN REGISTER
00375 7627 26 04            BNE    BYPASS
00376 7629 86 A0            LDA A  #$A0     MSD IS THE ONLY NON-ZERO DIGIT IN RE
00377 762B 20 02            BRA    MSBYTE
00378 762D 86 9A   BYPASS LDA A  #$9A      MSD AND MSD-1 ARE ONLY NON-ZERO DIGI
00379 762F A0 05   MSBYTE SUB A  5,X
00380 7631 19               DAA
00381 7632 A7 05            STA A  5,X      STORE RESULT AND EXIT
00382 7634 20 E6            BRA    EXIT
00383              *
00384              *
00385              *
00386              *
00387              *
00388              ********                    ********
00389              * THIS ROUTINE IS AN UNSIGNED,INTEGER,DOUBLE PRECISION
00390              * (12 DIGIT),BCD ADDITION ROUTINE. PRIOR TO CALLING THIS
00391              * ROUTINE THE INDEX REGISTER SHOULD BE LOADED WITH THE
00392              * ADDRESS OF THE REGISTER TO BE ACCESSED.
00393              * THIS ROUTINE IS DEFINED BY THE FOLLOWING:
00394              * (N) = CONTENTS OF REGISTER N, WHERE N=A,B,C,D,E,F,G
00395              * (A) + (N) > REGISTER A
00396              * THE INDEX REGISTER IS USED ONLY AS A POINTER TO THE
00397              * MOST SIGNIFICANT BYTE OF THE ACCESSED REGISTER. ITS
00398              * VALUE IS NOT MODIFIED BY THIS PROGRAM. UPON RETURNING
00399              * TO THE MAIN PROGRAM THE CONTENTS OF ACCB SHOULD BE
00400              * CHECKED FOR A SEVENTH BYTE CARRY.
00401              ********ENTRY POINT:"BCDADD"********
00402              ********VERSION 1.10********
00403              ****************************************************
00404 7636 5F       BCDADD CLR B
00405 7637 96 85           LDA A  AREG+5
00406 7639 AB 05           ADD A  5,X       ADD FIRST BYTE OF AREG TO ACCESSED R
00407 763B 19              DAA
00408 763C 97 85           STA A  AREG+5    STORE BCD CORRECTED RESULT IN AREG
00409 763F 96 84           LDA A  AREG+4
00410 7640 A9 04           ADC A  4,X       ADD SECOND BYTE OF AREG
00411 7642 19              DAA
00412 7643 97 84           STA A  AREG+4    STORE BCD CORRECTED RESULT IN AREG
00413 7645 96 83           LDA A  AREG+3
00414 7647 A9 03           ADC A  3,X       ADD THIRD BYTE OF AREG
00415 7649 19              DAA
00416 764A 97 83           STA A  AREG+3    STORE BCD CORRECTED RESULT IN AREG
00417 764C 96 82           LDA A  AREG+2
00418 764E A9 02           ADC A  2,X       ADD FOURTH BYTE OF AREG
00419 7650 19              DAA
00420 7651 97 82           STA A  AREG+2    STORE BCD CORRECTED RESULT IN AREG
00421 7653 96 81           LDA A  AREG+1
00422 7655 A9 01           ADC A  1,X       ADD FIFTH BYTE OF AREG
00423 7657 19              DAA
00424 7658 97 81           STA A  AREG+1    STORE BCD CORRECTED RESULT IN AREG
00425 765A 96 80           LDA A  AREG
00426 765C A9 00           ADC A  X         ADD SIXTH BYTE OF AREG
00427 765F 19              DAA
```

```
00428 765F 97 80           STA A   AREG    STORE BCD CORRECTED RESULT IN AREG
00429 7661 24 01           BCC     STOP
00430 7663 5C              INC B           CARRY IN THE SEVENTH BYTE,INCREMENT
00431 7664 39      STOP    RTS
00432                *
00433                *
00434                *
00435                *
00436                *
00437                *******                      *******
00438                * THIS ROUTINE IS A BCD (12 DIGIT) RIGHT SHIFT SUBROUTINE.
00439                * PRIOR TO CALLING THIS ROUTINE THE INDEX REGISTER IS TO BE
00440                * LOADED WITH THE STARTING ADDRESS OF THE REGISTER WHICH IS
00441                * TO BE SHIFTED. THIS ROUTINE DOES NOT MODIFY THE CONTENTS
00442                * OF THE INDEX REGISTER.
00443                *******ENTRY POINT:"RSHIFT"********
00444                ********VERSION: 1.00********
00445                ************************************************************
00446 7665 86 04    RSHIFT  LDA A   #$04
00447 7667 0C       BACK    CLC
00448 7668 66 00            ROR     X
00449 766A 66 01            ROR     1,X
00450 766C 66 02            ROR     2,X
00451 766E 66 03            ROR     3,X
00452 7670 66 04            ROR     4,X
00453 7672 66 05            ROR     5,X
00454 7674 4A              DEC A
00455 7675 26 F0            BNE     BACK
00456 7677 39              RTS
00457                *
00458                *
00459                *
00460                *
00461                *
00462                *******                      *******
00463                * THIS ROUTINE IS A BCD (12 DIGIT) LEFT SHIFT SUBROUTINE.
00464                * PRIOR TO CALLING THIS ROUTINE THE INDEX REGISTER IS TO BE
00465                * LOADED WITH THE STARTING ADDRESS OF THE REGISTER WHICH IS
00466                * TO BE SHIFTED. THIS ROUTINE DOES NOT MODIFY THE CONTENTS
00467                * OF THE INDEX REGISTER.
00468                ********ENTRY POINT:"LSHIFT"********
00469                ********VERSION: 1.00********
00470                ************************************************************
00471 7678 86 04    LSHIFT  LDA A   #$04
00472 767A 0C       BACK1   CLC
00473 767B 69 05            ROL     5,X
00474 767D 69 04            ROL     4,X
00475 767F 69 03            ROL     3,X
00476 7681 69 02            ROL     2,X
00477 7683 69 01            ROL     1,X
00478 7685 69 00            ROL     X
00479 7687 4A              DEC A
00480 7688 26 F0            BNE     BACK1
00481 768A 39              RTS
00482                *
00483                *
00484                *
00485                *
00486                *
00487                ******                       ******
00488                ************************************************************
00489                * THIS SUBROUTINE WILL CLEAR ANY OF SIX BYTE SOFTWARE WORKI
00490                * PRIOR TO CALLING THIS SUBROUTINE THE INDEX REGISTER SHOU
00491                * WITH THE ADDRESS OF THE REGISTER TO BE CLEARED. THIS ROUT
00492                * NOT MODIFY THE CONTENTS OF THE INDEX REGISTER.
00493                ****** ENTRY POINT: CLEAR ******
00494                ****** VERSION: 1.00 ******
00495                ************************************************************
00496 768B 6F 05    CLEAR   CLR     5,X
00497 768D 6F 04            CLR     4,X
00498 768F 6F 03            CLR     3,X
00499 7691 6F 02            CLR     2,X
00500 7693 6F 01            CLR     1,X
00501 7695 6F 00            CLR     X
00502 7697 39              RTS
00503                *
```

```
00504                    *
00505                    *
00506                    *
00507                    *
00508                    *******                              *******
00509                    * THIS SUBROUTINE READS THE SIX DECADE DATA
00510                    * ACQUISITION COUNTER. THE ROUTINE READS TWO
00511                    * BCD DIGITS AND PACKS THEM INTO ONE 8 BIT BYTE,
00512                    * RESULTING IN THREE BYTES. THIS IS THEN LOADED
00513                    * INTO ONE OF THE SOFTWARE REGISTERS INDICATED
00514                    * BY THE INDEX REGISTER. THE CONTENTS OF THE
00515                    * INDEX REGISTER ARE UNAFFECTED.
00516                    ********ENTRY POINT:"READIT"********
00517                    *********VERSION 1.00*********
00518                    ************************************************
00519                    *
00520 7698 BD 76BB  READIT JSR    CLEAR    CLEAR THE DESTINATION REGISTER
00521 769B B6 1500         LDA A  COUNTR   READ LSD OF BYTE
00522 769E 84 0F           AND A  #$0F
00523 76A0 F6 1501         LDA B  COUNTR+1 READ MSD OF BYTE
00524 76A3 58              ASL B
00525 76A4 58              ASL B
00526 76A5 58              ASL B
00527 76A6 58              ASL B
00528 76A7 1B              ABA             PACK THE BCD DIGITS
00529 76A8 A7 05           STA A  5,X
00530                    *
00531                    * SECOND BYTE *
00532                    *
00533 76AA B6 1502         LDA A  COUNTR+2 READ LSD OF BYTE
00534 76AD 84 0F           AND A  #$0F
00535 76AF F6 1503         LDA B  COUNTR+3 READ MSD OF BYTE
00536 76B2 58              ASL B
00537 76B3 58              ASL B
00538 76B4 58              ASL B
00539 76B5 58              ASL B
00540 76B6 1B              ABA             PACK THE BCD DIGITS
00541 76B7 A7 04           STA A  4,X
00542                    *
00543                    * THIRD AND FINAL BYTE *
00544                    *
00545 76B9 B6 1504         LDA A  COUNTR+4 READ LSD OF BYTE
00546 76BC 84 0F           AND A  #$0F
00547 76BE F6 1505         LDA B  COUNTR+5 READ MSD OF BYTE
00548 76C1 58              ASL B
00549 76C2 58              ASL B
00550 76C3 58              ASL B
00551 76C4 58              ASL B
00552 76C5 1B              ABA             PACK THE BCD DIGITS
00553 76C6 A7 03           STA A  3,X
00554 76C8 39              RTS
00555                    *
00556                    *
00557                    *
00558                    *
00559                    *
00560                    *******                              *******
00561                    * THIS ROUTINE IS THE FREQUENCY MEASUREMENT SUBROUTINE. THI
00562                    * ROUTINE CLEARS THE SIX DECADE DATA ACQUISITION COUNTER AN
00563                    * THEN GENERATES A 31.250MSEC GATE PULSE TO MEASURE THE INP
00564                    * FREQUENCY. THE INDEX REGISTER IS USED BY THIS ROUTINE. HE
00565                    * ITS VALUE (IF IMPORTANT) SHOULD BE STORED PRIOR TO CALLIN
00566                    * THIS ROUTINE.
00567                    ********ENTRY POINT :"FREQ"********
00568                    *********VERSION: 1.00*********
00569                    ************************************************
00570 76C9 0F       FREQ   SEI
00571 76CA DF 76           STX    TEMP     SAVE THE POINTER
00572 76CC 96 7F           LDA A  PROG+4   GET THE HARDWARE LATCH IMAGE
00573 76CE 84 12           AND A  #$12     CLEAR BITS B2,B3,B5,B6,B7
00574 76D0 8A 20           ORA A  #$20     SELECT THE FREQUENCY DATA PORT
00575 76D2 16              TAB             ACCA=>ACCB
00576 76D3 8A 04           ORA A  #$04     SET BIT B2,THE COUNTER RST CONTROL B
00577 76D5 B7 1400         STA A  CONTRL   GENERATE COUNTER CLEAR PULSE
00578 76D8 F7 1400         STA B  CONTRL
```

```
00579 76D8 17              TBA
00580 76DC 8A 80           ORA A    #$80
00581 76DF CE 0F41          LDX     #$0F41    INITIALIZE LOOP COUNTER
00582 76E1 B7 1400          STA A   CONTRL    START 31.250 MSEC GATING PULSE
00583 76E4 09      LOOP2    DEX
00584 76E5 26 FD            BNE     LOOP2
00585 76E7 96 7F            LDA A   PROG+4
00586 76E9 01              NOP
00587 76EA B7 1400          STA A   CONTRL    STOP
00588 76ED CE 0125          LDX     #$0125    INITIALIZE 1 MILLISEC. WAIT
00589 76F0 09      WAIT1    DEX
00590 76F1 26 FD            BNE     WAIT1     WAIT FOR THE GATE TO CLOSE
00591 76F3 DE 76            LDX     TEMP      RESTORE THE POINTER
00592 76F5 BD 769B          JSR     READIT    READ THE COUNTER BEFORE CHANGING LAT
00593 76F8 96 7F            LDA A   PROG+4
00594 76FA B7 1400          STA A   CONTRL    RETURN WITH CONTROL LATCH STATUS RES
00595 76FD 0E              CLI
00596 76FE 39              RTS
00597                 *
00598                 *
00599                 *
00600                 *
00601                 *
00602                 ********                         *******
00603                 * THIS ROUTINE MOVES THE CONTENTS OF SOFTWARE REGISTER "A"
00604                 * OF THE OTHER SOFTWARE REGISTERS B,C,D,E,F,AND G. PRIOR T
00605                 * THIS SUBROUTINE THE INDEX REGISTER SHOULD BE LOADED WITH
00606                 * ADDRESS OF THE DESTINATION REGISTER. THE VALUE OF THE IN
00607                 * IS NOT MODIFIED BY THIS ROUTINE.
00608                 ********ENTRY POINT: "MOVE"********
00609                 ********VERSION: 1.00********
00610                 ****************************************************
00611 76FF 96 80    MOVE    LDA A    AREG
00612 7701 A7 00            STA A    X         FIRST BYTE MOVED
00613 7703 96 81            LDA A    AREG+1
00614 7705 A7 01            STA A    1,X       SECOND BYTE MOVED
00615 7707 96 82            LDA A    AREG+2
00616 7709 A7 02            STA A    2,X       THIRD BYTE MOVED
00617 770B 96 83            LDA A    AREG+3
00618 770D A7 03            STA A    3,X       FOURTH BYTE MOVED
00619 770F 96 84            LDA A    AREG+4
00620 7711 A7 04            STA A    4,X       FIFTH BYTE MOVED
00621 7713 96 85            LDA A    AREG+5
00622 7715 A7 05            STA A    5,X       SIXTH BYTE MOVED
00623 7717 39              RTS
00624                 *
00625                 *
00626                 *
00627                 *
00628                 *
00629                 ********                         *******
00630                 * THIS ROUTINE WILL MOVE THE CONTENTS OF ANY OF THE
00631                 * SOFTWARE REGISTERS TO ANY OF THE OTHER SOFTWARE REGISTERS
00632                 * PRIOR TO CALLING THIS ROUTINE THE MEMORY LOCATION
00633                 * TEMP SHOULD BE LOADED WITH ADDRESS OF THE DESTINATION
00634                 * REGISTER AND THE INDEX REGISTER SHOULD CONTAIN THE
00635                 * ADDRESS OF THE SOURCE REGISTER. UPON RETURN THE
00636                 * INDEX REGISTER WILL CONTAIN THE ADDRESS OF THE
00637                 * DESTINATION REGISTER.
00638                 ********ENTRY POINT: "MOVET"********
00639                 ********VERSION: 1.00********
00640                 ****************************************************
00641                 *
00642                 *
00643 7718 0F     MOVET     SEI               DISABLE THE INTERRUPTS
00644 7719 A6 00            LDA A    X
00645 771B 36              PSH A
00646 771C A6 01            LDA A    1,X
00647 771E 36              PSH A
00648 771F A6 02            LDA A    2,X
00649 7721 36              PSH A
00650 7722 A6 03            LDA A    3,X
00651 7724 36              PSH A
00652 7725 A6 04            LDA A    4,X
00653 7727 36              PSH A
```

```
00654 7728 A6 05           LDA A  5,X
00655 772A 36              PSH A
00656 7729 DE 76           LDX    TEMP      GET THE DESTINATION ADDRESS
00657 772D 32              PUL A
00658 772E A7 05           STA A  5,X
00659 7730 32              PUL A
00660 7731 A7 04           STA A  4,X
00661 7733 32              PUL A
00662 7734 A7 03           STA A  3,X
00663 7736 32              PUL A
00664 7737 A7 02           STA A  2,X
00665 7739 32              PUL A
00666 773A A7 01           STA A  1,X
00667 773C 32              PUL A
00668 773D A7 00           STA A  X
00669 773F 0E              CLI              ENABLE THE INTERRUPT SYSTEM
00670 7740 39              RTS
00671                *
00672                *
00673                *
00674                *
00675                *
00676                ********                         ********
00677                * THIS ROUTINE IS THE RIGHT DISPLAY ZERO SUPPRESSION AND DI
00678                * DUMP SUBROUTINE. THE REGISTER WHICH IS POINTED TO BY THE
00679                * REGISTER IS INTERROGATED ONE BYTE AT A TIME. THIS PROCEDU
00680                * STARTS FROM THE MOST SIGNIFICANT BYTE ,SCANNING THE INDIC
00681                * REGISTER LOOKING FOR LEADING ZEROS. EACH TIME A LEADING Z
00682                * IS ENCOUNTERED THE HEXADECIMAL DIGIT "F" IS STORED IN ITS
00683                * THIS CAUSES THE DISPLAY DECODER/DRIVER TO BLANK THIS DIGI
00684                * THIS ROUTINE DOES NOT MODIFY THE CONTENTS OF THE INDEX RE
00685                *********ENTRY POINT:"RDSPLY"*********
00686                *********VERSION: 1.00*********
00687                ****************************************************
00688 7741 A6 00     RDSPLY LDA A  X         LOAD DIGITS D3 AND D2
00689 7743 26 1A            BNE    TEST3     NONZERO,TEST TO DETERMINE IF D3 IS Z
00690 7745 86 FF            LDA A  #$FF
00691 7747 A7 00            STA A  X         BOTH DIGITS ARE ZERO,STORE "FF" IN T
00692 7749 A6 01            LDA A  1,X       LOAD DIGITS D1 AND D0
00693 774B 26 06            BNE    TEST4     NONZERO,TEST TO DETERMINE IF D1 IS Z
00694 774D 86 F0            LDA A  #$F0
00695 774F A7 01            STA A  1,X       BOTH ARE ZERO,STORE "F0" IN THIS LOC
00696 7751 20 16            BRA    DUMP2
00697 7753 84 F0     TEST4  AND A  #$F0      DETERMINE IF D1 IS ZERO
00698 7755 26 12            BNE    DUMP2
00699 7757 86 F0            LDA A  #$F0
00700 7759 AA 01            ORA A  1,X
00701 775B A7 01            STA A  1,X       D1 IS ZERO. "OR" WITH "F0" AND STORE
00702 775D 20 0A            BRA    DUMP2
00703 775F 84 F0     TEST3  AND A  #$F0      DETERMINE IF D3 IS ZERO
00704 7761 26 06            BNE    DUMP2
00705 7763 86 F0            LDA A  #$F0
00706 7765 AA 00            ORA A  X
00707 7767 A7 00            STA A  X         D3 IS ZERO, "OR" WITH "F0" AND STORE
00708                ******
00709                *
00710                * BEGINNING OF DISPLAY DUMP ROUTINE *
00711                *
00712                ******
00713 7769 A6 00     DUMP2  LDA A  X         LOAD DIGITS D3 AND D2
00714 776B 97 F7            STA A  HPREG3    RIGHT DISPLAY MSB DUMP FOR HPIB
00715 776D 16              TAB
00716 776F 84 F0            AND A  #$F0      EXTRACT DIGIT D3 FROM D2
00717 7770 44              LSR A
00718 7771 44              LSR A
00719 7772 44              LSR A
00720 7773 44              LSR A
00721 7774 C4 0F            AND B  #$0F
00722 7776 B7 1000          STA A  RIGHTD    STORE IN THEIR RESPECTIVE LOCATION
00723 7779 F7 1001          STA B  RIGHTD+1
00724 777C A6 01            LDA A  1,X       LOAD DIGITS D1 AND D0
00725 777E 97 F8            STA A  HPREG4    RIGHT DISPLAY LSB DUMP FOR HPIB
00726 7780 16              TAB
00727 7781 84 F0            AND A  #$F0      EXTRACT DIGIT D1 FROM D0
00728 7783 44              LSR A
00729 7784 44              LSR A
```

```
00730 77B5 44              LSR A
00731 77B6 44              LSR A
00732 77B7 C4 0F            AND A  #$0F
00733 77B9 B7 1D02          STA A  RIGHTD+2   STORE IN THEIR RESPECTIVE LOCATION
00734 77BC F7 1D03          STA B  RIGHTD+3
00735 77BF 96 7E            LDA A  PROG+3     LOAD THE RIGHT DISPLAY ANNUNCIATOR I
00736 7791 D6 AB            LDA B  STAT2
00737 7793 2A 04            BPL    DUMPR      BR IF NOT HPIB
00738 7795 8A 01            ORA A  #$01       SET HPIB FLAG
00739 7797 97 7E            STA A  PROG+3
00740 7799 B7 1D00 DUMPR    STA A  ANNUNR
00741 779C 39               RTS
00742                 *
00743                 *
00744                 *
00745                 *
00746                 *
00747                 ********                        ********
00748                 * THIS ROUTINE IS THE LEFT DISPLAY ZERO SUPPRESSION AND DIS
00749                 * DUMP SUBROUTINE. THE REGISTER WHICH IS POINTED TO BY THE
00750                 * REGISTER IS INTERROGATED ONE BYTE AT A TIME. THIS PROCEDU
00751                 * STARTS FROM THE MOST SIGNIFICANT BYTE ,SCANNING THE INDIC
00752                 * REGISTER LOOKING FOR LEADING ZEROS. EACH TIME A LEADING Z
00753                 * IS ENCOUNTERED THE HEXADECIMAL DIGIT "F" IS STORED IN ITS
00754                 * THIS CAUSES THE DISPLAY DECODER/DRIVER TO BLANK THIS DIGI
00755                 * THIS ROUTINE DOES NOT MODIFY THE CONTENTS OF THE INDEX RE
00756                 ********ENTRY POINT:"LDSPLY"********
00757                 ********VERSION: 1.00********
00758                 *****************************************************
00759 779D A6 00 LDSPLY LDA A  X           LOAD OVERFLOW DIGIT FROM REGISTER
00760 779F 84 0F            AND A  #$0F
00761 77A1 26 32            BNE    OVERFL    FIRST DIGIT NON-ZERO,LIGHT OVERFLOW
00762 77A3 96 7D            LDA A  PROG+2    LOAD LEFT DISPLAY ANNUNCIATOR IMAGE
00763 77A5 0C               CLC
00764 77A6 49               ROL A
00765 77A7 0D               SEC              FIRST DIGIT ZERO,CLEAR OVERFLOW INDI
00766 77A8 46               ROR A
00767 77A9 97 7D            STA A  PROG+2    STORE NEW LEFT DISPLAY ANNUNCIATOR I
00768 77AB A6 01            LDA A  1,X       LOAD DIGITS D3 AND D2
00769 77AD 26 0C            BNE    TEST1
00770 77AF 86 FF            LDA A  #$FF
00771 77B1 A7 01            STA A  1,X
00772 77B3 D6 7F            LDA B  PROG+5
00773 77B5 C4 20            AND B  #$20      CHECK FOR DECIMAL POINT
00774 77B7 26 24            BNE    SKIP
00775 77B9 20 0C            BRA    TEST2
00776 77BB 84 F0 TEST1      AND A  #$F0      TEST TO DETERMINE IF DIGIT 2 IS ZERO
00777 77BD 26 1F            BNE    SKIP
00778 77BF 86 F0            LDA A  #$F0      IT IS,"OR" "F0" WITH 2ND BYTE AND ST
00779 77C1 AA 01            ORA A  1,X
00780 77C3 A7 01            STA A  1,X
00781 77C5 20 16            BRA    SKIP
00782 77C7 A6 02 TEST2      LDA A  2,X       LOAD DIGITS D1 AND D0
00783 77C9 84 F0            AND A  #$F0      TEST TO DETERMINE IF DIGIT 4 IS ZERO
00784 77CB 26 10            BNE    SKIP
00785 77CD 86 F0            LDA A  #$F0      IT IS,"OR" "F0" WITH 3RD BYTE AND ST
00786 77CF AA 02            ORA A  2,X
00787 77D1 A7 02            STA A  2,X
00788 77D3 20 08            BRA    SKIP
00789 77D5 96 7D OVERFL     LDA A  PROG+2    LOAD LEFT DISPLAY ANNUNCIATOR IMAGE
00790 77D7 0C               CLC
00791 77D8 49               ROL A
00792 77D9 0C               CLC              SET OVERFLOW DIGIT
00793 77DA 46               ROR A
00794 77DB 97 7D            STA A  PROG+2    STORE NEW LEFT DISPLAY ANNUNCIATOR I
00795                 ******
00796                 *
00797                 * BEGINNING OF DISPLAY DUMP ROUTINE *
00798                 *
00799                 ******
00800 77DD A6 01 SKIP       LDA A  1,X       LOAD FIRST BYTE
00801 77DF 97 F5            STA A  HPREG1    LEFT DISPLAY MSB FOR HPIB
00802 77E1 16               TAB
00803 77E2 84 F0            AND A  #$F0      EXTRACT BCD DIGITS D3 AND D2
00804 77E4 44               LSR A
```

```
00805 77E5 44              LSR A
00806 77E6 44              LSR A
00807 77E7 44              LSR A
00808 77E8 C4 0F           AND B  #$0F
00809 77EA 97 1C00         STA A  LEFTD      STORE IN RESPECTIVE DISPLAY LOCATION
00810 77ED F7 1C01         STA B  LEFTD+1
00811 77F0 A6 02           LDA A  2,X        LOAD SECOND BYTE
00812 77F2 97 F6           STA A  HPREG2     LEFT DISPLAY LSB FOR HPTR
00813 77F4 16              TAB
00814 77F5 84 F0           AND A  #$F0       EXTRACT BCD DIGITS D1 AND D0
00815 77F7 44              LSR A
00816 77F8 44              LSR A
00817 77F9 44              LSR A
00818 77FA 44              LSR A
00819 77FB C4 0F           AND B  #$0F
00820 77FD 97 1C02         STA A  LEFTD+2    STORE IN RESPECTIVE DISPLAY LOCATIO
00821 7800 F7 1C03         STA B  LEFTD+3
00822 7803 96 70           LDA A  PROG+2     LOAD LEFT DISPLAY ANNUNCIATOR IMAGE
00823 7805 97 1200         STA A  ANNJVL     STORE IN LEFT DISPLAY ANNUNCIATOR
00824 7808 B6 3002         LDA A  HPTRP+2    SEE IF HPTR OPTION IS INSTALLED
00825 780B 85 10           BIT A  #$10
00826 780D 26 03           BNE    DUMPR1     BR IF NOT INSTALLED
00827 780F BD 5807         JSR    HPTLK      OUTPUT DATA IF REQUESTED TO DO SO
00828 7812 39       DUMPR1 RTS
00829                *
00830                *
00831                *
00832                *
00833                *
00834                ******                           ******
00835                ****************************************************
00836                * THIS IS THE WRITE DATA SUBROUTINE. DATA IN THE REGISTER T
00837                * BY THE INDEX REGISTER IS LOADED INTO THE TRANSMIT DATA BU
00838                * THIS ROUTINE SETS VARIOUS FLAGS IN STATUS REGISTERS 1 AND
00839                * ARE USED BY THE INTERRUPT SERVICE ROUTINE "MPIRQ" IN TRAN
00840                * A DATA BLOCK. THE CONTENTS OF THE INDEX REGISTER IS NOT M
00841                ****** ENTRY POINT: WDATA ******
00842                ****** VERSION: 1.00 ******
00843                ****************************************************
00844 7813 C6 8A     WDATA  LDA B  #START     LOAD THE START FIELD COMMAND
00845 7815 8D 2A            BSR    INDJMP
00846 7817 A6 05            LDA A  5,X        GET THE FIRST BYTE
00847 7819 84 0F            AND A  #$0F
00848 781B 48               ASL A
00849 781C 48               ASL A
00850 781D 48               ASL A
00851 781E 48               ASL A
00852 781F 8D 1D            BSR    REDJMP
00853 7821 A6 05            LDA A  5,X
00854 7823 84 F0            AND A  #$F0
00855 7825 8D 17            BSR    REDJMP
00856 7827 A6 04            LDA A  4,X        GET THE SECOND BYTE
00857 7829 84 0F            AND A  #$0F
00858 782B 48               ASL A
00859 782C 48               ASL A
00860 782D 48               ASL A
00861 782E 48               ASL A
00862 782F 8D 0D            BSR    REDJMP
00863 7831 A6 04            LDA A  4,X
00864 7833 84 F0            AND A  #$F0
00865 7835 8D 07            BSR    REDJMP
00866 7837 CE 2710          LDX    #10000
00867 783A 09       SYNC1   DEX               WAIT 80 MSEC. TO KEEP BLOCK SYNC.
00868 783B 26 FD            BNE    SYNC1
00869 783D 39               RTS
00870                *
00871                *
00872                *
00873 783E 8A 01    REDJMP  ORA A  #$01
00874 7840 16               TAB
00875 7841 B6 2000  INDJMP  LDA A  ACIA0
00876 7844 84 02            AND A  #$02       IS THE TRANSMIT BUFFER CLEAR?
00877 7846 27 F9            BEQ    INDJMP
00878 7848 F7 2001          STA B  ACIA1
00879 784B 39               RTS
00880                *
00881                *
```

```
00882         *
00883         *
00884         *
00885         *
00886               ******                          ******
00887               *********************************************************
00888               * THIS IS THE READ DATA SUBROUTINE. DATA IS LOADED FROM THE
00889               * DATA BUFFER TO THE REGISTER INDICATED BY THE INDEX REGIST
00890               * ROUTINE SETS AND CLEARS VARIOUS FLAGS IN STATUS REGISTERS
00891               * WHICH ARE USED BY THE INTERRUPT SERVICE ROUTINE "MPIRQ" T
00892               * DETERMINING IF THE DATA BLOCK HAS BEEN READ. THE CONTENTS
00893               * INDEX REGISTER IS NOT MODIFIED.
00894               ****** ENTRY POINT: RDATA ******
00895               ****** VERSION: 1.00 ******
00896               *********************************************************
00897 784C 96 AF    RDATA   LDA A   DATA       LOAD THE FIRST BYTE OF DATA
00898 784E 84 F0            AND A   #$F0       REMOVE THE CONTROL CHARACTERS
00899 7850 44               LSR A
00900 7851 44               LSR A
00901 7852 44               LSR A
00902 7853 44               LSR A              MOVE TO LEAST SIGNIFICANT LOCATION T
00903 7854 A7 05             STA A   5,X        STORE IN REGISTER INDICATED BY THE I
00904 7856 96 B0             LDA A   DATA+1     LOAD SECOND DATA BYTE
00905 7858 84 F0             AND A   #$F0       REMOVE THE CONTROL CHARACTERS
00906 785A AA 05             ORA A   5,X        COMBINE WITH FIRST
00907 785C A7 05             STA A   5,X        STORE IN REGISTER INDICATED BY INDEX
00908 785E 96 B1             LDA A   DATA+2     LOAD THE THIRD DATA BYTE
00909 7860 84 F0             AND A   #$F0       REMOVE THE CONTROL CHARACTERS
00910 7862 44                LSR A
00911 7863 44                LSR A
00912 7864 44                LSR A
00913 7865 44                LSR A              MOVE TO LEAST SIGNIFICANT LOCATION T
00914 7866 A7 04             STA A   4,X        STORE IN REGISTER INDICATED BY INDEX
00915 7868 96 B2             LDA A   DATA+3     LOAD THE FOURTH DATA BYTE
00916 786A 84 F0             AND A   #$F0       REMOVE THE CONTROL CHARACTERS
00917 786C AA 04             ORA A   4,X        COMBINE WITH THIRD
00918 786E A7 04             STA A   4,X        STORE IN REGISTER INDICATED BY INDEX
00919 7870 96 AB             LDA A   STAT2      LOAD THE CONTENTS OF STATUS REGISTER
00920 7872 84 FC             AND A   #$FC       CLEAR THE DATA POINTER
00921 7874 97 AB             STA A   STAT2      STORE NEW STATUS
00922 7876 39                RTS
00923         *
00924         *
00925         *
00926         *
00927         *
00928               ******                          ******
00929               *********************************************************
00930               * THIS SUBROUTINE READS THE DATA BUFFER WHEN THE READY FLAG
00931               * IS SET BY THE INTERRUPT SERVICE ROUTINE. IF AFTER
00932               * 10 SECONDS NO DATA IS RECEIVED AN ERROR MESSAGE IS DISPLA
00933               * AND RETURNS. IF THE RECEIVED DATA IS "FFFF" AN OUT OF RAN
00934               * ERROR MESSAGE IS DISPLAYED. THIS ROUTINE ABORTS IMMEDIATE
00935               * IF THE FRONT PANEL STATUS IS CHANGED.
00936               *********************************************************
00937               ****** VERSION: 1.00 ******
00938               ****** ENTRY POINT: RBUFF ******
00939 7877 CE 61A8  RBUFF   LDX     #25000     INITIALIZE WAIT LOOP
00940 787A 96 AB   RBUFF1   LDA A   STAT2
00941 787C 84 02            AND A   #$02       BUFFER READY?
00942 787E 26 19            BNE     RBUFF2
00943 7880 09               DEX                WAIT APPROXIMATELY 6 SECONDS FOR DAT
00944 7881 27 07            BEQ     EBUFF      TIMED OUT! OUTPUT NO DATA ERROR
00945 7883 BD 64C6          JSR     LOOKUP     CHECK FOR PENDING ABORT
00946 7886 28 F2            BVC     RBUFF1
00947 7888 20 0D            BRA     XBUFF      ABORT!
00948 788A 96 75   EBUFF    LDA A   SPANEL
00949 788C 84 18            AND A   #$18       GET MODE CONTROL BITS
00950 788E 81 08            CMP A   #$08       SLAVE?
00951 7890 27 05            BEQ     XBUFF
00952 7892 C6 09            LDA B   #$09       PASS ERROR NUMBER
00953 7894 BD 751C          JSR     ERROR
00954 7897 0B      XBUFF    SEV                SET FLAG
00955 7898 39      GBUFF1   RTS
00956 7899 0F      RBUFF2   SEI                DISABLE INTERRUPTS WHILE READING
```

```
00957 789A CE 0080              LDX      #AREG      LOAD INDEX REGISTER WITH POINTER
00958 789D BD 76BB              JSR      CLEAR      0=>[A]
00959 78A0 BD 784C              JSR      RDATA      DBUFFER=>[A]
00960 78A3 0E                   CLI                 DATA STORED AWAY,ENABLE INTERRUPTS
00961 78A4 A6 04                LDA A    4,X
00962 78A6 81 BE                CMP A    #$BE       ERROR PREAMBLE?
00963 78A8 26 16                BNE      GBUFF
00964 78AA E6 05                LDA B    5,X        GET THE ERROR NUMBER
00965 78AC C1 10                CMP B    #$10       UNDER-RANGE?
00966 78AE 26 03                BNE      NOBLK
00967 78B0 BD 7549              JSR      BLANKR     BLANK RIGHT DISPLAY
00968 78B3 37         NOBLK     PSH B
00969 78B4 BD 751C              JSR      ERROR
00970 78B7 86 BE                LDA A    #$BE
00971 78B9 97 84                STA A    AREG+4
00972 78BB 33                   PUL B
00973 78BC D7 85                STA B    AREG+5
00974 78BE 20 07                BRA      XBUFF
00975 78C0 0A         GBUFF     CLV
00976 78C1 20 05                BRA      GBUFF1
00977                 *
00978                 *
00002                 *
00003                 *  THIS IS THE SELF CHECK ROUTINE
00004                 *  IT WILL ONLY TEST MINI-TIMS STANDARD OPERATING MODE(NO MA
00005                 *  IT STARTS WITH LEVEL FREQUENCY AND GOES THROUGH ALL THE FU
00006                 *  THE LATCH BOARD IS NEEDED FOR THAT ROUTINE!!!!
00007                 *  LEVEL FREQUENCY CHECK.
00008                 *
00009 78C3 9F EB      SCHK      STS      STACK
00010 78C5 0E                   CLI                 ENABLE THE INTERRUPT SYSTEM
00011 78C6 7F 00EA              CLR      SCHSTO
00012 78C9 A6 11                LDA A    #$11       CHANGED FROM #$10 - MSEC ANNUN BLINK
00013 78CB 97 75                STA A    SPANEL
00014 78CD B6 5000              LDA A    DIAROM     SEE WHETHER A DIAGNOSTICROM IS PRESE
00015 78D0 81 01                CMP A    #$01
00016 78D2 26 03                BNE      PLUS4
00017 78D4 7E 5000              JMP      DIAROM     JUMP TO THE DIAGNOSTIC ROM
00018 78D7 CE 001A  PLUS4       LDX      #$1A
00019 78DA 6F CD    HINBUF      CLR      ERRORT,X   CLEAR 26 BYTES
00020 78DC 09                   DEX
00021 78DD 26 FB                BNE      HINBUF
00022 78DF B6 1100              LDA A    PANEL      CHECK IF DELAY ZERO SWITCH IS DEPRES
00023 78E2 85 40                BIT A    #$40       IF IT IS ACTIVATED THEN JUMP TO THE
00024 78E4 26 03                BNE      PLUS6
00025 78E6 7E 7877              JMP      MODEMT
00026 78E9 85 80    PLUS6       BIT A    #$80       IS LEVEL ZERO DOWN?
00027 78EB 26 07                BNE      PLUS7
00028 78ED 86 FA                LDA A    #$FA       KEY WORD
00029 78EF 97 EA                STA A    SCHSTO
00030 78F1 7E 7C6A              JMP      LOGOJA
00031 78F4 86 BB    PLUS7       LDA A    #$BB
00032 78F6 97 83                STA A    AREG+3
00033 78F8 97 84                STA A    AREG+4
00034 78FA 97 85                STA A    AREG+5
00035 78FC BD 72A7              JSR      DTSPL
00036 78FF B7 1000              STA A    RIGHTD     LIGHT ALL DISPLAY SEGMENTS
00037 7902 B7 1001              STA A    RIGHTD+1   OF THE RIGHT DISPLAY
00038 7905 B7 1002              STA A    RIGHTD+2
00039 7908 B7 1003              STA A    RIGHTD+3
00040 790B 86 1F                LDA A    #$1F
00041 790D B7 1200              STA A    ANNJNL
00042 7910 86 FF                LDA A    #$FF
00043 7912 B7 1300              STA A    ANNJNR
00044 7915 BD 7DAA              JSR      WARTE
00045 7918 BD 7DAA              JSR      WARTE
00046 791B 86 43                LDA A    #$43
00047 791D 97 7C                STA A    PROG+1     IMAGE OF XMIT CONTROL LATCH
00048 791F 97 1700              STA A    XMIT
00049 7922 86 B6                LDA A    #$B6
00050 7924 97 7B                STA A    PROG       IMAGE OF RECEIVER CONTROL LATCH
00051 7926 B7 1600              STA A    RCVR
00052 7929 4F                   CLR A
00053 792A B7 1400              STA A    CONTRL     IMAGE OF HARDWARE CONTROL LATCH
00054 792D 97 7F                STA A    PROG+4
00055 792F 86 82                LDA A    #$82
```

```
00056 7931 97 7D           STA A   PROG+2
00057 7933 B7 1200         STA A   ANNJVL
00058 7936 86 22           LDA A   #$22
00059 7938 97 7E           STA A   PROG+3
00060 793A B7 1300         STA A   ANNJVR
00061 793D BD 753A         JSR     BLANKL    BLANK LEFT DISPLAY
00062 7940 BD 7549         JSR     BLANKR    BLANK RTHT DISPLAY
00063 7943 CE 00C7         LDX     #SCHL
00064 7946 BD 76BB         JSR     CLEAR
00065 7949 CE 00C1         LDX     #SCHF
00066 794C BD 76BB         JSR     CLEAR
00067                  *BEGIN OF LEVEL FREQUENCY SELF CHECK
00068 794F 7F 00BB         CLR     LENNY
00069 7952 86 04           LDA A   #$04
00070 7954 B7 1900         STA A   HWFL
00071 7957 86 02           LDA A   #$02
00072 7959 B7 1800         STA A   HWFM
00073 795C B7 1800         STA A   HWFM
00074 795F 97 BF           STA A   FREVAR
00075 7961 BD 7DB3         JSR     WARTEA
00076 7964 86 03           LDA A   #$03      TOLERANCE OF LEVEL VALUE IN .1 DB
00077 7966 97 BB           STA A   LADY
00078 7968 BD 7ECF         JSR     HPOJT     SET OUTPUT REQUST FOR HPIB
00079 796B BD 66D3         JSR     LEVEL
00080 796E CE 0000         LDX     #$0       NOMINAL LEVEL AT 304HZ IS 0 DB
00081 7971 86 20           LDA A   #$20      ERROR NUMBER H-20
00082 7973 97 B7           STA A   LUBA
00083 7975 BD 7E10         JSR     LEVCH
00084 7978 BD 7DFB         JSR     FRECH
00085 797B 86 10           LDA A   #$10
00086 797D B7 1800         STA A   HWFM
00087 7980 B7 1800         STA A   HWFM
00088 7983 97 BF           STA A   FREVAR
00089 7985 BD 7DB3         JSR     WARTEA
00090 7988 86 21           LDA A   #$21
00091 798A 97 B7           STA A   LUBA      ERROR NUMBER
00092 798C BD 7ECF         JSR     HPOJT     SET OUTPUT REQUST FOR HPIB
00093 798F BD 66D3         JSR     LEVEL
00094 7992 CE 0000         LDX     #$0
00095 7995 BD 7E10         JSR     LEVCH
00096 7998 BD 7DFB         JSR     FRECH
00097 799B 86 39           LDA A   #$39
00098 799D B7 1800         STA A   HWFM
00099 79A0 B7 1800         STA A   HWFM
00100 79A3 97 BF           STA A   FREVAR
00101 79A5 BD 7DAA         JSR     WARTE
00102 79A8 BD 7ECF         JSR     HPOJT     SET OUTPUT REQUEST FOR HPIB
00103 79AB BD 66D3         JSR     LEVEL
00104 79AE 86 22           LDA A   #$22
00105 79B0 97 B7           STA A   LUBA
00106 79B2 CE 0000         LDX     #$0
00107 79B5 BD 7E10         JSR     LEVCH
00108 79B8 BD 7DFB         JSR     FRECH
00109                  *THIS IS SELF CHECK ROUTINE FOR C-MESSAGE NOISE.IT CHECKS T
00110                  *FILTER RESPONSE AT THREE FREQUENCIES.
00111 79BB 86 F6           LDA A   #$F6
00112 79BD B7 1600         STA A   RCVR
00113 79C0 97 7B           STA A   PROG
00114 79C2 CE 00C7         LDX     #SCHL
00115 79C5 BD 76BB         JSR     CLEAR
00116 79C8 CE 00C1         LDX     #SCHF     CLEAR SOFTWARE REG.
00117 79CB BD 76BB         JSR     CLEAR
00118 79CE 86 03           LDA A   #$03
00119                  *PROGRAM XMITER TO 304HZ
00120 79D0 B7 1800         STA A   HWFM
00121 79D3 B7 1800         STA A   HWFM
00122 79D6 97 BF           STA A   FREVAR
00123 79D8 BD 7DAA         JSR     WARTE
00124 79DB BD 7ECF         JSR     HPOJT     SET OUTPUT REQUEST FOR HPIB
00125 79DE BD 66D3         JSR     LEVEL     JUMP TO LEVEL ROUTINE
00126 79E1 CE 1650         LDX     #$1650    LOAD THE NOMINAL DB VALUE INTO INDEX
00127 79E4 86 10           LDA A   #$10
00128 79E6 97 BB           STA A   LADY
00129 79E8 86 30           LDA A   #$30
00130 79EA 97 B7           STA A   LUBA
```

```
00131 79EC 86 80             LDA A  #$80       SET FLAG FOR THE LEVEL ERROR ROUTINE
00132 79EE 97 8B             STA A  LENNY
00133 79F0 BD 7E10            JSR   LEVCH
00134 79F3 86 F6             LDA A  #$F6
00135 79F5 B7 1600            STA A  RCVR       RESTORE AUTORANGE GAIN
00136 79F8 97 7B             STA A  PROG
00137 79FA 86 10             LDA A  #$10
00138 79FC B7 1800            STA A  HWFM       PROGRAM XMTT TO 1004 HZ
00139 79FF B7 1800            STA A  HWFM       DO IT A SECOND TIME PAUL WANTS IT TH
00140 7A02 BD 7DAA            JSR   WARTE
00141 7A05 BD 7ECF            JSR   HPOJT      SET OUTPUT REQUEST FOR HPIB
00142 7A08 BD 66D3            JSR   LEVEL
00143 7A0B 86 03             LDA A  #$03
00144 7A0D 97 8B             STA A  LADY
00145 7A0F CE 0000            LDX   #$0
00146 7A12 86 31             LDA A  #$31
00147 7A14 97 87             STA A  LUBA
00148 7A16 7F 008B            CLR   LENNY
00149 7A19 BD 7E10            JSR   LEVCH
00150                  *PROGRAM XMITER TO 3004HZ
00151 7A1C 86 30             LDA A  #$30
00152 7A1F B7 1800            STA A  HWFM
00153 7A21 B7 1800            STA A  HWFM
00154 7A24 BD 7DAA            JSR   WARTE
00155 7A27 BD 7ECF            JSR   HPOJT      SET OUTPUT REQUEST FOR HPIB
00156 7A2A BD 66D3            JSR   LEVEL
00157 7A2D CE 0250            LDX   #$250
00158 7A30 86 10             LDA A  #$10
00159 7A32 97 8B             STA A  LADY
00160 7A34 86 32             LDA A  #$32
00161 7A36 97 87             STA A  LUBA
00162 7A38 86 80             LDA A  #$80
00163 7A3A 97 8B             STA A  LENNY
00164 7A3C BD 7E10            JSR   LEVCH
00165             *END OF C-MESSAGE ROUTINE
00166             *THIS IS SELF CHECK ROUTINE FOR NOISE WITH TONE.THE ONLY TE
00167             *IN THIS CHECK IS TO TEST THE NOTCH FLLTER.. OK IF GREATER
00168             *OTHERWISE AN ERROR MESSAGE WILL BE DISPLAYED.ERROR#50
00169 7A3F 86 32             LDA A  #$32
00170 7A41 97 7B             STA A  PROG
00171 7A43 B7 1600            STA A  RCVR
00172 7A46 86 10             LDA A  #$10       PROGRAMS XMITER TO 1004HZ
00173 7A48 B7 1800            STA A  HWFM
00174 7A4B B7 1800            STA A  HWFM
00175 7A4E BD 7DAA            JSR   WARTE
00176 7A51 BD 7ECF            JSR   HPOJT      SET OUTPUT REQUST FOR HPIB
00177 7A54 BD 66D3            JSR   LEVEL
00178 7A57 96 CA             LDA A  SCHL+3
00179 7A59 26 06             BNE   ERR40
00180 7A5B 96 CB             LDA A  SCHL+4
00181 7A5D 81 50             CMP A  #$50       SPEC. FOR NOTCH DEPTH
00182 7A5F 24 04             BCC   NOERVN     BRANCHES IF GREATER OR EQUAL TO 50D
00183 7A61 86 33    ERR40   LDA A  #$33
00184 7A63 97 F1             STA A  ERRORT+20
00185 7A65 BD 7DAA NOERVN JSR   WARTE
00186             *END OF NOISE WITH TONE  SELF CHECK
00187             *
00188             *
00189             *THIS IS SELF CHECK FOR IMPULSE NOISE.IT PROGRAMS THE XMITT
00190             *THIS SIGNAL IS USED TO GENERATE PULSES FOR THE IMPULSE COU
00191             *THE INTEGRATION TIME IS 10 SECONDS.
00192 7A68 BD 7DAA            JSR   WARTE      WAIT A LITTLE
00193 7A6B BD 753A            JSR   BLANKL
00194 7A6E BD 7549            JSR   BLANKR
00195 7A71 7F 007D            CLR   PROG+2     DONE SO HPIB WILL NOT PUT OUT SIGN
00196 7A74 86 20             LDA A  #$20       PROGRAMS XMITTER TO 2004 HZ
00197 7A76 B7 1800            STA A  HWFM
00198 7A79 B7 1800            STA A  HWFM
00199 7A7C 86 32             LDA A  #$32
00200 7A7F B7 1600            STA A  RCVR       SET AUTORANGE TO GAIN STATE 101
00201 7A81 BD 7DAA            JSR   WARTE      WAIT UNTIL XMITTER CAN SETTLE
00202 7A84 86 0C             LDA A  #$0C
00203 7A86 D6 49             LDA B  STAT2      CHECK IF IN HPIB
00204 7A88 2A 01             BPL   IBFIX1     BR IF NOT IN HPIB
00205 7A8A 4C              INC A              ADD THE HPIB LIGHT
```

```
00206 748B B7 1300 TRFIX1 STA A  ANNJVR    STORE IN THE ANNUNCIATOR RIGHT SIDE
00207 748E 86 E0           LDA A  #$E0      BLANK LEFT ANNUNCIATOR
00208 7490 B7 1200          STA A  ANNJVL
00209 7493 86 32            LDA A  #%00110010   PROGRAM RCVR TO ORMS,GAIN STATE
00210 7495 B7 1600          STA A  RCVR
00211 7498 97 7B            STA A  PROG
00212 749A 86 40            LDA A  #%01000000
00213 749C 16              TAB
00214 749D CA 44            ORA B  #%01000100
00215 749F F7 1400          STA B  CONTRL    RESET COUNTER
00216 74A2 B7 1400          STA A  CONTRL
00217 74A5 C6 06            LDA B  #$6
00218 74A7 BD 7DAA LONGER   JSR    WARTE
00219 74AA 5A              DEC B
00220 74AB 26 FA            BNE    LONGER    THIS SECTION OF THE PROGRAM GENERATE
00221 74AD CE FFFF          LDX    #$FFFF
00222 74B0 09        LONG1  DEX
00223 74B1 26 FD            BNE    LONG1
00224 74B3 CE 128C          LDX    #$128C
00225 74B6 09        LONG2  DEX
00226 74B7 26 FD            BNE    LONG2
00227 74B9 CE 0080          LDX    #AREG
00228 74BC BD 7698          JSR    READIT    READ DECADE COUNTER
00229 74BF 86 04            LDA A  #$04
00230 74C1 B7 1300          STA A  ANNJVR
00231 74C4 97 7E            STA A  PROG+3
00232 74C6 96 85            LDA A  AREG+5    SHIFT DATA FOR THE DISPLAY DUMP ROUT
00233 74C8 97 81            STA A  AREG+1
00234 74CA 96 84            LDA A  AREG+4
00235 74CC 97 80            STA A  AREG
00236 74CE BD 7741          JSR    RDSPLY    DISPLAY DUMP ROUTINE
00237 74D1 BD 7FD7          JSR    RTONLY
00238 74D4 BD 7DAA          JSR    WARTE     WAIT AGAIN
00239 74D7 7F 0083          CLR    AREG+3
00240 74DA CE 0070          LDX    #$0070
00241 74DD DF 81            STX    AREG+1
00242 74DF 7F 0080          CLR    AREG
00243 74E2 BD 73DA          JSR    DSUB0     BCD SUBTRACT ROUTINE
00244 74E5 86 E0            LDA A  #$E0
00245 74E7 B7 1200          STA A  ANNJVL
00246 74EA 7D 0086          TST    BREG
00247 74ED 26 0B            BNE    ERR50     BRANCH IF NUMBER IN DISPLAY DEVIATES
00248 74EF 7D 0087          TST    BREG+1
00249 74F2 26 06            BNE    ERR50
00250 74F4 96 88            LDA A  BREG+2
00251 74F6 81 04            CMP A  #$04      COMPARE WITH TOLERANCE OF 4 COUNTS/1
00252 74F8 23 04            BLS    GOOD      BRANCH IF NUMBER IS OK
00253 74FA 86 34     ERR50  LDA A  #$34
00254 74FC 97 E0            STA A  ERRORT+19
00255 74FF BD 7DAA GOOD     JSR    WARTE
00256                *END OF IMPULE NOISE CHECK
00257                *
00258                *THIS IS SELF CHECK ROUTINE FOR ENVELOPE DELAY
00259 7801 86 E4            LDA A  #$E4
00260 7803 B7 1200          STA A  ANNJVL
00261 7806 97 7D            STA A  PROG+2
00262 7808 86 02            LDA A  #$02
00263 780A B7 1300          STA A  ANNJVR
00264 780D 97 7E            STA A  PROG+3
00265 780F 86 45            LDA A  #$45
00266 7811 B7 1700          STA A  XMIT
00267 7814 97 7C            STA A  PROG+1
00268 7816 86 B6            LDA A  #$B6
00269 7818 B7 1600          STA A  RCVR
00270 781B 97 7B            STA A  PROG
00271 781D 86 73            LDA A  #$73
00272 781F 97 7F            STA A  PROG+4
00273 7821 B7 1400          STA A  CONTRL
00274 7824 86 03            LDA A  #$03
00275 7826 97 8C            STA A  GLORIA
00276 7828 86 18            LDA A  #$18
00277 782A B7 1800          STA A  HNFM
00278 782D B7 1800          STA A  HNFM
00279 7830 86 B4            LDA A  #$B4      WAIT 13 SECONDS
00280 7832 BD 7F67          JSR    EDDWAT
00281 7835 BD 7199          JSR    DELZER
```

```
00282 733B 86 0F            LDA A   #$F         WAIT ONE SECOND
00283 733A BD 7E67           JSR    EDDWAT
00284 733D 86 47            LDA A   #$47        SHIFT TEMP 83.3HZ BY 3000 MICRO SEC.
00285 733F B7 1700           STA A  XMIT
00286 7342 86 24            LDA A   #$24        WAIT THREE SECONDS
00287 7344 BD 7E67           JSR    EDDWAT
00288 7347 B6 1100 HUNGER   LDA A   PANEL
00289 734A 85 80             BIT A  #$80        IS LEVEL ZERO DOWN
00290 734C 26 06             BNE    HEUTE
00291 734E BD 7DAA           JSR    WARTE
00292 7351 BD 7DAA           JSR    WARTE
00293 7354 86 1C  HEUTE     LDA A   #$1C        RUN FOR TWO MORE SECONDS
00294 7356 BD 7E67           JSR    EDDWAT
00295 7359 86 30            LDA A   #$30        TOLERANCE OF +/-30MIVRO SEC.
00296 735B 97 BB             STA A  LADY
00297 735D 86 70            LDA A   #$70        ERROR NUMBER
00298 735F 97 B7             STA A  LUBA
00299 7361 BD 7E81           JSR    EDDERR
00300 7364 86 1C            LDA A   #$1C        RUN FOR ANOTHER 2 SECONDS
00301 7366 BD 7E67           JSR    EDDWAT
00302 7369 86 10            LDA A   #$10
00303 736B 97 BB             STA A  LADY
00304 736D 86 71            LDA A   #$71        ERROR NUMBER
00305 736F 97 B7             STA A  LUBA
00306 7371 BD 7E81           JSR    EDDERR
00307                  * THIS ROUTINE CHECKS OUT THE MODEM
00308 7374 7F 0070           CLR    PROG+2      DONE SO HPIB WON'T PUT OUT SIGN PTT
00309 7377 B6 1E00 MODEMT   LDA A   DROP
00310 737A 85 40             BIT A  #$40        IS THE MODEM BOARD AN OPTION?
00311 737C 27 03             BEQ    PLUSAA
00312 737E 7E 7C51           JMP    EXITMD
00313 7381 86 1F  PLUSAA    LDA A   #$1F        MASTER RESET THE ACIA
00314 7383 B7 2000           STA A  ACIA0
00315 7386 CE 009F           LDX    #FREG
00316 7389 BD 768B           JSR    CLEAR
00317 738C 86 40            LDA A   #%01000000
00318 738E B7 1700           STA A  XMIT        PROGR. TRANSMIT LATCH FOR FSK TRANSM
00319 7391 86 B0            LDA A   #%10110000  LOAD RECEIVER LATCH
00320 7393 B7 1600           STA A  RCVR        LOAD RECEIER LATCH
00321 7396 B6 2000           LDA A  ACIA0
00322 7399 85 04             BIT A  #$4
00323 739B 26 06             BNE    KEINCA
00324 739D 86 80            LDA A   #$80
00325 739F 97 09             STA A  ERRORT+12
00326 73A1 97 9E             STA A  FREG
00327 73A3 BD 7DB9 KEINCA   JSR    WARTEB
00328 73A6 86 10            LDA A   #$10
00329 73A8 B7 2000           STA A  ACIA0       PROG. THE DIVISION RATIO IN THE ACIA
00330 73AB C6 04             LDA B  #$4         LOAD LOOP COUNTER
00331 73AD D7 B7             STA B  LUBA
00332 73AF B6 2000 OBEN     LDA A  ACIA0        STATUS REGISTER
00333 73B2 F6 2001           LDA B  ACIA1
00334 73B5 85 04             BIT A  #$4
00335 73B7 27 11             BEQ    OVERRU
00336 73B9 BD 7DB9           JSR    WARTEB
00337 73BC 7A 00B7           DEC    LUBA
00338 73BF 26 EE             BNE    OBEN
00339 73C1 86 80            LDA A   #$80
00340 73C3 97 09             STA A  ERRORT+12
00341 73C5 97 9E             STA A  FREG
00342 73C7 7E 7C51           JMP    EXITMD
00343                  *TEST THE OVERRUN ERROR FLAG BIT
00344 73CA BD 7DB9 OVERRU   JSR    WARTEB
00345 73CD 0E               CLI
00346 73CE 7F 00BC           CLR    GLORIA
00347 73D1 86 90            LDA A   #$90        ENABLE INTERRUPTS
00348 73D3 B7 2000           STA A  ACIA0
00349 73D6 C6 AA             LDA B  #$AA
00350 73D8 BD 7EA5           JSR    TRANSM
00351 73DB CE 0EA6           LDX    #$EA6
00352 73DF 09   LOOPJ       DEX
00353 73DF 26 FD             BNE    LOOPJ
00354 73E1 3E               WAI                 WAIT FOR INTERRUPTS
00355 73E2 86 10            LDA A   #$10
00356 73E4 B7 2000           STA A  ACIA0
```

```
00357 7BE7 C6 F0            LDA B  #$F0
00358 7BE9 BD 7EA5           JSR    TRANSM
00359 7BEC C6 0F             LDA B  #$0F
00360 7BEE BD 7EA5           JSR    TRANSM
00361 7BF1 CE 2500           LDX    #$2500
00362 7BF4 09        LOOPK   DEX
00363 7BF5 26 FD             BNE    LOOPK
00364 7BF7 86 9D             LDA A  #$9D
00365 7BF9 B7 2000           STA A  ACIA0
00366 7BFC CE 00FF           LDX    #$00FF
00367 7BFF 09        LOOPBB  DEX
00368 7C00 26 FD             BNE    LOOPBB
00369 7C02 96 C7             LDA A  SCHL
00370 7C04 D6 C8             LDA B  SCHL+1   IT SHOULD THE READ THE FIRST LOST WO
00371 7C06 81 A3             CMP A  #$A3
00372 7C08 27 06             BEQ    KIRCHB
00373 7C0A 86 81             LDA A  #$81
00374 7C0C 97 08             STA A  ERRORT+11
00375 7C0E 97 9F             STA A  FREG+1
00376 7C10 86 99    KIRCHB   LDA A  #$99     EVEN PARITY
00377 7C12 B7 2000           STA A  ACIA0
00378 7C15 B7 2000           STA A  ACIA0    CONTROL REGISTER
00379 7C18 C6 AA             LDA B  #$AA
00380 7C1A BD 7EA5           JSR    TRANSM
00381 7C1D CE 1000           LDX    #$1000   WAIT LOOP
00382 7C20 09        LOOPBA  DEX
00383 7C21 26 FD             BNE    LOOPBA
00384 7C23 86 9D             LDA A  #$9D     ODD PARITY
00385 7C25 B7 2000           STA A  ACIA0    CONTROL REGISTER
00386 7C28 3E               WAI
00387 7C29 96 C7             LDA A  SCHL     STATUS REGISTER
00388 7C2B D6 C8             LDA B  SCHL+1   DATA RECEIVE REGISTER
00389 7C2D 81 C3             CMP A  #$C3
00390 7C2F 27 06             BEQ    WEIHNA
00391 7C31 86 82             LDA A  #$82     ERROR NUMBER
00392 7C33 97 06             STA A  ERRORT+9
00393 7C35 97 A0             STA A  FREG+2
00394 7C37 86 08    WEIHNA   LDA A  #$8
00395 7C39 97 B7             STA A  LUBA
00396 7C3B CE 1000           LDX    #$1000
00397 7C3E 09        LOOPBC  DEX             WAIT LOOP
00398 7C3F 26 FD             BNE    LOOPBC
00399 7C41 C6 FF    WIEDER   LDA B  #$FF
00400 7C43 BD 7EA5  HUPF     JSR    TRANSM
00401 7C46 0E                CLI
00402 7C47 3E                WAI             WAIT FOR INTERRUPT
00403 7C48 BD 7D94           JSR    FSKERR
00404 7C4B 58                ASL B           SHIFT B REGISTER BY ONE PLACE
00405 7C4C 7A 00B7           DEC    LUBA
00406 7C4F 26 F2             BNE    HUPF
00407 7C51 86 10    EXITMO   LDA A  #$10
00408 7C53 B7 1800           STA A  HWFM
00409 7C56 B7 1800           STA A  HWFM
00410 7C59 BD 7EF1           JSR    IBFSK           HPTB FSK ERROR OUTPUT ROUTINE
00411 7C5C 86 1D             LDA A  #$1D            DISABLE INTERRUPTS
00412 7C5E B7 2000           STA A  ACIA0
00413 7C61 96 EA             LDA A  SCHSTO          IF IT CONTAINS $FA THEN IT WILL DO T
00414 7C63 81 FA             CMP A  #$FA
00415 7C65 27 03             BEQ    LOGQUA
00416 7C67 7E 7D32           JMP    NOEVER
00417 7C6A 86 80    LOGQUA   LDA A  #$80
00418 7C6C 97 7B             STA A  PROG
00419 7C6E B7 1600           STA A  RCVR
00420 7C71 86 61             LDA A  #$61            MANUAL FREQUENCY CONTROL
00421 7C73 97 17             STA A  XMIT
00422 7C76 B6 1000  TOP      LDA A  FPANEL          GET FRONT PANEL
00423 7C79 84 02             AND A  #$02            SEE IF TX FOR RX
00424 7C7B 27 0F             BEQ    RCV             BR IF N RECEIVE
00425 7C7D 86 21             LDA A  #$21            PROGRAM XMIT FOR XMIT
00426 7C7F 97 7C             STA A  PROG+1
00427 7C81 86 10             LDA A  #$10            DISPLAY TRMT HZ
00428 7C83 97 7F             STA A  PROG+3
00429 7C85 86 FD             LDA A  #$FD
00430 7C87 C6 04             LDA B  #$04
00431 7C89 20 0C             BRA    ALPHA
```

```
00432 7CBB B6 61    RCV    LDA A  #$61       PROGRAM XMIT TO REC
00433 7CBD 97 7C           STA A  PROG+1
00434 7CBF 86 02           LDA A  #$02       DISPLAY RCV HZ
00435 7C91 97 7E           STA A  PROG+3
00436 7C93 86 FF           LDA A  #$FF
00437 7C95 C6 06           LDA B  #$06
00438 7C97 94 7B    ALPHA  AND A  PROG
00439 7C99 97 7B           STA A  PROG
00440 7C9B DA 7B           ORA B  PROG
00441 7C9D D7 7B           STA B  PROG       SETS FOR EITHER TX OR RX
00442 7C9F F7 1600          STA B  RCVR       PROGRAMS RECEIVER LATCH
00443 7CA2 86 02    ZERODB LDA A  #$02       0 DB OUT OF TRANSMITTER
00444 7CA4 9A 7C           ORA A  PROG+1
00445 7CA6 97 7C    BETA   STA A  PROG+1
00446 7CA8 B7 1700          STA A  XMIT       PROGRAM THE TANSMITTER
00447                *
00448                *
00449 7CAB B6 1000 LOOK    LDA A  FPANEL
00450 7CAE 44             LSR A
00451 7CAF 44             LSR A
00452 7CB0 44             LSR A
00453 7CB1 44             LSR A
00454 7CB2 44             LSR A             GET FUNCTION BITS TO RIGHT SIDE
00455 7CB3 81 00           CMP A  #$00       L/F
00456 7CB5 27 29           BEQ    RTEST1
00457 7CB7 81 01           CMP A  #$1        C-MESS
00458 7CB9 27 2B           BEQ    RTEST2
00459 7CBB 81 02           CMP A  #$2        NWT
00460 7CBD 27 2D           BEQ    RTEST3
00461 7CBF 81 03           CMP A  #$3        S/N
00462 7CC1 27 2F           BEQ    RTEST4
00463 7CC3 86 EE           LDA A  #$EE       ERROR
00464 7CC5 B7 1D00          STA A  RIGHTD
00465 7CC8 B7 1D01          STA A  RIGHTD+1   PLACE DASHED LISES ON DISPPAY
00466 7CCB B7 1D02          STA A  RIGHTD+2
00467 7CCE B7 1D03          STA A  RIGHTD+3
00468 7CD1 B7 1C00          STA A  LEFTD
00469 7CD4 B7 1C01          STA A  LEFTD+1
00470 7CD7 B7 1C02          STA A  LEFTD+2
00471 7CDA B7 1C03          STA A  LEFTD+3
00472 7CDD 7E 7CAB         JMP    LOOK
00473                *
00474                *
00475 7CE0 86 BE    RTEST1 LDA A  #$BE       FLAT,FWA
00476 7CE2 C6 80           LDA B  #$80
00477 7CE4 20 10           BRA    BEGIN
00478 7CE6 86 FF    RTEST2 LDA A  #$FF       FWA,CMESS
00479 7CE8 C6 C0           LDA B  #$C0
00480 7CEA 20 0A           BRA    BEGIN
00481 7CEC 86 3F    RTEST3 LDA A  #$3F       FLAT,ORMS
00482 7CEE C6 00           LDA B  #$00
00483 7CF0 20 04           BRA    BEGIN
00484 7CF2 86 7F    RTEST4 LDA A  #$7F       CMESS,ORMS
00485 7CF4 C6 40           LDA B  #$40
00486 7CF6 94 7B    BEGIN  AND A  PROG
00487 7CF8 97 7B           STA A  PROG
00488 7CFA DA 7B           ORA B  PROG
00489 7CFC D7 7B           STA B  PROG       STORE REC INFO
00490 7CFE F7 1600          STA B  RCVR       PROGRAM RECEIVER LATCH
00491                *
00492                * BEGIN RANGING
00493                *
00494 7D01 BD 7DC0         JSR    ARANG1
00495 7D04 CE 0083         LDX    #AREG+3
00496 7D07 86 F4           LDA A  #$F4       MICRO SEC
00497 7D09 97 7D           STA A  PROG+2
00498 7D0B BD 779D         JSR    LDSPLY     DISPLAY
00499                *
00500                *   FREQ
00501                ******
00502 7D0F CE 0080         LDX    #AREG
00503 7D11 BD 76C9         JSR    FREQ
00504 7D14 C6 08           LDA B  #$08
00505 7D16 BD 767B SHIFT2 JSR    LSHIFT
00506 7D19 5A             DEC B
```

```
00507 701A 26 FA              BNE     SHIFTR
00508 701C BD 7741             JSR     RDSPLY
00509 701F CE 1000             LDX     #$1000
00510 7022 01       WAIT       NOP
00511 7023 01                  NOP
00512 7024 01                  NOP
00513 7025 09                  DEX
00514 7026 26 FA               BNE     WAIT      A LITTLE WAIT LOOP
00515 7028 BD 65C6             JSR     LDPVLA
00516 702B 84 01               AND A   #$01      STILL IN SELF CHECK
00517 702D 27 03               BEQ     NOEVER
00518 702F 7E 7C76             JMP     TOP
00519                *
00521 7032 86 E0   NOEVER LDA A #$E0
00522 7034 97 7D               STA A   PROG+2
00523 7036 B7 1200             STA A   ANNJVL    BLANK LEFT ANNUNCIATOR
00524 7039 4F                  CLR A
00525 703A 97 7E               STA A   PROG+3
00526 703C B7 1300             STA A   ANNJVR    BLANK RIGHT ANNUNCIATOR
00527 703F 97 83               STA A   ARES+3
00528 7041 97 84               STA A   ARES+4
00529 7043 97 85               STA A   ARES+5
00530 7045 BD 753A             JSR     BLANKL
00531 7048 BD 7549             JSR     BLANKR
00532 704B CE 001A PLUS10 LDX   #$1A
00533 704F A6 CD  MINUS3 LDA A  ERRORT,X
00534 7050 26 22              BNE     MEHRER
00535 7052 09                 DEX
00536 7053 26 F9              BNE     MINUS3
00537 7055 CE 9950            LDX     #$9950
00538 7058 DF F5              STX     HPRES1    STORE PASS INFO FOR HPIB
00539 705A BD 7EDE            JSR     LFONLY    HPIB OUTPUT
00540 705D 86 05              LDA A   #$05
00541 705F B7 1C03            STA A   LEFTD+3   WRITE THE WORD "PASS"
00542 7062 B7 1C02            STA A   LEFTD+2   ON THE LEFT DISPLAY
00543 7065 86 0D              LDA A   #$0D
00544 7067 B7 1C01            STA A   LEFTD+1   LETTER A
00545 706A 86 0C              LDA A   #$0C
00546 706C B7 1C00            STA A   LEFTD     LETTER P
00547 706F C6 FF              LDA B   #$FF
00548 7071 7E 707D            JMP     PLUS5
00549 7074 BD 7ECE MEHRER JSR    HPOJT     SET THE OUTPUT BIT FOR HPIB
00550 7077 BD 70F9            JSR     ERRORM
00551 707A 09                 DEX
00552 707B 26 F7              BNE     MEHRER
00553 707D BD 7EB6 PLUS5  JSR    EXITSC    STILL IN SELF CHECK
00554 7080 20 C9              BRA     PLUS10    MUST STILL BE IF IT EXECUTED THIS IN
00555 7082 CE 3A9B AUSGAN LDX    #$3A9B
00556 7085 09      SYNC5  DEX
00557 7086 26 FD              BNE     SYNC5     WAIT FOR CONTACT BOUNCE TO STOP
00558 7088 96 AA              LDA A   STAT1
00559 708A 84 FD              AND A   #$FD      CLEAR THE SELF-CHECK FLAG
00560 708C 97 AA              STA A   STAT1     RESTORE STATUS REGISTER
00561 708E 86 9D              LDA A   #$9D
00562 7090 B7 2000            STA A   ACIA0     ENABLE INTERRUPTS
00563 7093 39                 RTS
00564 7094 96 C7  FSKERR LDA A  SCHL      STATUS REGISTER
00565 7096 85 04              BIT A   #$4       CHECK DATA DETECT CARRIER)
00566 7098 26 09              BNE     ERRMOD
00567 709A 85 70              BIT A   #$70      CHECK THE STATUS OF PE,OVRN,FE,RDRF
00568 709C 26 05              BNE     ERRMOD
00569 709E 96 CB  ERRM4  LDA A   SCHL+1
00570 70A0 11                 CBA              IS RECEIVED WORD EQUAL TO THE TRANSM
00571 70A1 27 06              BEQ     SERVUS
00572 70A3 86 83  ERRMOD LDA A   #$83
00573 70A5 97 D7              STA A   ERRORT+10
00574 70A7 97 A1              STA A   FRES+3
00575 70A9 39     SERVUS RTS
00576 70AA CE FFFF WARTE  LDX    #$FFFF
00577 70AD BD 7EB6            JSR     EXITSC
00578 70B0 09     WARTE1 DEX
00579 70B1 26 FD              BNE     WARTE1
00580 70B3 CE FFFF WARTEA LDX    #$FFFF
00581 70B6 09     WARTE2 DEX
00582 70B7 26 FD              BNE     WARTE2
```

```
00583 7DB9 CE FFFF  WARTE3   LDX    #$FFFF
00584 7DBC 09       WARTE3   DEX
00585 7DBD 26 FD             BNE    WARTE3
00586 7DBF 39                RTS
00587 7DC0 0F       ARANG1   SEI             SET THE INTERRUPT MASK
00588                        ******
00589                        *
00590                        * RESET SIX DECADE COUNTER *
00591                        *
00592                        ******
00593 7DC1 5F                CLR B
00594 7DC2 96 7F             LDA A  PROG+4   GET THE HARDWARE LATCH IMAGE
00595 7DC4 84 92             AND A  #$92     CLEAR RST BIT,SELECT LOG DATA
00596 7DC6 16                TAB             ACCA=>ACCB
00597 7DC7 8A 04             ORA A  #$04     SET B2 THE COUNTER RST CONTROL BIT
00598 7DC9 97 1400           STA A  CONTRL   OUTPUT CLEAR PULSE TO CONTROL LATCH
00599 7DCC F7 1400           STA B  CONTRL   RESTORE STATUS OF CONTROL LATCH
00600                        ******
00601                        *
00602                        * COUNTER CLEARED,QUANTIZE DETECTOR OUTPUT. *
00603                        *
00604                        ******
00605 7DCF CE 00FA           LDX    #$00FA   INITIALIZE WAIT LOOP
00606 7DD2 17                TBA             ACCB=>ACCA
00607 7DD3 8A 08             ORA A  #$08     SET BIT B3,THE LOG QUANTIZER CONTROL
00608 7DD5 97 1400           STA A  CONTRL   START 2MSEC QUANTIZATION GATE
00609 7DD8 09       AGAIN3   DEX
00610 7DD9 26 FD             BNE    AGAIN3
00611 7DDB F7 1400           STA B  CONTRL   STOP
00612 7DDE CE 0080           LDX    #AREG    SET POINTER TO ADDRESS OF SOFTWARE R
00613 7DE1 BD 768B           JSR    CLEAR    0 -> A,CLEAR REGISTER A
00614 7DE4 BD 7698           JSR    READIT   COUNTER -> A,LOAD CONTENTS TO REGIST
00615 7DE7 0E                CLI
00616 7DE8 39                RTS
00617 7DE9 E6 CD   FRRORM    LDA B  ERRORT,X
00618 7DEB 27 0D             BEQ    NOER
00619 7DED DF BB             STX    LADY
00620 7DEF BD 751C           JSR    ERROR
00621 7DF2 BD 7DAA           JSR    WARTE
00622 7DF5 BD 7DAA           JSR    WARTE
00623 7DF8 DE BB             LDX    LADY
00624 7DFA 39       NOER     RTS
00625 7DFB 96 C5   FRECH     LDA A  SCHF+4
00626 7DFD 91 BF             CMP A  FREVAR
00627 7DFF 26 0A             BNE    ERR20
00628 7E01 96 C6             LDA A  SCHF+5
00629 7E03 81 06             CMP A  #$06
00630 7E05 22 04             BHI    ERR20
00631 7E07 81 02             CMP A  #$02
00632 7E09 24 04             BCC    GOOV1   BRANCH IF FREQ. IS =OR GREATER THAN
00633 7E0B 86 40   ERR20     LDA A  #$40
00634 7E0D 97 DF             STA A  ERRORT+18
00635 7E0F 39       GOOV1    RTS
00636 7E10 7F 0080 LEVCH     CLR    AREG
00637 7E13 96 CA             LDA A  SCHL+3  TRANSFER DATA FROM SCHL TO AREG
00638 7E15 97 83             STA A  AREG+3
00639 7E17 96 CB             LDA A  SCHL+4
00640 7E19 97 84             STA A  AREG+4
00641 7E1B 96 CC             LDA A  SCHL+5
00642 7E1D 97 85             STA A  AREG+5
00643 7E1F DF 81             STX    AREG+1
00644 7E21 96 7D             LDA A  PROG+2
00645 7E23 97 C0             STA A  EXECON  STORE THE POLARITY
00646 7E25 BD 73DA           JSR    DSUB0
00647 7E28 96 C0             LDA A  EXECON  RESTORE POLARITY
00648 7E2A 97 1200           STA A  ANNUNL
00649 7E2D 96 BB             LDA A  LENNY
00650 7E2F 2A 06             BPL    SCHNE
00651 7E31 96 C0             LDA A  EXECON
00652 7E33 85 40             BIT A  #$40
00653 7E35 27 21             BEQ    ERR30
00654 7E37 7D 0086 SCHNE     TST    BREG
00655 7E3A 26 1C             BNE    ERR30
00656 7E3C 96 87             LDA A  BREG+1
00657 7E3E 81 09             CMP A  #$9
```

```
00658 7E40 22 16              BHI      ERR30
00659 7E42 48              ASL A
00660 7E43 48              ASL A
00661 7E44 48              ASL A
00662 7E45 48              ASL A
00663 7E46 74 00BB          LSR      BREG+2
00664 7E49 74 00BB          LSR      BREG+2
00665 7E4C 74 00BB          LSR      BREG+2
00666 7E4F 74 00BB          LSR      BREG+2
00667 7E52 9A BB             ORA A    BREG+2
00668 7E54 91 B4             CMP A    LADY
00669 7E56 23 0E             BLS      IAMTYR   BRANCHES IF= OR SMALLER THAN LIMITS
00670 7E58 CE 001A ERR30     LDX      #$1A
00671 7E5B A6 CD  CARDT      LDA A    ERRORT,X
00672 7E5D 27 03             BEQ      NOTTE
00673 7E5F 09                DEX
00674 7E60 26 F9             BNE      CARDT
00675 7E62 96 B7  NOTTE      LDA A    LUBA
00676 7E64 A7 CD             STA A    ERRORT,X
00677 7E66 39      IAMTYR    RTS
00678 7E67 97 C0  EDDWAT     STA A    EXECON   STORE A REG INEXECON - EXECUTION COU
00679 7E69 BD 6FF9 OVERAN    JSR      ZURJCK   JUMP TO ENVELOPE DELAY
00680 7E6C BD 7EB6           JSR      EXITSC   CHECK WHETHER STILL IN SELF CHECK IF
00681 7E6F 7A 00C0           DEC      EXECON
00682                        *
00683                        * THIS PART ENABLES THE OUTPUT ROUTINE
00684                        * TO HPIB ONE DISPLAY BEFORE THE END OF THE WAIT
00685                        *
00686 7E72 86 01             LDA A    #$01     SEE IF EXECON IS ONE COUNT
00687 7E74 91 C0             CMP A    EXECON   BR IF NOT THERE YET
00688 7E76 26 03             BNE      NOTYET   SET THE OUTPUT FLAG
00689 7E78 BD 7ECE           JSR      HPOJT
00690 7E7A 7D 00C0 NOTYET    TST      EXECON   SEE IF EXECON AT ZERO
00691 7E7E 26 E9             BNE      OVERAN
00692 7E80 39                RTS
00693 7E81 7F 0080 EDDERR    CLR      AREG
00694 7E84 CE 3000           LDX      #$3000
00695 7E87 DF 81             STX      AREG+1
00696 7E89 DE CB             LDX      SCHL+4
00697 7E8B DF 84             STX      AREG+4
00698 7E8D 96 CA             LDA A    SCHL+3
00699 7E8F 97 83             STA A    AREG+3
00700 7E91 BD 73DA           JSR      DSUBO
00701 7E94 DE 86             LDX      BREG
00702 7E96 26 06             BNE      ERR60
00703 7E98 96 88             LDA A    BREG+2
00704 7E9A 91 B8             CMP A    LADY
00705 7E9C 23 06             BLS      PLUS3
00706 7E9E CE 000E ERR60     LDX      #$E
00707 7EA1 BD 7E5B           JSR      CARDT
00708 7EA4 39      PLUS3     RTS
00709                        *MY OWN TRANSMIT ROUTINE FOR EXPERIMENTAL PURPOSES ONLY
00710 7EA5 CE FFFF TRANSM    LDX      #$FFFF
00711 7EA8 B6 2000 LOOPH     LDA A    ACIA0
00712 7EAB 85 02             BIT A    #$2
00713 7EAD 26 03             BNE      LOOPI
00714 7EAF 09                DEX
00715 7EB0 26 F6             BNE      LOOPH
00716 7EB2 F7 2001 LOOPI     STA B    ACIA1
00717 7EB5 39                RTS
00718 7EB6 96 A8  EXITSC     LDA A    STAT2    SEE IF IN HPIB
00719 7EB8 2A 07             BPL      EXITSK   BR IF NOT IN HPIB
00720 7EBA B6 1000           LDA A    FPANEL   SEE IF STILL SET IN HPIB
00721 7EBD 84 18             AND A    #$18
00722 7EBF 26 08             BNE      DRUBER   BR IF NOT IN HPIB
00723 7EC1 BD 65C6 EXITSK    JSR      LDPVLA
00724 7EC4 84 01             AND A    #$01
00725 7EC6 27 01             BEQ      DRUBER   BRANCHES IF NOT IN SELFCHECK
00726 7EC8 39                RTS
00727 7EC9 9E FB  DRUBER     LDS      STACK
00728 7ECB 7E 7DB2           JMP      AUSGAN
00729                        *
00730                        * THIS SECTION SETS THE HPIB STATUS
00731                        * REGISTER FOR NORMAL OUTPUT
00732                        *
```

```
00733 7ECE D6 F3    HPOJT  LDA B  HSTAT1
00734 7ED0 C4 BF           AND B  #$BF
00735 7ED2 CA 80           ORA B  #$80
00736 7ED4 D7 F3           STA B  HSTAT1
00737 7ED6 39             RTS
00738                *
00739                *
00740                *THIS SUBROUTINE OUTPUTS TO HPIB ONLY THE INFORMATION
00741                *LOADED IN THE RIGHT DISPLAY REGISTERS HPREG3 AND HPREG4.
00742                *
00743 7ED7 5F     RTONLY  CLR B
00744 7ED8 D7 F5          STA B  HPREG1    ZERO OUT THIS REGISTER
00745 7EDA D7 F6          STA B  HPREG2    THIS ONE ALSO
00746 7EDC 20 05          BRA    TUIT      GO THERE WHEN YOU GET AROUND TO IT (
00747 7EDE 5F     LFONLY  CLR B
00748 7EDF D7 F7          STA B  HPREG3    CLEAR THIS REGISTER
00749 7EE1 D7 F8          STA B  HPREG4    THIS ONE ALSO
00750 7EE3 F6 3002 TUIT   LDA B  HPIB+2    SEE IF HPIB OPTION IS INSTALLED
00751 7EE6 C5 10          BIT B  #$10
00752 7EE8 26 06          BNE    SUSAN     BR IF OPTION IS NOT INSTALLED
00753 7EEA BD 7ECE         JSR    HPOJT     SET THE OUTPUT BIT
00754 7EED BD 5B36         JSR    NSR3      ENTRY POINT IN HPIB OUTPUT ROUTINE
00755 7EF0 39     SUSAN   RTS
00756                *
00757                *
00758                *
00759                *THIS SUBROUTINE OUTPUTS THE FSK ERROR MESSAGES
00760                *ON THE HPIB BUS
00761                *
00762                *
00763 7EF1 CE 009E IBFSK   LDX    #FREG
00764 7EF4 A6 00   IBFSK1  LDA A  X         SEE WHAT ERRORS ARE THERE
00765 7EF6 27 0D          BEQ    IBFSK2    BR IF NO ERRORS
00766 7EF8 97 F6          STA A  HPREG2    STORE ERROR IN THE LEFT LSB
00767 7EFA 86 99          LDA A  #$99      SET THE ERROR CODE
00768 7EFC 97 F5          STA A  HPREG1
00769 7EFE DF 76          STX    TEMP      STORE THE INDEX REGISTER SO IT IS NO
00770 7F00 BD 7EDE         JSR    LFONLY    PUT ON HPIB  (ROUTINES DIDDLES WITH
00771 7F03 DE 76          LDX    TEMP
00772 7F05 08     IBFSK2  INX
00773 7F06 8C 00A2        CPX    #FREG+4   ONLY THREE FSK ERRORS DETECTED
00774 7F09 26 E9          BNE    IBFSK1
00775 7F0B 39             RTS
00776                *
00777                *
00778                *
00779                *
00001                *
00003                *
00004                ******
00005                * RESTART POWER-UP ROUTINE *
00006                ******
00007                *
00008                *
00009 7F0C 8E 0070 RSTART  LDS    #$70      INITIALIZE THE STACK TO BE READY FOR
00010 7F0F 4F             CLR A            FIX THE HARDWARE GLITCH BY STORING 7
00011 7F10 B7 1F00         STA A  CLOCKR    TURN OFF THE TIME BASE MARKER GENERA
00012 7F13 86 1F          LDA A  #$1F
00013 7F15 B7 2000         STA A  ACIA0     RESET ACIA,CLEAR PENDING IRQ
00014 7F18 86 90          LDA A  #$90
00015 7F1A B7 2000         STA A  ACIA0     ENABLE ACIA RECEIVE INTERRUPT SYSTEM
00016                ******
00017                * CLEAR THE DISPLAY WHILE POWERING UP INSTRUMENT *
00018                ******
00019 7F1D BD 7549         JSR    BLANKR    BLANK RIGHT DISPLAY
00020 7F20 BD 753A         JSR    BLANKL    BLANK LEFT DISPLAY
00021 7F23 86 A0          LDA A  #$A0      FIX BOB'S GLITCH
00022 7F25 B7 1200         STA A  ANNJVL    TO BLANK THE LEFT DISPLAY ANNUNCIATO
00023 7F28 7F 1300         CLR    ANNJVR    BLANK RIGHT DISPLAY ANNUNCIATOR
00024                ******
00025                * QUIET TERM THE TRANSMITTER WHILE POWERING UP INSTRUMENT *
00026                ******
00027 7F2B 86 11          LDA A  #$11      QUIET TERM TRANSMITTER WHILE POWERIN
00028 7F2D B7 1700         STA A  XMIT      PROGRAM TRANSMITTER TO FIXED FREQUEN
00029 7F30 86 04          LDA A  #$04
```

```
00030 7F32 C6 10           LDA B   #$10
00031 7F34 B7 1900         STA A   HWFL
00032 7F37 F7 1800         STA B   HWFM
00033 7F3A F7 1800         STA B   HWFM     DO TWICE TO MAKE SURE PAUL GETS IT
00034                   ******
00035                   * WAIT FOR TRANSMITTER TO ACCEPT DATA *
00036                   ******
00037 7F3D 86 08          LDA A   #$08
00038 7F3F B7 1300        STA A   ANNUNR   LIGHT IN-PROCESS ANNUNCIATOR
00039                   *
00040                   *
00041                   *
00042                   ****** ROM CHECKSUM WHILE WE WAIT FOR TRANSMITTER ******
00043                   *
00044                   * COMPUTES THE CHECKSUM OF EACH 2K BYTE BLOCK
00045                   * OF ROM MEMORY MODULO 256. IF A CHECKSUM ERROR
00046                   * IS DETECTED THE NUMBER OF THE ROM IN WHICH THE
00047                   * ERROR WAS DETECTED IS DISPLAYED ON THE LEFT
00048                   * DISPLAY. THIS ROUTINE USES ONLY THE INTERVAL
00049                   * MPU REGISTERS AND ROM. HENCE RAM FAILURES WILL
00050                   * NOT EFFECT THIS PROGRAM.
00051                   *
00052                   *
00053      5800         BEGIN1   EQU   $5800
00054      0057         ROM0     EQU   $57
00055      0099         ROM1     EQU   $99
00056      00ED         ROM2     EQU   $ED
00057      00E1         ROM3     EQU   $E1
00058                   *
00059                   *
00060 7F42 CE 5800               LDX    #BEGIN1
00061 7F45 4F                    CLR A
00062 7F46 5F                    CLR B
00063 7F47 AB 00        SUM0     ADD A  X        GET THE SUM OF BYTES OF ROM0
00064 7F49 08                    INX
00065 7F4A 8C 6000               CPX    #BEGIN1+$0800
00066 7F4D 26 F8                 BNE    SUM0
00067 7F4F 8B 57                 ADD A  #ROM0    ADD THE CHECKSUM BYTE?
00068 7F51 26 34                 BNE    CKSUM    BRANCH IF RESULT NOT ZERO
00069 7F53 5C                    INC B
00070 7F54 AB 00        SUM1     ADD A  X
00071 7F56 08                    INX
00072 7F57 8C 6800               CPX    #BEGIN1+$1000
00073 7F5A 26 F8                 BNE    SUM1
00074 7F5C 8B 99                 ADD A  #ROM1
00075 7F5E 26 27                 BNE    CKSUM
00076 7F60 5C                    INC B
00077 7F61 AB 00        SUM2     ADD A  X
00078 7F63 08                    INX
00079 7F64 8C 7000               CPX    #BEGIN1+$1800
00080 7F67 26 F8                 BNE    SUM2
00081 7F69 8B ED                 ADD A  #ROM2    CHECKSUM BYTE FOR ROM #2
00082 7F6B 26 1A                 BNE    CKSUM
00083 7F6D 5C                    INC B
00084 7F6E AB 00        SUM3     ADD A  X
00085 7F70 08                    INX
00086 7F71 8C 7800               CPX    #BEGIN1+$2000
00087 7F74 26 F8                 BNE    SUM3
00088 7F76 8B E1                 ADD A  #ROM3    CHECKSUM BYTE FOR ROM #3
00089 7F78 26 0D                 BNE    CKSUM
00090 7F7A 5C                    INC B
00091 7F7B AB 00        SUM4     ADD A  X
00092 7F7D 08                    INX
00093 7F7E 8C 7FC0               CPX    #FINAL1
00094 7F81 26 F8                 BNE    SUM4
00095 7F83 AB 00                 ADD A  X        CHECKSUM BYTE FOR ROM #4
00096 7F85 27 05                 BEQ    ROMSGD
00097 7F87 F7 1C03      CKSUM    STA B  LEFTD+3
00098 7F8A 20 FE                 BRA    *
00099 7F8C 86 0F        ROMSGD   LDA A  #$0F     WAIT 1.5 SECONDS FOR TRANSMITTER
00100 7F8E BD 64A3               JSR    WAITR
00101 7F91 7F 00AA               CLR    STAT1    CLEAR THE STATUS REGISTERS
00102 7F94 7F 00AB               CLR    STAT2
00103 7F97 7F 00F3               CLR    HSTAT1   HPIB STATUS REGISTERS
00104 7F9A 7F 00F4               CLR    HSTAT2
```

```
00105 7F9D 7F 00B8          CLR    LENVY       SOME STORAGE FOR ENVELOPE DELAY
00106 7FA0 7F 00B9          CLR    LENVY+1
00107 7FA3 7F 00BA          CLR    LENVY+2
00108                ******
00109                * INITIALIZE PIA
00110                ******
00111 7FA6 7F 3002          CLR    HPIBP+2
00112 7FA9 7F 3003          CLR    HPIBP+3
00113 7FAC A6 0C             LDA A  #$0C        SETS DATA DIRECTION B SIDE
00114 7FAE B7 3002           STA A  HPIBP+2
00115 7FB1 C6 1F             LDA B  #$1F
00116 7FB3 F7 3003           STA B  HPIBP+3     SET CONTROL REGISTER
00117 7FB6 B7 3002           STA A  HPIBP+2     INITIALIZE THE OUTPUT DATA
00118 7FB9 BD 5CD7           JSR    CLSTN
00119 7FBC 0E                CLI                ENABLE INTERRUPT SYSTEM
00120 7FBD 7E 5F0D           JMP    SYSTEM
00121 7FC0 3A         FINAL1 FCB    $3A         CHECKSUM BYTE FOR THIS ROM
00122 7FF5               ORG    $7FF5
00123 7FF5 7E 7F0C          JMP    RSTART      TRY TO RECOVER IF WE BLOW AWAY!
00124                ******
00125                *
00126                * FORM THE INTERRUPT AND RESTART VECTORS
00127                *
00128                ******
00129 7FF8 65E7             FDB    HNIRQ
00130 7FFA 65E7             FDB    HNIRQ
00131 7FFC 65A3             FDB    NMIRQ
00132 7FFE 7F0C             FDB    RSTART
00022                END
```

SYMBOL TABLE

```
AA03   726A AA05   728F AA06   72A1 AA07   727C AA08   729F AA09   724F
AA10   7260 AA20   7219 ABORT  008E ABORT1 6B4A ABORT2 6BC2 ABORT3 6FA0
ABORT4 6675 ABORT5 6681 ABORTA 0072 ABORTC 61D1 ABSOLT 676A ACIA0  2000
ACIA0I 0085 ACIA1  2001 ACIA1I 0086 ADDTLK 5CC7 AGAIN  7441 AGAIN1 659D
AGAIN3 70DB ALPHA  7C97 ANIRQ  65F4 ANVA   70CE ANNUNL 1200 ANNUNR 1300
ANSWER 00AE ARANG1 7DC0 ARANGE 7429 AREG   0080 AUSGAN 7D82 AVANTI 724A
AVER   6077 AVERG1 72ED AVERG2 7303 AVGE   74BF BACK   7667 BACK1  767A
BAD    6498 BAD1   6499 BAD2   649D BADRGE 6BC5 BB00   7389 BB01   73A5
BB02   73C8 BCDADD 7636 BCDBIY 7368 BE01   63EF BE11   6451 BEGIN  7CF6
BEGIN1 5800 BETA   7CA6 BFIX01 66E9 BFIX07 68D4 BFIX10 6A16 BFIX12 6900
BFIX15 66F5 BFIX17 6A22 BFIX18 6843 BFIX19 684F BFIX21 6C63 BFIX25 6856
BFIX27 6849 BFIX29 6A29 BFIX33 6D96 BLAD   72DC BLANK  74F6 BLANK0 72DB
BLANKL 753A BLANKO 751B BLANKR 7549 BREG   0086 BYE    6697 BYE000 66D2
BYE1   6588 BYE2   65B5 BYE4   663F BYE5   662E BYE6   649C BYEALL 5B4E
BYEBYE 64B0 BYENOW 6589 BYEONE 5C07 BYESLV 6DC4 BYFTWO 7010 BYPASS 762D
BYTE   7602 CAROL1 65CF CAROL2 65D1 CAROL3 65E6 CAROT  7E5B CC00   7046
CC03   705D CC04   7078 CC20   7247 CHANGE 6840 CHECKR 645F CHEKR1 6473
CHEKR2 6478 CHEKR3 647A CHEKR4 648A CKSUM  7F87 CLEAR  76BB CLOCK  00AB
CLOCKO 66B0 CLOCKR 1F00 CLOSED 66C4 CLOSEB 66BF CLRABT 6669 CLRBCE 6FBF
CLRREF 6B22 CLSTN  5CD7 CMPIT  75FC CNRCVR 5E29 CNXMIT 5E25 CONFIG 5B4F
CONT1  72EB CONT2  72EC CONTIN 7231 CONTRL 1400 CONTU  74F0 CONTU2 616B
CONTJ6 690C CONTU7 695A CONTJ8 701E CONTU9 702B CONWD  00B4 COUNT1 6EFE
COUNT2 6DF5 COUNT3 6F84 COUNTR 1500 CREG   008C CRLF   5CB2 CRMMTR 5E31
CRMMTT 5E2D CRMSTR 5E39 CRMSTT 5E35 CRSMTS 5E3D CRSSTM 5E41 CTALK  5CF1
DATA   00AF DATACK 6641 DAVE1  65C3 DAVE2  65C5 DBM    7568 DBM00  7566
DBM10  7564 DBM20  7562 DBM30  7560 DBM40  755E DBM50  755C DBM60  755A
DBM70  7558 DBRN   75BA DBRN20 75AA DBRN30 75AC DBRN40 75AE DBRN50 75B0
DBRN60 75B2 DBRN70 75B4 DBRN80 75B6 DBRN90 75B8 DCLEAR 5AD2 DCOVER 63A5
DDELAY 652D DEC1   7576 DEC1R  75C8 DEC2   757E DEC2R  75D0 DEC3   75A6
DEC3R  75D8 DEC4   75AE DEC4R  75F0 DEC5   7596 DEC5R  75E8 DEC6   759E
DEC6R  75F0 DEL0   5AC4 DEL1   5ACB DELGEN 723C DELZFR 7199 DIAL   5F9E
DIAROM 5000 DIS0   5925 DIS2   592C DIS3   5933 DIS3   593A DIS4   591C
DISPL  72A7 DIVID  00A8 DIVIDE 7248 DIVIS  00BF DLLA   00EE DLLB1  60C6
DLLB2  60F3 DLLB3  60E8 DLLB4  60FB DOIT   760C DONE   75FB DPOSIT 6F94
DPSKIP 5C23 DREG   0092 DRET   681A DROP   1E00 DROPR  6E18 DRUBER 7EC9
DSJB0  73DA DSJB1  73E6 DSJB2  73F3 DSJB3  7408 DSJB4  7416 DTORSC 64FC
DUMP2  7769 DUMPR  7799 DUMPR1 7812 E2     5A47 E3     5A53 E4     5A5E
EBJEE  78B4 EDDERR 7EB1 EDDFRE 6FDF EDDMIS 7175 EDDSLV 715B EDDWAT 7E67
EDMMTR 5EC1 EDMMTT 5EBD EDMSTR 5EB9 EDMSTT 5EB5 EDNNMR 5EAD EDNNMT 5EA5
```

```
EDNRTR 5EB1  EDNRTT 5EA9  EDSMTS 5EC9  EDSSTM 5EC5  ELMMTR 5EE9  ELMMTT 5EE5
ELMSTR 5EE1  ELMSTT 5EDD  ELNNMR 5ED5  ELNNMT 5ECD  ELNRTR 5ED9  ELNRTT 5ED1
ELSMTS 5EF1  ELSSTM 5EED  ENDE   742B  EREG   009B  ERR14  6F6E  ERR20  7E0B
ERR30  7E5B  ERR40  7A61  ERR50  7AFA  ERR60  7E9E  ERRM4  7D9F  ERRMOD 7DA3
ERROR  751C  ERROR1 0087  ERROR2 0088  ERROR3 0089  ERROR4 008A  ERROR5 6398
ERROR6 62FB  ERROR8 62AD  ERRORM 7DE9  ERRORS 62DE  ERRORT 00CD  ETABLM 5F0B
ETABLS 5F0C  EXECON 00C0  EXECR0 61E3  EXECJT 00F2  EXIT   761C  EXIT2  62D1
EXIT3  6351  EXIT4  631C  EXITM0 7C51  EXITR  6400  EXITSC 7E86  EXITSK 7EC1
F1     5B84  FDATA  6B9B  FINAL  74F5  FINAL1 7FC0  FIND1  5B00  FIND2  5B13
FINDIT 5B00  FINISH 75A9  FIVESA 713F  FORT   7086  FORW   722E  FPAN   00EF
FPANEL 1000  FQ3NIB 5B96  FQ4NIB 5BA6  FRECH  7DFB  FREG   009E  FREQ   76C9
FREVAR 00BF  FSKERR 7D94  FUNCTN 630A  FXFREQ 602D  GBUFF  78C0  GBJFF1 7B98
GETIT  6E97  GLORIA 00BC  GOOD   7AFE  GOOD1  5BC1  GOOD2  5BCB  GOODRP 633A
GOODY  6440  GOOF   5BFB  GOON1  7E0F  GREG   00A4  GTIME  6F09  HALT   6F42
HANS   72B9  HBLAN1 5BB0  HBLAN2 5BC5  HBLAN4 5C70  HBLAN4 5C70  HDELAY 5AB8
HDIG1  5B95  HDIG3  5BDB  HDIG4  5C16  HDISP  5904  HDSK   5C94
HEND   5A21  HERTA  71DC  HEUTE  7854  HEXEL  70DC  HFPAN  00F0  HFREQ  5B74
HHERE  5902  HHERE1 5903  HIMPV  5966  HINAUF 7BDA  HMEAS  59B3  HOJT   5A6E
HPAN   00F2  HPB    00ED  HPB1   00EE  HPER   5941  HPTBFQ 6041  HPTBP  3000
HPLUS  5BBE  HPOUT  7FCE  HPREG1 00F5  HPREG2 00F6  HPREG3 00F7  HPREG4 00F8
HPTLK  5907  HREAD  5BEB  HREG   00F9  HREM   5904  HRFL   1800  HRFM   1400
HSCHK  5AAB  HSCK1  5AB0  HSIGV  5BB2  HSKIP  5BED  HSPACE 5C2E  HSPC1  5BAB
HSPC2  5BC9  HSPC3  5C0F  HSTAT1 00F3  HSTAT2 00F4  HUNGER 7B47  HUPF   7C43
HWAIT  5879  HWFL   1900  HWFM   1800  HWIRQ  65E7  HWIRQ1 65FD  HZERO  5A04
IO     5975  I1     597C  IAMTYR 7E66  IBFIX1 74B9  IBFSK  7EF1  IBFSK1 7EF4
IBFSK2 7EF5  ICLOCK 6F02  IMNBLK 6DBE  IMNRCV 6D99  IMPLSF 6D01  IMSHFT 6D7F
INDJMP 7841  INPUT  6CBB  INRCV1 6D0A  INRCVR 5E89  INRUN  6DDB  INRUN1 6DE4
INRUN2 6E26  INTIAL 6267  INXMIT 5E85  IPLUS  6036  IPXMTT 6D0D  IRMMTR 5E91
IRMMTT 5EBD  IRMSTR 5E99  IRMSTT 5E95  IRSMTS 5E9D  IRSSTM 5FA1  IRTEMP 007B
ISLAVE 6F53  ISTART 6E50  ISTOP  6F31  ISTOP2 6EBB  ISTORE 6D67  ITRUE  6D63
ITSOK  6F89  ITSOK2 6F81  ITSOK3 5EC8  JOSEF  71E4  KEINCA 7BA3  KIRCHB 7C10
KONSTA 7336  KRAUT  7127  LADY   00BA  LDELAY 6B5B  LDFPAN 5ABF  LDFPLA 65BA
LDFREQ 5BB9  LDLTR  5BBA  LDNBR  5BD3  LDPAN  5A9A  LDPNLA 65C6  LDSPLY 779D
LDSTAT 5AB6  LEFTD  1C00  LEMON  5F5D  LENNY  00BB  LESS10 7475  LEVCH  7E10
LEVDLY 655B  LEVEL  66D3  LEVMTR 5B6B  LFONLY 7EDE  LFTFLD 5B74  LISTEN 5B47
LVORM  66DD  LVRCVR 5E09  LVXMIT 5E09  LOAD02 75A6  LOADO2 75FB  LOGQUA 7C6A
LONG1  7AB0  LONG2  7AB6  LONGER 7AA7  LOOK   7CAB  LOOK3  6572  LOOKIH 64DB
LOOKUP 64C6  LOOP   0086  LOOPO  760A  LOOP2  76E4  LOOP5  615F  LOOPBA 7C20
LOOPBB 7BFF  LOOPBC 7C3E  LOOPH  7EAB  LOOPI  7EB2  LOOPJ  7BDE  LOOPK  7BF4
LOWER  7496  LRMMTR 5E11  LRMMTT 5F0D  LRMSTR 5E19  LRMSTT 5E15  LRSMTS 5E1D
LRSSTM 5E21  LSCHK  660F  LSHIFT 767B  LSLAVE 6BBB  LSTNOK 5B1D  LUBA   00B7
M0     59A3  M1     59AA  M2     59B1  M3     59BA  M4     59BF  M6     59C6
M7     59CD  MASKH  000F  MASKL  00F0  MASSER 5FD6  MASTER 6217  MATCH  62BA
MATCH2 61C5  MCNBLK 69FB  MCNBYE 69A6  MCNCHK 699F  MCNF4A 694D  MCNMTR 69BD
MCNVOR 6965  MCNOIS 68E9  MCNORM 59B1  MCNPOS 692C  MCNRCC 68F4  MCNRCV 69A9
MCVRGE 6BFB  MCNSLV 69F2  MCPLJS 597B  MCRCRD 691C  MEHR   731E  MEHRER 7D74
MINOS  6EBD  MINOSC 6E3A  MIN15  6E93  MIN15C 6E36  MINUEN 007F  MINUS3 7D4E
MNXMIT 6913  MOCONT 5AA1  MODE   007A  MODEMT 7B77  MOVE   76FF  MOVE08 6995
MOVE09 6993  MOVE1  5FF6  MOVE10 6D71  MOVE2  5FF8  MOVE6  6AA9  MOVE7  6AA7
MOVEB  6C36  MOVE9  6C3E  MOVER  7103  MOVET  7718  MSBYTE 762F  MTSSLV 6783
MWHILE 638F  NABORT 6285  NOAC   5CB3  NDATA  6A70  NDELAY 6539  NEDDM  653C
NEXT2  761D  NMATCH 6200  NMIRQ  66A3  NMSTER 6B13  NNRCVR 5E49  NNXMIT 5E45
NOAUTO 6FFB  NOAVER 70B3  NOBLK  7BB3  NODLLB 6354  NOFNFR 7D32  NOFR   7DFA
NOERVN 7465  NOHPB1 6245  NOHPB2 606F  NOHPIB 6061  NOLREF 6750  NOMOD  7067
NORM   6704  NORM02 678F  NORM10 5FA5  NORM11 5F7D  NORM12 5FDD  NORMAL 7097
NORML1 654B  NORPSF 6431  NOSAVE 5F26  NOSCON 697F  NOSELF 7146  NOSLAV 64F3
NOSWAP 6B40  NOTFDD 6566  NOTHB  614E  NOTTE  7E62  NOTYFT 7E7B  NRMMTR 5E51
NRMMTT 5E4D  NRMSTR 5E59  NRMSTT 5E55  NRSMTS 5E5D  NRSSTM 5E61  NSRQ   5B36
NTPLUS 6491  NJM1   5BF3  NWNORM 6AD9  NWRCRD 6A32  NWTBLK 6B24  NWTBYE 6ACE
NWTCHK 6AC6  NWTCON 6495  NWTFNA 6463  NWTLMT 6B02  NWTMTR 6AE5  NWTNOR 6A7B
NWTONE 69FE  NWTPOS 6442  NWTRCC 6A0A  NWTRCV 6AD1  NWTRGE 6A0E  NWTSHT 6AB7
NWTSLV 6B1B  O0     5A7A  O1     5A80  OBEN   7BAF  ONWARD 6376  OTPUT1 6349
OUTPJT 6CD9  OJTSTD 74EB  OVER   74CF  OVER10 745B  OVERAN 7E69  OVERFL 77D5
OVERRU 7BCA  P0     5951  P1     595B  P2     595F  PAN    00F1  PAVEL  1100
PASS1  631F  PASS2A 6361  PASS2B 6379  PATCH1 6519  PATCH2 651F  PATCH3 5FC0
PICKET 5B26  PLUS   671B  PLUS10 704B  PLUS2  70A2  PLUS3  7E44  PLUS4  7BD7
PLUS5  707D  PLUS6  7BF9  PLUS7  7BF4  PLUSAA 7BB1  PROG   007B  PROG1  600B
PROG2  620A  PROG3  63AC  PSTART 6DB4  QUOTI  0091  R0     59EB  R1     59FF
R2     59F6  R3     59FD  RANGE  00AD  RANGE2 63D2  RBUFF  7877  RBJFF1 787A
RBJFF2 7899  RCOVER 63B6  RCV    7CBB  RCVR   1600  RDATA  7B4C  RDSPLY 7741
READ   62F1  READIT 7698  READY  62BF  RECHNE 73D0  REDUMP 7A3F  REFFR  6737
RELAT2 61AB  RELATE 62AD  REMOTE 6FA7  REPET  64A6  RETURN 66B7  RGFCHK 6411
RGELMT 69D9  RIGHTD 1000  ROMO   0057  ROM1   0099  ROM2   00ED  ROM3   00E1
ROMSGD 7FBC  RPTSET 70FC  RSHIFT 7665  RSLT   0085  RSLT1  0097  RSTART 7F0C
RTEST1 7CF0  RTEST2 7CF6  RTEST3 7CFC  RTEST4 7CF2  RTFLD  5C43  RTFLD1 5C4B
```

| | | | | | | | | | |
|---|---|---|---|---|---|---|---|---|---|
| RTFLD2 | 5C49 | RTFLD3 | 5C77 | RTONLY | 7FD7 | RTS1 | 5BAF | RTS2 | 5C5C | RTS3 | 5CC6 |
| RTJRN1 | 6450 | SAMPLE | 689E | SAVEFG | 5F20 | SCHF | 00C1 | SCHK | 78C3 | SCHL | 00C7 |
| SCHLE1 | 71C5 | SCHSTO | 00EA | SCHWE | 7E37 | SCIRQ | 669A | SERVUS | 7DA9 | SETIT | 5B2A |
| SFREQ | 717A | SHAKIT | 5C9F | SHDSK | 5CA2 | SHIFT | 67CA | SHIFT7 | 67F2 | SHIFTR | 7016 |
| SIGVAL | 6B27 | SIGNL1 | 6B2B | SKIP | 77DD | SKIP1 | 6F37 | SKIP2 | 6BB2 | SKIP3 | 6658 |
| SKIP4 | 5EF7 | SKIP7 | 6F65 | SKIPPR | 5FAB | SLAVE | 6124 | SLAVE1 | 74C6 | SLAVE2 | 6586 |
| SLAVE3 | 6549 | SLAVE4 | 7485 | SLVMCN | 69C7 | SLVNWT | 6AF0 | SLVSNR | 6C85 | SNRBYE | 6C60 |
| SVRCHK | 6C5B | SNRCON | 6C24 | SNRCRD | 6B5F | SNRCVR | 5E69 | SNRLMT | 6C97 | SNRMTR | 6C7A |
| SVRPOS | 6B6F | SNRRCC | 6B37 | SNRRCV | 5C66 | SNRRGE | 6B3A | SNRSHT | 6C4C | SNRSLV | 6CB0 |
| SNRXMT | 6BFA | SVXMIT | 5E65 | SONNE | 7158 | SPANEL | 0075 | SPLOOP | 610A | SPOLL | 5D0B |
| SPOLL2 | 5D16 | SPRING | 73D7 | SRMMTR | 5F71 | SRMMTT | 5F60 | SRMSTR | 5F79 | SRMSTT | 5F75 |
| SRNORM | 6BB4 | SRPLUS | 6C20 | SRQ | 5B14 | SRSMTS | 5F72 | SRSSTM | 5FB1 | STACK | 00EB |
| START | 008A | START1 | 7150 | STAT1 | 00AA | STAT2 | 00AB | STAT3 | 00AC | STOP | 7664 |
| STOP1 | 60D5 | STOPIT | 6FAB | STORE | 67A9 | STORE1 | 67E9 | STOREX | 6BA5 | SUBT1 | 7274 |
| SUBTRH | 0082 | SUM0 | 7F47 | SUM1 | 7F54 | SUM2 | 7F61 | SUM3 | 7F6F | SUM4 | 7F7B |
| SUSAN | 7EF0 | SWAP | 5FE9 | SWAPIT | 6CF5 | SWEEP | 0076 | SYNC1 | 7A3A | SYNC10 | 64A9 |
| SYNC2 | 64BD | SYNC5 | 7D85 | SYSTEM | 5F0D | TABLE | 5D25 | TABLE2 | 5EF5 | TAKE0 | 5A65 |
| TAKE1 | 5A2D | TAKE11 | 5A6C | TAKE12 | 5A73 | TAKE2 | 5A34 | TAKE3 | 5A3B | TAKE4 | 5A42 |
| TAKE5 | 5A49 | TAKE6 | 5A50 | TAKE7 | 5A57 | TAKE9 | 5A5F | TAKIT | 5A14 | TEMP | 0076 |
| TEMPSC | 00FB | TENSCO | 00BD | TEST1 | 77BB | TEST2 | 77C7 | TEST3 | 775F | TEST4 | 7753 |
| THRU1 | 6D1D | THRU2 | 6055 | TIME | 0096 | TIMEC | 6E3C | TIMER | 6F35 | TLKNOK | 5CD0 |
| TLKOK | 5CD5 | TOP | 7C76 | TRANSM | 7EA5 | TRUE | 6743 | TRY001 | 60BB | TRY010 | 6092 |
| TRY011 | 609C | TRY100 | 60A6 | TRY101 | 6080 | TRY110 | 60BB | TUIT | 7EE3 | UNDER | 74DC |
| UPDATE | 7497 | UPPER | 7493 | VECTOR | 601B | WAIT | 7D22 | WAIT1 | 76F0 | WAIT2 | 6414 |
| WAITR | 64A3 | WAITS | 6255 | WARTE | 7DAA | WARTE1 | 7DB0 | WARTE2 | 7DB6 | WARTE3 | 7DBC |
| WARTEA | 7DB3 | WARTER | 7DB9 | WASTE | 62F3 | WATCH | 5F46 | WATCHR | 5F68 | WDATA | 7B13 |
| WEIHNA | 7C37 | WETTER | 7013 | WIEDER | 7C41 | WORD | 62D4 | WORK | 63C2 | XBUFF | 7897 |
| XFDATA | 67FB | XMIT | 1700 | XMITLV | 67F5 | XMITR | 64B1 | Z0 | 5A13 | Z1 | 5A1A |
| ZERODB | 7CA2 | ZURUCK | 6FF9 |

ROM LISTINGS

PATENT T=00003 IS ON CR00003 USING 00024 BLKS R=0000

```
0001   S0060000+B+45218
0002   S11358006630012B0F1724056D5D0B2006492A036F
0003   S113581005AD23996F38520270385CD78630003A
0004   S113582043B1402E013981452603FE5A21B1462633
0005   S11358300337E5874814426037E59046814926037EDD
0006   S113584059658140260376E59836814F26037E5A6E05
0007   S113585006150260376E59941815260376E59D4815AB0
0008   S11358602603FE5A043B15326037E5A48B14C2603BC
0009   S113587077E5A6639C6FFCE00F9BD58D3290A8C0027
0010   S1135BB0FD26013907A70008020F097768C00FC270636
0011   S1135B9080C00FD271139935FA48484B489AF897EE40
0012   S1135BA096F997ED201496F6464B484B9AFC97EEE1
0013   S1135BB09CF948484B489AFA97ED86409EO2E01AB
0014   S1135BC03995ED8B0022C0139967606F3CA01D7F3C6
0015   S1135BD07E5826863001261066100084182619864F
0016   S1135BE030028520266ED2010661300043B1202736C6
0017   S1135BF0413923070C1FF270A3232398030280F90A54
0018   S11359002001063980580381002721B101271606E8
0019   S113594010EFC4E0C1A02705C1C02701398102713C4
0020   S113592081032715398FDDC007E5A8F86FFC6027C
0021   S1135930307E5A8F863FC5A07E5A8F86DFC6007E5A27
0022   S113594066FDD5803B1002709B8101270CB1022706B0
0023   S113595039B6F1C5007E5A98B6F9C6087E5A98861A
0024   S113596D0FDC6007E5A98BD5AA1BD580381002705A7
0025   S1135978D10127083986D0DC6107E5A9886EDC62037
0026   S113598D07E5A98D05D03B1012719B102271CB103AF
0027   S113599D0271F81042722B10527258106272381076F
0028   S1135A0272B39861FC6007E5A8F863FC6207E5A13
0029   S1135A808F865FC5407E5A8F867FC6607E5A8F86EA
0030   S1135AC09FC5807E5A8F80BFC6A07E5A8F86FFC62A
0031   S1135AD0E07E5A8F805B03B1002700810127178196E
0032   S1135AE00227183103270A3986F7C6107E5A8F8644
0033   S1135AF0EFC6087E5A8F86FFC61C7E5A8F86FHC66A
0034   S1135B00187E5A8FA05A41B05803B1002705810144
0035   S1135B10270A3986700605007E5A98A6BDC6007E5A00
0036   S1135B209696EF97F096F197F296F346241948907D3
0037   S1135B30F3967C6B40F977C871700006EEF71900066F
0038   S1135B40EDF71800F71800963B50427068402BA4FB
0039   S1135B50F897F396F3B508270586A4097F339848FAB
```

```
0040  S1135A5097F326300028A0B8730027F00F439BD5884
0041  S1135A70038100270581012707396627C600200620
0042  S1135A80862FC608200094F397F3DAF307F33994FA
0043  S1135A90EF97EFDAEFD7EF3994F197F1DAF107F125
0044  S1135AA0398604AF397F339BD58D381022D01390D
0045  S1135AB0D6F1C4FE1B97F1396D58D3810027058167
0046  S1135AC001270A39A6FFC6017E5A8F86FEC6007EEE
0047  S1135AD0548F863D028A038730020567CC4DF077C2E
0048  S1135AE0F71700960487190097EE861087180087A9
0049  S1135AF0160097ED461597EF97F086FC97F197F2CB
0050  S1135B007F00F37F00F4396F6B1FF26796708463
0051  S1135B102026013996F35540271CD6F0C4E0C1B0C5
0052  S1135B2026088510271084EF97F3C650D7F4F63073
0053  S1135B3002C4F7F73002F63002C580270A858026B2
0054  S1135B400652026092003552027038D5CD7396D92
0055  S1135B505CF1E630028A0B8730027F00F496F38411
0056  S1135B607F97F396F581BE260B862080C948699BB
0057  S1135B7097F52021967D520270B8620BD5C9428F2
0058  S1135B80143985402708862080C94280839062D56
0059  S1135B908D5C94291A96F5432616967E8520260820
0060  S1135BA0B620B05C942801398620BD5C94282C395C
0061  S1135BB0D07EC520251A4384F08lF0270C44444441
0062  S1135BC044B30B0SC9420B8398620BD5C94290F61
0063  S1135BD096F5840F8A30BD5C9429D496F64326lC2D
0064  S1135BE0D67EC520270785208D5C9429C2862080A9
0065  S1135BF05C9429AB3620B05C942B33394384F081AE
0066  S1135C00F0270C444444443B0BD5C94280839B606
0067  S1135C1020B05C942946B07EC52027078652EBD5C10
0068  S1135C20942939G6F6A40F8430BD5C94292E862OF6
0069  S1135C30B05C942278620B05C942920B620BD5CFC
0070  S1135C40942914CE00F720010BA60043260F8620CB
0071  S1135C50B05C942907B52080C942826394384F0D2
0072  S1135C6061F0270C4444444BB30BD5C94280839AB
0073  S1135C70862080C9429E5A60084OF8A30BD5C941E
0074  S1135C8029D4BC00F3261360BD5C9429CE860ADB
0075  S1135C90BD5C943943F630D253C40326020B39B772
0076  S1135CA03000BD5CC7291FF63002C50227F4860800
0077  S1135CB08730028D5CC7290EF630025624F5B60FB4
0078  S1135CC0673002BD5CC739F630022809C540260542
0079  S1135CD08D5CD708390A397F30017F3000C62DF700
0080  S1135CE03001B630028A0437300286DF94F397F3AA
0081  S1135CF039C6FFF73000/F3001F73000863DB730FA
0082  S1135D00018620AF397F339F63002CA0BF7300275
0083  S1135D1096F3654027008D5CF196F4BD5C94BD5C80
0084  S1135D2007/F00F43945583452412120205E215E2A
0085  S1135D30215E105E105E095E055E095E055E195EDF
0086  S1135D40155E115E00455B3452412120205E415E7E
0087  S1135D50415E305E305E295E255E295E255E395EBF
0088  S1135D60355E315E20455B3452412120205E615EDE
0089  S1135D70615E5D5E5D5E495E455E495E455E595E9F
0090  S1135D80555E515E40455B3452412120205EB15E3E
0091  S1135D90815E705E705E695E655E695E655E795E7F
0092  S1135DA0755E715E60455B3452412120205EA15E9F
0093  S1135DB0A15E9D5E9D5E995E855E895E855E995E5F
0094  S1135DC0955E915E8O455B3452412120205EC55EFA
0095  S1135DD0C55EC95EC95E815EA95EAD5E455EB95E13
0096  S1135DE0B55EC15EB0455B3452412120205EED5E32
0097  S1135DF0ED5EF15EF15ED95ED15ED55ECD5EE15EB3
0098  S1135E00D5EF95EE5BC21E230BE61E228C21E256
0099  S1135E1030BE21F170BC21E230BE60E2A2BE60E37C
0100  S1135E2040BE41E380SC11E2005E51E800SC11E2D7
0101  S1135E30005E51E940BC11E2005E40EBB07E40E92A
0102  S1135E40408E11E980BC01E2305A41EB02BC01E2E3
0103  S1135E50309E01E950BC01+2225A69BBA25A28E9DE
0104  S1135E6042BE01E982BC0142307E4180028C01A263
0105  S1135E7030BE0131508C01A2307E40B0827E408140
0106  S1135E8040BE41918DBC41A2307E41A0043C61A2B0
0107  S1135E9030BE41A144BC61A2307E40A0847B40A1C0
0108  S1135EA0447B41A1848E25A410BE29A010BE65A4D4
0109  S1135EB002BE69A002BE24A410BE64A482BE25A4AE
0110  S1135EC010BE25A550BE09A580BE09A540BC25A2CB
0111  S1135ED0305C24A230BE05A222BE69A222BC25A282
0112  S1135EE0301C080455BC25A2301C00C4C61C00207C
0113  S1135EF0011C0820020B020C062B0A2C0E481A4C21
0114  S1135F001E642A6C2EB83A8C3EAB6AAC6E4FB71F6B
```

```
0115    S1135F1000860397BC96A8854026057F00AA200621
0116    S1135F2096AA843097AA96A684904748BD7549B069
0117    S1135F30753A86A08712007F13007F00F57F00F644
0118    S1135F407F00F7F00F8861000841826189CAH2851
0119    S1135F500C8A6097A80F8D5AD2BD5CD70E8601B7B1
0120    S1135F6013009A7E977E201596AHB47E97ABD67EDF
0121    S1135F70C4FED77E96F3842097F37F00F486110015
0122    S1135F8084022641AC5FF3D55C6840127189CAABA0C
0123    S1135F90D297AA86018D64A3BD78C37E5F0D86A661
0124    S1135FA08716002041B06584977585022712168410
0125    S1135FB0F841B8252896758941FC6C018977520100C6
0126    S1135FC0641B811482617967516C4F8C1D826078632
0127    S1135FD055D675C4041834FC97757E62179675B4C5
0128    S1135FE0F861B027048100260D9675168948C40170
0129    S1135FF053581B152002D675C4FED77A9675168497
0130    S11360001681082603766124CE5D250F76D67AD8EF
0131    S113601077D77724037C0076DE76EE004600977BA4
0132    S113602C6716004601B5202704D6AH2A14977CB79E
0133    S113603017008604C61087190DF71800F7180020D7
0134    S113604014B4DF977CB71700966EED6EDB71900F7E6
0135    S113605015D0F71800A602977DA603D6AB2A028A79
0136    S113606001977E96732B10C6089CA82A02CA01F7CD
0137    S113607013008605406A386018064A3967584E000
0138    S113608026067F007F7E5D3812026067F007F7EE2
0139    S11360906BEB614026067F007F7E69FEB1602606CF
0140    S11360A07F007F7E6327818026067F007F76DD01C7
0141    S11360B081A026078673977F7E6FDF81C0260786BF
0142    S11360C002977F7E65D38D3E977BH71600868197EC
0143    S11360D07CB717007F007F4FE71400860797AD8603
0144    S11360E0A29770B608B71300F7007EBD7A29290B13
0145    S11360F03D610A3D64C623F37E5F0D86058064A339
0146    S1136100306104860580644320E986A08712007F9D
0147    S1136110300860A871D04F671D01B71D02860C78
0148    S1136120871D0339865E97B6716008640977CB7A8
0149    S113613017008604C61087190DF71800F718008670
0150    S113614041977DB71200860806AB2A02840197EF2
0151    S1136150B7130077007F4F871400860880644380D4A
0152    S113616055BAB41681082703E5F00967B871600F5
0153    S1136170967C871700563797ADBD74292961967DC3
0154    S1136180871200966AAB52026480F968506967F08A
0155    S113619086506650127C9657026C51784038102269B
0156    S1136140BEC18E272CC1F2273AC1762782C18A27F5
0157    S11361B0AEC17227AACE5EF6E10027098C5F0C27D8
0158    S11361C04C086820F3094600977AD7B48D648120F1F
0159    S11361D08E96A485202735B4CF97AAC572BD648FB
0160    S11361E07E615F0634503064B17F00AA95AB8848053
0161    S11361F097A86013064A3967A975964B8A40975D
0162    S113620A8967A81EE260376D0C67E5D03C6EED722
0163    S113621074BD6441762527368E9775871600864007
0164    S113622097CB71700863+C6108719DDF71800F753
0165    S11362301800663797ADB5A0977DB71200860806DA
0166    S1136240A82402A019770B713007F007F4FB714F1
0167    S113625009850F9775601B064A37A00762708A071
0168    S113626054526F17E5F00967B871600967CB71746
0169    S113627009AAB520270E84CF97AAC613D751C45
0170    S1136280B01E305437F008575006696AB8480975D
0171    S113629CARCED05407633967584E4BA08CE5EF517
0172    S11362A010027168C5F03270408082F3C608BD3D
0173    S11362B0751C804C28807E5F0D008A600977A865B
0174    S11362C0297562CE9784BD63C2402707A5012742
0175    S11362D0EE7E5F00C570260D696AEB172272CCEA089
0176    S11362E005B094426FD0F9685D6867F008508501
0177    S11362F012F04570260C172270F0926E3C60604
0178    S113630407B1C860A8D64A320856601978696745E
0179    S113631097B46D53C24D27068501277EE2083C57025F
0180    S113632027187C0089860A418926DF7F0039C603A5
0181    S1136330BD751C860A80644320D07F0089D6AED16A
0182    S1136340B4271EC1EE260DC607BD751C860A8D64A2
0183    S1136350A37E63047C008A860A918A26F4C60420F6
0184    S1136360EBB601978685F2978480634024027048F5
0185    S1136370012703E5F007E625FC5702611D6AE501B
0186    S1136380D17A26022026067AD1AE260CCE2009BE9
0187    S113639095B5012810092BFC6055D751C860A8DFC
0188    S11363A054A37E528F968640917A26EC967A97B43F
0189    S11363B0967584FE977A7F00AA96AB8A4097AB7E47
```

```
0190    S11363C0600B06348D64817A008626F67F00877F64
0191    S113630U008B6D645F2929BD742928357F008B7C25
0192    S11363E0008786309187270786018D64A320E37F59
0193    S11363F0006C6018D751C860ABD64A38602205081
0194    S1136400350126AC5F8D751C860AHD64A38601208B
0195    S113641U3FCE13380926F07F0067F96B506B6F39
0196    S113642000550E3504260A35012706D7AE164F202F
0197    S113643O1F7C008B8630913626987F0088B62000CB
0198    S113644065042600C602BD751C860A9D64A3860498
0199    S1136450G9C611BD751C360ABC64A3860820F1B631
0200    S11364501100350326359OA62A09B61000B4182737
0201    S1136470072026B51000200296EFB502261B16C4BC
0202    S1136480F8C10B2605C6384041B84FCD675C4FCA0
0203    S1136490112700R41381182704B6010B394F20FBIE
0204    S11364A0A20F94D270ACE2710090126FC4A26F6B0
0205    S11364B039DF70B52000640227F7CE186A0926FD54
0206    S11364C0F72001DE763996AB64DF97A82A0AB61043
0207    S11364D00084182703TE65B59675841881082603O1
0208    S113642U7E658696AA840227037E65B8C6FFB065CD
0209    S11364F0C684012644F611O0C402263D8D65BA8453
0210    S1136500106118264696A43520262E967585022679
0211    S1136510U884F8818826520068AF881D3261D8D74
0212    S1136520658A1634E08140270481C0260C96758A80
0213    S1136530006C4061126037E556B7E65850675C4FE0D
0214    S1136540505658A84FE11262A7E658BD658A84F895
0215    S113655001B02704810O260EBD656A84F3D675C4EC
0216    S11365b0F811275A200CBD056A84FAD675C4FA1100
0217    S1136570274696A8B420253D6601BD64A396A8BA4C
0218    S113658020974B7E64D8BD656A8A4128108271A8623
0219    S11365900597B0C560F717006608D64A3C68EB044
0220    S11365A064B174008026F5200C96AB8440270696CB
0221    S11365B0AAB42027030820010A3996AB2B05B61089
0222    S11365C000200296F03996AB2B05B61100201796E1
0223    S11365D0F25D2612D5F3C502270CC4FD07F3C6F02C
0224    S11365E0DAF107F107F239F63003663002B51O2646
0225    S11365F003BD5B0096AA6502270037E66988620003C
0226    S1136000ZA3DF620018504260097B50786B5702605
0227    S11366105896851634038102262796A8B4FC97AB52
0228    S1136620C18E2751964AB52020684CF97AAC176C5
0229    S1136030275501B42651964B8A0197A87F00832098
0230    S11366405681012542967AB8401274C9683CE00AF07
0231    S1136650DF73B7397792403TC007BDE79E7008CD7
0232    S11366600B227237C00332020296AAB5202618B4FE
0233    S1136670CF97AA20129644B510270682097AA20C7
0234    S11366R0056A1074AA2000y6AB84FE97AB20089642
0235    S11366590A584FEBA029748B66200097C3B6200185
0236    S11366A09TCB3A96O198A919B160270497A9202ZDA
0237    S11366B07F00A9A50193A81997A89696271491A8EC
0238    S11366C0270220OE4F8714004FB71F0096AB8A0C59
0239    S11366D097A83696AAB5022704860720028637974A
0240    S11366E0AD8B074292803TE68C596751684188108B3
0241    S11365F026037E62B8C4J22608675C41CC11C26DA
0242    S1136700037E6863CE00A08076888D756846019740
0243    S11367105A8502706CE00806D75FCCE008680761B
0244    S11367Z06B8D7698D703096AAB502263B967584EF
0245    S113673U1B6108250203196758402261A5F3D65F0
0246    S1136740C6642S0CCE00A48D76FF96AB8A1097A844
0247    S11367509rA9841027129675B402260CCE008DBD59
0248    S11367607BFCCE00A8BD7636CE008680768B86053C
0249    S1136770978B4D7635968584F09785967584188187
0250    S11367B006260CCE00B08D766580781378681396UE
0251    S11367905064F0270ECE008D806D75FC967D8AC08A6F
0252    S1136740DF2006957D8A80849F977DCE009E8D76ED
0253    S11367B0FFCE00C78D75FFCE0080BD75C9CE00C136
0254    S11367C0076FFCE008DC608HD76785A26FA8D771E
0255    S113670041967006750C4022600D6ABC41027068418
0256    S11367E0F06A10200697DB4EFBA02977DCE009E56
0257    S11367F0C6056D75785A26FABD779D9675841E81A6
0258    S1136800182610851400979861B009791CE008CEC
0259    S113681007613964A8A4022701398D64C629037E74
0260    S11368205003967584F881027318D65BA84FBD6CD
0261    S1136B3075C4F81126179675841BB118270CD67517
0262    S1136840C4043065BA84041126037E5F0D96A8B42F
0263    S1136850EF97A8CE00A48D768B20EFBD65BA16844E
0264    S1136860F8010027E5B1B027E120E2BD787729A31C
```

```
0265   S11368700968484F08190260A86994783978297810B
0266   S1136880975060767E6737967DB71200967EB77F
0267   S113689013009675B40427037E6704CE0080B07888
0268   S11368A07722022010B61A009776B61B009777DE6C
0269   S11368B0849C762700968B5714009684B71800877F
0270   S11368C015007E5B1336FF97CA9675841C810C276E
0271   S11368D0037E67F8CE00808D768BCE8E10DF84CEF8
0272   S11368E00080B076787E67839675840227068637965
0273   S11368F097602004860797ADBD7429280375690916
0274   S1136900967516841B810826037E69C7C402260377
0275   S11369107659A9CE0080BD768BD7568A60197847B
0276   S113692CA60081902606CE0080BD75FCCE0086BDF3
0277   S1136930765ABD7698BD7636BD768A967984802625
0278   S1136940006650978BBD75367F00852000B6059783
0279   S1136950B860763696B584F09785967584188110864
0280   S1136960250037E69F29680A4F08190260ECE008004
0281   S11369708D75FC967D8AC004DF20049670849F9734
0282   S11369B0D967E871300CE0080967584022604C6D9
0283   S1136990042002C605BD76785A26FABD7790B064EB
0284   S11369A0C629037E68E87E5F0D0675C41CC11C270A
0285   S11369B00CCE0080BD76388D758A7E691CBD787720
0286   S11369C02939B076782095967EB71300957DB7123E
0287   S11369D0009675840427C72008967584ICB10C26DC
0288   S11369E01ACE00808D768BCE5E10DF84CE0080BD73
0289   S11369F0767ECE00808D75658D78137E699E9675E7
0290   S1136A0068022706B637974D2004860797AD8D744B
0291   S1136A1094226037E68029575168418B1082503TE46
0292   S1136A20CAF0C4022B037E6AD1CE0080BD768BBD97
0293   S1136A30755BA5019784A500CE008081902603BDC8
0294   S1136A4075FCCE00863D75ABBD7698BD7636BD765B
0295   S1136A500596788480260C36B5097ABBD76367F0080
0296   S1136A6065200086059763BD7636968584F09785AF
0297   S1136A70967584188108260376B61B968084F081AA
0298   S1136AB090260ECE0080BD75FC967D8AC034DF20E2
0299   S1136A90649670849F977DCE009EB076FF96758477
0300   S1136AA0022604C604200CC605BD76785A26FACE0C
0301   S1136AB0008030F75C9C608BD76785A26FABD7741EE
0302   S1136AC0CE009E8D779DB064C624037E69FE7E5F80
0303   S1136AD00D0675C41CC11C270CCE0080BD768BBDA1
0304   S1136AE075847E6A328D787729DCBD76787E6A789A
0305   S1136AF09670B71200967EB71300967584042B0946
0306   S1136B0020C49675841CB10C261ACE0080BD768B19
0307   S1136B10CEBE10DF84CE00B0BD767BCE0050BD76FB
0308   S1136B2065407B137E5AC6363697A4967584022757
0309   S1136B30058637970200A363797ADBD7429280330
0310   S1136B407E5C9796751684188108260375C85C41E
0311   S1136B500226037E6C66CE0080BD768B8D755A66A
0312   S1136B60019784A50081902606CE00808075FCCE08
0313   S1136B700086807688807598BD76369675840227E1
0314   S1136B80037E5BFABU6C88CE008CBD76883D76FFED
0315   S1136B90C60AD79BCE0092BD768BB60797ADBD7492
0316   S1136BA02928068D5CD97E6C97CE0080BD768BBD3E
0317   S1136BB0755AA6019734CE0086BD768BD07698BD46
0318   S1136BC075J6CE0092BD7J6BD76FF7A009826CE14
0319   S1136BD0CE0060B07665BD75FCCE008CBD7636BD1D
0320   S1136BE0708B86509791BD7636BD76FFBD5CD956BF
0321   S1136BF075841B8105210765C80CE008CBD768B0F
0322   S1136C008B059791BD7538CE008CBD76FF968C8432
0323   S1136C10F0819026088D75FC967D8AC084DF20042C
0324   S1136C2096708A9F977DCE008C9675840226077F7F
0325   S1136C3000C6042003596184F097916058D760C
0326   S1136C407B5A26FACE0080307609C60BD76785A31
0327   S1136C5026FABD7741CE00BCBD779DBD64C628035E
0328   S1136C607E5F0D7EB3730675C41CC11C270CCE000D
0329   S1136C7080B076B3BD758A7E685F8D7877290CBD30
0330   S1136C80767B7E6C07967D871200967EB71300D691
0331   S1136C9075C404250120190675C41CC10C26BCCEDB
0332   S1136CA008C8D7688CEBE10DF90CE00BCBD767B86
0333   S1136CB0CE00CBD76653D7B1320A09678438C4C5
0334   S1136CC0444406A4C4F01B97A45496784C71B9752
0335   S1136CD07B967B84F9C60220IC967B843846A414
0336   S1136CE0C40F1597A4353858967884C71897788660
0337   S1136CF0994735C60618977B871600860590544373
0338   S1136D00399675168413B10826037E6D99C5022765
0339   S1136D10F9263797AD8D742928037E6D8ECE008029
```

| | |
|---|---|
| 0340 | S11360208076880750BA6019784A6008190260662 |
| 0341 | S1136030CE00808075FCCE0086B07598BD7636BD8E |
| 0342 | S11360407688660597B85D7636968584F0978596E7 |
| 0343 | S113605080B4F0270ECE0080E075FC967D8AC084A9 |
| 0344 | S11360600F20049670849F977DCE009EBD76FFC66E |
| 0345 | S11360700520767B5A26FACE0080BD76C9C6088D10 |
| 0346 | S113608076785A26FABD7741CE009EBD779D8D64C4 |
| 0347 | S1136090C629037E5D017E5F008640977F864B87CA |
| 0348 | S11360A01400BD6F02BD5F8FCE009EBD768BCE00EA |
| 0349 | S11360B0808076889575841B610826088640B714A2 |
| 0350 | S11360C0607E6F535F8D05C68430B130270D8120FE |
| 0351 | S11360D026037E6E508D0FAB7EBE47967E85082629 |
| 0352 | S11360E0037E6F949675841C811C273A96AA8501AC |
| 0353 | S11360F02634CEFFFFB61E002B2C0926F896758488 |
| 0354 | S1136E001C811825133544371400BD6FAB8D6FBF39 |
| 0355 | S1136E10CEBE140F9F7E6F9496708AC084DF477DFB |
| 0356 | S1136E2096AABA0197AAC5FFED65C6840C2708B162 |
| 0357 | S1136E300827034F20066615200226050696112788 |
| 0358 | S1136E4055BD6FD2BD0FAB9670BAA097707E6D993F |
| 0419 | S113721097A30E870F84B073DA6608978E869297EC |
| 0420 | S11372208D80724380736B7A00BB260220037E711C |
| 0421 | S113723CC5DE9827159 67F84EFB714000926FD968E |
| 0422 | S113724O7FB71400CE00FF0926FD390FCE00034638 |
| 0423 | S11372506516840F3654545454370926F2CE00064A |
| 0424 | S1137260032A7B8092 6FA0ECE00066F916F97092676 |
| 0425 | S1137270F9CE0006A6B8979891BE2D12969B98BBDC9 |
| 0426 | S11372801997986C91E691918E2D037E727C969825 |
| 0427 | S1137290484684848ABBAA78A092F037E7274CE00F7 |
| 0428 | S11372A006A6910926FB39CE0080607208089684C3 |
| 0429 | S11372B061FF26059685B072DC968516840FB71C62 |
| 0430 | S11372C00354545454F71C029684168840FB71C01BB |
| 0431 | S11372D054545454F71C0039A604270C84F02600B8 |
| 0432 | S11372E0A6048AF0A704200486FFA704399685AB78 |
| 0433 | S11372F00519A70596844904197049683A9031957 |
| 0434 | S1137300470339A60397B6A6049787A60597068688 |
| 0435 | S113731003978E869797B0B0724R0FCE0006A6910C |
| 0436 | S11373204848484804A903609092 6F3329785329787 |
| 0437 | S11373308432978030E39000A141E28323C46505A70 |
| 0438 | S11373400000006400C8012C019001F40258028C42 |
| 0439 | S1137350032003840000038070008A80FA0138BB0 |
| 0440 | S1137360177018581F402328CE0098BD768BCE7310 |
| 0441 | S113737036OF9A9692979996938073D0DE9AA6008B |
| 0442 | S11373809B99979924037C0098CE7336DF9A969440 |
| 0443 | S1137390484CC60A188073D00E9AA6009B999799E8 |
| 0444 | S11373A024037C009809A60098989798CE7336DF37 |
| 0445 | S11373B0949695484CC61E1B6073D00E9AA6009BB8 |
| 0446 | S11373C09997992A4037C009809A6009B9897983968 |
| 0447 | S11373D0989824037C0094979B39CE0003967D8463 |
| 0448 | S11373E09F8A40977D5F8694A082A7850926F7CE5C |
| 0449 | S11373F000030D467FA98519A7850926F6DE8796C1 |
| 0450 | S1137400862A25CE0003C6808699A085A7850926ED |
| 0451 | S113741OF7CE00034F00A98519A78586000926F626 |
| 0452 | S1137420DE87967D849F977D390F5F957F849216C1 |
| 0453 | S1137430BA0467140OF71400CE00FA178A08B714AB |
| 0454 | S113744000092 6FDF71400CE00608D768BBD76982A |
| 0455 | S1137450E96832D0696B484F0271A967BB43844F5 |
| 0456 | S11374604444D6ADC40F112765D6832629C613D14B |
| 0457 | S113747084232320780604267796788438444444413 |
| 0458 | S11374806ADC4F054545454112208D685C110023E7 |
| 0459 | S1137490482050442001 4CC6C7D47BD778484B4863 |
| 0460 | S11374A09A7897788716 00B065BA841B8108271 6A6 |
| 0461 | S11374B08064C62933967B280588604BD64A3B6026E |
| 0462 | S11374C08D64A37E742996AA652027E9201ABD7479 |
| 0463 | S11374D0F6967D3A80849F871200200C8D74F696C0 |
| 0464 | S11374E07D8AC0840F8712 00967FB71400082 00595 |
| 0465 | S11374F0967FB714003980753ABD7549967E84DF11 |
| 0466 | S1137500871300967D8AA0H712008699970597F66F |
| 0467 | S1137510 97F797F806AB2A03BD58O739CE008O8D39 |
| 0468 | S1137520768B863EA701E7028D779D967D8AA0B7BC |
| 0469 | S1137530120096 7E84DF8713003986FFB71C006 7AC |
| 0470 | S11375401C01B71C028710033986FFB71D008710D9 |
| 0471 | S11375500168710028710033990709060905090400A0 |
| 0472 | S1137560903090200910000B0967B84384444442648 |
| 0473 | S1137570005CE75582033442605CE755A20284A2647 |
| 0474 | S1137580005CE755C20234A2605CE755E20184A264F |

```
0475  S113759005CE756020134A2605CE756220084A2657
0476  S113754005CE75642003CE75663900200030004096
0477  S11375B0005000600070008000909678843644442
0478  S11375C0442605CE75AA20334A2605CE75AC202859
0479  S113750004A2605CE75AE20234A2605CE7580201B5B
0480  S11375E04A2605CE75B220134A2605CE75B4200663
0481  S11375F04A2605CE75362003CE75H839C60507846C
0482  S113760001F06A6052717869A20028699400519A7A2
0483  S113761005095A26F53699400519A70539095A2698
0484  S113762061A60527F7840F260486A02002869AA0E7
0485  S113763000519A70520E65F9685AB051997359684FD
0486  S113764089041997849683490319978396B2A9029A
0487  S11376501997829581490119978196B0A900199793
0488  S113766080240150398604006600640166026603A8
0489  S11376706604660544260F39660400690569046986
0490  S113768003690269016900442605F0396F056F046FC6
0491  S113769003F026F016F0039807688861500840F3E
0492  S11376A0F6150158585853618A705861502840FF64D
0493  S11376B01503585858581847048615048400FF6151B
0494  S11376C005585858581BA703390FDF76967F841244
0495  S11376D008A20168A048714008F714001784B0CE0F84
0496  S11376E041H714000926FD967F01F71400CE012549
0497  S11376F00926FDDE768D7698967F87140008E39967E
0498  S113770080A7009581A7019682A7029683A703967S
0499  S113771084A7049685A705390FA60036460136A6CB
0500  S113772002364603364604364605360E76324704624
0501  S113773032A70432A70332A70232A70132A7000EF0
0502  S113774039A600261A85FFA700A601260686F0A7FA
0503  S113775001201684F0261286F0AA01A701200A84CB
0504  S113776F0260686F0AA00A700A600097F71684F074
0505  S113777044444444C40FB71D00F71D01A60197F803
0506  S113778016B4F044444444C40FB71D02F71D039605
0507  S113779076D6A62A048A01977EB7130039A6084EB
0508  S11377A00F263296700C490046977DA6012600B640
0509  S11377B0FFA701D67EC4202624200C84F0261EB632
0510  S11377C0F0AA01A7012016A60284F0261086F0AACA
0511  S11377D0024702200896700C490046977DA60197C6
0512  S11377E0F51684F044444444C40FB71C00F71C014C
0513  S11377F0A60297F616B4F044444444C40FB71C020E
0514  S113780F71C03967D371200B63002851026038D1F
0515  S113781058D739C68A8D2A4605840F484848488DD7
0516  S113782010A60584F08D174604840F484848488D8A
0517  S113783000A6048488D07CE27100926FD39B80190
0518  S113784016B620000840227F9F720013996AF84F098
0519  S113785044444444A7059680B4F0AA05A7059681OC
0520  S113786084F0444444447049682B4F0AA04A704D0
0521  S113787096A684FC97AB39CE61A8964BB4022619EB
0522  S113788092707BD64C62BF2200D9675841B81085F
0523  S113789027050609307510CUB390FCE00808D76883C
0524  S11378A08D764C0EA604818E2616E605C11026033B
0525  S11378B08D754937B0751CB6BE978433D78520D7DF
0526  S11378C00A2005SFEB0E7F00EA86119775B650000B
0527  S11378D00B10126037E5000CE001A6FCD0926FBB627
0528  S11378E01100654026037E787858026078676A970C
0529  S11378F0EA7E7C9A8688978397849785BD72A787A74A
0530  S11379001D00B71001871D02671D03861FB7120066
0531  S113791086FFB713000D7JAABD70AA8643977CB7A9
0532  S113792017008686977687160046B71400977FB66B
0533  S11379308297704712008622977EB71300BD753AF1
0534  S113794080754905E00C7BD7688CE00C1BD76BB7F99
0535  S113795008B860487190036026718008718009754
0536  S113796050F+070833603978BD7ECEBD66D3CE008F
0537  S1137970006209787807E10607DF6861087180002A
0538  S1137980037150097BFBD708386219787BD7ECEBD26
0539  S11379908603CE00003D7E16D70DFB8639871800CE
0540  S11379A0871800978FBD70AABD7ECEBD66D3862223
0541  S11379B08975FCE00008D7E1607DF886F68716000E
0542  S11379C0977CE00C73D768BCE00C1BD768B80037B
0543  S11379D0871500B71800978FBD70AABD7ECEBD669F
0544  S11379E003CE16503610978660309787868097884B
0545  S11379F080D7E10867687160097788610871800B7C1
0546  S1137A001B0E0D7DAABD7ECEBD66D386039788CECE
0547  S1137A1000000863197B77F00668D7E108630871856
0548  S1137A200B71800807DAABD7ECEBD66D3CE025050
0549  S1137A308610973886329787668097B8BD7E10862E
```

```
0550   S1137A4032977B8716006610B71800B71800BD7083
0551   S1137A50AABD7ECE8D660396CA260696C881502497
0552   S1137A6004863397E180 7DAABD7AABD753ABD7577
0553   S1137A70497F007D8620371800B71800963287 16F4
0554   S1137A8000BD7AAB60CD6AB2A014CB71300B6E054
0555   S1137A90B712006328716009778864016CA44F7A1
0556   S1137AA014006714006C606BD7AA5A26FACEFFFFFD
0557   S1137AB00926FDCE128C0926FDCE00E0BD7698B65F
0558   S1137AC00487130097 7E968597B196849780BD7737
0559   S1137AD0413D7ED78D7AA7F0083CE0070DF817F4C
0560   S1137AE006050 73DAB5E0B712007D0086260B7D28
0561   S1137AF00872606968B31042304863497E0BD7D9A
0562   S1137B00AA86E4B71200977D8602B71300977E8693
0563   S1137B1045371700977C558667160097 7836739790
0564   S1137B207F8714008603978C861BB71800B71800EF
0565   S1137B3086B64BD7E678D7199860EBD7E67864757E4
0566   S1137B401700862AB07E67B611008580260680 7096
0567   S1137B50AABD7AAB61C8D7E678630978B8670978A
0568   S1137B6087BD7E31B61C8D7E678610978B867197E4
0569   S1137B70B7B07EB17F007D361E0085402 7037E7CD5
0570   S1137B5051B61F872000CE009EBD76B88640B71766
0571   S1137B90006B30B71600362000850426086B809788
0572   S1137BA00997 9EBD70B9361DB72000C6040 7B7B648
0573   S1137B502000F6200185042711BD70B897A00B7267F
0574   S1137BC0EEB6B0970 9979E7E7C51BD7DB90E7F004D
0575   S1137BD08C869D372000C5AABD7EA5CE0EA60926EA
0576   S1137BE0FD3F6610B72000C6F0BD7EA5C60FBD7E36
0577   S1137BF045CE25000926FD869DB72000CE00FF09ED
0578   S1137C0026FD96C7D6C831A327068681970B979F55
0579   S1137C10B59987 2000B72000C6AABD7EA5CE100065
0580   S1137C20092 6FDB69D872000 3E96C7D6C881C32786
0581   S1137C300686B8297D697A086089 7B7CE10000926A5
0582   S1137C40FDC6FFBD7EA50E3EBD7D94587A00B726C5
0583   S1137C50F28610B71800B71800BD7EF186 10B72054
0584   S1137C600096E4B1F427037E7D32B6B09778B716A9
0585   S1137C700086619 71700B51000B402270E8621978C
0586   S1137C807C5610977E86FDC604200C8661977C86D0
0587   S1137C90029 77E85FFC6069478977BDA7BD77BF7B9
0588   S1137CA016006B6029A7C977CB71700B61000 4444ED
0589   S1137CB04444448100272981012728810227 2D81F7
0590   S1137CC00372F96EEB71D00B71D01B71D0257 1D90
0591   S1137CD0036 71C03B71C01B71C02B71C037E7CABA6
0592   S1137CE086BFC6B02010865FFC6C0200A863FC60016
0593   S1137CF02004867FC5409 47B977BDA7BD77BF7167C
0594   S1137D00004F7DCUCE008386E4977DBD779DCE0007
0595   S1137D10B04076C9C608307 6765A26FABD7741CEAD
0596   S1137D20100001010109 2FAED65C6840127037EFE
0597   S1137D307C7686E0977DB712004F977EB713009745
0598   S1137D408397 84978 5BD753ABD7549CE001AA6CD33
0599   S1137D5026220926F9CE9950DFF5BD7EDE8605B7C9
0600   S1137D601C036 71C0286008 71C01860CB71C00C689
0601   S1137D70FF 7E7D7DB07ECEBD7DE90926F7BD7B645
0602   S1137D80020C9CE3A98092 6FD96AAB4FD97AAB69015
0603   S1137D908 720039 96C7350426098570260596CB3C
0604   S1137DA0112706B683970797A139CEFFFFBD 7EB6EC
0605   S1137DB00 0926FDCEFFFF0926FDCEFFFF0926FD396A
0606   S1137DC00F5F967F8492158A04B71400F71400CECE
0607   S1137DD000FA17AA08B71400 0926FDF71400CE002C
0608   S1137DE080BD76B8BD76980E39F8CD270DDF88BD01
0609   S1137DF0751C5D7DAABD7AADEBB3996C591BF2683
0610   S1137E00A96C6610622048102240 486 40970F393B
0611   S1137E107F008096CA978396CB978496CC9755DF0C
0612   S1137E20B1967D97C0BD730A96C0B712009 6B82AC2
0613   S1137E300596C08540272170008626 1C968 7B109E9
0614   S1137E402216484843487400BB7400BB7400BB746E
0615   S1137E5000889A9891BB23DECE001AA6CD27030969
0616   S1137E6026F 9968747C03997C0BD6FF9BD7E67A0E
0617   S1137E700C08601 91C02503BD 7ECE7D00C026E9E8
0618   S1137E80397F0080CE3000 0F81DECBDF8496CA9755
0619   S1137E9063BD737ADEB62 06968B91BB2306CE0060
0620   S1137EA00EBD7E5B39CEFFFFB62000850226036996
0621   S1137EB026F.6F7200139 9B452A07B610008418 2657
0622   S1137EC06BD65C6840127 01394EEB7E7D82D6F309
0623   S1137ED0C4BFCAB007F3395FD7F5D7F620055FD77B
0624   S1137EE0F7D7F8F63002C51026066BD7ECEBD5B3648
```

```
0525   S1137EF039CE009EA50027UD97F6869997F50F7672
0526   S1137F00807EDEDE750588C00A226F9398E00704F35
0527   S1137F10871F00851F872000869D6720008U754996
0528   S1137F20BD753A26A097120078130086118717008FB
0529   S1137F30B604C6103719U9F71800F71A00860887AA
0530   S1137F40130UCE53004F5FA800068C60002F888FE
0531   S1137F50572634SCA80008SC680026F9AR99262/0A
0532   S1137F50CA800083C700U20F688ED261A5CA80025
0533   S1137F70088C7800258884E1260005CA80008867F1A
0534   S1137F80C026F8A300270F71C0320FE860FB0644E
0535   S1137F90A37F00AA7F0048/FU0F37F00F47F008CB
0536   S1137FA07F00697F0084/F30027F3003860C873080
0537   S1137F002Cc1FF730038730028D5C070E7E5F000B
0538   S1047FCU3A82
0539   S10E7FF57E7FUC65E765E76A37F0C48
0540   S9030000FC
```

We claim:

1. Communication channel measuring apparatus comprising:
  two processor controlled machines, each having means for being selectively placed in a master mode and a slave mode and each machine comprising:
  a. a bus;
  b. control means for generating control code word corresponding to the master mode and the slave mode selection and to a desired measurement function and applying the code word to the bus;
  c. a first memory coupled to the bus for storing digital information;
  d. a second memory having stored microinstructions and coupled to the bus;
  e. a processing unit coupled to the bus for performing operations in response to the microinstructions stored in the second memory, digital information stored in the first memory, the control code word and parallel digital information appearing on the bus;
  f. first means coupled to the bus for receiving parallel digital information and converting the parallel digital information to a serial bit stream;
  g. a transmitter coupled to the first means to receive the serial bit stream from the first means and to a communication channel for applying a signal to the channel in response to the serial bit stream;
  h. second means for receiving a serial bit stream and converting the serial bit stream to parallel digital information;
  i. a receiver coupled to the communication channel and to the second means for applying a serial bit stream to the second means in response to receiving a signal on the channel; and
  means for coupling each of the processor controlled machines to distal ends of a communication channel to be measured.

2. Apparatus as in claim 1 where the first and second means comprise a modem coupled to the bus, the transmitter and the receiver.

3. Apparatus as in claim 1 wherein the first memory is a random access memory.

4. Apparatus as in claim 1 wherein the second memory is a read only memory.

5. Apparatus as in claim 1 wherein control means comprise:
  a plurality of switches;
  a plurality of latches coupled to and responsive to actuation of the plurality of switches and to digital information; and
  means for coupling the plurality of latches to the bus.

6. Apparatus as in claim 1 wherein control means comprise a computer.

7. Apparatus as in claim 1 wherein the transmitter produces a control signal in the form of frequency shift keying.

8. Apparatus as in claim 7 wherein the control signal comprises a first signal of 800 Hz frequency, representative of a logic high, and a second signal of 1200 Hz, representative of a logic low.

9. Apparatus as in claim 7 wherein the control signal comprises a 1990 Hz tone.

10. Apparatus as in claim 9 wherein the 1990 Hz tone is a carrier for an 83.3 Hz reference signal.

11. Apparatus as in claim 1 wherein the receiver is operable to receive a control signal only in response to receiving a 1990 Hz signal of a selected energy level.

12. Apparatus as in claim 11 wherein the receiver produces a serial bitstream having a logic high in resonse to receiving an 800 Hz frequency and a logic low in response to receiving a 1200 Hz frequency.

13. Apparatus as in claim 2 wherein the modem produces a serial bit stream wherein a serial word has eleven bits, eight bits being data, one bit being a start bit, one bit being a parity bit and one bit being a stop bit.

14. Apparatus as in claim 1 comprising a display coupled to the bus.

15. Apparatus as in claim 14 wherein the display comprises:
  a plurality of decoders; and
  a plurality of visual read out digital displays coupled to the plurality of decoders.

16. Apparatus as in claim 15 wherein the display comprises
  a plurality of visual annunciators; and
  a plurality of latches coupled to the plurality of annunciators and to the bus.

17. Apparatus as in claim 1 wherein the receiver has a receiver control latch coupled thereto, the transmitter has a transmitter control latch coupled thereto, the control means comprises a plurality of front panel latches which generate the control code word and comprising means for coupling the receiver control latch, the transmitter control latch and the front panel latches to the bus.

18. Apparatus as in claim 17 wherein the second memory has microinstructions stored therein for causing the processor to perform a normal measurement routine comprising the following steps:
  analyzing the control code;
  reading a look-up table stored by microinstruction in the second memory;

setting the front panel latches corresponding to switch settings necessary to make a desired measurement in response to the look-up table and the control code word;

enabling the receiver control latch to program the receiver into a configuration appropriate to the measurement; and making the measurement.

19. Apparatus as in claim 18 comprising a display wherein the second memory has microinstructions stored therein for causing the processor to apply data to the display.

20. Apparatus as in claim 17 wherein the transmitter produces a control signal and the second memory has microinstructions stored therein for causing the processor to perform a master/slave routine comprising the following steps:

analyzing the control code word;

reading a look-up table stored in the second memory;

setting the front panel latches corresponding to switch settings necessary to make a desired measurement in response to the look-up table and the control code word;

sending data corresponding to the direction of test and identifying the measurement by addressing the modem to transmit a control signal;

enabling the receiver control latch to program the receiver into a configuration appropriate to make the measurement; and enabling the transmitter control latch to program the transmitter into a configuration appropriate to make the measurement.

21. Apparatus as in claim 17 wherein one of the plurality of manual switches and a corresponding one of the plurality of front panel latches are operable to generate a control code word placing the apparatus in a slave mode and the second memory has microinstructions stored therein for causing the processor to perform a master/slave routine comprising the following steps:

analyzing the control code word;

identifying the control code word corresponding to the slave mode and accessing received data from the second means in response to the identification;

reading a look-up table stored in the second memory;

setting the front panel latches corresponding to switch settings necessary to make a desired measurement in response to the look-up table and the received data;

enabling the receiver control latch to program the receiver into a configuration appropriate to make the measurement; and enabling the transmitter control latch to program the transmitter into a configuration appropriate to make the measurement.

22. A method for testing a communication channel wherein a master processor controlled test instrument is coupled to one end of the communication channel and a slave processor controlled test instrument is coupled to another end of the communication channel, each instrument being responsive to control data comprising the steps of:

transmitting control data corresponding to an abort operation from the master instrument to the slave instrument over the channel;

transmitting control data corresponding to receipt of the abort message by the slave instrument over the channel in response to the slave instrument receiving the control data from the master instrument;

transmitting control data identifying a measurement by the master instrument to the slave instrument over the channel;

retransmitting the control data identifying the measurement and the direction of the measurement by the slave instrument back to the master instrument over the channel;

transmitting control data corresponding to an execute command by the master instrument to the slave instrument over the channel;

transmitting a two's complement of the control data corresponding to the execute command by the slave instrument to the master instrument over the channel; and transmitting measurement data.

23. A method as in claim 22 comprising the additional step of the master instrument displaying an error message in response to the slave instrument failing to respond to the master instrument with a control code identifying the measurement and measurement direction.

24. A method as in claim 22 wherein data is configured in an eleven-bit data word wherein the first bit is a start bit; the second and third bits identify the data as being measuement data and control data; the fourth through ninth bits identify measurement and duration; the tenth bit is a parity bit and the eleventh bit is a stop bit.

25. A method as in claim 22 wherein the step of transmitting measurement data comprises the steps of:

transmitting an analog signal on the channel in the direction of the test; and transmitting a digital signal on the channel in the opposite direction of the test.

26. A method as in claim 25 wherein the step of transmitting a digital signal on the channel comprises the steps of:

configuring the digital signal into eleven-bit words;

configuring the words into a five-word data block; and transmitting the data block.

* * * * *